US006062481A

United States Patent [19]

Storch et al.

[11] Patent Number: 6,062,481

[45] Date of Patent: May 16, 2000

[54] OPTIMAL ERROR-DETECTING, ERROR-CORRECTING AND OTHER CODING AND PROCESSING, PARTICULARLY FOR BAR CODES, AND APPLICATIONS THEREFOR SUCH AS COUNTERFEIT DETECTION

[75] Inventors: Leonard Storch; Ernst van Haagen, both of New York, N.Y.

[73] Assignee: Cias, Inc., New York, N.Y.

[21] Appl. No.: 08/689,927

[22] Filed: Aug. 16, 1996

Related U.S. Application Data

[63] Continuation of application No. 08/225,731, Apr. 11, 1994, Pat. No. 5,548,110, and a continuation-in-part of application No. 07/292,569, Dec. 30, 1988, abandoned, and application No. 07/109,075, Oct. 16, 1987, Pat. No. 5,088,093, which is a continuation-in-part of application No. 06/853,745, Apr. 18, 1986, Pat. No. 4,814,589, said application No. 07/292,569, is a continuation of application No. 06/853,745.

[51] Int. Cl.$^{7}$ ..................... G06K 19/06

[52] U.S. Cl. ..................... 235/494; 235/462.01

[58] Field of Search ..................... 235/462, 454, 235/494, 462.01

[56] References Cited

U.S. PATENT DOCUMENTS

| | | | |
|---|---|---|---|
| 3,838,251 | 9/1974 | Herrin | 235/463 |
| 3,896,917 | 7/1975 | Taplin | 400/131 |
| 4,644,143 | 2/1987 | McJohnson et al. | 235/462 |
| 4,660,221 | 4/1987 | Dlugos | 380/23 |
| 4,818,969 | 4/1989 | Krakauer et al. | 341/80 |

*Primary Examiner*—Karl Frech

*Attorney, Agent, or Firm*—Brown Raysman Millstein Felder & Steiner LLP

[57] ABSTRACT

Bar codes, comprised of black and white stripes, are shown to be a finite topic, and the optimum bar code methodology is binary coded binary, BCB. Binary digits are utilized to represent bar coded messages and each binary digit is immediately complemented, forming two independent but binarily complemented messages in one bar code symbol. BCB represents given information in less space than, e.g., Interleaved 2 of 5 and Code 39, while using the same x width (the width of a module), and BCB is far more versatile and is easier and less expensive to print and scan. BCB avoids misreads more reliably and achieves a dramatically higher first time read rate through use of error correcting bar codes.

19 Claims, 24 Drawing Sheets

BCB "A" Format: ASCII
Actual symbol = [barcode] = ABC
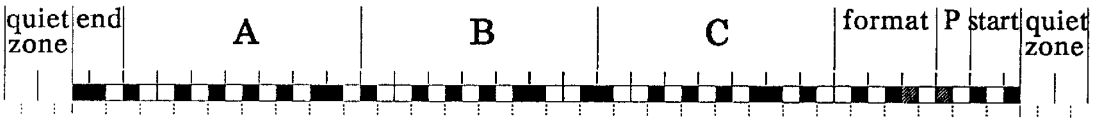
Figure 1
BCB "B" Format: Numerical Information (represented in binary arithmetic)
Actual symbol = [barcode] = 2,097,151 ($2^{21} - 1$)
Figure 2
3.6" BCB symbol (x = .01"), with 23.9 x $10^{51}$ numerical capacity
Figure 3

BCB Code Sample @ .01"

BCB Code Sample .0067"

BCB Code Sample .0033"

BCB S Format Samples

For 2, 4, 6 or 8 Binary Information Digits

!"#$%&'()0123456789abcdefghijklmnopqrstuvwxyz

BCB Numerical Information (represented in binary arithmetic)

Actual symbol = [barcode] = 999,033

BCB Alphanumeric Information (using Code 39's character set)

Actual symbol = [barcode] = CODE

BCB B & A, Numeric & Alphanumeric Bar Codes

Actual symbol = [barcode] = 1989AD

CODE

BCB A

Code 39

Fig. 45

10 BCBA 89

10 CODE 39

Fig. 46

Scan top row first

10 BCBA 89

SCAN TOP ROW FIRST

10 CODE 39

Fig. 47

10 BCBA 89

10 CODE 39

Fig. 48

Scan top row first

10 BCBA 89

SCAN TOP ROW FIRST

10 CODE 39

Fig. 49

OPTIMAL ERROR-DETECTING, ERROR-CORRECTING AND OTHER CODING AND PROCESSING, PARTICULARLY FOR BAR CODES, AND APPLICATIONS THEREFOR SUCH AS COUNTERFEIT DETECTION

This application is a continuation of application Ser. No. 08/225,731, filed Apr. 11, 1994, now U.S. Pat. No. 5,548,110, and is a continuation-in-part of application Ser. No. 292,569, filed Dec. 30, 1988, titled, "INFORMATION TRANSFER AND USE, PARTICULARLY WITH RESPECT TO COUNTERFEIT DETECTION," now abandoned, which is a continuation of application Ser. No. 853,745, filed Apr. 18, 1986, now U.S. Pat. No. 4,814,589, titled, INFORMATION TRANSFER AND USE, PARTICULARLY WITH RESPECT TO OBJECTS SUCH AS GAMBLING CHIPS," and this application is a continuation-in-part of application Ser. No. 109,075, filed Oct. 16, 1987, titled "SELF-CORRECTING REGISTERS, ERROR-DETECTING/CORRECTING REGISTERS, AND INVERSION CODING USING ONE BIT, AND OTHER INFORMATION STORAGE MEDIA," now U.S. Pat. No. 5,088,093 which is a continuation-in-part of the said U.S. Pat. No. 4,814,589, the disclosures of all of which are incorporated herein by reference.

BACKGROUND OF THE INVENTION

The invention disclosed herein relates generally to optimal, error-detecting, and/or error-correcting coding and other coding and processing, particularly for bar codes, and methods and apparatus therefor. More particularly, the invention relates to optimal bar codes, methods and apparatus for coding information represented by bar codes, methods and apparatus for processing information represented by bar codes, and methods and apparatus for detecting and correcting errors in information represented by bar codes. The invention further relates to methods and apparatus for machine reading bar codes. The invention also relates to detection of objects that either are unauthorized per se or are unauthorized as to their possession. The invention also relates to signals and coding in equipment and in information storage and transfer and use.

The invention and its background are described with particular reference to bar codes. However, the invention has wider application and it is not intended to limit the scope of the invention by such reference to bar codes. For example, the invention has application to the coding of signals and detecting and correcting of errors in fields such as communication, computers, data processing, data storage, mathematics and in other fields.

Bar codes provide a relatively simple and inexpensive way of inputting information to systems and equipment either fully automatically or semi-automatically with a minimum of manual effort. Bar codes are also an easy way for people to interact with systems and equipment. The use of bar codes has been expanding rapidly, from supermarkets to package pick-up and delivery control, to consumer use in programming VCRs, etc.

A bar code may be thought of as a specialized alphabet, or font, coded for machines to read (in the graphic arts, a font is a complete alphabet in a particular style and size, used for the purpose of setting type for printing plates). While the underlying function of type typically is readability, typestyles help convey mood, emotion, meaning, atmosphere and emphasis.

On the other hand, the primary function of a bar code "font" is to reliably provide information as efficiently as possible for a machine to read, particularly from paper. Unlike people, machines do not require variety and usually are more complex if they are to work with variety. Additionally, variety increases the possibility of error. The primary, and perhaps sole, criterion for judging a bar code is its performance, e.g., its information capacity for a given size, whether it possesses error correcting and/or error detecting, and if so, its error detecting and correcting ability (abbreviated as "EDAC"), etc.

Underlying the value of bar codes is their extremely low cost: they may be printed on plain paper, for example, and may be read with inexpensive scanners. They may be printed on labels affixed to articles, or otherwise associated with articles, and efficiently and inexpensively machine read. Perhaps no other computer-related technology can compare cost-wise to bar codes.

As they relate to computers and equipment and systems including a computer, bar codes are the printed language of computers and allow computers to acquire information automatically by machine reading bar codes, just as people acquire their information from reading print. Bar codes and computers increase the accuracy and dramatically decrease the cost of acquiring information. Because of computers, information is already the chief product and building block of modern society. However, few have begun to realize the impact that the combination of bar codes and computers will have in science, industry and society.

Although bar codes are already becoming vital to industry, they are not as reliable as they can and should be. More important is the recognition by applicants that today's bar codes do not fulfill their function efficiently: they do not contain information that they could or should, they occupy too much space for the information they do contain, and they occupy valuable space that is needed or could be used for other purposes.

For example, the Universal Product Code ("UPC") bar code used on products sold in supermarkets provides little information, identifying only the manufacturer and product identity, and the version of UPC used. Applicants recognize that bar codes should include additional useful information such as: date of manufacture; shelf life; place of manufacture; intended distribution route; batch number; government specs; size, weight, color, wattage, etc.; safety, health, ingredients, precautions, dosage, etc. information; pricing, discount, commission, tax and other accounting information; automatic reordering instructions; serial numbers, and so forth.

While today's popular codes may be able to individually identify about a million (UPC Version E) different consumer articles in a relatively small code, they have reached their limit in many growing applications. For practical reasons, today's codes cannot be used to identify certain smaller objects; they cannot be used to identify larger numbers of objects; they are subject to being misread if damaged or poorly printed; and, they have disappointing first time read rates. Moreover, today's bar codes are not a practical option for providing additional valuable information: they do not have the information capacity required in today's Information Age.

Many different bar code "fonts" are being used in thousands of applications. The underlying methodology of today's popular bar codes (UPC and Code 39 being the two most popular) was invented and "standardized" in the late 1960's, early 1970's, well before the "PC generation" and the development and use of sophisticated, inexpensive lasers, for both printing and reading devices.

Today's optical bar codes are typically comprised of contrasting stripes, e.g., black stripes printed on a white background, which create the familiar black and white stripe patterns of common bar codes, sometimes called "zebra codes." These stripes, or code elements, vary in width and several stripes are selected to create distinct patterns of stripes which are used to represent decimal digits or decimal digits and alphabetic characters to reading apparatus. Applicants in their U.S. Pat. No. 4,814,589 disclose a bar code coded directly in binary arithmetic. Among other things, optimal and error-correcting binary arithmetic bar codes are disclosed herein.

Today's bar codes associate different patterns of varying width stripes with decimal digits or decimal digits and characters of the alphabet. The different patterns are selected to be readily distinguishable by a reading apparatus. Today's approach is complicated and cumbersome. It needlessly limits the usefulness of today's bar codes.

The key to continued growth and new benefits from bar codes lies in optimizing bar code design. To continue to be competitive, bar codes must be improved over those developed many years ago under the constraints of technology that no longer exist.

Present bar codes and bar code reading equipment suffer from poor first time read rates, i.e., the frequency with which a particular bar code using given apparatus must be re-read in order to input its information. Thus, present bar codes and bar code reading equipment have the disadvantage that frequently a bar code has to be read more than once before it is recognized as a good read by the equipment. A good example is the UPC code and supermarket scanners. Frequently a check-out person may be required to pass a product over the scanner several times before the equipment accepts the bar coded information. Such poor first time read rates of todays bar codes and equipment delay entry of bar coded information, which compromises the reasons that bar codes are in wide use today: speed, ease and reliability of information inputting to processing or storage apparatus.

Many of the problems and deficiencies described above with reference to bar codes applies as well to coding, processing and transfer of information in general. Thus, the use of parity for error detecting, Hamming codes for error correcting and other current techniques for error detecting and correcting are often inadequate, complex, require more extensive hardware, and/or reduce other performance criteria such as speed or information handling capability of the equipment or method using them.

Counterfeit products, lottery tickets, casino chips, tokens, currency, etc. now diverts billions of dollars annually from legitimate businesses and government, and the problem of counterfeits is worsening. Current attempted solutions such as the use of holograms for credit cards and special paper and inks for currency are based on the difficulty of counterfeiters to make exact copies. However, given the steady advance of technology, what can be made with authorization can be copied, for example by reverse engineering, or can simply be made with unauthorized assistance or unauthorized access to the pertinent technology. Applicants' U.S. Pat. No. 4,814,589 discloses solutions to the counterfeit problem based on accountability. However, more can be done to detect and deter counterfeiting, and also to detect and deter crime based on unauthorized possession of products and currency.

SUMMARY OF THE INVENTION

Objects of the invention disclosed herein are to improve coding, transfer, processing and/or storage of information, to improve the reliability of coding, processing, transfer and/or storage of information, to improve the information handling capacity of coding.

Other objects of the invention are to improve coding of information in bar codes, to improve reading of bar coded information, to improve the reliability of bar codes, to provide new coding applications for bar codes, to improve the information handling capacity of bar codes, to make bar codes more compact.

Other objects of the invention are to improve counterfeit detection and/or deterrence, to apprehend and/or track criminals and/or deter crime.

In proceeding with the invention disclosed herein, applicants approached the theory of coding broadly, and considered that the theory of bar codes is finite, i.e., that there is an optimal bar code with respect to the primary objectives of bar codes, and that there are optimal bar codes with respect to certain objectives of bar codes. Applicants considered deficiencies of current bar codes and coding techniques, the causes of failures and errors in bar codes and processing and storage equipment, and how such deficiencies, failures and errors may be detected, removed, diminished or corrected. Applicants' efforts, as described herein, thus broadly addressed coding, error detecting, error correcting, bar code reading, bar code printing, etc.

In accomplishing the above and other objects, individually and in various combinations, the applicants devised in accordance with the invention disclosed herein optimal coding, particularly but not exclusively for bar codes, in which: errors may be detected and/or corrected in accordance with the invention disclosed herein; information may be coded more compactly and more reliably in accordance with the invention disclosed herein.

Applicants have found that information coded in binary arithmetic may be coded into and/or extracted from bar codes more reliably and more efficiently. Applicants in their U.S. Pat. No. 4,814,589 disclose a bar code coded directly in binary arithmetic. Applicants have invented and disclose herein novel, optimal and improved coding, and methods and apparatus for obtaining, coding and processing information, particularly with respect to bar codes.

Three specific bar codes described herein are "BCB," "2x Max" and "straight binary" (all terms coined by the applicants), each optimal in its own right. Applicants disclose specific coding techniques for such bar codes, specific error detecting techniques, and specific error correcting techniques in accordance with the invention. Again, it should be understood that such error detecting, error correcting and coding techniques are not limited to bar codes.

In accomplishing certain of the above objects of the invention, applicants have expanded upon and improved the counterfeit detection techniques disclosed in their U.S. Pat. No. 4,814,589. According to the invention such techniques involve accountability, alone or in combination with techniques which make it difficult to copy visually detectable features, such as holograms, thus making poor counterfeits easier to detect. The invention is applicable to virtually all types of counterfeitable products, lottery tickets, receipts, casino chips, tokens, currency, security documents, objects of commerce, etc.

Bar codes to which the invention is applicable and in which the invention may be embodied, may be defined by or have properties that are optically, magnetically, electrically, electromagnetically, mechanically, etc., contrasting, distinguishable, detectable, etc. To simplify further description of the invention, bar codes having optically contrasting black and white stripes will be used with the understanding, however, that the invention is applicable to bar codes of contrasting properties other than optical and other than black and white stripes.

In accordance with one aspect of the invention, coding of information is provided comprising contrasting properties arranged to define first and second machine-detectable code elements. The coding may be bar coding, e.g., the code elements are black and white bar code stripes, or signal levels, e.g., digital signals in a computer or elsewhere, etc. The code elements are arranged in patterns having opposed ends, each of the patterns including a plurality of code elements representing given information, e.g., a bar code message such as a serial number, etc., and an end code element at each of the opposed ends. The end code elements are both either first code elements or second code elements and represent at least in part a start and an end of the pattern of code elements. The code elements between the end code elements at least in part represent characters and are arranged so that no more than two adjacent code elements are either first code elements or second code elements. With respect to the code elements between the end code elements which represent the characters, one of any two adjacent same code elements represent with one or more code elements consecutively adjacent thereto a first character and the other of the two adjacent same code elements represent together with one or more code elements consecutively adjacent thereto a second character. The code elements in the patterns are machine detectable to obtain the given information therefrom. One form of coding including the above features is referred to herein by applicants as BCB.

In accordance with another aspect of the invention, the code elements between the end code elements represent binary digits, and with respect to those code elements, one of any two adjacent same code elements represent with a different code element consecutively adjacent thereto a first binary digit and the other of the adjacent same code elements represent together with a different code element consecutively adjacent thereto the binary digit which is the complement of the first binary digit. Coding including the these features is referred to herein by applicants as BCB.

In accordance with another aspect of the invention, when the first and second code elements are interpreted to define opposite binary digits, n consecutive of the code elements between the end code elements represent given information and are arranged in a pattern such that alternate code elements of the n code elements define a first binary number which represents the given information, and remaining code elements of the n code elements define a second binary number which is the complement of the first binary number, n being an even number greater than or equal to 4. Coding including the above features is referred to herein by applicants as BCB.

In accordance with another aspect of the invention, when the first and second code elements are interpreted to define opposite binary digits, n consecutive of the code elements between the end code elements represent given information and are arranged in a pattern such that adjacent code elements of the n code elements define a binary digit and the binary digits defined by the n code elements represent the given information in binary arithmetic. Each two adjacent of the n code elements share a common boundary, n being an even number greater than or equal to 2. Coding including the above features is referred to herein by applicants as BCB.

In accordance with another aspect of the invention, coding of information is provided comprising contrasting properties arranged to define first and second machine-detectable code elements, the code elements being arranged in patterns having opposed ends, each of the patterns including a plurality of code elements representing given information. The first and second code elements are interpretable to define opposite logic levels, and the code elements are arranged to represent at least one binary digit 1 and at least one binary digit 0. The at least one binary digit 0 and the at least one binary digit 1 each being represented by both a first code element and a second code element. The order of the first and second code elements representing the binary digit 0 is different from the order of the first and second code elements representing the binary digit 1 so that the at least one binary digit 0 and the at least one binary digit 1 are distinguishable from each other. The code elements between the end code elements being arranged so that when they are machine-detected, the given information may be obtained from them. Preferably, the coding includes an end code element at each of the opposed ends, the end code elements both being either first code elements or second code elements and representing at least in part a start and an end of the pattern of code elements. The coding may be bar coding, e.g., the code elements are black and white bar code stripes, or signal levels, e.g., digital signals in a computer or elsewhere, etc. Coding including the above features is referred to herein by applicants as BCB.

In accordance with another aspect of the invention, coding is provided comprising two contrasting properties arranged to define a plurality of machine-readable code elements, each code element being represented by one of the two contrasting properties. The plurality of code elements include two end code elements which are always defined by the same contrasting property and which at least in part represent a start and an end of the plurality of code elements. The plurality of code elements also include an even number of code elements equal to or greater than four between the end code elements which represent at least a portion of given information, half of the even number of code elements which represent the given information being defined by one of the contrasting properties and the other half of the even number of code elements being defined by the other of the contrasting properties. The even number of code elements are arranged so that no more than two consecutive code elements are defined by the same contrasting property. The coding may be bar coding, e.g., the code elements are black and white bar code stripes, or signal levels, e.g., digital signals in a computer or elsewhere, etc. Coding including the above features is referred to herein by applicants as BCB.

BCB coding may have code elements included for error detecting and correcting such as code elements that maintain a parity convention.

In accordance with another aspect of the invention, a method is provided which associates machine readable given information with an object. The method comprises selecting two contrasting properties to represent code elements; selecting one or more of the code elements to represent a start and one or more of the code elements to represent an end of the code elements, the start and the end being distinguishable from each other; selecting a single code element of either property to represent one of the two binary digits and two of the same adjacent code elements of either property to represent the other of the two binary digits between the start and the end; using the code elements in association with the object to represent the information with binary digits; machine reading the code elements associated with the object; providing signals related to the code elements which are machine read; processing the signals provided from the machine reading of code elements associated with the object to obtain the given information. The above method relates to coding referred to herein by applicants as 2x Max.

In accordance with another aspect of the invention, coding is provided of information comprising contrasting properties arranged to define first and second machine-detectable code elements. The code elements are arranged in patterns having opposed ends, each of the patterns including a plurality of code elements representing given information and an end code element at each of the opposed ends. The end code elements both are either first code elements or second code elements and represent at least in part a start and an end of the pattern of code elements. The code elements between the end code elements at least in part represent binary digits and are arranged such that a single code element of either property represents one of the two binary digits and two of the same adjacent code elements of either property represent the other of the two binary digits, the code elements being machine detectable in the patterns to obtain the given information therefrom. The above coding is referred to herein by applicants as 2x Max.

2x Max coding may have code elements included for error detecting and correcting such as code elements that maintain a parity convention.

In accordance with another aspect of the invention, a method is provided of obtaining correct information from machine-readable error detecting and correcting bar codes, the bar codes containing an error and having information associated therewith. The method comprises: providing the bar codes with additional code elements than those required to represent the correct information; machine reading a said error detecting and correcting bar code and obtaining information therefrom; detecting the error in the information obtained from the machine-read bar code using the additional code elements; and correcting the error in the read information to provide the correct information. The additional code elements for this purpose may repeat all or part of the information represented by the bar code one or more times, as described for example in applicants' U.S. Pat. No. 4,814,589, or error detecting and/or correcting bar code elements such as one or more parity code elements.

In accordance with another aspect of the invention, a method is provided of obtaining error-free information from a machine-readable bar code. The method comprises machine reading a bar code which represents given information if error-free and obtaining signals which represent the given information when the bar code is error free, or which represent erroneous information relative to the given information when the bar code includes at least one error or at least one error is introduced during machine reading. Whether the signals represent error-free information or erroneous information is determined, and when the signals represent erroneous information, the at least one error is detected and corrected to provide signals which now represent the given information. The signals representing the given information may be made available for processing, storage or use.

Error correcting methods may include use of additional code elements to repeat those code elements required to represent information and/or use of additional code elements coded for detecting and correcting an error.

In accordance with another aspect of the invention, a method is provided of coding given information comprised of characters of a given size character set into a single coded numerical message in which individual characters are not distinguishable subsequent to coding and prior to decoding. The method comprises: (a) processing the position sequence of each character of the given information with a number derived from the number of characters in the character set with each of the character's numerical value as derived from the character set; (b) using the numerical total of each result of step (a) to represent the given information as the single coded numerical message. Applicants refer to the coding defining by this method as "Whopper Coding."

Whopper coding may be represented in a bar code, in a storage medium associated, for example, with a computer-like apparatus, communicated over a communication medium, etc. Whopper coded messages may be decoded by processing with a number derived from the number of characters in the character set used.

In accordance with another aspect of the invention, a bar code is provided comprising a single bar coded representation of given integer and fractional numerical information. The bar code comprises a first set of code elements representing the integer information, a second set of code elements representing the fractional information and a predefined set of code elements which define the location of the point separating the first code elements and the second code elements.

In accordance with another aspect of the invention, a bar code is provided which represent given signed numerical information. The bar code comprises a plurality of bar code elements, at least one of which in a predefined location of the bar code represents the sign of the given numerical information.

In accordance with another aspect of the invention, a method is provided of bar coding two distinct portions of a given message such as a numerator and a denominator in a single bar code, comprising: representing a first portion of the message with a first set of bar code elements, representing a second portion of the message with a second set of bar code elements, and interleaving bar code elements from the first and second sets of bar code elements.

In accordance with another aspect of the invention, a method is provided for recognizing a particular bar code methodology. The method comprises utilizing two contrasting code elements in the bar code and selecting patterns of bar code elements to define information to be represented by the bar code which present a recognizable pattern regardless of the particular information represented by the bar code. In accordance with another aspect of the invention, a bar code methodology is provided having the information defining and recognizable patterns referred to above.

In accordance with a preferred embodiment, a bar code satisfying the above methodology comprises pairs of code elements which consist of both contrasting code elements in which the order of the contrasting code elements is varied to define the information represented by the bar code. No more than two adjacent code elements are of the same contrasting property and when there are a plurality of instances of two adjacent code elements of the same contrasting property, such instances are of alternating contrasting properties. The bar code includes two end code elements which are of the same contrasting property and which at least in part represent a start and an end of the code. The contrasting properties are arranged to define first and second machine-readable bar code elements. The bar code elements are arranged in patterns having opposed ends, each of the patterns including a plurality of bar code elements representing given information and the end elements which both are either first bar code elements or second bar code elements. The bar code elements between the end bar code elements define the information represented by the bar code. No more than two adjacent of the bar code elements are the same and when there are a plurality of occurrences of two adjacent same bar code elements, the bar code elements of the alternating occurrences alternate.

In accordance with another aspect of the invention, a method of avoiding bar code short-reads is provided. The method comprises examining a proposed message prior to encoding it into a bar code symbol to detect the possibility of the proposed message allowing a short-read to occur; when the examination detects the possibility of a short-read, changing the message inconsequentially to avoid the possibility.

In accordance with another aspect of the invention, a method is provided of coding information in an alphanumeric mode and coding information in a numerical only mode and storing the coded information in a same means for storing. The method comprises coding the information in binary arithmetic with representations of the binary digits 0 and 1; forming from the binary digits alphanumeric information from a first character set including letters and digits; forming from the binary digits only numerical information from a second character set including only numerical digits, forming a unique pattern for identifying characters formed with binary digits from the first and from the second character sets.

In accordance with another aspect of the invention, a method is provided of decoding information coded in an alphanumeric mode and coded in a numerical only mode, as described above. The method comprises interpreting the binary digits in dependence upon the unique pattern such that alphanumeric information is interpreted in accordance with the first character set and numerical only information is interpreted in accordance with the second character set.

Such means for storing may be a bar code or a memory apparatus, such information may be communicated over a communication medium, etc.

In accordance with another aspect of the invention, apparatus is provided for scanning along at least two scan lines displaced from each other, comprising: an optical element configured such that when moved in a predetermined manner a scanning beam impinging on the optical element will be projected first along a first of the scan lines and then along a second of the scan lines; means for causing the optical element to move in the predetermined manner; and means for causing the scanning beam to impinge upon the moving optical element. In a specific embodiment, the optical element comprises at least two reflective surfaces mounted to be at different angles with respect to each other.

In accordance with another aspect of the invention, apparatus is provided for scanning along at least two scan lines displaced from each other, comprising: an optical element configured so that at least two scanning beams impinging on the optical element are projected therefrom displaced from each other; means for causing the two scanning beams to impinge upon the optical element; and means for moving the optical element such that the two beams scan along the two lines. In a specific embodiment, the optical element comprises a reflective surface.

In accordance with another aspect of the invention, a method is provided for reading a bar code comprising scanning the bar code along different portions sufficient for each scan to obtain the information represented from the bar code, comparing the information obtained from the scans, and, if the result of this comparison is the same, providing the information represented by the bar code.

In accordance with another aspect of the invention, a method is provided for confirming the accuracy of a bar code reading by comparing two or more received reflections from a bar code from two or more beams such as laser beams, the two or more beams having been projected from two or more beam sources.

Such scanning apparatus may include a plurality of reflective optical surfaces arranged at different angles with respect to each other, or a refractive element, and and may be used for scanning a bar code. Comparison of information obtained from more than one scans may be performed to improve the overall reliability of such scanning.

A method of designating an object as an authorized object comprising: randomly selecting one property from at least two distinguishable properties; storing information related to the randomly selected property in association with identifying information for the authorized object; and associating the randomly selected property and identifying information with the authorized object.

A randomly selected property may represent a binary digit and the binary digit may be stored in one binary digit location of a memory and the location in the memory associated with an address of the memory, and the address associated with identifying information for an authorized object.

In accordance with another aspect of the invention, a method is provided of storing coded information coded with a given plurality of code places to select valid coded information from other possible coded information within a range of coded information formed with the places, comprising: storing possible coded information within the range in two or more distinct sub-piles in accord with at least one particular characteristic; and subsequently selecting one or more of the coded information from the two or more sub-piles as the valid coded information and rejecting other the coded information as not being valid coded information.

Such characteristics may include the lack of a specific starting point for interpreting possible codes, the codes may be interpreted in forward or reverse order and/or may have interchangeable connotation, the codes may be error detecting and/or correcting codes and only one valid code from each one of two or more sub-piles may be selected.

In accordance with another aspect of the invention, a method is provided of operating apparatus including means for storing information represented by binary logic levels, the means for storing possibly being defective so that a part thereof is capable of assuming only one of the two binary logic levels. The method comprises: equating information represented by a set of binary logic levels and its binary complement; placing information to be stored in the means for storing, the means for storing possibly storing the information with an error therein; obtaining the information from the means for storing, the obtained information possibly having an error; determining if the information obtained from the means for storing has an error, and if so providing an indication thereof; inverting the binary logic levels of error-free information obtained from the storing means; placing the information represented by the inverted logic levels in the means for storing.

In accordance with another aspect of the invention, binary logic level processing or storing apparatus is provided including means for storing information represented by binary logic levels, the means for storing possibly being defective so that a part thereof is capable of assuming only one of the two binary logic levels. The apparatus is configured so that an additional binary logic level is provided for information handled by the apparatus, and information represented by a set of binary logic levels and its binary complement are equated. The apparatus comprises: means for placing information to be stored in the means for storing, the means for storing possibly storing the information with an error therein; means for obtaining the information from the means for storing, the obtained information possibly having an error; means for determining if the information obtained from the means for storing has an error, and if so providing an indication thereof; means for inverting the error-free binary logic levels of information obtained from the storing means; means for placing the information represented by the inverted logic levels in the means for storing.

In accordance with another aspect of the invention, binary logic level processing or storing apparatus is provided including means for storing information represented by binary logic levels, the means for storing possibly being defective so that a part thereof is capable of assuming only one of the two binary logic levels, the binary logic levels being coded according to a code which includes check logic levels that are checkable to detect one or more errors. The apparatus is configured so that an additional binary logic level is provided for information handled by the apparatus, and information represented by a set of binary logic levels and its binary complement are equated. The apparatus comprises: means for performing a checking operation on information obtained from the means for storing using the check logic levels to determine if the information contains an error; and means for complementing all error free binary logic levels in the information obtained from the means for storing if the information has an error.

Such complemented information may be stored a second time and/or inverted again when the information stored is obtained for use. Parity checking may be used and/or other error detecting and/or correcting means may be used and another error indication may be produced if the read word contains an error after being complemented.

In accordance with another aspect of the invention, binary logic level processing or storing apparatus is provided including means for storing information represented by binary logic levels, the means for storing including storage elements having two complementary outputs which when operating properly have opposite logic levels, at least one of the storage elements possibly being defective such that both of its outputs are capable of assuming only one of the two binary logic levels, the binary logic levels being coded according to a code which includes parity information. The apparatus comprising: means for detecting an error in information stored in the means for storing; and means for correcting the error in accordance with the parity information.

In accordance with another aspect of the invention, a method is provided for indicating whether information represented by binary logic levels is in an original form or in an inverted form, comprising: representing the information with an odd number of binary logic levels; associating an original form of the information with an odd number of a first of the two binary logic levels contained in the information and an inverted form of the information with an even number of the first binary logic levels contained in the information. This method may include error detecting and/or correcting means.

In accordance with another aspect of the invention, a method is provided for determining whether an object to be authenticated is authorized or not, comprising: associating first and second information with a plurality of authorized objects; storing in a means for storing the second information associated with each of the authorized objects using the first information associated with a respective authorized object as a locator for the location at which the second information for that respective authorized object is stored in the means for storing; obtaining first and second information from an object to be authenticated having same associated therewith; using the first information obtained from the object to be authenticated to obtain second information stored in the means for storing at the location in the means for storing associated with the first information obtained from the object to be authenticated; comparing the stored second information to the second information obtained from the object to be authenticated to determine if they are the same or not, whereby the object to be authenticated may be determined to be authorized when the obtained and stored second information is the same.

The first and/or second information may be comprised of one or more binary digits, one or more of which may be randomly selected and may be associated with an object, such as currency, in the form of a machine readable bar code.

In accordance with another aspect of the invention, a method of controlling crime is provided which comprises associating unique bar coded information with objects, storing the unique information, machine reading bar coded information from an object which may be the property of someone other than the person in possession of the property, and determining if the bar coded information read from the object is the same as unique stored information associated with an object belonging to another.

In accordance with another aspect of the invention, a method is provided of designating objects as authorized objects comprising associating a bar code representing unique identifying information with each respective object and associating a hologram with said objects.

BRIEF DESCRIPTION OF THE DRAWINGS

The invention is illustrated by way of example and not limitation in the figures of the accompanying drawings in which like references indicate like parts, and in which:

FIG. 1 represents a BCB Format A bar code for ASCII.

FIG. 2 represents a BCB Format B bar code for numerical information in binary arithmetic.

FIG. 3 shows an actual size BCB bar code symbol demonstrating BCB's high information capacity.

Figures 4, 5, 6, 7:
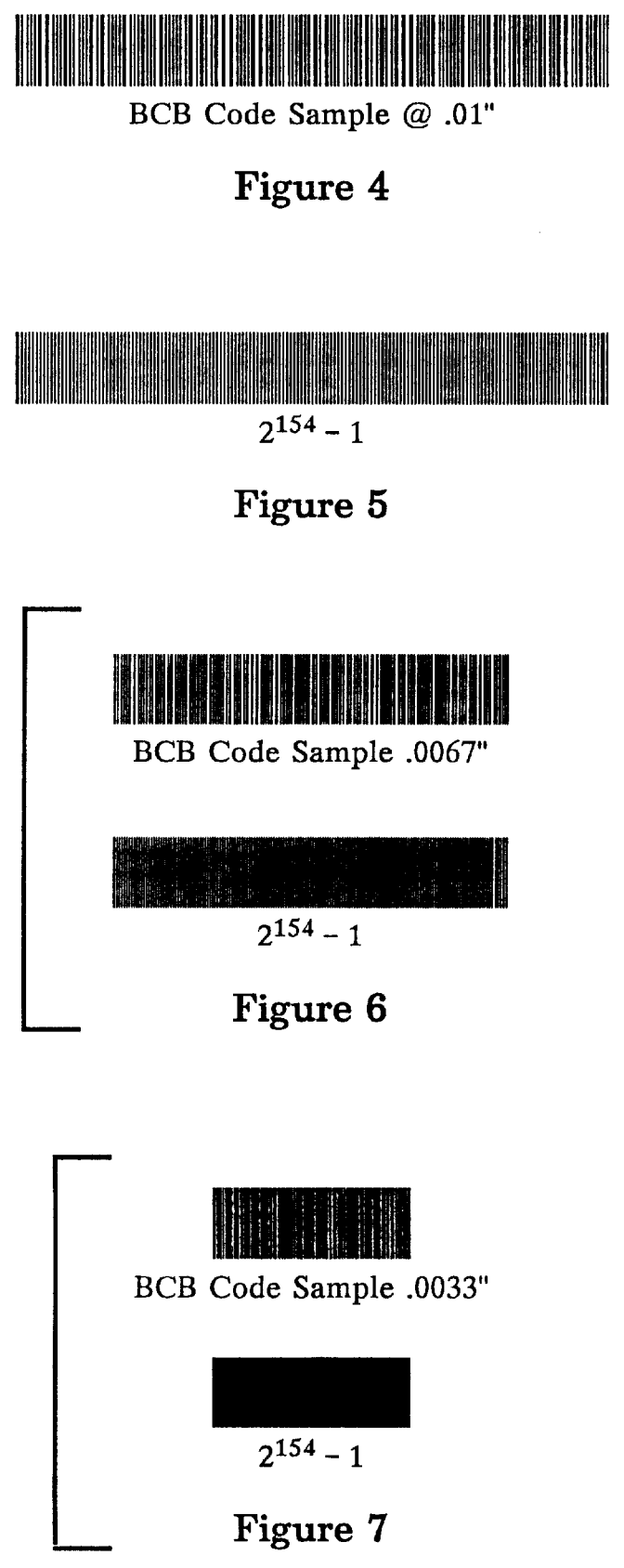

FIG. 4 shows a BCB Format A bar code symbol representing a message with the ASCII character set.

FIG. 5 shows a BCB Format B bar code symbol representing a numerical message in binary arithmetic.

FIG. 6 shows a BCB Format A bar code symbol representing a message with the ASCII character set, and a BCB Format B bar code symbol representing a numerical message in binary arithmetic.

FIG. 7 also shows a BCB Format A bar code symbol representing a message with the ASCII character set, and a BCB Format B bar code symbol representing a numerical message in binary arithmetic.

FIG. 43 shows a photographic reduction of FIGS. 41 and 42.

FIG. 44 shows a BCB bar code with bearer bars.

FIG. 45 shows the message "CODE" in BCB A mode and in Code 39.

FIGS. 46 to 49 show a comparison of a ten character message in BCB A mode and in Code 39.

DETAILED DESCRIPTION BCB Defined

Figure 8:
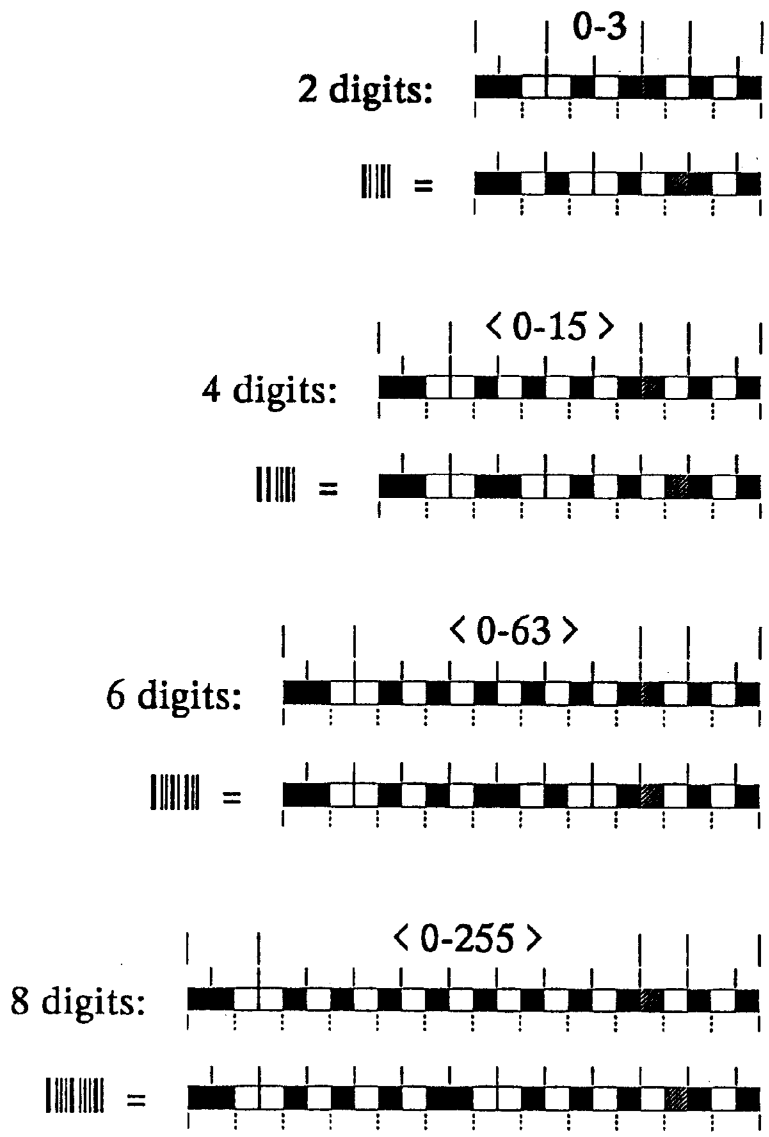
FIG. 8 shows BCB Short Formats representing short numerical messages in binary arithmetic.

BCB is the optimal bar code; it is as simple as possible. It has only two patterns:

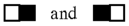

Each pattern, which represents a binary digit, has two stripes, one black stripe and one white stripe.

Thus, each binary coded binary digit is comprised of one white stripe and one black stripe (code elements) adjacent to each other. For illustrative purposes, various "framing" lines are shown that would not be in the actual code, and the illustrative characters are shown enlarged horizontally.

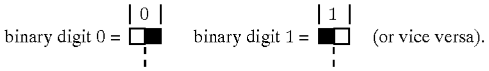

However, to simplify further description the following convention is adopted: as shown above, the binary digit 0 is represented by a white code element on the left and a black code element on the right and vice-versa for the binary digit 1. Each BCB digit is self-checking in a complementary fashion, as described below.

Consecutive binary digits, e.g., 00010111, are illustrated below. A BCB code (without end elements; described below) is also shown (the width of one stripe (1x) in the actual samples is 0.01"):

Actual BCB bar codes include end elements as described below.

BCB's unique methodology (how it fully utilizes these stripes) has many potential advantages: BCB may represent any numerical and/or alphabetic information in a smaller code, but has a dramatically higher first time read-rate and fewer misreads than other bar codes, while using common bar code reading apparatus. BCB's structure is easier for a machine to discern more reliably and BCB methodology is as self-checking as practically possible. BCB is also self-correcting. BCB also has the distinct advantage of being codable directly in binary arithmetic.

Development of BCB

In developing their BCB bar code, applicants understood that the BCB bar code would be read by machine, rather than read by people, and that the information represented by the BCB bar code would be used and/or processed by computers and systems including computer-like apparatus. Applicants concluded that one reason the optimal bar code should be coded in binary arithmetic is that the internal language of computers is binary. This avoids the need to "translate" higher order information (in which today's popular bar codes are coded), reduces the possibility of error and reduces processing time needed for translation. While coding the BCB bar code in binary arithmetic has significant advantages, according to the theory of numbers (which is concerned, in its elementary parts, with the universally familiar integers, or whole numbers) there is nothing intrinsically more efficient in binary numbering than higher order numbering. Each order of numbering is different and each order is theoretically perfect; each quantity has one and only one representation in each order of numbering. One reason binary is, in fact, preferable, is that black and white stripes may be utilized to lend themselves to representing binary. As discussed in detail below, the primary reason the BCB scheme is most reliable and compact is that each two successive code elements check each other in a most basic manner—they binarily complement each other.

Applicants' development of the BCB bar code focused on the use of two contrasting optical patterns applied to paper or other objects (or, e.g., a label therefor), as by printing for example, since printing on paper is inexpensive, is in widespread use in almost all areas of business and science, and is readily machine read to automatically input the information represented by the bar code into a computer or system including computer-like apparatus. However, as described above, the BCB code methodology is applicable to other contrasting properties and media, such as contrasting physical properties like "slants" on a casino chip, contrasting magnetic properties or contrasting electrical voltage levels, etc. (as disclosed in applicants' U.S. Pat. No. 4,814,589).

Regarding bar codes, two colors (e.g., black and white) are used so that they form contrasting stripes. For example, one color (e.g., black) is imparted in or on a background of another contrasting color (e.g., white), and the one color must be discerned from the other contrasting color. For simplicity of presentation, further description of BCB will be made using black and white stripes on paper as the contrasting properties.

Applicants believe that, since, in essence, a bar code need only be comprised of black and white stripes (as is typically the case), the subject of bar codes is therefore finite, i.e., they believe that BCB is the optimal bar code methodology. In these regards, applicants' discoveries stem from a broad view of the subject matter; they addressed the "forest," as well as "trees."

Discerning black from white is primarily a function of printing and reading apparatus. However, discerning black from white alone cannot represent sufficient information, as described below. (Colors and shades of gray are not considered.)

A code element is a black or white stripe which measures "x" in width. Applicants further concluded that, for simplicity, as discussed in more detail below, the BCB bar code will include stripes of approximately equal widths, i.e., "x." Thus, a number of adjacent stripes, "n," will measure nx in width.

Since each BCB digit includes a black stripe and a white stripe, when adjacent BCB digits are not the same, two black or two white stripes occur juxtaposed. For example, "01" in BCB is represented by □■■□ and "10" in BCB is represented by ■□□■. (The wide white stripe in the representation of "10" shows a thin black framing line in its middle. As mentioned, such framing lines would not be present in wide white stripes of an actual BCB bar code.) Thus, wide black and wide white stripes of width "2x" may occur in the BCB bar code. Therefore, each half of a "2x" black or white stripe is one half of a BCB digit.

In some bar coding applications, in order to increase the difference in width between a white or black stripe of 1x width and a white or black stripe of 2x width (and thus the reliability, described below), a "2x" width may, in practice, measure more than 2x. For example, a "2x" width stripe of black or white color may be made consistently wider, such as 2.2x, 2.4x, 3x, or more. However, each half of a 2.2x, 2.4x, 3x etc. black or white stripe still represents one half of a BCB digit (or one binary digit of the 2x Max bar code, described below).

In other bar coding applications, in order to increase the information "density" (described below) a wide white or black stripe of "2x" width may, in practice, measure less than 2x. For example, a "2x" width stripe of black or white color may be made consistently narrower, such as 1.9x, 1.75x, 1.5x or less. However, each half of a 1.9x, 1.75x, 1.5x etc. black or white stripe still represents one half of a BCB digit (or one binary digit of 2x Max).

In practice, with the x width measurement a given, the width of a wide stripe is directly proportional to the reliability of a bar code and inversely proportional to the information density. For simplicity of explanation below, it is assumed that a wide stripe measures 2x width.

A simpler useful bar code cannot be constructed if its (black and white) stripes alternate only in color, i.e., alternating black and white stripes of width "x," and do not vary in width, because representing place value would be impossible.

If two or more adjacent stripes of the same color were not allowed, only the following information would be possible (e.g., black=0; white=1): 0, 10, 010, 1010, 01010, . . . , meaning (at best) 1, 2, 3, 4, 5, . . . This means that the number of stripes represented are counted in order to represent the number which is the result of that count: this is not a practical approach for modern bar coding. In mathematical terms this may be characterized as two ordinal symbols representing cardinal information (as may be derived from, "From One To Zero, A Universal History of Numbers," page 31, George Ifrah, ©Viking '85). The number base principle (place value) cannot be represented unless stripes may vary in width as well as alternate in color.

In short, a bar code must allow some stripes of the same color to be adjacent. Applicants have determined that a bar code in which only two adjacent stripes of the same color are permitted is optimal, for reasons described below.

Experience and logic suggest that, in mechanical, electrical and other devices or systems, a binary logic decision, such as 0/1, on/off, black/white, yes/no, thin/thick or high/low, is more reliable than higher order decisions, such as 0/1/2, on/halfon/off, black/gray/white, yes/maybe/no, thin/average/thick or high/medium/low. Binary logic decisions require that a choice be made between two logic states, each represented by two distinguishable properties. Logic conditions in between these two distinguishable properties are not possible choices in binary. Two such properties are the most distinguishable choices that exist in a given situation (often each property being, in a sense, the extreme opposite of the other) and therefore such choices are the most reliable.

Binary is unique in allowing only two logic states. Other base notations allow more than two states.

While, mathematically speaking, one number base is not more efficient than another, applicants concluded that binary is most reliable.

Accordingly, applicants concluded that the optimal bar code would allow stripes of single width 1x and double width 2x only (a “1x or 2x code” or a “thin/thick code”), i.e., more than two stripes of the same color are not permitted to be adjacent, so that decisions as to stripe width are binary in nature.

The bar code industry, with its twenty years or so experience, appears to support this conclusion since today’s best performing bar codes use 1x or 2x stripes only, e.g., Interleaved 2 of 5 and Code 39, decimal and alphanumeric bar codes, respectively. (As mentioned above, a “2x” width may in practice measure more than 2x width. However, for explanation purposes herein, wide stripes’ widths will be referred to simply as 2x.)

While many of today’s bar codes, including, for example, BCB, Code 39 and Interleaved 2 of 5 (I 2 of 5), use only 1x and 2x black and white stripes, only BCB utilizes two patterns comprised of two stripes each and represents only two characters, “0” “and 1.” Other bar codes represent more than two characters with patterns of more than two stripes.

Bar Code Performance

Bar code performance is comprised of three considerations or criteria; reliability (which applicants believe is most important), density and first time read rate, all discussed below. Optimal performance occurs when some “thing” performs to the best degree possible for a given set of conditions.

A bar code’s reliability, or how well it avoids misreads, i.e., conveying the wrong information, is a function of error detection (also called error checking). In the field of bar coding, two distinct forms of error detecting have been used: individual character error detecting and overall symbol error detecting. Character error detecting is most fundamental to a bar code’s methodology. Most bar codes rely on character error detecting and many also offer optional symbol error detecting (check digits). Given a bar code’s particular error detection methodology, two additional performance considerations remain: the density and the first time read rate.

The density of a bar code refers to the amount of information a bar code conveys per unit of bar code real-estate, often measured in characters per inch. The particular “characters” represented must be considered: a binary character conveys less information than a decimal character and a decimal character conveys less information than a character of the alphabet. Density is directly related to printing and reading resolution. However, it will be shown that density is also a function of a bar code’s methodology: other factors such as the printing quality of a bar code being equal, better methodology allows for more information per inch.

Bar codes may fail to read the first time they are scanned. The rate at which this occurs may be measured in percentage. For example, if bar codes of a particular design failed to read the first time that respective bar codes were scanned five times in one hundred tries, the first time successful read rate of that bar code design would be 95%.

Some bar coding applications require the use of variable length symbols, i.e., one bar coded message may be longer or shorter than the next message. When using variable length symbols, short-reads may be possible. Short-reads may occur when a wand or scanner leaves or enters a symbol other than at the end(s) of the symbol. Short-reads may cause a failure to read or a misread. When a short-read misread does occur, either the start or the stop code is sensed within a symbol, i.e., somewhere between the intended start and stop patterns typically located at the ends of the bar code symbol. Minimally, such a misread would not contain all the information intended in the message.

BCB Short-read avoidance will be described in detail below. However, short-reads will be ignored in subsequent discussion of errors and how they are detected and corrected. Errors which will be considered are a stripe of one color being mistakenly interpreted as the other color, since these are the only failures that usually occur while actually reading respective stripes of a bar code symbol. More certain detection of these failures, and automatic correction of most of these failures (while also being more compact than other thin/thick, i.e., 1x or 2x, bar codes) separates the BCB bar code from the rest.

Bar Code Flaws: Error Detecting and Correcting (“EDAC”)

Bar codes are created with many different imaging technologies such as various printing methods, dot matrix, ink jet, toner, automatic mechanical numbering wheels (such as might be used for bar coded serial numbers), branding irons (a variety of animals, and even people, have already been bar coded for various purposes) and hand stamps. Bar codes may be typeset with a variety of devices such as high and low resolution lasers, CRT, photo composition, direct impression and even hot lead. Bar codes may be put on any medium, such as paper, corrugated cardboard, photos, wood, skin, cells, leaves, food, plastic, glass, stone, semiconductor material, metal, fabric, etc., and even to the backs of bumble bees (Popular Science, February, 1989).

All such methods and media have one thing in common: they are not perfect. A sampling of bar codes will reveal that some of them have flaws. Flaws are to be expected in bar codes. Flaws result from: blemishes in the paper or other media on which bar codes are imaged; imperfections associated with the “inking” process; dust, dirt, or abrasion that a bar code may encounter during or after being imaged; the mechanics associated with the scanning process (relative motion is typically required between the bar code and the reading device), etc.

Flaws create the following two performance failures when reading bar codes: misreads (incorrect readings) and no-reads (failures to get readings). These performance failures result from a stripe of one color being interpreted as the other color or one width stripe being interpreted as another width stripe. These are the two failures that can occur when machine reading respective stripes of a bar code symbol since a bar code is only comprised of black and white stripes.

Because printing and reading flaws are to be expected, the requirements of bar code printing and reading apparatus should be limited to (1) creating an image of a bar code, (2) sensing the bar code in order to discern the black stripes from white, and (3) to providing information from which each stripe may be measured to determine if it is thin, 1x, or thick, 2x. These three functions are the minimal requirements of printing and bar code reading devices. To require more of printing and reading may introduce more error into the process than necessary.

Failure rates associated with printing and reading are typically much higher than the failure rate associated with computer processing apparatus that analyzes the stripes after they have been read. Therefore, as much work as possible in decoding a bar code symbol should be performed by the more reliable computer processing apparatus. This decoding work will be done in accord with a particular bar code's methodology. Because of the failure rates associated with printing and reading, the optimal bar code's methodology must include error detection and correction, "EDAC." Specifically, in order to minimize the number of misreads, a bar code must have character error detection, and in order to minimize the number of no-reads, bar codes must have error correction.

Because misreads undermine the the reason bar codes are useful to industry and/or because misreads may have serious consequences, character error detection is paramount compared to the other aspects of bar code performance. Most popular bar codes, including BCB, rely on character error detection to perform reliably. However, because BCB utilizes a most reliable character error detection method, density and first time read rate are also improved.

The approach of current bar codes toward no-reads is less-than optimal. Typically, they require another reading of the bar code, hopefully through a non-flawed area of the bar code stripes.

In most bar code applications, bar codes may be reread in an attempt to get a reading after a first read failure. Rereads waste time, however, and time is money to industry. Rereads are often even more costly when given applications have to be designed to enable rereads to be made. Moreover, some potential applications are abandoned because rereads are not possible or practical (e.g., applications involving conveyer belts).

Typically, relatively expensive multiple scan bar code reading devices have fewer no-reads than lower cost wands. However, no matter what reading apparatus is used, the first time read rate would be dramatically higher percentage-wise when reading a bar code that is error correcting (as described below). Any bar code without error correction is less than optimal, especially considering that well over 90% effective error correction requires only two stripes of BCB bar code real-estate (as described graphically below).

Since errors are to be expected when reading bar codes, and since first time read failures waste time and money, character error detection and error correction should be provided in the optimal bar code to reduce the number of misreads and increase the first time read rate. Bar code density should not be needlessly sacrificed to provide or enhance EDAC.

Straight Binary Bar Code

In working toward the optimal bar code, one should have a clear understanding of the theoretically perfect code. In according with the theory of numbers, a perfect black and white code, given a starting point and a reading direction for the moment, is comprised of equal width black and white stripes only and uses only one stripe per binary digit. Its "ratio" would be perfect, 1:1, i.e., conventional binary notation could thus be represented in a bar code directly: one white stripe equals binary 0 and one black stripe equals binary 1. This theoretically perfect bar code, in accord with the theory of numbers, may be descriptively called a "Straight Binary Bar Code." This is the most efficient scheme to represent information conceivable with two characters (a black and a white stripe in this case). Indeed, this fact has been at the very foundation of mathematics for over three thousand years.

While such a code requires the absolute minimum number of (black and white) stripes to represent information, such a code would allow totally unpredictable sequences of white or black stripes to appear in any order, in contrast to the 1x or 2x only width requirement of BCB described above. Large expanses of white or black stripes could appear anywhere. Thus, consecutive stripes of the same color would not be delineated in any manner whatsoever that may be read reliably. For reliability, the stripes in a bar code must somehow be delineated. The Straight Binary Bar Code is theoretically perfectly efficient, but not reliable or practical.

The Straight Binary Bar Code, however, provides a perspective for considering other bar codes: it is the theoretical limit regarding the minimum number of stripes possible. Prior to examining BCB, however, a theoretically optimal bar code, denoted "2x Max" bar code by the applicants, must also be considered.

2x Max

Another bar code, called "2x Max" by applicants, is consistent with the requirements of the optimal bar code described above: black and white stripes are used to represent information and no more than two stripes of the same color appear consecutively. On average, 2x Max can represent more information than any other possible schemes that satisfy the optimal requirements described above. In this regard, 2x Max is optimal, but, as will be described, 2x Max cannot perform as well as BCB.

It may be noted that if a coding scheme allowed no more than three stripes of the same color to be adjacent ("3x Max"), information could be efficiently coded in ternary (similar in principle to 2x Max, as described below). "4x Max" could be used for base four, etc. On average, such schemes represent information as efficiently as possible using "3x," "4x," etc. stripes. (If only information capacity were considered, the advantage 3x Max has over BCB, on average, is that advantage afforded by having a third distinct digit to code information with, because the average width of the three 3x Max digits, 1x, 2x and 3x, is exactly 2x, which is the exact width of each of the two BCB digits.) As may be apparent, such 2x, 3x, 4x, etc. Max bar codes may vary in length for a given number of characters (as described below).

The conventions that 2x Max follows are that a single code element of either color (1x width, or a narrow stripe) represents a binary 0 and two adjacent code elements of either color together (2x width, or a wide stripe) represent a binary 1. Successive binary digits are represented by alternating black and white stripes of 1x or 2x width. No more than two code elements of the same color are adjacent (hence the code is termed, 2x Max). Therefore only binary decisions may be made when decoding the stripes which may represent information in binary arithmetic. As mentioned however, 2x Max cannot perform as well as BCB.

Which is not to say that representing applicants' 2x Max or Straight Binary Bar Code may not be useful in specialized circumstances, e.g., in "static" situations, such as reading the periphery of casino chips where "matrixed" devices are used for reading instead of scanning lasers, as disclosed in applicants' U.S. Pat. No. 4,814,589.

Further, 2x Max would be of some general usefulness for modern bar code applications using, e.g., laser scanning devices, if means were used to indicated which end of the bar code was the start and which end was the stop. In one embodiment, two binary digits represented in 2x Max convention are used to provide means to differentiate between the start and the end of a 2x Max bar code. For example, if 2x Max were to be printed on white background, a narrow black stripe on one end could be used to indicate the start of the code and a wide black stripe on the other end could be used to indicate the end of the code. Because these two distinct stripes are black, they contrast with the white background.

These distinguishable narrow and wide start and end stripes represent a binary 0 (the start of the code) and a binary 1 (the end of the code) in 2x Max convention, thus specifically indicating the which end of the code is the start and which end of the code is the other end or stop of the bar code, so that the white and black stripes in-between may be interpreted in the proper order with, e.g., a single sensor reading device moved across the bar code in one direction or the other direction. A sufficiently wide white space, such as more than the width of two wide stripes, may be left outside of these two black distinguishable ending stripes to separate the bar code from other possible markings on a bar coded object.

Ending patterns using two or more stripes may be beneficially adopted for 2x Max that would allow, for example, 2x Max to be distinguished from other bar codes that may be read in the same bar code application. Ending patterns containing two or more stripes, described below, may be adapted for use with 2x Max. Also, ending patterns used with 2x Max may use stripes of more than 2x width of one color, such as 3x or 4x white and/or black stripes. Bearer bars or 3x or 4x stripes in the ending patterns may be used to prevent short-reads with 2x Max, and thus 2x Max can be used in variable length bar code applications, as described below. (In 2x Max, however, similar amounts of information may require different bar code lengths because of its methodology, as described below.)

If an odd number of stripes were used to represent all information in-between these two ending stripes, the first and last may be made white so as to contrast with the two black ending stripes. However, an even number of in-between stripes cannot have a white stripe as both the first and last stripe. Therefore, according to 2x Max convention, an otherwise meaningless "leading zero" (a black or white 1x stripe) is be added to the information to be encoded so that all represented information will have an odd number of stripes in-between the two ending stripes described above, so that the first and last in-between stripes may always be white to contrast with the two black ending stripes described. If ending patterns using two or more stripes were used, the convention could be that an always odd or an always even number of stripes were used in-between (if the convention were even, each ending pattern would have to have a different colored stripe toward the middle of the bar code).

Brinker et al. U.S. Pat. No. 3,543,007 and Shields et al. U.S. Pat. No. 3,617,707 disclose a bar code, for use with railroad cars, which, similar to 2X Max, has narrow regions and wide regions which are twice as wide as the narrow regions. The bar code also includes indistinguishable end regions which are significantly wider than the wide regions. Each narrow region represents a binary 0, and each wide region represents a binary 1. The narrow and wide regions between the end regions represent alphanumeric information coded according to a Baudot code. Unlike 2X Max according to the invention, these two patents make no provision in the code itself or in information carried by the code to distinguish one end of the code from the other end so that the correct order of the regions may be determined therefrom for interpretation. These patents make no provision for error detecting or error correcting (except to check that the proper number of bar code elements was read), or reading other numbers of regions, such as an even number of regions.

Additional leading zeros may be used to indicate how a 2x Max bar code should be interpreted, such as in a numerical mode or in an alphanumeric mode. For example, assume all 2x Max bar codes in a given application use the two black ending stripes described above (and not ending patterns with two or more stripes) and that the number of in-between stripes is always odd so that the first and last in-between stripes may always be white to contrast with these two black ending stripes. If no leading zeros are present or if one leading zero is present that would indicate that a particular 2x Max bar code represents numerical only information, e.g., in binary arithmetic. But, if two or three leading zeros are present, that may be used to indicate that a particular 2x Max bar code represents alphanumeric information, e.g., in accord with applicants' whopper technique described below. Such one or more leading zeros would be disregarded when decoding after indicating numerical or alphanumeric modes. (If applicants' EDAC cluster, described below, were used in this 2x Max scheme, it would also protect any leading zero(s) as required, as described below.)

Minimally, binary parity error detecting (described below) would improve 2x Max's reliability. For example, one parity digit could be used for all stripes (shown below in FIG. 35), or a parity digit could be used with groups of stripes, such as one parity digit for each seven stripes (described below in association with BCB) so that, e.g., any character, function, etc. of ASCII coding (described below) could be represented in a group of 8 stripes, each such group being independently protected by parity. Several ASCII characters, functions, etc. could thus be represented with a corresponding number of groups of 8 stripes in a 2x Max bar code. Parity could be used as described with groups of any number of digits, n, to represent $2^n$ characters, etc. of other codes besides ASCII, and parity could also be used with groups of n digits of whopper coded messages (described below). Additional leading zeros may be required with whopper coded messages to fill the first (most significant) group of n digits. Numerical only or alphanumeric mode messages may be indicated with adjustment in accord with the above method of using leading zeros, or one binary digit in a fixed position of the bar code, e.g., between the parity digit and the message (and would not be part of the whopper coded message) could be assigned the task of indicating which mode the message represented (as described below in association with BCB).

The reliability of 2x Max is further enhanced, and thus 2x Max is even more useful, when it also incorporates applicants' Carryless Addition EDAC, described below as mentioned.

Figure 35:
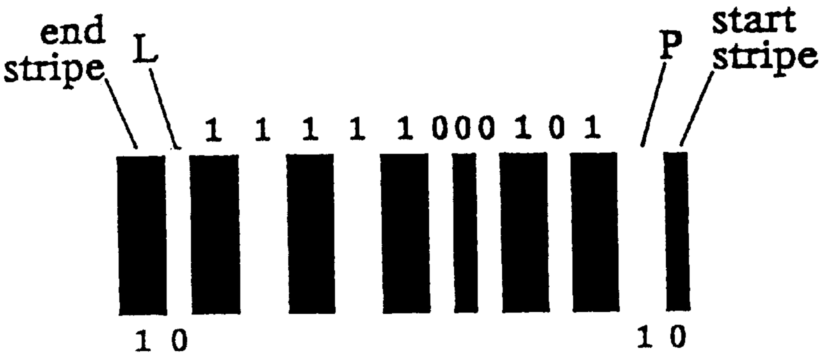
FIG. 35 shows a 2x Max Bar Code with parity representing 1989.

FIG. 35 illustrates a 2x Max bar code representing the numerical only message: "1989" (not including the quotes), which is eleven digits in binary 11111000101, according to the convention described above and also including one parity digit (making 12 digits). The narrow black stripe on the right is the start stripe and the wide black stripe on the left is the end stripe. The parity digit (shown with a capital "P" above it slightly to the right), which is always present and located between the right narrow black start stripe and the stripes representing the information, in this example 1989, is selected so that the total number of binary 1 digits in the bar code symbol is always even considering all digits except the wide end stripe (a reason for basing parity convention on the is is described below). In FIG. 35 the parity digit is a binary 1 digit. The most significant binary digit of the message 1989 is toward the left. Because the eleven binary digits representing 1989 plus one parity digit is a total of 12 binary digits, one leading zero (shown with a capital "L" above it slightly to the left) is required in accord with our 2x Max convention to make the total number of digits between the two ending stripes an odd number, namely 13 in this example. None or one leading zero indicate that the message is numerical only, according to 2x Max convention described above.

Thus, the coded 11111000101 message will be interpreted as 1989 in decimal, and the binary overhead digits, i.e., the two ending stripes, the leading zero(s) (if required) and the parity digit, may be ignored since they are not part of the actual message.

However, it may be desired to protect the message 1989 subsequent to decoding, in which case the additional convention might be to carry the parity digit along with the message 1989. (If parity were based on 0s, a leading 0, if required to make the number of digits between the start stripe and the end stripe odd, would have to be carried along with the parity digit for this protection-subsequent-to-decoding when the parity digit itself is a binary zero.

Also, one or more leading zeros may continue to be associated with a numerical only or an alphanumeric message to continue to indicate that the message is numerical only or alphanumeric. However, if such messages (with one or more leading zeros) were, e.g., put into one or more computer memory register, such leading zeros may have to be distinguished from "empty" leading places of the register, which empty places may also contain otherwise confusing zeros. This may be distinguished, e.g., with an associated register that would, by convention, be used to indicate how many places the "complete" message requires (including such leading zeros as required to inform as to whether the message is numerical only or alphanumeric, according to convention described above or as described below). This convention might be different (shortened) than that described above for encoding a 2x Max message; e.g., no leading zero could indicate that the message was numerical only and one leading zero could indicate that the message was an alphanumeric message (since an odd number of digits need not be a requirement subsequent to reading, a 2x Max bar code.

Thus, protected-subsequent-to-decoding messages may continue to be protected by 2x Max parity and may continue to indicate whether they are numerical only messages or alphanumeric messages.

In FIG. 35, the eleven binary information digits, 11111000101, are shown above their respective stripes and the binary value of the overhead digits are shown below their respective stripes.

Figure 36:
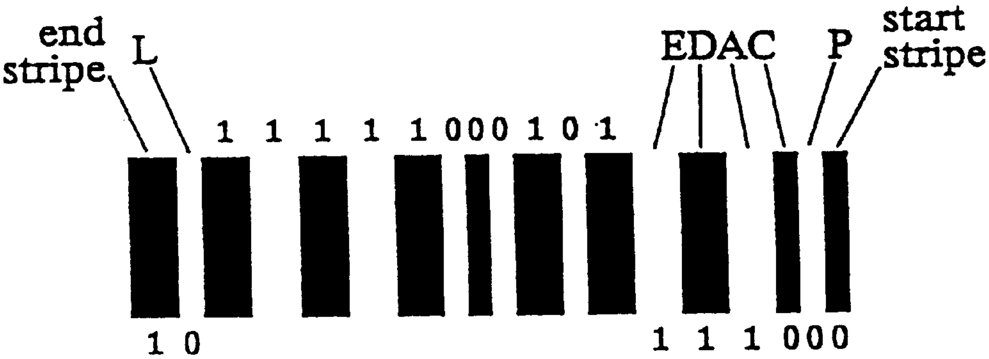
FIG. 36 shows a 2x Max Bar Code with parity and EDAC digits representing 1989.

FIG. 36 is similar to FIG. 35 but it incorporates 4 EDAC digits, 1110, in an "EDAC cluster" located between the parity digit and the information 11111000101. These 4 EDAC digits protect themselves and the eleven information digits and the parity digit. The leading zero is protected as well, as described below.

Any stripe representing a binary 0 but incorrectly interpreted as a binary 1 is correctable, and any stripe representing a binary 1 but incorrectly interpreted as a binary 0 is correctable. Also, any two such errors are detectable (but not correctable). If the leading 0 is incorrectly interpreted as a 1, the number of protected digits that would be thus indicated would be inconsistent with EDAC operation, and this error would be detected and correctable (because 12 information digits require 5 EDAC digits, a total of 17, but only a total of 16 such digits would be present if the leading 0 was misinterpreted as a 1; therefore, in accord with 2x Max and EDAC convention, it is deducible that the most significant digit (the incorrect 1 which should be a leading 0) is incorrect. In this case, one other misinterpreted stripe would also be correctable, and two other misinterpreted stripes would be detectable.

If 2 leading 0s were required to indicate that this particular message was alphanumeric, 5 EDAC digits would be required for the alphanumeric message, 0011111000101, because misinterpretation among the leading zeros could cause a misread if the EDAC operation were coincidentally satisfied (with or without other error). Leading zeros are inconsequential in EDAC operation, unless they are misinterpreted as ones. EDAC operation is described below. 2 leading zeros are required (as opposed to 3) because 2x Max requires an odd number of digits between the two black ending stripes; 2 leading 0s+11 information digits+5 EDACs+1 parity=19, which is odd.

If there were 12 information digits, 3 leading zeros would be required because, 3 leading, 0s+12 information digits+5 EDACs+1 parity=21, which is odd, but if there were 10 information digits, 2 leading zeros would be required because, 2 leading 0s+10 information digits+4 EDACs+1 parity=17, which is odd (see Table 5 below).

The start stripe and the end stripe are always predictable, according to 2x Max convention. However, if the black wide end stripe were misinterpreted as a narrow stripe and the black narrow start stripe were simultaneously misinterpreted as a wide stripe, a misread could result. In this situation, the bar code symbol would effectively be misinterpreted in reverse order because of the reversed start stripe and end stripe. If the EDAC operation was also coincidentally correct in a reverse order interpretation of the bar code symbol (or would be correct if error correcting were performed) a misread would occur.

If this situation were possible in a given bar code application using 2x Max, the start and end stripes may also be protected with EDAC digits to avoid or minimize this potential problem and/or one or more stripes could be associated with the start stripe and/or the end stripe. (Whatever different conventions that might be adopted would be consistently applied in such a given application.) For example, left to right, the end pattern could be binary 1 0 (wide black, narrow white) and the start pattern could be binary 1 0 (wide white, narrow black), in which case the odd number of code elements required in-between would begin and end with black stripes instead of white.

The binary value of each of th e EDAC overhead digits, 1110, are shown below their respective stripes. This binary value is consistent with one possible form of selected EDAC operation, described below. Notice that the parity digit has been inverted (from 1 to 0) in accord with the parity convention described above (even is), i.e., in FIG. 36 the parity digit is a binary 0 digit. The EDAC digits may be ignored once the message is decoded since they are not part of the actual message.

However, it may be desired to protect the message 1989 with the EDAC digits subsequent to decoding, in which case the 4 EDAC digits, etc. may continue to be associated with the message 1989.

Comparison of Straight Binary, 2x Max and BCB

To put 2x Max in perspective, a comparison is made of an average given message represented by the Straight Binary Bar Code, the 2x Max bar code and BCB. Assume that the average given message expressed in the Straight Binary Bar Code requires a total of 50 binary digits, half of which are binary zeros and half binary ones (because it is average).

Thus, 25 black stripes and 25 white stripes, for a total of 50 stripes, are required. In the 2x Max bar code, a total of 75 stripes are required: the 25 binary ones of the message each require two adjacent stripes (2x) of the same color for a subtotal of 50 stripes to represent the binary ones, and 25 stripes (1x) are required required to represent the 25 binary zeros, making a total of 75 stripes. In BCB, 50 black stripes and 50 white stripes, for a total of 100 stripes are required: 50 pairs of two stripes, one black and one white, for each binary digit of the message.

If the given message was represented in BCB and it was 1 inch long, in 2x Max the message would be ¾ inch long, and in Straight Binary it would be ½ inch long.

Regarding the number of unique codes 2x Max may represent (the yield): for increasing numbers of code elements, the yield increases in accord with a Fibonacci series (the ratio of successive magnitudes of yield approaches the Golden Ratio), as has been discovered by applicants.

The 2x Maximum Bar Code is optimal in its own right and may represent average given information with fewer stripes than BCB. However, it is less reliable than BCB, as described below.

Since the stripes in 2x Max comprise no patterns whatsoever (they are merely limited to 1x or 2x width), there is no inherent character error detecting scheme. Without such patterns, the reliability of optimally efficient 1x or 2x width only 2x Max may suffer. In 2x Max, after reading one, or any number of stripes of the code, the probability that the next stripe read will be thin or thick is equal, 50/50, and after reading one or more, or even all of the stripes, there is no way to check anything (except, as described above for example, parity may be used in a variety of ways to impart error detecting schemes, added digits for applicants' EDAC cluster may also be used as described, and, because 2x Max performs its task in binary arithmetic, computer and telecommunicating EDAC coding techniques may be employed in an attempt to achieve a shorter (but reliable) overall code (on average) using fewer stripes than BCB.

However, as described below, compared to BCB, any other bar code, including 2x Max, may require a wider "x" measurement for its stripes, thus potentially defeating the objective of a shorter code. 2x Max is also unwieldly because, from one message to the next, length may vary unpredictably (depending on the proportion of binary is to 0s).

Checkdigits may be used with many of today's popular bar codes. Checkdigits purport to confirm the final result after all of the stripes have been discerned and the bar code has been decoded. While checkdigits reduce the number of failures, typically, they may allow some failures to occur. In essence, checkdigits are used to check to see if the character error checking has failed to detect an error: in most cases, checkdigits detect such failure. The optimal bar code should not (and need not) rely on imperfect technology such as checkdigits.

Bar Code Failure

The foregoing demonstrates that effective character error detection is desirable and that effective, real-estate efficient, error correction is also desirable.

EDAC must be optimized from a practical viewpoint since EDAC information could be added to a code ad infinitum (although with diminishing returns). The symbol could grow in length forever if a theoretical limit were sought. In other words, a practical limit must be put on a bar code's real-estate allotment for EDAC.

A theory of bar code failure, developed by the applicants, refers to fundamental premises for considering failures that may occur in bar codes and optimal means to "cope" with failures. Such theory of failure relates to the bar code performance considerations of reliability, density and first time read rate. Many aspects of the theory are generic, and are analogous to the storage of information on other media, such as memory chips and magnetic memory: bar codes store information with stripes on paper, memory chips use voltage levels, e.g., in flip-flop circuits of registers and magnetic means use magnetically oriented matter.

Parts you don't have can't fail: more parts fail more often. Failure may be minimized in a bar code by using the fewest number of stripes, which are the parts of a bar code. Bar codes therefore should utilize the fewest stripes possible to achieve optimal performance. This minimizes the possibilities of errors since stripes you don't have can't have flaws. The corollary of this logic is: use as many stripes as necessary, but no more. In this regard, applicants' work is in accord with Albert Einstein's axiomatic advice that things should be made as simple as possible, but not more so.

The Straight Binary Bar Code and 2x Max use too few stripes, and are thus unable to perform optimally.

Reliability and first time read failures are thus related to the number of stripes required to represent a given message: if more stripes than necessary were used, the additional stripes would provide proportionally more opportunity for additional flaws to occur—the more flaws, the more failures. The total number of stripes required to represent a given message is also related to density; in theory, the fewer stripes used for a given message, the smaller the bar code symbol.

Therefore, failures and density are intertwined, both being dependent on the number of stripes used. This is a multi-step "Strange Loop" (as described in "Gödel, Escher, Bach: An Eternal Golden Braid," by Douglas R. Hofstadter, pages 10–742, © '79 Basic Books, a popular example of which is an Escher stairway going around into itself, so that there is no beginning or end). On the one hand we learn that the Straight Binary Bar Code, according to the theory of numbers, uses the fewest number of stripes possible, and on the other, we learn that we need more stripes than this extreme low limit. The largest number of stripes possible is theoretically limited only by infinity.

However, even if an "infinite" number of stripes were used, a misread could still occur, because as many as every stripe used could be in error. The best that can be done is to reduce the probability of error toward 0 as the number of stripes approaches infinity. (See "Introduction to Coding Theory," by J. H. van Lint, page 24, © '82 Springer-Verlag NY. However, please notice that if every stripe were in error, U.S. Pat. No. 4,814,589, and application Ser. No. 109,075, filed Oct. 16, 1987, which is a continuation-in-part of said U.S. Pat. No. 4,814,589, would prevent a misread. Which is not to say that van Lint's general premise is incorrect.)

Essential to the optimal bar code's methodology is the compromise it must make between these two extremes regarding the total number of stripes it uses to represent the message including stripes used for EDAC. This compromise entails pickine a "point" in our multi-step Strange Loop in order for bar coding to proceed. Superficially, Strange Loops (in general) do not appear to offer any such (natural) point(s). But a natural, and the optimal point has been found for bar coding and it is the essence of BCB. As described below, the optimal BCB compromise is, in accord with the theory of numbers, the first pure harmonic of straight binary arithmetic; it utilizes exactly double the number of stripes.

While not suitable for bar coding purposes, another natural point in the multi-step Strange Loop also exists. There comes a point when additional added EDAC stripes provide less (EDAC) value than the additional opportunity for failure they create, since additional EDAC stripes provide increasingly diminishing value and the opportunity for failure per additional stripe remains relatively constant.

Predictability and Error Detecting

A bar code's error detecting method (its ability to avoid misreads) is related to density; if (optimal) methodology utilizes the fewest, smallest and most predictable patterns of stripes possible (that still convey place value), given reading apparatus will be able to discern narrower width stripes without error, because the most predictable patterns require the least possible effort of printing and reading apparatus. In essence, optimal error detecting requires utilizing the maximum level of predictability possible. Support of this is, e.g., the fact that 1x and 2x stripe width codes work more reliably and with higher first time read rates than codes that allow more variation in width, in accord with the binary widths only requirement described above, and further discussed below.

If less than optimal predictable error detecting were being used in a bar code, and printing and reading apparatus were making marginally correct (or incorrect) decisions regarding the color of stripes and/or the width of stripes because of flaws, or because the reliable limits of the apparatus's resolution capability were being approached, then optimal predictable error detecting would support more correct decisions and would also detect incorrect decisions thus preventing misreads. A concrete example follows.

If a 2x stripe is read in a 1x or 2x only code, no question remains as to whether the next stripe(s) to be read should be the same color, making 3x (or more) width, because it is known that the code should not have stripe widths wider than 2x. (Which is not to say that BCB need discern 2x stripes from 3x stripes for error detection, as the graphics below readily demonstrate. BCB merely needs to be able to distinguish between black and white!) However, if a more than 1x or 2x stripe width code reads 2x, the question still remains as to whether the next stripe is the same color after the 2x stripe is read. In the 1x or 2x width only code, there was no question: the answer is already known because it is predictable, and in the more than 1x or 2x width code the answer is not predictable, i.e., the answer must be determined by the apparatus. Thus, the most predictable patterns require the least possible effort of printing and reading apparatus.

Something less than 100% predictability is required, however, because 100% predictability cannot convey meaningful information. 100% predictability can only convey whether or not the information is present (which is only one binary digit worth of information). In other words, if the message were 100% predictable, by definition there would only be one message, and the only thing to convey is the presence or absence of this one message. (Even Paul Revere's one or two lanterns conveyed more information: they conveyed when the British arrived and if they came by land or sea.)

The least number of patterns that can convey meaningful information in a bar code is two. Discerning only two patterns is more predictable than discerning more patterns: if it isn't one pattern, it can only be the (one) other. The smallest and most predictable patterns possible are comprised of two stripes, one black and one white, binarily complementing each other. (As will be shown when BCB is compared to Interleaved 2 of 5 below, the only thing that is not predictable in BCB is, when will a wide stripe appear? However, wide stripes must alternate in color, binarily complementing each other.) Thus, the full appreciation of a bar code with two patterns of two stripes each, each pattern representing a respective binary digit, begins to emerge, as does why such a code is optimal.

This optimal methodology is not limited to discerning single stripes, one at a time. Rather, BCB discerns respective 2x wide pairs of two adjacent stripes, expecting only to see:

 or 

When decoding, the order of black and white provides all of the bar code information. Essentially, error detection is comprised of discerning two blacks or two whites:

 or 

instead of one of each, as will be demonstrated in context below.

In sum, optimal error detecting must incorporate the fewest, most predictable patterns possible that still allow place value information. This maximizes reliability and allows the narrowest stripes possible. The narrower the stripes used, the smaller the bar code symbol and the higher the density.

Straight Binary, 2x Max and BCB; the Bar Code Triad

Applicants consider the three bar codes, Straight Binary, 2x Max and BCB, as forming a triad. Each may represent information in binary arithmetic and each is optimal in its own right. A comparison of these three codes is presented below. The Straight Binary Bar Code uses the fewest stripes possible but it doesn't delineate its stripes. The 2x Max bar code and BCB solve this delineation problem by utilizing 1x and 2x widths only (according to the binary width only requirement). However, both Straight Binary and 2x Max are unpredictable because neither code uses any patterns whatsoever. In this latter regard, BCB is the opposite; it utilizes the most predictable patterns possible.

Each of these codes may be compared to the others by their respective lengths and their respective distribution of, and ratio of, black and white color for given messages. For comparison, the messages in the following examples are all similar in that they all require the same total number of binary digits.

Consider unwieldly 2x Max: if a first given message were comprised of all binary 1s (each binary 1 requiring 2x of width) this message, if bar coded, would be exactly the same length in 2x Max and BCB. If a second given message were comprised of all binary 0s (each binary 0 requiring 1x of width) this message, if bar coded, would be exactly the same length in 2x Max and the Straight Binary Bar Code. Thus, 2x Max precisely spans the length gap between its triad partners which have fixed lengths.

In 2x Max, both these given messages would be comprised of an equal amount and an even distribution of black and white color: in the first message, black and white alternations of 2x stripes, and in the second message, black and white alternations of 1x stripes. However, if a third given message were comprised of 101010 . . . , 2x Max would have exactly twice as much of one color (black) as the other, and the length would be exactly half way between its triad partners. 2x Max is unpredictable regarding its length and regarding the ratio and the evenness of color it uses (it depends on the message content).

If these same two messages were coded in the Straight Binary Bar Code, we would see an all black symbol for the first message, an all white symbol for the second message, and an equal number of even black and white alternations of 1x stripes evenly distributed for the third message. In Straight Binary, all three messages, and any possible message requiring the same total number of binary digits, are the same length (half of BCB's length) but the ratio and evenness of color is unpredictable.

All three messages in BCB, and any possible message in BCB requiring the same total number of binary digits, is predictable. BCB always has an equal amount of black and white, the black and white is always as evenly distributed throughout the symbol as possible while still conveying place value information, and each BCB symbol is exactly the same length (twice the length of Straight Binary).

The BCB bar code is optimal in that it uses the fewest, smallest, most predictable (binarily complementing) patterns conceivable, uses an equal amount of black and white color distributed as evenly as possible while still conveying place value information, uses the fewest stripes possible to do all this, and does all this as simply as possible, but not more so. There are additional considerations regarding bar code failure and BCB's optimal EDAC methodology.

BCB Digits Compared to Flip-Flops

It may be said that a single circuit is responsible for the transition society has made from the Industrial Age to the Information Age: the common flip-flop memory circuit. The principle used in the flip-flop circuit is at the very foundation of the computer industry.

A common flip-flop may use a pair of transistors interconnected so that while one transistor is "on," the other must be "off," and vice versa, and only two binarily complementing output conditions are possible: one transistor represents binary 1 and the other represents binary 0 (1/0), and vice versa (0/1). The binary 1 and 0 are represented by two voltage levels, typically, +5 volts and 0 volts, respectively. The use of binarily complementing pairs of transistors is probably most responsible for the development and proliferation of reliable computers.

BCB works similarly. Instead of two voltage levels, each BCB digit uses two stripes which binarily complement each other, □■ or ■□, as do the flip-flop voltage levels.

Only one flip-flop output is needed to provide the intended information contained in the flip-flop since the other output is the binary complement. Likewise, only one stripe of each BCB digit pair is needed to provide the intended information (as described and shown graphically below). The other "output" or stripe, respectively, contains the binary complement form of the information, bit-for-bit, providing binary "contrast" for the intended information, and thereby insures the intended information's integrity.

A difference between a flip-flop and BCB is that when an error occurs in a flip-flop the flip-flop inverts, giving a 1 for the 0 and a 0 for the 1. Although in error, the flip-flop appears normal. It merely contains the wrong information. In a binary word formed from the outputs of a number of flip-flops, an error in one flip-flop output, or bit, is detectable by common parity but not correctable by parity. Once the bit in error is located (by means that must be provided), correction is automatic because the bit in error need only be inverted, an inherent attribute of binary.

However, when an error occurs in a BCB digit, the black and white pair of stripes in error become either two black or two white stripes (typically from printing defects, dirt or abrasion). These common bar code failures ■■ or □□ obviously are readily detected and readily located, because BCB's alternating rhythm, or cadence, is broken (described below). Since an error in BCB does not "appear" normal, it is automatically located upon being detected, and the error may readily be corrected because of BCB's symbol parity (also described below). The BCB digit in error can only satisfy parity if it is corrected to the intended information. That is part of the simplicity of BCB.

If a flip-flop, in error, produced two 1s or two 0s (as error in a BCB symbol produces) it also would be correctable by parity as described. However, this type of error is relatively rare in a flip-flop. Such an error would be indicative of a hardware failure and hardware failures usually need to be repaired, and not corrected by coding (an exception to this is described below).

Regarding media other than bar codes, where integrity of information and/or simplicity is paramount compared to the amount of memory storage means required or the amount of time required for the communication of a message (such as communication involving satellites, modems, wires, fiber optics, electromagnetic waves, etc.), the BCB approach may be beneficially used, possibly in favor of Hamming codes or other EDAC methods. Each bit stored or sent may be complimented with an adjacent bit (e.g., an 8 bit word would thus require 16 bits). While this BCB approach essentially doubles the length of the message (not including, e.g., parity bits which may be incorporated at regular intervals), it may be advantageous if, for example, the medium did not have a propensity to allow more than one adjacent bit to be in error. If the medium did have a propensity to allow more than one adjacent bit to be in error, but not allow errors frequently, the complimented message could be sent following the original message (in this latter case, error could result if the same portion of the message coincidentally failed both in the original and complemented message). One advantage is that parity, as described herein in relation to a BCB bar code, could be utilized as the means for correcting. The regular intervals in which parity bits would be incorporated, e.g., would be determined in relation to the expected failure rate of the particular media.

In any given BCB pair of black and white stripes, it is unlikely that two opposite errors occur together, i.e., a black stripe switched to a white and simultaneously in the same pair a white stripe switched to a black. Failures causing black to white switches and failures causing white to black switches are different and occur for independent reasons. BCB detects two such simultaneous errors (a switch) in any one BCB digit by means of a BCB parity digit for the BCB bar code symbol. For this case, parity is used in similar fashion to a memory register's normal binary word error detecting parity. However, like normal word binary parity, BCB symbol parity would not be able to automatically correct a switch failure, because it does not "appear" to be in error, and a no-read would result in the event such a switch occurred in a BCB symbol. If such switches were a common error in bar codes, means would be needed for error correction of switches, e.g., more than one additional EDAC digits could be provided (explained below).

For example, in *Design Considerations, Mean Time Between Events* [Failures], by David W. Gulley and published by Texas Instruments Inc., © 1988, overall reliability considerations of a large computer memory system are analyzed. The following example is used to demonstrate a generic method of failure analysis and prevention: a memory system comprised of 64,000,000 words of dynamic random-access memory (DRAMs), with each word comprised of 39 binary bits which include 32 bits of information and 7 additional bits for EDAC.

In Gulley's system, each 39 bit word has the ability to self-correct any single bit error that could occur within it automatically. BCB's EDAC allows any single stripe error that could occur in a BCB bar code symbol to be corrected automatically. BCB's requirement for error correction is only one BCB digit comprised of two stripes: this provides the ability to correct any single stripe error no matter how large the bar code symbol.

Because the errors that may occur in a bar code and in a computer are inherently different in nature, the role parity plays is correspondingly different; primarily correcting errors in bar codes, versus detecting errors in a computer.

Regarding error correction in general, Gulley's memory system and the BCB bar code system have both been designed to correct any single bit or stripe that may fail within one word or one symbol, and thus any single error would not affect system operation or the reading of a BCB bar code symbol.

The value of single bit error correction is enormous, as Gulley's paper dramatically demonstrates. Gulley calculated that a single bit error would occur in his memory system example about once per 400 hours, or about once per 17 days. However, these single errors occurring every 17 days do not cause system failure because they are automatically corrected.

This is not the case for two errors occurring in any one word of information, which would affect system operation. Gulley further calculated that the statistics of a two bit error occurring in any one 39 bit word were once per 27.6 billion hours (about 3,000,000 years). Thus, with one bit error correction, Gulley's system could theoretically operate for about 3 million years between failures, whereas, without one bit error correction, system failure would occur about every 17 days.

Statistical information on bar code first time read failures relating to one stripe errors versus two or more stripe errors occurring in the same symbol is not available, so far as applicants know. However, by analogy with Gulley's one-bit EDAC system, BCB's one bit error correction should have dramatic effect on BCB's first time read rate. Thus, without any specific data that would directly relate to a particular bar code application, applicants are nonetheless able to provide a logical and sound method of demonstrating BCB's rather dramatic improvement in successful first time read rate under any set of bar coding circumstances.

For example, assume in a given industrial situation, Interleaved 2 of 5 (or, I 2 of 5, a popular numeric only bar code, discussed in detail below) fails to read the first time at a rate of 5 failures per 100 reads, which is to say it reads first time successfully 95% of the time. By analogy with the Gulley example, an extremely conservative estimate is made: 90% of these first time read errors occur because only one stripe fails to be read in a given symbol properly, typically, from spots and voids . . . caused by localized printing defects (Intermec's Code 39 Specifications booklet, © 1986 by Intermec, page 5). If the number of defects is proportional to the over-all quality of the printing job, which is a logical assumption, the lower the printing quality, the more valuable error correcting becomes. (The other 10% of the errors occur because two or more stripes fail to read first time in a given symbol.)

The above estimate of 90% is arbitrary, but logical nonetheless, and quite conservative. In essence, applicants are drawing on the Law of Diminishing Returns. If failures, of any type, typically occurred more than one at a time, cars, e.g., would have to be equipped with more than one spare tire. The following estimate is quite conservative and reasonable: if one out of ten drivers got two flat tires in the same day (compared to nine other drivers, driving nine other cars, who got only one flat that day), that would be the exception as opposed to the rule.

This means that, conservatively, 9 out of 10 first time read errors will be avoided because BCB's error correcting feature automatically corrects any one stripe error. Stated differently: if the first time successful read rate were 95% using a popular bar code, the first time successful read rate with BCB would be better than 99.5% (an improvement by a factor of ten). This is the value BCB's error correcting feature provides. BCB is the only bar code that has the ability to error correct designed into it.

Having two stripes per pattern is optimal for a bar code because two is the lowest number possible that can perform (optimal) binarily complementing character error detecting. The reason representing only the two binary digits is optimal is that effective error correction may be most efficiently performed. If a pattern representing a binary digit has been detected to be in error, correction by inversion of this digit is indicated. If patterns represented more than two possible characters, correction would require additional effort to determine which of the two or more remaining characters to change the character-in-error to.

Information, carried in the form of stripes, must accompany a bar code in order to perform EDAC. The following, applicants' theory of bar code design, is presented by way of a summary, after which BCB performance will be demonstrated graphically. As will be seen, BCB performs seemingly effortlessly.

Applicants' Theory of Bar Code Design

The units of information a bar code can represent in relation to its size is called density, and may be measured in characters/inch. Density is increased by using fewer, thinner code elements. Effective density (described below) is maximized by using fewer, thinner code elements most reliably. If reliability is zero, effective density is zero. If reliability is 1 (100%), effective density is the same as density. Thus, effective density is directly proportional to reliability.

The following may be stated: effective density is equal to the reliability factor (from 0 to 1) multiplied by the density, density being the information units per inch. Therefore, the reliability factor, from 0 to 1, is equal to the effective density multiplied by the width of one code element measured in inches multiplied by the number of code elements per information unit.

Regarding the number of code elements in relation to density: the minimum number of code elements possible in a bar code has a lower limit, in accord with the theory of numbers, 1:1. BCB utilizes exactly double the theoretical minimum number of code elements possible. BCB's ratio is (exactly) 2:1. Other bar codes use about the same; a little more or a little less than double, i.e., 2+/− a fraction:1. (Other 1x or 2x stripe width only bar codes, such as I 2 of 5 and Code 39, however, use 2+ a fraction. Therefore, other 1x or 2x stripe width only bar codes are less compact than BCB, even before reliability is considered, because they require more code elements than BCB.)

Regarding reliability in relation to effective density: not only is effective density directly proportional to reliability, but, in practice, effective density is primarily a function of reliability (because the number of code elements required is more or less fixed, at 2+/− a fraction:1).

BCB utilizes its code elements in the most reliable manner possible: the two code elements of each successive BCB digit check each other (two is the absolute minimum number of code elements per character that can check each other). Mathematically speaking, they binarily complement each other. BCB stripes are binarily predictable. As one single or double width stripe is read in sequence, the color of the next stripe of the same width is known before being read. (This feature is described in context below, when BCB is compared directly to Interleaved 2 of 5.) BCB's reliability "resonates" (a bridge designed to support megatons may be toppled by the resonance created by marching soldiers). The number of code elements per character required by BCB is the absolute minimum for maximum reliability purposes; if more or less were used, reliability would be sacrificed disproportionately, because the rhythm, or cadence, would be broken. Reliability being of primary importance to (as well as directly proportional to) effective density, BCB is optimal regarding the number of code elements per character. BCB is the first harmonic of theoretical perfection; it's in tune, so to speak. Thus, applicants believe that BCB is the optimal bar code.

While in practice, the number of code elements is more or less fixed, the limit of the thinness of code elements is not similarly defined; it is primarily relative to printing and reading technology and offers considerably more leeway than the overall number of code elements used by a bar code to represent information. While the overall number of code elements doesn't/can't vary much between different bar codes, because of BCB's optimal reliability, BCB's code elements may be as thin as practically possible, resulting in the most compact bar code symbol possible, i.e., only BCB may achieve the highest effective density in a bar code.

Reference Code Elements

A practical concern arises because black code elements may be printed on a white background. As can be seen in the illustration below (repeated from above) a white code element happens to be at each end of the code:

There may be difficulty in determining if the code ends in white or black. To eliminate this potential problem, the code preferably has one black code element, called a reference code element, at each end:

For convenience, the black left end reference code element is shown with "1r" above it and the black right end reference code element is shown with "rr" above it.

Another practical concern arises in most applications: how are the code elements oriented for decoding purposes, or, which end is the starting point? A simple, convenient and bar code real-estate efficient approach is as follows: an orientation digit or an orientation code element may be provided at each end of the code, adjacent the (black) end reference code elements, i.e., between the end reference code elements and the rest of the code elements. For example, an orientation BCB digit 1 is provided adjacent to the right end reference code element and adjacent to the left end reference code element, as shown below. The reference code element and orientation code elements are referred to as an end or ending pattern.

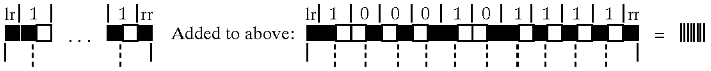

Thus, black, white, black at the right end forms a right end pattern, and black, black, white at the left end forms a left end pattern. Alternatively, a single white and a single black stripe may be used adjacent the two black end reference code elements for orientation purposes, but this may cause more than two adjacent stripes of the same color (3 black stripes) to occur. One end code element or pattern may be a code read start and the other a code read stop. As described above, more than two consecutive stripes of the same color is not desirable. Another alternative for the right end is one white orientation code element adjacent the black end reference. Also, specific left and right coding patterns on the ends of the bar code (appearing in each bar code that may be represented) may be used to help identify a bar code as such, although with BCB coding this additional help is not necessary, as described below. The above (left) end and (right) end or start patterns are best used in applications where fixed length symbols are required.

Short-Read Protection

As mentioned, some bar coding applications require the use of variable length symbols, i.e., one message may be longer or shorter than the next message. When using variable length symbols, short-reads may be possible. Short-reads may occur when a wand or scanner leaves or enters a symbol other than at the end(s) of the symbol. Short-reads may cause a failure to read or a misread. When a short-read misread does occur, an ending pattern (an end or a start code pattern) was sensed within a symbol, i.e., somewhere between the intended end and start patterns located at respective ends of the bar code symbol. Minimally, such a misread would not contain all the information intended in the message.

Various known methods that may be selected to eliminate the possibility of short-read errors are made in accord with the requirements of a particular bar code application. One such novel method applicants disclose is to check for the mathematical possibility of a short-read. (While this novel method lends itself to BCB, other bar codes could also use this method.) In other words, any message to be coded may be analyzed as a given number, and that number checked in accord with appropriate algorithms to see if the mathematical possibility of a short-read would exist if it were to be bar coded. In essence, these algorithms identify numbers, that, if bar coded, could allow a short-read misread to occur. For example, an algorithm may identify "ranges" of (odd or even) possible short-misread numbers. Proposed messages are compared to see if they are such a number.

If the possibility of a short-read exists, in accord with this embodiment of the invention, the message may be automatically adjusted. For example, in BCB, another format may be used for the message, or the message may be inconsequentially amended by adding, e.g., a superfluous (ASCII) "space" or inconsequential leading zeros, in order to avoid bar coding a message with a short-read possibility. BCB formats and this amending are described in context below.

Alternatively, when encoding, a symbol-length, 2x+ thick horizontal line (known in the bar code industry as "bearer bars") placed directly above and below the symbol would prevent short-reads because no quiet zone can be erroneously read above or below the symbol. In other words, if two black horizontal bars, each measuring more than 2x (e.g., 3x) in thickness and each at least as long as the bar code symbol, were printed in association with the bar code symbol, i.e., one bar was printed directly above and one bar was printed directly below the stripes of the bar code, a wand or scanner could not sense the (white) quiet zone if it left or entered the symbol other than at the end(s) of the symbol. FIG. 44 illustrates a BCB symbol with bearer bars as described. The x width in FIG. 44 is 0.0167" and the "height" of the bearer bars shown is 0.052". The message capacity of the BCB symbol shown in FIG. 44 is $2^{48}$ ($2.81\times10^{14}$).

When bearer bars are used with BCB, the real-estate efficient end and start patterns described above may be used without risk of a short-read. If bearer bars are not desired for any reason, different end and start patterns may be used instead of bearer bars to avoid short-reads. However, these different patterns require more stripes. In variable length applications, apparatus may be instructed to not accept the shorter "fixed length end and start patterns," i.e., black, black, white for the left end end pattern and black, white, black for the right end start pattern, as described above.

For example, end and start patterns may include more than two consecutive code elements (such as three black stripes) so that sensing an end/start pattern other than at the ends of the symbol as intended cannot happen: the entire bar code symbol must be sensed.

In another approach, BCB's "cadence" is broken, i.e., end patterns with more stripes of one color than the other color are used, e.g., black, black, white, black, black, white. Since such patterns cannot be found within the message portion of BCB bar code symbols, because "pairs" of black and white stripes are utilized, the entire bar code symbol must be sensed.

For general purpose bar coding where variable length symbols are required, and/or various BCB formats are to be utilized, applicants provide the following "variable length end and start patterns" for BCB, reading from left to right. The left end pattern: black, black, white, white, black, white. The right start pattern: black, white, black, black, white, black. Shown below, with "framing" lines:

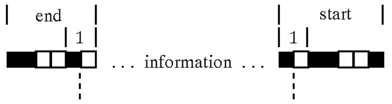

These end and start patterns are also asymmetrical and provide required orientation information. In a manner of speaking, BCB's "phase" is changed without using three consecutive code elements and without, in essence, using more of one color stripe than the other.

These end and start patterns cannot properly occur within a BCB symbol, even if one or more white stripes were made black by soil, or even if one or more black stripes were erased to become white stripes. In other words, these end and start patterns have been designed to avoid the possibility of a short-read even if a BCB symbol suffers one or more occurrences of common damage (damage is described below).

In applications requiring use of variable length messages, where bearer bars are not desired, but shorter end and starting patterns are desired to reduce the average required bar code lengths, other patterns can be used which use fewer stripes. However, if common damage occurs to the bar code symbol, a misread may be possible if a short-read were to occur as well. The following is an example, reading from left to right. The left end pattern: black, white, white, black, white. The right start pattern: black, white, black, black. Shown below, with "framing" lines:

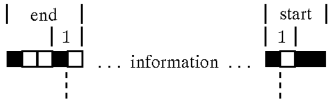

If one or both end patterns used by BCB happen to be similar to those of other bar codes, there is little chance of confusing BCB with another bar code because of BCB's unique complementing rhythm which is detected when decoding to positively identify a BCB code (decoding described below).

The alternations in color of wide stripes (a feature of BCB, described in detail below) will be changed corresponding to these two sets of end patterns: in the rightmost portion of the bar code symbol there will be two consecutive wide black stripes and in the leftmost portion of the symbol there will be two consecutive wide white stripes.

For simplicity of explanation, discussion below assumes the shortest previously described end and start patterns are used, i.e., black, black, white for the left end end pattern and black, white, black for the right ending start pattern. Appropriate adjustment would be made for "remainders," etc. if other ending patterns were used, as will become clear in context below.

Using BCB

Today's codes represent high-order coded information with discreet patterns of stripes, which patterns are selected to look as distinguishable as possible from other patterns to a machine's reading apparatus. Today's popular codes do not encode information in binary arithmetic as BCB does.

For example, a pattern of stripes representing a decimal digit according to UPC (which only represents decimal digits) does not relate the numerical value of the decimal digit by binary arithmetic to its respective pattern of stripes. In UPC the value of each decimal digit is associated with a particular pattern of stripes, selected so that each decimal digit's pattern is easy to discern from each of the other nine digits' patterns.

Using its ten patterns of stripes, UPC represents the ten decimal digits, 0–9. Information represented in UPC Version A may be a coded representation of any given eleven decimal digit number. Since BCB is designed specifically to represent binary digits, BCB represents the same numerical information, or any amount of numerical information, directly in binary arithmetic. Numerical information may be represented in a standard BCB Format B which is described below.

Also by way of example, in ASCII (coding designed for telecommunications, specified in the American Standards Institute brochure USAS X3.16-1966), 128 letters, decimal digits and other "characters" have a specific sequential numerical value, which numerical value is represented in coded binary arithmetic when ASCII is used for telecommunication (which is what ASCII was designed for). Code 39 and Code 128, which may be used to represent all 128 ASCII characters, do not represent these ASCII numerical values in binary arithmetic. Instead they use a selected pattern(s) which is assigned to represent each of ASCII's 128 characters, which patterns are essentially selected by virtue of distinguishability from other patterns used.

BCB may represent each ASCII character conveniently: each successive group of 7 consecutive BCB information digits ($2^7=128$) may represent one ASCII character by respectively representing each character's numerical value according to the binary number assigned to each character in ASCII (see Table 1 below). BCB may also be made "discrete," like Code 39's characters (see Intermec's Code 39 Specifications booklet, © 1986, page 3), e.g., with a black stripe on each end of a seven BCB digit "word," described below. (However, when using applicants' "Whopper" coding technique, described below, discrete character representation is not possible.)

However, for some bar coding applications, binary coding systems to the powers 4–6, with the clever use of a "precedent" character technique, similar to that used by Code 39, may be more sensible and efficient, particularly, e.g., in applications requiring the letters of the alphabet. For example, when letters of the alphabet are used to represent normal text, certain letters are used much more frequently than others (e.g., "e" is used more often than "z"). Binary bar coding systems to the powers 4–6 with the use of a "precedent" character technique may be described as alpha/binary.

Moreover, consistent with the theory of numbers, any message, on average, may be represented most efficiently: any given number of required characters may be utilized as the base of a coding system and may be composed in such a manner as to represent any given message therefrom by a respective number, and this number represented by BCB in binary arithmetic. Applicants have devised a technique for such coding, which they call the "Whopper," which is described below.

Standard BCB formats (described below) contain one or more seven bit "information portions." In Format B, leading zeros are added if required to accomplish this, while this is automatic in Format A. BCB may follow any coding scheme associated with computers. (A difference is that standard BCB coding may be read in either direction and processed as described.) For example, a BCB parity digit may be included in each seven bit portion of a BCB symbol, making each portion an eight bit BCB word. This included 8th parity bit would provide each BCB information word with its own EDAC capability (described below in more detail).

TABLE 1

| ASCII Set: | Decimal = | Binary = | BCB Digits: | ASCII Set: | Decimal = | Binary = | BCB Digits: |
|---|---|---|---|---|---|---|---|
| NUL | 0 | 0000000 | | @ | 64 | 1000000 | |
| SOH | 1 | 0000001 | | A | 65 | 1000001 | |
| STX | 2 | 0000010 | | B | 66 | 1000010 | |
| ETX | 3 | 0000011 | | C | 67 | 1000011 | |
| EOT | 4 | 0000100 | | D | 68 | 1000100 | |
| ENQ | 5 | 0000101 | | E | 69 | 1000101 | |
| ACK | 6 | 0000110 | | F | 70 | 1000110 | |
| BEL | 7 | 0000111 | | G | 71 | 1000111 | |
| BS | 8 | 0001000 | | H | 72 | 1001000 | |
| HT | 9 | 0001001 | | I | 73 | 1001001 | |
| LF | 10 | 0001010 | | J | 74 | 1001010 | |
| VT | 11 | 0001011 | | K | 75 | 1001011 | |
| FF | 12 | 0001100 | | L | 76 | 1001100 | |
| CR | 13 | 0001101 | | M | 77 | 1001101 | |
| SO | 14 | 0001110 | | N | 78 | 1001110 | |
| SI | 15 | 0001111 | | O | 79 | 1001111 | |
| DLE | 16 | 0010000 | | P | 80 | 1010000 | |
| DC1 | 17 | 0010001 | | Q | 81 | 1010001 | |
| DC2 | 18 | 0010010 | | R | 82 | 1010010 | |
| DC3 | 19 | 0010011 | | S | 83 | 1010011 | |
| DC4 | 20 | 0010100 | | T | 84 | 1010100 | |
| NAK | 21 | 0010101 | | U | 85 | 1010101 | |
| SYN | 22 | 0010110 | | V | 86 | 1010110 | |
| ETB | 23 | 0010111 | | W | 87 | 1010111 | |
| CAN | 24 | 0011000 | | X | 88 | 1011000 | |
| EM | 25 | 0011001 | | Y | 89 | 1011001 | |
| SUB | 26 | 0011010 | | Z | 90 | 1011010 | |
| ESC | 27 | 0011011 | | [ | 91 | 1011011 | |
| FS | 28 | 0011100 | | \ | 92 | 1011100 | |
| GS | 29 | 0011101 | | ] | 93 | 1011101 | |
| RS | 30 | 0011110 | | ^ | 94 | 1011110 | |
| US | 31 | 0011111 | | _ | 95 | 1011111 | |
| SP | 32 | 0100000 | | ' | 96 | 1100000 | |
| ! | 33 | 0100001 | | a | 97 | 1100001 | |
| " | 34 | 0100010 | | b | 98 | 1100010 | |
| # | 35 | 0100011 | | c | 99 | 1100011 | |
| $ | 36 | 0100100 | | d | 100 | 1100100 | |
| % | 37 | 0100101 | | e | 101 | 1100101 | |
| & | 38 | 0100110 | | f | 102 | 1100110 | |
| ' | 39 | 0100111 | | g | 103 | 1100111 | |
| ( | 40 | 0101000 | | h | 104 | 1101000 | |
| ) | 41 | 0101001 | | i | 105 | 1101001 | |
| * | 42 | 0101010 | | j | 106 | 1101010 | |
| + | 43 | 0101011 | | k | 107 | 1101011 | |
| , | 44 | 0101100 | | l | 108 | 1101100 | |
| - | 45 | 0101101 | | m | 109 | 1101101 | |
| . | 46 | 0101110 | | n | 110 | 1101110 | |
| / | 47 | 0101111 | | o | 111 | 1101111 | |
| 0 | 48 | 0110000 | | p | 112 | 1110000 | |
| 1 | 49 | 0110001 | | q | 113 | 1110001 | |
| 2 | 50 | 0110010 | | r | 114 | 1110010 | |
| 3 | 51 | 0110011 | | s | 115 | 1110011 | |
| 4 | 52 | 0110100 | | t | 116 | 1110100 | |
| 5 | 53 | 0110101 | | u | 117 | 1110101 | |
| 6 | 54 | 0110110 | | v | 118 | 1110110 | |
| 7 | 55 | 0110111 | | w | 119 | 1110111 | |
| 8 | 56 | 0111000 | | x | 120 | 1111000 | |
| 9 | 57 | 0111001 | | y | 121 | 1111001 | |
| : | 58 | 0111010 | | z | 122 | 1111010 | |
| ; | 59 | 0111011 | | { | 123 | 1111011 | |
| < | 60 | 0111100 | | ¦ | 124 | 1111100 | |
| = | 61 | 0111101 | | } | 125 | 1111101 | |
| > | 62 | 0111110 | | ~ | 126 | 1111110 | |
| ? | 63 | 0111111 | | DEL | 127 | 1111111 | |

BCB Formats

BCB bar code reading apparatus may have a selector switch that is used to select "raw" mode or general purpose BCB interpretation mode. In raw mode, uninterpreted BCB binary digits that are read by the apparatus may be sent to a host computer for interpretation. The host computer may be custom programmed for a particular bar code application with different requirements than general purpose bar code applications. If the BCB interpretation mode is selected, the bar code reading apparatus will interpret BCB digits read in accordance with standard BCB general purpose formats before making a read bar code available for use. Thus, BCB bar codes are fully versatile.

General purpose BCB bar codes may be "formatted" in accord with particular proposed messages. For example, FIG. 1 illustrates a bar code symbol coded in BCB to represent ASCII characters, as specified in the American Standard Institute; specifically, the BCB bar code in FIG. 1 represents the three character message, "ABC". A BCB bar code symbol representing ASCII characters in the format depicted in FIG. 1 is termed a "Format A" code. FIG. 2 illustrates a bar code symbol coded in BCB to represent numerical information (in binary arithmetic), specifically, 0 through ($2^{21}$–1) or 0–2,087,151 in decimal. A BCB bar code symbol representing binary arithmetic numerical information in the format depicted in FIG. 2 is termed a "Format B" code. Since widespread use of Formats A and B (BCB bar code symbols representing ASCII characters and numerical information, respectively) is envisioned, Formats A and B codes are termed "standard format" codes. As shown in FIGS. 1 and 2, a portion of the bar code defines the format being used.

Standard format BCB bar codes are interchangeable because self-defining format BCB digits are located in a predefined portion of the BCB bar code symbol. Custom formats may be made interchangeable with standard formats. For example, a Format H may be reserved to define possible custom formats. Format H may be interpreted to mean something different for different bar code applications. Also, additional self-defining format BCB digits may be provided in another predefined portion of the BCB bar code symbol if format H is utilized, so that more than one "custom" requirement may be accommodated interchangeably, depending on the needs of various applications.

A BCB bar code may include portions having different standard formats. For example, a single bar code symbol may include Format A and Format B portions to more efficiently represent, e.g., alphanumeric and numerical only information, as described below.

In Format B, leading zeros are added between the BCB numerical information digits and the left end pattern as required so that each symbol has a total number of BCB information digits equal to a multiple of seven (none were required in FIG. 2). In Format A, shown in FIG. 1, ASCII characters are represented by 7 BCB digits, in accord with standard binary arithmetic ASCII notation, as mentioned. Thus, in Formats A and B, the total number of information BCB digits are always any multiple of 7, i.e., divisible by 7. Also, each 7 BCB digit portion has 7 black and 7 white code elements.

The BCB parity digit is included and selected so that the total number of BCB 0s is always even. Since the total number of BCB code elements is always a multiple of 14, the total number of BCB is will also be known to be even or odd, as the case may be.

It is sometimes advantageous to break up a long bar code message into two or more shorter messages. If 0000000 in Format B or A (which is the ASCII "NUL" in Format A) is adjacent to the left end pattern (three code elements), it means the next bar code symbol read is part of the BCB symbol with the 0000000 (NUL) adjacent to the left end pattern.

A BCB bar code symbol may include alphabetic information in ASCII characters (Format A) and numerical information in Format B in order to maximize efficiency (shorten the code length). For example, within a given BCB symbol, the ASCII NUL may be used to signify a change from Format A to Format B as follows: if in Format A, as indicated by the format digits, and if a number greater than 99 is called for following the ASCII characters of the message, the NUL could be inserted at the end of the ASCII portion of the message, i.e., between the ASCII portion represented in Format A and the numerical portion represented in Format B, if no further ASCII characters are required. The NUL indicates the switch to Format B. Leading zeros would be added as required to the Format B part of the message to maintain portions of seven. (If the number is between 127 and 1000, no length saving would be appreciated.)

Letters, integers, fractions, etc., are sensed when encoding. Upon receiving a message, BCB encoding software may automatically select the shortest, most efficient format.

As mentioned, when using variable length symbols, short-reads are possible. Applicants have devised another standard format for use with variable length messages which may eliminate or reduce the risk of a short-read, even with the "fixed length end patterns" described above. If the possibility of a short-read in a proposed message is determined to exist through inspection (e.g., examination is performed as described with processing apparatus to detect messages that may satisfy BCB conventions if a wand or scan were to leave or enter a symbol other than at both ends of the symbol), to avoid the short-read possibility, the proposed message may be encoded differently. For example, if the mathematical possibility of a short-read is sensed when encoding variable length symbols in Format A or B, Format D, described below, may be automatically selected (rather than Formats A or B) in some applications (especially those where one-way reading, e.g., insures reading the right end of the bar code symbol containing the format portion, and/or BCB Short formats are not allowed, and/or other constraints are convenient).

Format D may represent either a Format A or B symbol. Format D incorporates one additional portion containing 7 BCB digits (which may be called the ED portion, for error detection) located between the format portion and the information. When the rightmost BCB digit of the ED portion adjacent to the format digits is 0, the Format D symbol follows Format B convention, and if 1, it follows Format A convention. The remaining 6 BCB digits of the ED portion represent the number of 7 BCB digit information portions in the bar code symbol, 1–64, residue modulo 64 if more than 64 portions are used in one symbol. (Since at least one portion of BCB digits will always be present, let 000000=64). This may avoid most short-read possibilities in a given application, but, if a possibility then exists, which would be determined through further inspection, the message may be automatically inconsequentially amended. For example, Format B could start in A and then be "NULed" to B, a superfluous ASCII "space" character (or otherwise) inserted, etc., avoiding or reducing short-read possibilities.

An example of a Format A BCB bar code symbol encoding a 22 character ASCII message in upper/lower case:

[BCB Code Sample @ 0.01"], (not including the brackets) is shown in FIG. 4, where x=0.01".

An example of a Format B BCB bar code symbol encoding a 47 place decimal number, 2.283 . . . $\times 10^{46}$ (with 154 BCB information digits, in 22 seven bit portions), is shown in FIG. 5, where x=0.01".

FIG. 6 shows an example of a Format A symbol encoding a 22 character ASCII message in upper/lower case as shown, where x=0.0067", and an example of a Format B symbol encoding a 47 place decimal number, 2.283 . . . $\times 10^{46}$, where x=0.0067", respectively.

FIG. 7 shows Format A and B, respectively, with the same number of code elements as in FIGS. 4, 5 and 6, representing the messages as shown, where x=0.0033" (higher quality imaging and printing are required @ 0.0033" for actual operation of these illustrations).

While standard Formats A and B include numbers of BCB digits evenly divisible by 7 (with a remainder of 7 code elements when using BCB's longer short-read avoiding end patterns), BCB S Formats include numbers of BCB digits evenly divisible by 4. In the BCB S Formats (S for Short), shown in FIG. 8, only 2, 4, 6 or 8 BCB digits are represented, yielding 4, 16, 64 or 256 possible codes, respectively. A leading zero(s) is added to information if required (more than one leading zero may be added to keep the number of code elements in all short format symbols the same for a particular application). The Short Formats may be useful for airport baggage routing, etc., where the number of unique messages required may be minimal. The total number of code elements, including end patterns, (numerical) information and parity for short formats may be 12, 16, 20 or 24, all divisible by 4. Multiples of seven binary digits of information may be represented in standard formats, not short formats. If a particular bar coding application is limited and specific, a most efficient stand-alone format may be designed.

Because of BCB's "paired" methodology and the two black end reference code elements on the ends, as described above, in all standard formats and all short formats the number of white code elements equals the number of black code elements minus 2 (white=black−2). As mentioned, when using BCB's longer short-read avoiding end patterns, minor adjustment to these calculations are required.

In addition, two BCB general purpose bar codes, described below, have been designed for applications that require only numerical information and/or only alphanumeric information.

Codes incorporating BCB methodology may be circular as well as linear. As with BCB linear bar codes, such circular codes are as compact/reliable as possible. Select embodiments of round codes are described in applicants' U.S. Pat. No. 4,814,589. BCB may follow other configurations as well.

Advantages of BCB

BCB provides many advantages. Unlike other bar codes, BCB may be interpreted from black code elements only by utilizing simple "hints" from the white code elements, and vice versa. BCB is two codes in one. BCB's elements are as predictable as possible. BCB's advantages include:

A) each consecutive pair of two code elements is comprised of 1 white and 1 black stripe, which two stripes together represent one binary digit (every two consecutive stripes read will be 1 black and 1 white): the order of black and white determines which binary digit is represented. This means that every two consecutive stripes, comprising one BCB digit, are self-checking because they are binarily self-complementing. This is an ideal error detecting capability, a parity for every two consecutive code elements.

B) No more than two consecutive code elements can be the same color. Two consecutive code elements of the same color are not the same as a "thick" stripe used in other codes, because in BCB two consecutive code elements of the same color represent two halves of two separate (but adjacent) binary digits, i.e., two adjacent code elements of the same color represent one element from each of two adjacent pairs of code elements (either 01 or 10). These two pairs of code elements represent two binary digits. With a determination that the specific color of two consecutive code elements is the same, the two BCB digits represented by the two pairs of code elements can readily be determined with no other data. For example, if the two adjacent are black, then the digits are 01, and if they are white, then the digits are 10. This may be referred to as binary logic applied to binary coding.

C) Because of the (A) advantage above, the total number of white code elements is the same as the black code elements (except for the two extra black end reference code elements). The two black end reference code element and the orientation digits can be ignored when interpreting information since they are consistently present in every code. This is better than normal binary parity where the number of black elements is always, e.g., an even number, because in BCB the number of white code elements always equals the number of black code elements. The BCB code is most discernible for this reason: equal numbers of black and white stripes are always present and evenly distributed, in a most elementary and predictable binary pattern.

D) Parity (as illustrated and fully explained below) is provided by one parity binary digit that is inserted as a BCB 0 digit or BCB 1 digit, as required, in a fixed location, so that there will always be an even (or odd) number of BCB 1 (or 0) digits. Parity is most efficient in BCB and provides error detecting and correcting at a cost of only one BCB digit.

E) High information capacity, as described below.

An important consideration in comparing different bar codes is, how many different messages can each represent per single (1×) stripe? (ignoring, for current purposes, end patterns or start/stop codes, etc.) The "messages per stripe," "mps," specification of a bar code is more meaningful than "density." FIG. 3 shows an example of BCB suggesting its large information capacity.

The "characters per inch" specification, "cpi," commonly called density in the bar code industry, is not suitable, for example, when comparing different codes' message capacity when different codes represent different numbers of characters. if one compares BCB's characters per inch to other's, BCB's is much higher. This is not a good comparison because BCB represents binary characters, and one character of BCB can only represent 2 different messages. Since I2 of 5 represents the ten decimal digits, one character of I 2 of 5 can represent 10 different messages (in this regard, UPC is the same as I 2 of 5; I 2 of 5 evolved from UPC). Since Code 39 represents 43 characters, one character of Code 39 can represent 43 different messages. Which is not to say that BCB doesn't provide more information per stripe than the others.

Density, in "cpi," does not provide meaningful comparative information when comparing codes that represent a different number of characters (the "character set"). What density is useful for, e.g., is comparing a particular bar code's density for a given x measurement compared to a different given x measurement. (Message capacity may be analyzed generally with logarithms.)

BCB, I 2 of 5 and Code 39 are similar in that they each use only 1x or 2x width stripes. In this regard, these codes are all optimal. Also, seven characters of BCB require a total width of 14x, two characters of I 2 of 5 require a total width of 14x, and one character of Code 39 (each with its average required 2x "space") requires a total width of 14x. Thus, as it happens, a "common denominator" among these particular codes is a 14x width.

In BCB, a 14x width can represent 128 different messages, or $2^7$. In I 2 of 5, a 14x width can represent 100 different messages, or $2^{6.6}$ or $10^2$. In Code 39, a 14x width can represent 43 different messages, or $2^{5.4}$ or $43^1$.

Thus, BCB has higher message capacity per given number of stripes, i.e., BCB provides more messages per stripe than other 1x or 2x only bar codes. In the 14x width example above, messages per stripe, mps, in BCB is 9.1. Messages per stripe, mps, in I 2 of 5 is: 7.1. Messages per stripe, mps, in Code 39 is: 3.1.

BCB is more compact than today's best codes. This is because BCB's ratio to the theoretical Straight Binary Bar Code is exactly 2:1 and other 1x or 2x only codes are 2+ a fraction: 1, i.e., more than 2:1).

This message capacity advantage of BCB over other bar codes increases exponentially for each additional character of a message: the more information, the more BCB's advantage increases, which is one reason BCB lends itself to today's growing demands of bar coding. Thus, in comparing various bar codes' performance regarding density, even if the x width is held constant, BCB is superior. Also, as demonstrated below, because BCB can be identified and readily distinguished from other bar codes by its unique rhythm, its end or start/stop patterns and quiet zones require appreciably fewer stripes, providing further bar code real-estate saving.

A major advantage of BCB is that it can handle the thinnest stripes because of its optimally predictable binarily complementing methodology, as will be described further below. Therein lies the BCB's leap in density potential, or better, information compaction. BCB allows the highest message capacity possible.

Stripe Analysis and Comparison of BCB and I 2 of 5

Another way to consider BCB's unique advantages is to analyze its stripe structure in direct comparison to a bar code in wide use today, Interleaved 2 of 5, or I 2 of 5. I 2 of 5 must discern ten differing patterns of stripes to interpret its bar coded messages into decimal digits while BCB must discern only two patterns of stripes to interpret its messages into binary digits. Only the widths of I 2 of 5's stripes directly interact. BCB's widths and colors directly interact to provide a valuable array of decoding "hints" (predictability).

Each decimal digit in I 2 of 5 is represented by five white stripes or five black stripes, according to specified patterns. Five white stripes representing a decimal digit interleave with, or separate, five black stripes representing another decimal digit. Either black or white stripes may represent any of the ten digits. In each of the ten digit's patterns, two of the five stripes are wide and the remaining three stripes are narrow. A total of 7x in width are required for each decimal digit represented by I 2 of 5:2x for each of the two wide stripes requires 4x subtotal, and the three narrow stripes require 1x each, 3x subtotal.

In determining respective decimal digits of I 2 of 5, five consecutive stripes of the same color (black or white) must be read and decisions made as to which are the wide stripes and which are the narrow stripes. These five decisions are each binary in nature (thus making I 2 of 5 a strong code): "wide or narrow (1x or 2x)?" is the question that is asked about each of the five successive stripes of the same color. Each of the five successive binary decisions must be answered correctly for I 2 of 5 to read correctly.

I 2 of 5 decoding apparatus has predictable "hints" (albeit, non-binary hints) to work with. Of each five consecutive stripes of one color representing one of the ten decimal digits, two are wide and three are narrow. Thus, I 2 of 5 is self-checking every 7 successive code elements of the same color, i.e., in decoding I 2 of 5, if five stripes are not comprised of two wide and three narrow, an error is detected. This is I 2 of 5's character error checking scheme.

Also, if a failure does occur in, e.g., a black stripe, that failure may simultaneously affect the adjacent white stripe. However, neither of these corresponding failures predicts the other, i.e., the black decimal digit's failure does not reliably indicate which of the ten digits the white digit is or should be, and vice versa. One reason neither failure predicts the other is that only ten patterns of five stripes exist wherein 2 are wide and 3 are narrow. Therefore, I 2 of 5 must use all ten patterns.

I 2 of 5's hints were designed to detect errors. However, when deciphering five stripes of one color, the five interleaved stripes of the other color offer no additional hints: each pattern of five consecutive stripes of one color effectively stands on its own. Thus, only the widths of stripes interact with each other (2 of 5 are wide).

If one or more decimal digits are misread in I 2 of 5, use of the optional checkdigit will in most cases detect that an error has occurred and thus prevent a misread from being generated.

While I 2 of 5's hints were designed to detect errors, no scheme for error correcting in I 2 of 5 has heretofore been devised. However, applicants have devised a method to perform error correcting in I 2 of 5. If I 2 of 5's optional checkdigit were employed, it could be consulted when an error occurs. Depending on the nature of the error, it may be possible to deduce what the decimal digit(s) in error must be to satisfy the checkdigit's modulo 10 requirement (modulo 100 if two checkdigits were used), as described below.

According to applicants' method, suppose an intended three decimal digit message in an I 2 of 5 bar code symbol is 123 and a checkdigit is used (and also suppose that the "raw" scanned/digitized bar code image will be temporally stored). According to I 2 of 5 convention, the checkdigit would be calculated as follows: the numeric sum of the odd position digit(s) (only one odd position digit, 2, in this example) is 2; the numeric sum of the even position digits (1 and 3) is 4, multiplied by 3 is 12. Summing 2 and 12 results in a total of 14. The checkdigit is the smallest number which, when added to 14, results in a multiple of ten. Therefore, in this example, the checkdigit is 6, and the message, with checkdigit, is 61 23.

Following I 2 of 5 convention, this example is shown in Table 2 below by letters as follows (ignoring the start/stop characters in this example): capital letters for black stripes and lower case letters for white stripes, N or n for narrow stripes and W or w for wide stripes.

TABLE 2

```
          6  6  6  6  6 | 2  2 * 2  2  2
6123 = NwWnWnNnNw|NwWwNnNnWn
           1  1  1  1  1 |  3   3   3  3   3
```

Focusing on the 23 portion of the message, illustrated above (to the right of the thin vertical line) as NwWwNnNnWn, suppose that the left part of the middle narrow black stripe (N) were slightly marked by (black) dirt or ink (shown as *) so that it appeared to be a wide black stripe to reading apparatus. Also suppose this marking was so slight that it did not affect reading of the white interleaving stripe, i.e., the wide white stripe to the left of the "marked" black stripe. NwWwWnNnWn would result. An error is thus detected in the five black stripes representing the 2 of the message because NWWNW contains three wides and two narrows. Normally, a no-read would be generated.

However, error correcting in accord with the invention, can take place as follows: it may be deduced from I 2 of 5 convention (two stripes must be wide and three narrow) that one of the wide stripes of NWWNW should be narrow. From the left, if the first W were narrow (NNWNW) it would represent a 4, if the second W were narrow (NWNNW) it would represent a 2, and if the third W were narrow (NWWNN) it would represent a 6.

So far, normal I 2 of 5 character error detection convention detected an error. Then, in an attempt to error correct, the character with the error must be either a 4, 2 or 6 (via character error detection deduction). However, by consulting the I 2 of 5 checkdigit convention, it is found that the character with the error must be a 2, because if it were a 4 or 6 the checkdigit convention would be wrong.

Thus, in this example, an error was detected through I 2 of 5's character error detecting. Then, in accord with the invention, the character with the error was then deduced and the correct character was deduced (given that only one of its stripes was wrong) in accord with I 2 of 5's checkdigit convention. Limited error correction may thus be accomplished with I 2 of 5 if an optional checkdigit is used.

It is also possible to error correct if the defective area (*) caused not only the narrow black stripe to the right to be read incorrectly, but also caused the wide white stripe to the left of the marked black stripe to be read incorrectly as a narrow white stripe because of the same marking. However, depending on the nature of the error and the digitizing software, error correction may be more or less positive. Minimally, a 50/50 guess could be made, as explained following. In most 50/50 error correcting situations, the reading is preferably discarded as a no-read, and only when the probability of a correct correction is sufficiently high, as determined in a specific application, should error correction preferably be allowed to proceed.

Still focusing on the 23 portion of the message, which is illustrated by NwWwNnNnWn, the result with these two errors is NwWnWnNnWn. Above, it was deduced that the black stripes must represent 4, 2 or 6. However, because the "white" character interleaving the "black" character is now also affected, an error correcting determination for the black character cannot proceed until similar white character error detection deduction is performed as follows.

It may be deduced from I 2 of 5 convention that one of the narrow stripes of wnnnn should be a wide stripe. From the left, if the first n were wide (wwnnn) it would represent a 3, if the second n were wide (wnwnn) it would represent a 5, if the third n were wide (wnnwn) it would represent an 8, and if the fourth n were wide (wnnnw) it would represent a 1.

Thus, the black stripes must represent 4, 2 or 6 and the white stripes must represent 3, 5, 8 or 1. The following two possibilities are deduced in accord with the checkdigit convention and the invention: if the black character is a 2 the white character must be a 3 (the correct result), and if the black character is a 6 the white character must be a 5 (incorrect, but still in accord with the checkdigit). No other combination of possibilities satisfies the I 2 of 5 checkdigit convention. Minimally, there is a 50/50 chance of a correct correction, (i.e., in this 3-decimal-digits-of-information example, the reading is narrowed down from 1-in-a-1000 to 1-in-2 because of error correction).

However, in accordance with the invention, this 50/50 chance may be improved as follows: consulting the raw, temporarily stored digitized image of the bar code symbol, it may be calculated that the respective data representing the affected (intended-to-be-wide) white stripe and the affected-by-the-same-mark (intended-to-be-narrow) black stripe are "suspect," i.e., while these two stripes' data erroneously fell within the limits of the narrow stripe and the limits of the wide stripe width parameters, respectively, they did so with less certainty-of-measurement than other, unaffected scanned stripes of the symbol. (Assume below that, e.g., the width limits for a narrow stripe are between 0.5x and 1.5x and the width limits for a wide stripe are between 1.5x and 2.5x).

For example, assuming "1x" is the average width of an unaffected narrow stripe and "2x" is the average width of an unaffected wide stripe, the two (black) marked adjacent stripes (left to right, intended-wide white next to intended-narrow black) may measure less than 2x in width (2x−) and more than 1x in width (1x+), respectively, or more than 2x in width (2x+) and less than 1x in width (1x−), respectively (e.g., 1.6x and 1.4x, or 2.4x and 0.6x, respectively). Since an error has been detected, 1x+ or 1x− and 2x+ or 2x− measurements of the two affected adjacent stripes are good reason to "suspect" an error in these two particular stripes more than the stripes that would make the black character in question a 6 and the interleaving white character a 5, the only other possibility which is in accord with the checkdigit (although incorrect), because the stripes that comprise the black 6 and the white 5 would be, on average, closer to exactly 2x and exactly 1x.

Innovative error correcting methods in accordance with the invention such as these may be applied to other popular bar codes (including, e.g., 1x, 2x, 3x or 4x bar coding schemes such as UPC).

Illustrative examples of techniques which may increase the chance of successful error correction follow. For example, if (unique) bar coded ID numbers (e.g., random ID or serial ID numbers) are utilized, a correct error correction may be deduced if, e.g., one of two possible choices for an error correction is known to be associated with an object which is accounted for elsewhere. In other words, if it is known that an object's bar code is likely not to be one of the otherwise possible error correction choices, then that meaning of the bar code symbol is eliminated as a possible error-corrected reading.

In the I 2 of 5 example above, it may have been know that the black-6, white-5 error correction possibility (i.e., a bar code containing 61 65 information versus 61 23) was not likely because 61 65 may be accounted for elsewhere. Say the bar code application of the example above concerned bar codes adhered to the thoraxes of individual bumblebees in a pollination experiment (Popular Science, February, 1989). Bee #61 65 may be known to be in another location. Therefore the correction possibility of 61 65 may be rather unlikely.

Following this same example, other steps may also be taken. Associated with the generation of the error corrected reading of 61 23 could be the additional information that 61 23 required error correction, and/or that 61 65 was also a possible error correction choice, and all or part of this additional information regarding this reading could be stored with the reading to provide the possibility of making a more conclusive determination as to the accuracy of the reading at another time, e.g., it may be discovered at another time that Bee #61 65 had died, moved to another beehive, etc., and thus this reading could not have been 61 65. As mentioned above, these principles may also be applied to other bar code error correcting methods including BCB.

Summarizing, in accord with the invention, assuming an error falls within certain limits and, e.g., one or more checkdigits (or other "control" or "comparison") are used, when an error is detected via a bar code's character error detecting, it is deduced what the character with the error could be, and/or, it is deduced what it must be in accord with the bar code's checkdigit convention. Error correction may thus be accomplished.

BCB Error Detection and Correction

Regarding comparison between I 2 of 5 and BCB, fundamental differences are that, only in BCB, the colors and the widths are interdependent, making BCB as predictable as possible, and BCB's numerous hints are all binary in nature. In BCB, a binary hint confirms each binary decision, which accounts for BCB's performance. In BCB, the "message" bits are "interleaved" (separated) with each respective message bit's binary complement, as shown graphically below. I 2 of 5 makes binary decisions which are, by comparison, unaided and independent. Thus, I 2 of 5 uses more stripes to do less.

With respect to BCB's wide stripes, whenever two wide stripes occur in succession, no matter how many (if any) narrow stripes are between them, the two wide stripes must be opposite colors. For example, if a wide black stripe is read, the next wide stripe read must be white, and vice versa. In other words, all wide stripes must alternate in color: . . . wide black, wide white, wide black, . . . This is consistent with BCB's rhythm: two similar properties (wide stripes) alternating in color. Also, including the wide black stripe which is always present in the left end code pattern, all BCB symbols must contain one more wide black stripe than wide white stripes. Further, the first or rightmost wide stripe (from the right end code pattern) must always be black. The wide white stripes complement the wide black stripes, in a self-checking, alternating and binarily predictable sequence.

The only question in BCB is, when will a wide stripe appear? After it does appear, the next wide stripe must be the opposite color, the binary complement.

With respect to BCB's narrow stripes, only an even number of narrow stripes must occur between two wide stripes (which must be opposite colors). This even number of narrow stripes is always comprised of an equal number of narrow black and narrow white stripes, and the color of these narrow stripes alternates (again, binarily complementing rhythm).

Whenever two narrow stripes are separated by any even number of wide stripes, the two narrow stripes thus separated must be opposite colors. Whenever two narrow stripes are separated by any odd number of wide stripes, the two narrow stripes must be the same color (a binary determination: an odd or even number dictates "even or odd" colors, respectively).

When deciphering a BCB symbol, these hints describe the means with which reliable decisions are made as to the correct succession of the binary digits represented. BCB's widths and colors predictably interact inseparably with each other. A variance in any of the above hints would indicate one or more BCB digits has been misread, thus preventing a misread from being generated. While binary based checkdigits may also be employed in accordance with the invention (in addition to parity), in BCB such is typically not required. Applicants' BCB bar code thus employs fewer stripes to accomplish more, noting that fewer parts reduce the risk of stripe failure. At a real-estate cost of only one BCB digit, parity (described below) is employed imparting error correction of most of the most common flaws.

Table 3 below contains a sampling of illustrated and actual BCB symbols in Format B representing 128 unique codes, $2^7$, from 0 through 127, inclusive, so that BCB's hints may be viewed in context. These hints, exclusive to BCB, should also be considered in association with the Unique Advantages of BCB previously described and other advantages described below.

TABLE ~~12~~ 3BCB ~~B~~ Format B Samples ~~representi~~ representing; 0 - 63

| | end | 0 - 31 | | | | | | | format | | | parity | start | |
|---|---|---|---|---|---|---|---|---|---|---|---|---|---|---|
| lr | 1 | 0 | 0 | 0 | 0 | 0 | 0 | 0 | 0 | 0 | 0 | 1P | 1 | rr |
| lr | 1 | 0 | 0 | 0 | 0 | 0 | 0 | 1 | 0 | 0 | 0 | 0P | 1 | rr |
| lr | 1 | 0 | 0 | 0 | 0 | 0 | 1 | 0 | 0 | 0 | 0 | 0P | 1 | rr |
| lr | 1 | 0 | 0 | 0 | 0 | 0 | 1 | 1 | 0 | 0 | 0 | 1P | 1 | rr |
| lr | 1 | 0 | 0 | 0 | 0 | 1 | 0 | 0 | 0 | 0 | 0 | 0P | 1 | rr |
| lr | 1 | 0 | 0 | 0 | 0 | 1 | 0 | 1 | 0 | 0 | 0 | 1P | 1 | rr |
| lr | 1 | 0 | 0 | 0 | 0 | 1 | 1 | 0 | 0 | 0 | 0 | 1P | 1 | rr |
| lr | 1 | 0 | 0 | 0 | 0 | 1 | 1 | 1 | 0 | 0 | 0 | 0P | 1 | rr |
| lr | 1 | 0 | 0 | 0 | 1 | 0 | 0 | 0 | 0 | 0 | 0 | 0P | 1 | rr |
| lr | 1 | 0 | 0 | 0 | 1 | 0 | 0 | 1 | 0 | 0 | 0 | 1P | 1 | rr |
| lr | 1 | 0 | 0 | 0 | 1 | 0 | 1 | 0 | 0 | 0 | 0 | 1P | 1 | rr |
| lr | 1 | 0 | 0 | 0 | 1 | 0 | 1 | 1 | 0 | 0 | 0 | 0P | 1 | rr |
| lr | 1 | 0 | 0 | 0 | 1 | 1 | 0 | 0 | 0 | 0 | 0 | 1P | 1 | rr |
| lr | 1 | 0 | 0 | 0 | 1 | 1 | 0 | 1 | 0 | 0 | 0 | 0P | 1 | rr |
| lr | 1 | 0 | 0 | 0 | 1 | 1 | 1 | 0 | 0 | 0 | 0 | 0P | 1 | rr |
| lr | 1 | 0 | 0 | 0 | 1 | 1 | 1 | 1 | 0 | 0 | 0 | 1P | 1 | rr |
| lr | 1 | 0 | 0 | 1 | 0 | 0 | 0 | 0 | 0 | 0 | 0 | 0P | 1 | rr |
| lr | 1 | 0 | 0 | 1 | 0 | 0 | 0 | 1 | 0 | 0 | 0 | 1P | 1 | rr |
| lr | 1 | 0 | 0 | 1 | 0 | 0 | 1 | 0 | 0 | 0 | 0 | 1P | 1 | rr |
| lr | 1 | 0 | 0 | 1 | 0 | 0 | 1 | 1 | 0 | 0 | 0 | 0P | 1 | rr |
| lr | 1 | 0 | 0 | 1 | 0 | 1 | 0 | 0 | 0 | 0 | 0 | 1P | 1 | rr |
| lr | 1 | 0 | 0 | 1 | 0 | 1 | 0 | 1 | 0 | 0 | 0 | 0P | 1 | rr |
| lr | 1 | 0 | 0 | 1 | 0 | 1 | 1 | 0 | 0 | 0 | 0 | 0P | 1 | rr |
| lr | 1 | 0 | 0 | 1 | 0 | 1 | 1 | 1 | 0 | 0 | 0 | 1P | 1 | rr |
| lr | 1 | 0 | 0 | 1 | 1 | 0 | 0 | 0 | 0 | 0 | 0 | 1P | 1 | rr |
| lr | 1 | 0 | 0 | 1 | 1 | 0 | 0 | 1 | 0 | 0 | 0 | 0P | 1 | rr |
| lr | 1 | 0 | 0 | 1 | 1 | 0 | 1 | 0 | 0 | 0 | 0 | 0P | 1 | rr |
| lr | 1 | 0 | 0 | 1 | 1 | 0 | 1 | 1 | 0 | 0 | 0 | 1P | 1 | rr |
| lr | 1 | 0 | 0 | 1 | 1 | 1 | 0 | 0 | 0 | 0 | 0 | 0P | 1 | rr |
| lr | 1 | 0 | 0 | 1 | 1 | 1 | 0 | 1 | 0 | 0 | 0 | 1P | 1 | rr |
| lr | 1 | 0 | 0 | 1 | 1 | 1 | 1 | 0 | 0 | 0 | 0 | 1P | 1 | rr |
| lr | 1 | 0 | 0 | 1 | 1 | 1 | 1 | 1 | 0 | 0 | 0 | 0P | 1 | rr |

| | end | 32 - 63 | | | | | | | format | | | parity | start | |
|---|---|---|---|---|---|---|---|---|---|---|---|---|---|---|
| lr | 1 | 0 | 1 | 0 | 0 | 0 | 0 | 0 | 0 | 0 | 0 | 0P | 1 | rr |
| lr | 1 | 0 | 1 | 0 | 0 | 0 | 0 | 1 | 0 | 0 | 0 | 1P | 1 | rr |
| lr | 1 | 0 | 1 | 0 | 0 | 0 | 1 | 0 | 0 | 0 | 0 | 1P | 1 | rr |
| lr | 1 | 0 | 1 | 0 | 0 | 0 | 1 | 1 | 0 | 0 | 0 | 0P | 1 | rr |
| lr | 1 | 0 | 1 | 0 | 0 | 1 | 0 | 0 | 0 | 0 | 0 | 1P | 1 | rr |
| lr | 1 | 0 | 1 | 0 | 0 | 1 | 0 | 1 | 0 | 0 | 0 | 0P | 1 | rr |
| lr | 1 | 0 | 1 | 0 | 0 | 1 | 1 | 0 | 0 | 0 | 0 | 0P | 1 | rr |
| lr | 1 | 0 | 1 | 0 | 0 | 1 | 1 | 1 | 0 | 0 | 0 | 1P | 1 | rr |
| lr | 1 | 0 | 1 | 0 | 1 | 0 | 0 | 0 | 0 | 0 | 0 | 1P | 1 | rr |
| lr | 1 | 0 | 1 | 0 | 1 | 0 | 0 | 1 | 0 | 0 | 0 | 0P | 1 | rr |
| lr | 1 | 0 | 1 | 0 | 1 | 0 | 1 | 0 | 0 | 0 | 0 | 0P | 1 | rr |
| lr | 1 | 0 | 1 | 0 | 1 | 0 | 1 | 1 | 0 | 0 | 0 | 1P | 1 | rr |
| lr | 1 | 0 | 1 | 0 | 1 | 1 | 0 | 0 | 0 | 0 | 0 | 0P | 1 | rr |
| lr | 1 | 0 | 1 | 0 | 1 | 1 | 0 | 1 | 0 | 0 | 0 | 1P | 1 | rr |
| lr | 1 | 0 | 1 | 0 | 1 | 1 | 1 | 0 | 0 | 0 | 0 | 1P | 1 | rr |
| lr | 1 | 0 | 1 | 0 | 1 | 1 | 1 | 1 | 0 | 0 | 0 | 0P | 1 | rr |
| lr | 1 | 0 | 1 | 1 | 0 | 0 | 0 | 0 | 0 | 0 | 0 | 1P | 1 | rr |
| lr | 1 | 0 | 1 | 1 | 0 | 0 | 0 | 1 | 0 | 0 | 0 | 0P | 1 | rr |
| lr | 1 | 0 | 1 | 1 | 0 | 0 | 1 | 0 | 0 | 0 | 0 | 0P | 1 | rr |
| lr | 1 | 0 | 1 | 1 | 0 | 0 | 1 | 1 | 0 | 0 | 0 | 1P | 1 | rr |
| lr | 1 | 0 | 1 | 1 | 0 | 1 | 0 | 0 | 0 | 0 | 0 | 0P | 1 | rr |
| lr | 1 | 0 | 1 | 1 | 0 | 1 | 0 | 1 | 0 | 0 | 0 | 1P | 1 | rr |
| lr | 1 | 0 | 1 | 1 | 0 | 1 | 1 | 0 | 0 | 0 | 0 | 1P | 1 | rr |
| lr | 1 | 0 | 1 | 1 | 0 | 1 | 1 | 1 | 0 | 0 | 0 | 0P | 1 | rr |
| lr | 1 | 0 | 1 | 1 | 1 | 0 | 0 | 0 | 0 | 0 | 0 | 0P | 1 | rr |
| lr | 1 | 0 | 1 | 1 | 1 | 0 | 0 | 1 | 0 | 0 | 0 | 1P | 1 | rr |
| lr | 1 | 0 | 1 | 1 | 1 | 0 | 1 | 0 | 0 | 0 | 0 | 1P | 1 | rr |
| lr | 1 | 0 | 1 | 1 | 1 | 0 | 1 | 1 | 0 | 0 | 0 | 0P | 1 | rr |
| lr | 1 | 0 | 1 | 1 | 1 | 1 | 0 | 0 | 0 | 0 | 0 | 1P | 1 | rr |
| lr | 1 | 0 | 1 | 1 | 1 | 1 | 0 | 1 | 0 | 0 | 0 | 0P | 1 | rr |
| lr | 1 | 0 | 1 | 1 | 1 | 1 | 1 | 0 | 0 | 0 | 0 | 0P | 1 | rr |
| lr | 1 | 0 | 1 | 1 | 1 | 1 | 1 | 1 | 0 | 0 | 0 | 1P | 1 | rr |

KDF 01/04/00

TABLE 3 Continued, BCB Format B Samples representing: 64 - 127 Page 70

|  | end | 64 - 95 |  |  |  |  |  |  | format |  |  | parity | start |  |
|---|---|---|---|---|---|---|---|---|---|---|---|---|---|---|
| lr | 1 | 1 | 0 | 0 | 0 | 0 | 0 | 0 | 0 | 0 | 0 | 0P | 1 | rr |
| lr | 1 | 1 | 0 | 0 | 0 | 0 | 0 | 1 | 0 | 0 | 0 | 1P | 1 | rr |
| lr | 1 | 1 | 0 | 0 | 0 | 0 | 1 | 0 | 0 | 0 | 0 | 1P | 1 | rr |
| lr | 1 | 1 | 0 | 0 | 0 | 0 | 1 | 1 | 0 | 0 | 0 | 0P | 1 | rr |
| lr | 1 | 1 | 0 | 0 | 0 | 1 | 0 | 0 | 0 | 0 | 0 | 1P | 1 | rr |
| lr | 1 | 1 | 0 | 0 | 0 | 1 | 0 | 1 | 0 | 0 | 0 | 0P | 1 | rr |
| lr | 1 | 1 | 0 | 0 | 0 | 1 | 1 | 0 | 0 | 0 | 0 | 0P | 1 | rr |
| lr | 1 | 1 | 0 | 0 | 0 | 1 | 1 | 1 | 0 | 0 | 0 | 1P | 1 | rr |
| lr | 1 | 1 | 0 | 0 | 1 | 0 | 0 | 0 | 0 | 0 | 0 | 1P | 1 | rr |
| lr | 1 | 1 | 0 | 0 | 1 | 0 | 0 | 1 | 0 | 0 | 0 | 0P | 1 | rr |
| lr | 1 | 1 | 0 | 0 | 1 | 0 | 1 | 0 | 0 | 0 | 0 | 0P | 1 | rr |
| lr | 1 | 1 | 0 | 0 | 1 | 0 | 1 | 1 | 0 | 0 | 0 | 1P | 1 | rr |
| lr | 1 | 1 | 0 | 0 | 1 | 1 | 0 | 0 | 0 | 0 | 0 | 0P | 1 | rr |
| lr | 1 | 1 | 0 | 0 | 1 | 1 | 0 | 1 | 0 | 0 | 0 | 1P | 1 | rr |
| lr | 1 | 1 | 0 | 0 | 1 | 1 | 1 | 0 | 0 | 0 | 0 | 1P | 1 | rr |
| lr | 1 | 1 | 0 | 0 | 1 | 1 | 1 | 1 | 0 | 0 | 0 | 0P | 1 | rr |
| lr | 1 | 1 | 0 | 1 | 0 | 0 | 0 | 0 | 0 | 0 | 0 | 1P | 1 | rr |
| lr | 1 | 1 | 0 | 1 | 0 | 0 | 0 | 1 | 0 | 0 | 0 | 0P | 1 | rr |
| lr | 1 | 1 | 0 | 1 | 0 | 0 | 1 | 0 | 0 | 0 | 0 | 0P | 1 | rr |
| lr | 1 | 1 | 0 | 1 | 0 | 0 | 1 | 1 | 0 | 0 | 0 | 1P | 1 | rr |
| lr | 1 | 1 | 0 | 1 | 0 | 1 | 0 | 0 | 0 | 0 | 0 | 0P | 1 | rr |
| lr | 1 | 1 | 0 | 1 | 0 | 1 | 0 | 1 | 0 | 0 | 0 | 1P | 1 | rr |
| lr | 1 | 1 | 0 | 1 | 0 | 1 | 1 | 0 | 0 | 0 | 0 | 1P | 1 | rr |
| lr | 1 | 1 | 0 | 1 | 0 | 1 | 1 | 1 | 0 | 0 | 0 | 0P | 1 | rr |
| lr | 1 | 1 | 0 | 1 | 1 | 0 | 0 | 0 | 0 | 0 | 0 | 0P | 1 | rr |
| lr | 1 | 1 | 0 | 1 | 1 | 0 | 0 | 1 | 0 | 0 | 0 | 1P | 1 | rr |
| lr | 1 | 1 | 0 | 1 | 1 | 0 | 1 | 0 | 0 | 0 | 0 | 1P | 1 | rr |
| lr | 1 | 1 | 0 | 1 | 1 | 0 | 1 | 1 | 0 | 0 | 0 | 0P | 1 | rr |
| lr | 1 | 1 | 0 | 1 | 1 | 1 | 0 | 0 | 0 | 0 | 0 | 1P | 1 | rr |
| lr | 1 | 1 | 0 | 1 | 1 | 1 | 0 | 1 | 0 | 0 | 0 | 0P | 1 | rr |
| lr | 1 | 1 | 0 | 1 | 1 | 1 | 1 | 0 | 0 | 0 | 0 | 0P | 1 | rr |
| lr | 1 | 1 | 0 | 1 | 1 | 1 | 1 | 1 | 0 | 0 | 0 | 1P | 1 | rr |

|  | end | 96 - 127 |  |  |  |  |  |  | format |  |  | parity | start |  |
|---|---|---|---|---|---|---|---|---|---|---|---|---|---|---|
| lr | 1 | 1 | 1 | 0 | 0 | 0 | 0 | 0 | 0 | 0 | 0 | 1P | 1 | rr |
| lr | 1 | 1 | 1 | 0 | 0 | 0 | 0 | 1 | 0 | 0 | 0 | 0P | 1 | rr |
| lr | 1 | 1 | 1 | 0 | 0 | 0 | 1 | 0 | 0 | 0 | 0 | 0P | 1 | rr |
| lr | 1 | 1 | 1 | 0 | 0 | 0 | 1 | 1 | 0 | 0 | 0 | 1P | 1 | rr |
| lr | 1 | 1 | 1 | 0 | 0 | 1 | 0 | 0 | 0 | 0 | 0 | 0P | 1 | rr |
| lr | 1 | 1 | 1 | 0 | 0 | 1 | 0 | 1 | 0 | 0 | 0 | 1P | 1 | rr |
| lr | 1 | 1 | 1 | 0 | 0 | 1 | 1 | 0 | 0 | 0 | 0 | 1P | 1 | rr |
| lr | 1 | 1 | 1 | 0 | 0 | 1 | 1 | 1 | 0 | 0 | 0 | 0P | 1 | rr |
| lr | 1 | 1 | 1 | 0 | 1 | 0 | 0 | 0 | 0 | 0 | 0 | 0P | 1 | rr |
| lr | 1 | 1 | 1 | 0 | 1 | 0 | 0 | 1 | 0 | 0 | 0 | 1P | 1 | rr |
| lr | 1 | 1 | 1 | 0 | 1 | 0 | 1 | 0 | 0 | 0 | 0 | 1P | 1 | rr |
| lr | 1 | 1 | 1 | 0 | 1 | 0 | 1 | 1 | 0 | 0 | 0 | 0P | 1 | rr |
| lr | 1 | 1 | 1 | 0 | 1 | 1 | 0 | 0 | 0 | 0 | 0 | 1P | 1 | rr |
| lr | 1 | 1 | 1 | 0 | 1 | 1 | 0 | 1 | 0 | 0 | 0 | 0P | 1 | rr |
| lr | 1 | 1 | 1 | 0 | 1 | 1 | 1 | 0 | 0 | 0 | 0 | 0P | 1 | rr |
| lr | 1 | 1 | 1 | 0 | 1 | 1 | 1 | 1 | 0 | 0 | 0 | 1P | 1 | rr |
| lr | 1 | 1 | 1 | 1 | 0 | 0 | 0 | 0 | 0 | 0 | 0 | 0P | 1 | rr |
| lr | 1 | 1 | 1 | 1 | 0 | 0 | 0 | 1 | 0 | 0 | 0 | 1P | 1 | rr |
| lr | 1 | 1 | 1 | 1 | 0 | 0 | 1 | 0 | 0 | 0 | 0 | 1P | 1 | rr |
| lr | 1 | 1 | 1 | 1 | 0 | 0 | 1 | 1 | 0 | 0 | 0 | 0P | 1 | rr |
| lr | 1 | 1 | 1 | 1 | 0 | 1 | 0 | 0 | 0 | 0 | 0 | 1P | 1 | rr |
| lr | 1 | 1 | 1 | 1 | 0 | 1 | 0 | 1 | 0 | 0 | 0 | 0P | 1 | rr |
| lr | 1 | 1 | 1 | 1 | 0 | 1 | 1 | 0 | 0 | 0 | 0 | 0P | 1 | rr |
| lr | 1 | 1 | 1 | 1 | 0 | 1 | 1 | 1 | 0 | 0 | 0 | 1P | 1 | rr |
| lr | 1 | 1 | 1 | 1 | 1 | 0 | 0 | 0 | 0 | 0 | 0 | 1P | 1 | rr |
| lr | 1 | 1 | 1 | 1 | 1 | 0 | 0 | 1 | 0 | 0 | 0 | 0P | 1 | rr |
| lr | 1 | 1 | 1 | 1 | 1 | 0 | 1 | 0 | 0 | 0 | 0 | 0P | 1 | rr |
| lr | 1 | 1 | 1 | 1 | 1 | 0 | 1 | 1 | 0 | 0 | 0 | 1P | 1 | rr |
| lr | 1 | 1 | 1 | 1 | 1 | 1 | 0 | 0 | 0 | 0 | 0 | 0P | 1 | rr |
| lr | 1 | 1 | 1 | 1 | 1 | 1 | 0 | 1 | 0 | 0 | 0 | 1P | 1 | rr |
| lr | 1 | 1 | 1 | 1 | 1 | 1 | 1 | 0 | 0 | 0 | 0 | 1P | 1 | rr |
| lr | 1 | 1 | 1 | 1 | 1 | 1 | 1 | 1 | 0 | 0 | 0 | 0P | 1 | rr |

BCB Error Correction and Parity

Parity is extremely helpful for almost all applications involving binary coding. Parity is simple in principle. If a "word" of coded information in a given system (such as one complete bar code identifying a consumer article, or one word of information in a computer memory) is made to contain, in accord with adopted convention, e.g., an even number of binary digit zeros, then the most common occurring errors, one digit (bit) errors (and any error situation wherein the number of errors is odd), may readily be detected.

In BCB every two successive code elements complement each other, which accounts for BCB's rhythmic predictability, which is the basis of BCB's character error detecting. The use of a BCB parity digit imparts error correction.

Figure 9:
FIG. 9 shows examples of BCB's parity digits.

BCB codes may be supplied with a parity digit in a fixed location of each code, so that every code has an even number of BCB digit 0s. For example, if the code had, prior to determining the parity digit, an even number of BCB 0s, the added parity BCB digit would be BCB 1, and if a code had an odd number of BCB 0s, the added parity BCB digit would be BCB 0. Thus, every BCB bar code provided would contain an even number of BCB digit 0s. Parity BCB digits are shown in FIG. 9 for an undetermined BCB parity digit, an added BCB parity digit 0, and an added BCB parity digit 1. The BCB parity digits are then shown in context in FIG. 9.

If damage to a BCB bar code does not allow a particular BCB digit to be discerned as a 0 or 1, parity allows the damage to be corrected and automatically determines whether the damaged BCB digit is 0 or 1, as described below.

Figure 10:
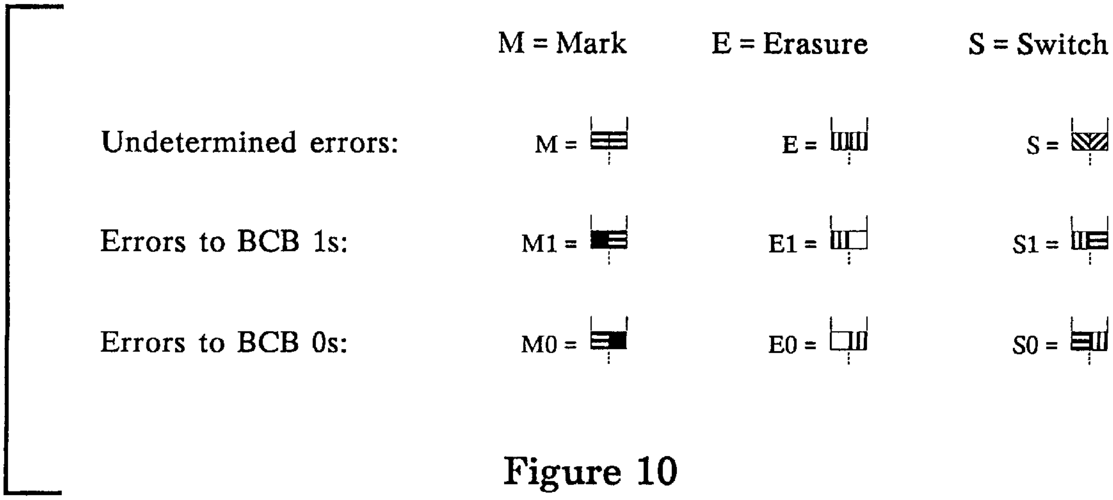
FIG. 10 shows representations of errors of marks and erasures and switches that may occur in a BCB bar code.

FIG. 10 illustrates types of damage possible to a single code element, and a switch of two code elements. Marks, M, shown as horizontal lines in FIG. 10, occur when damage causes a white element to be read as black. This might be caused by dirt, pen or pencil markings, over-inked bar code printing, etc. Both code elements are shown with horizontal lines because when a mark occurs to a BCB digit, it is not immediately known which one of the two code elements should be black.

Erasures, E, shown in FIG. 10 as vertical lines, occur when damage causes a black element to be read as white. This might be caused by rubbing, scratching, under-inked bar code printing, wear and tear from extended usage, etc. Both code elements are shown with vertical lines because when an erasure occurs to a BCB digit, it is not immediately known which of the two code elements should be white.

While not a serious possibility, a switch, S, shown in FIG. 10 as a combination of horizontal and vertical lines (or diagonal lines if undetermined), occurs when the digit halves of a BCB digit are reversed by a simultaneous mark and an erasure, i.e., the two adjacent code elements that comprise a given BCB digit (not two code elements that are merely adjacent are reversed). This is a worst case of theoretical error.

However, in order for one switch to occur the following must happen: the two stripes comprising a pair of adjacent code elements that represent one BCB digit (not merely two stripes that are adjacent) must be switched, i.e., in one BCB digit, the black stripe must be changed to a white stripe and the white stripe must be changed to a black stripe.

Figure 11:
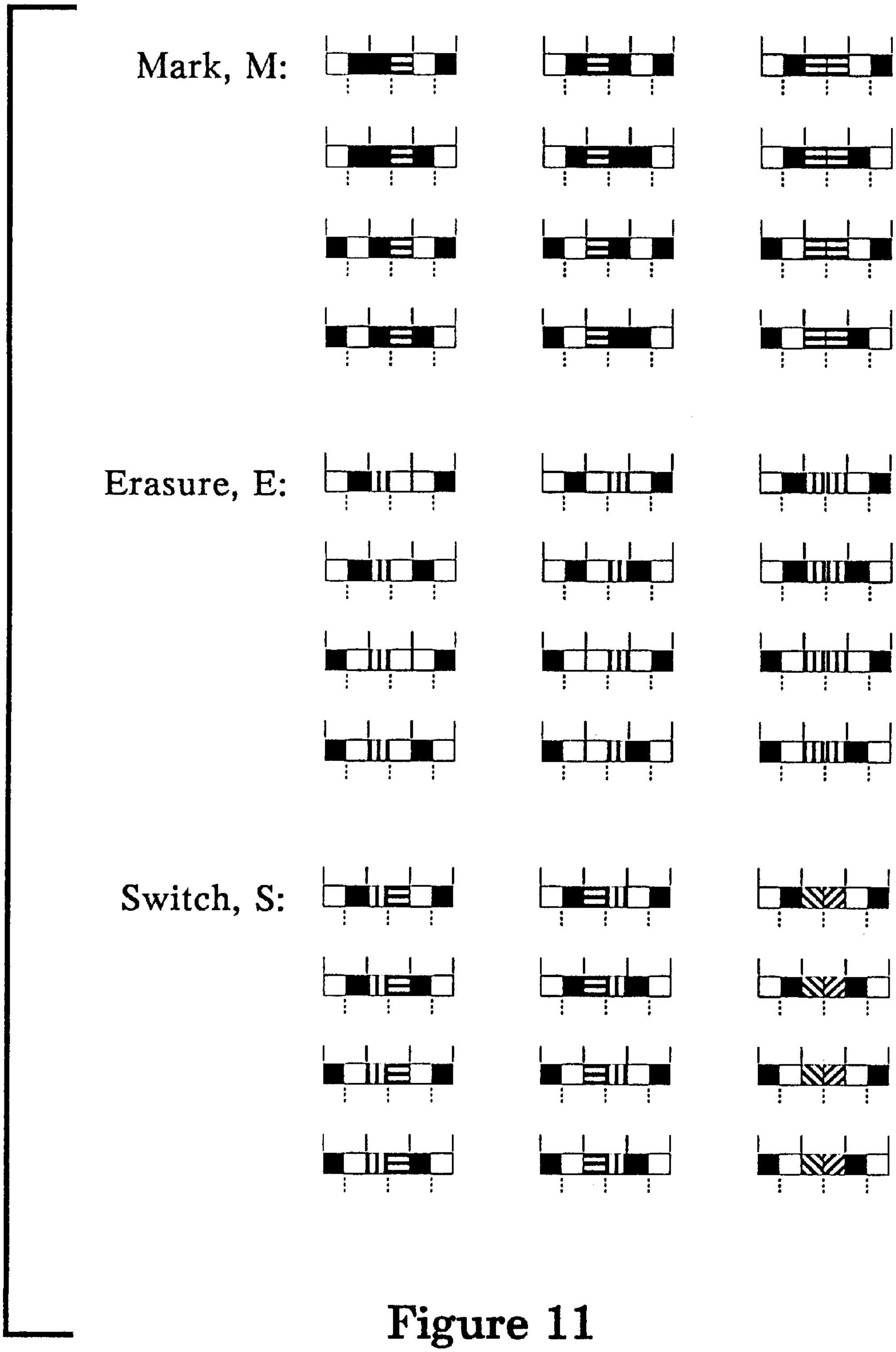
FIG. 11 shows representations of errors of marks and erasures and switches occurring in a BCB bar code.

In FIG. 11 all possible single BCB digit errors are shown in context, i.e., each possible error is shown between the four possible combinations of normal BCB digits which are: 0-0, 0-1, 1-0 and 1-1. As described above, e.g., in connection with BCB's advantages, the single error failures caused by marks or erasures are readily detectable and automatically correctable. Since self-complementing pairs of code elements have 1 black, 1 white stripe, no more than two consecutive code elements are ever the same color; wide stripes always alternate black/white, in predictable rhythm; there are two more black code elements than white in every symbol; parity given, there are always an even number of BCB 0 digits; and, each symbol has a readily discernible total number of BCB digits.

If a damaged code element is encountered in prior bar codes, the symbol cannot be read. Prior bar codes are not designed to be error correcting. BCB is self-correcting, dramatically increasing BCB's first time read rate. Also, multiple errors in BCB are detectable, offering multiple opportunities for detection (additional fail-safe security). Even switches cannot cause misreads in BCB, as described below.

Figure 12:
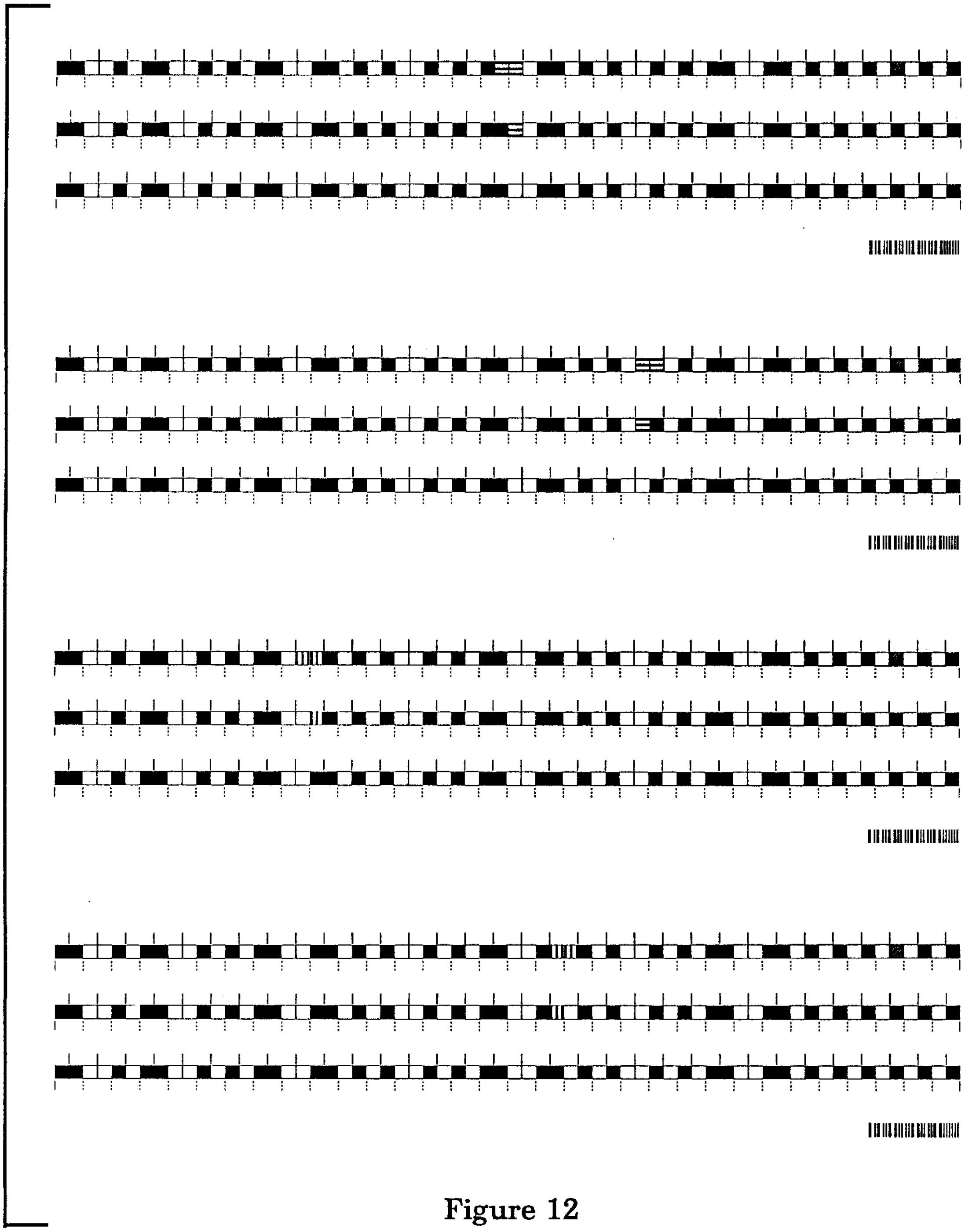
FIG. 12 generally shows examples of BCB bar code symbols with errors and errors being detected and corrected and the error free results of error correction.

FIG. 12, illustrates the use of EDAC in BCB bar codes, and shows four examples of one code element damage, and how any such damage is automatically corrected (each example of FIG. 12 is shown in two steps). The same coded information is used in each example and represents 0010001011100010111000101111 in binary arithmetic. The 64 code elements include 6 elements for end patterns and 2 code elements for the BCB parity digit, leaving 56 code elements for 28 BCB digits, which is $2^{28}$. This means that 268,435,456 unique codes are available for the actual BCB ⅝" bar code shown in FIG. 12. If the length of the actual bar code were increased to 1" long, there would be over 70 trillion unique codes available.

The above described examples illustrate BCB error detecting, locating and correcting generally. More detailed examples of how BCB's error detecting features cooperate with BCB's error correcting function follow.

BCB Decoding; Detecting and Correcting Errors

The description of how BCB is decoded includes a step by step procedure for detecting multiple errors, and detecting, locating and correcting any single error (in the initial example below, no error is present).

The following examples use actual standard BCB symbols which contain multiples of 7 BCB digits (each 7 BCB digits are comprised of 14 stripes or 14 code elements), with the parity convention that BCB symbols always contain an even number of BCB 0 digits. This is in accord with the standard BCB formats described above. Also, both code elements of any BCB digit containing a failure are shown as failures because it is not initially known which of the two code elements is defective.

In the BCB decoding described below, the binary sequence representing the scanned (or digitized) image of black and white stripes which comprise a bar code symbol is stored at least temporally in memory and analyzed as described below to determine if it conforms to BCB methodology, if an error or errors are present, and changes to correct the error, if possible.

FIGS. 13*a* and 13*b* show the same BCB bar code symbol which includes, from left to right respectively, as set off by thin vertical lines, the end pattern, a message, a BCB format, parity and another end pattern (the start pattern) as described in more detail below. As shown in FIG. 13*a*, each BCB digit (two adjacent stripes) is set off by thin vertical lines with a 0 designating a BCB 0 digit and a 1 designating a BCB 1 digit. The bar code in FIG. 13*b* is a repeat of the bar code symbol in FIG. 13*a* but includes a 1 or 0 immediately above each 1x width stripe. Each BCB digit includes two 1x width stripes, each 1x stripe being a BCB digit half. Thus each 1x width white stripe is referred to as a "0 BCB digit half" and each 1x width black stripe is referred to as a "1 BCB digit half." The BCB digit halves represent information that a reading device would transmit to memory.

Decoding recognizes BCB's end patterns and BCB's complementing rhythm. BCB's rhythm is unique and positively assures BCB will be reliably recognized. Each BCB digit consisting of two successive code elements must have one black and one white stripe.

The black code element on each end is detected as such but may be ignored during the rhythm check. Starting at either end, BCB rhythm is checked by detecting and counting each successive pair of BCB digit halves. If at any point two BCB digit halves of the same BCB digit are detected to be of the same color, that BCB digit is immediately concluded to be in error. The location of that BCB digit in error is noted in accord with its order in the sequence of proper BCB digits, i.e., its location is stored (or the location may be re-detected subsequently). The nature of the error is not necessarily significant (two 0 BCB digit halves or two 1 BCB digit halves). The process is continued until all BCB digit halves are thus considered and the total number of BCB digits is noted (stored). If only one BCB digit is found to be in error, i.e., is not comprised of complementing (one black and one white) BCB digit halves, the reading is not discarded, as must be done with other symbologies whenever one error is found. BCB is self correcting. The BCB bar code shown in FIGS. 13*a* and 13*b* contains no errors. If a complementing rhythm, which is characteristic only of BCB, is detected, the symbol is BCB.

After a (standard) BCB symbol is recognized by its complementing rhythm (with or without one error), the total number of BCB digits, each comprised of a complementing pair of stripes, is checked, remembering to include the black code elements on the ends as one BCB digit, to see if this total number is an exact multiple of 7 in accord with BCB convention (this is the same as saying that the total number of code elements is equal to a multiple of 14). If not a proper multiple, the reading must be discarded. This step would detect and discard most short-read possibilities even if the shorter end patterns were being used. However, potentially, short-reads, as described previously, involving exact multiples of 14 code elements could cause a truncated reading that may coincidentally satisfy other BCB convention as well, such as parity discussed below, if the longer ending, short-read avoiding patterns are not being used.

Other potential problems (related, as described below, to short-read type problems) are a possible failure that may arise from, e.g., a combination of a blemish (mark) and one or more "defects" (or, for lack of a better word, "shortcomings," or "defects/shortcomings") associated with the reading/decoding apparatus. Such defects, for example, may be associated with the stripe recognition software or "threshold" circuitry associated with the reading hardware. If defects, described below, are present or occur, BCB methodology may detect possible errors resulting from such defects avoiding a misread. However, BCB's methodology may not be able to correct such errors as readily as it would if such defects were not present. Because misread avoidance is paramount, error correcting in these situations is not attempted with the basic decoding method described. Appropriate (BCB) stripe recognition software may inhibit error correction if certain "stripe repairs" or combinations of "stripe repair" are required in a scanned representation of a given symbol, as described below.

For example, suppose a mark caused a reading device to detect an extra black stripe, but also detected the white stripe this mark appeared in as a white stripe (this may be called a long-read). Or, for example, a similar but opposite situation: suppose a mark caused a reading device to fail to detect a white stripe as such, but did not correspondingly detect this mark as a extra black stripe. (These general situations involving a mark blemish were described above in association with error correcting in I 2 of 5 above). These possible errors will be detected because the total number of code elements would be one over (a long-read) or one short (a short-read), respectively, and therefore not an even multiple of 14. This reading would be discarded. Such defects might cause more than 1 extra stripe error(s) or more than 1 less stripe error(s), but typically not both types of errors in one bar code symbol. If, as a result of given a defect, such errors, perhaps caused by over inked printing, occurred more than once in a given symbol, the errors would tend to be of the same type, over or under by more than one, which would be readily detected (but not necessarily correctable). Decoding BCB may detect such combinations of failure, avoiding possibilities of misreads.

These are worst case situations, so to speak, perhaps involving marginally defective apparatus that appear fully operational, and one or more blemishes. Combinations of stripe failure and such apparatus defects may be anticipated when decoding BCB. However, BCB decoding is reliable enough that it is not dependent on perfect hardware adjustment for flawless operation.

Figure 13:
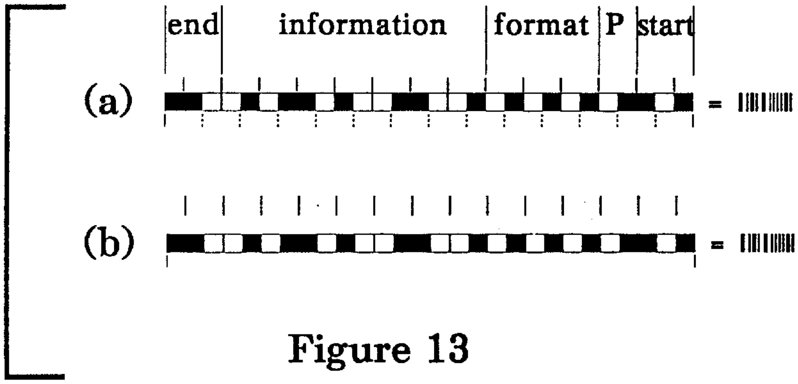
FIG. 13 shows a BCB Format B bar code symbol and the same symbol with BCB half digits specified.

The BCB bar code shown in FIG. 13 includes 28 code elements, which is proper since 28 is divisible by 14. Since the binary complementing rhythm is also proper, other than possibly containing one correctable error, it is assured that the symbol is in accord with BCB conventions, allowing correction of one error, if present. Alternations in color of wide stripes, for example, need not be checked again. The above checks have, in effect, already confirmed that BCB conventions are proper. Because of the extreme power of binarily complementing successive pairs of stripes, comprising two patterns which each represent one binary coded binary digit, BCB works seemingly effortlessly, and is rather subtle in operation.

If error correcting is not needed, as is the case in FIG. 13, the results may be confirmed by checking BCB's parity convention. In FIG. 13, eight BCB 0s, an even number, are present, which is proper BCB convention. If one switched digit (both halves of a digit reversed) were present, parity would detect it. As shown below, BCB parity also provides error correction.

Reviewing FIG. 13, the BCB symbol is recognized by its end and start patterns and by complementing rhythm; the total number of stripes has been determined to be a multiple of 14; and these results have been confirmed because proper BCB parity is present.

Therefore, the message in FIG. 13 may be interpreted in accord with BCB format B convention, a successful first time read. The message in FIG. 13 is 0011010 (26 in decimal), and may be reliably passed on by the reading device.

Notice that the BCB parity digit serves its purpose merely by maintaining parity, as does every BCB digit. This is why the BCB parity digit itself need not be specifically consulted and may itself be in error like any other BCB digit, in which case it would be correctable like any other BCB digit.

Regarding the BCB 1 digits which are part of the end patterns, these BCB 1s are also treated like any other BCB digit: if in error, they are corrected and will provide the end and start reference provided by these patterns. BCB will be read successfully every first time despite any single error occurring anywhere between the black end code elements. (Further, e.g., failures to either black end code element may also be corrected).

Figure 14:
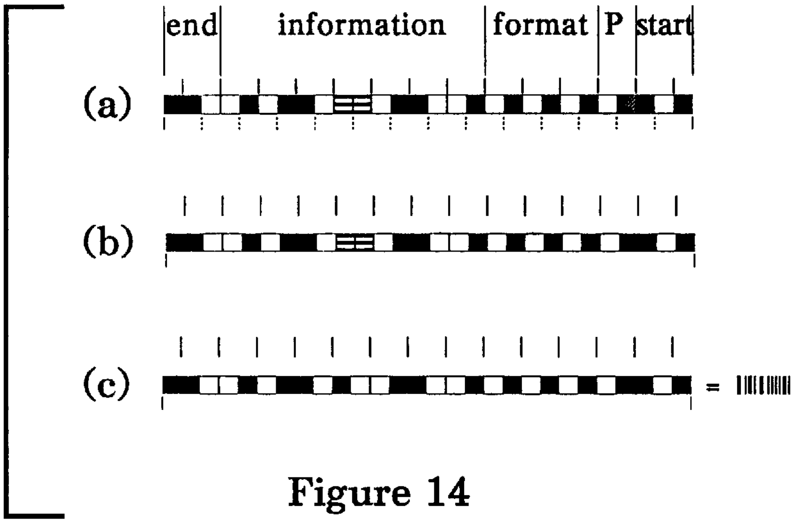
FIG. 14 shows a BCB Format B bar code symbol with a mark error and the error corrected version thereof.
Figure 15:
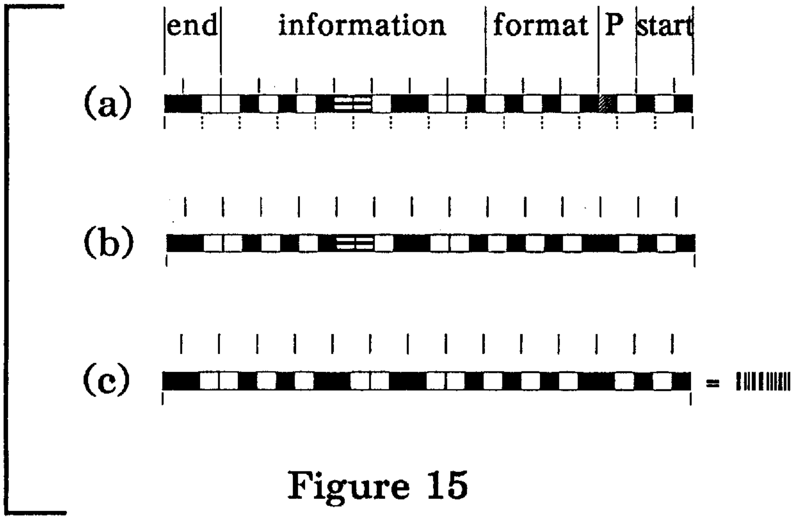
FIG. 15 also shows a BCB Format B bar code symbol with a mark error and the error corrected version thereof.
Figure 16:
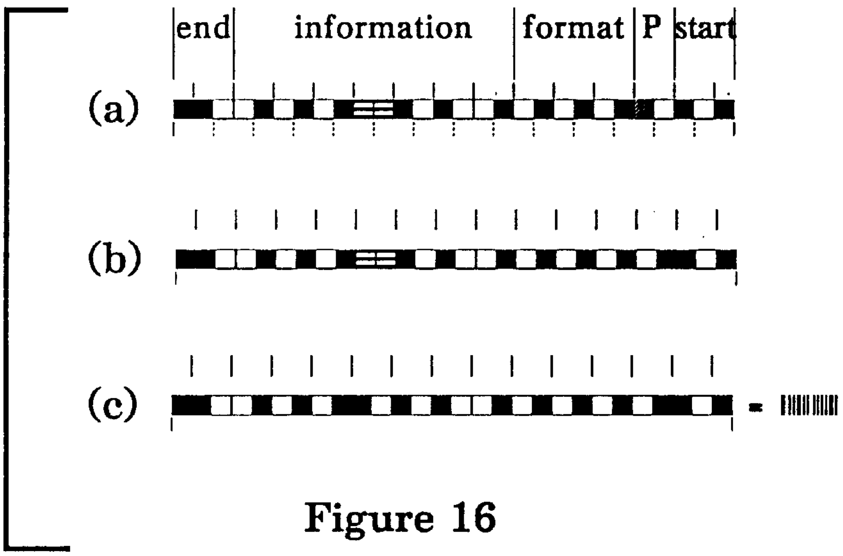
FIG. 16 shows a BCB Format B bar code symbol with another mark error and error correcting at work.

In FIGS. 14 through 16, bar code symbols are designated by a, b and c. FIGS. 14*a*, 15*a* and 16*a* are similar to FIG. 13*a* described above, but also include an error designated "m." FIGS. 14*b*, 15*b* and 16*b* are similar to FIG. 13*b* described above, but show both halves of the fifth BCB digit, which is in error, as two 1 BCB digit halves. FIGS. 14*c*, 15*c* and 16*c* show the same bar code symbol of FIGS. 14*a,b*, 15*a,b* and 16*a,b*, respectively, but with the error corrected.

A single mark failure is shown in the bar codes of FIGS. 14*a* and 14*b* through 16*a* and 16*b*, perhaps caused by a blemish in the paper on which the bar code symbol was printed, or dirt. The blemish appears as a mark or black spot in the white stripe of a BCB digit. As a practical consideration, if a given blemish occurred in a BCB digit's black stripe as well as its white stripe, no additional harm would be done because it was black to begin with. Erasure errors are handled in the same manner as marks. To BCB methodology, a failure of either color is a failure.

Referring to FIGS. 14*a* and 14*b*, the BCB bar code symbol illustrated therein includes a mark defect (described above) in the fifth BCB digit from the left, i.e., both halves of the fifth BCB digit are read as a (black) 1.

The error shown in FIG. 14*a* can readily be corrected. BCB is initially recognized as described above. In considering BCB's rhythmic sequence (from either end) it is detected and noted that two digit "1" BCB halves occur as both halves of one BCB digit; there should be one digit "1" BCB digit half and one "0" BCB digit half. The location of the BCB digit in error is noted, i.e., its position/location in the sequence of BCB digits, 5th from the left, or, 9th from the right, is stored in memory as being in error, in addition to the "image" of the entire symbol, as described below. In other words, in addition to the stored image, the BCB digit-in-error position must be located and stored.

Regarding the required correction: since BCB represents binary digits, the BCB digit in error should be either a BCB 0 digit or a BCB 1 digit. It is know that an error is present and that the error is one of two BCB digit halves (adjacent stripes that comprise a black and white pair representing a particular, but yet unknown, BCB digit). When BCB parity is now considered, as indicated in the third block of FIG. 25 (the parity is that the number of BCB 0 digits should be even), it will then be known that the BCB digit in error above must be a BCB 1, because if it were corrected to be a BCB 0 there would be nine, an odd number, BCB 0 digits. Inverting the BCB half digit (marked black in error) comprising the right half of the BCB digit in error, thus creating a BCB 1 digit, is the only way in which BCB parity may be achieved.

In FIGS. 15*a* and 15*b*, the same BCB bar code is shown as in FIGS. 14*a* and 14*b*, except that the BCB digit to the left of the error has been changed from a BCB 1 digit to a BCB 0 digit. Thus, the error in 15*a* and 15*b*, in the same position as FIG. 14*a* and 14*b*, creates three consecutive black stripes. The error is detected and located by binary complementing rhythm as described above. BCB parity must be considered as above in order to make the correction. FIG. 15*c* shows the corrected bar code.

In FIGS. 16*a* and 16*b*, the same BCB bar code is shown as in FIG. 15, except that in FIGS. 16*a* and 16*b* the BCB digit to the right of the error in 15*a* and 15*b*, has also been changed, from a BCB 0 to a BCB 1. Thus, the error in 16*a* and 16*b*, in the same position as FIGS. 14*a* and 14*b* and FIGS. 15*a* and 15*b*, creates four consecutive black stripes. The error is first detected and located as described above and BCB parity must then be considered as above in association with FIGS. 14 and 15 in order to make the correction. FIG. 16*c* shows the corrected bar code.

Detecting, locating and correcting an erasure works in similar fashion. Any possible combination of mark and/or erasure errors (switches described separately) are each detected. However, if more than one error is present they are not correctable with the above described method. Multiple error corrections are possible as described below.

Figure 24:
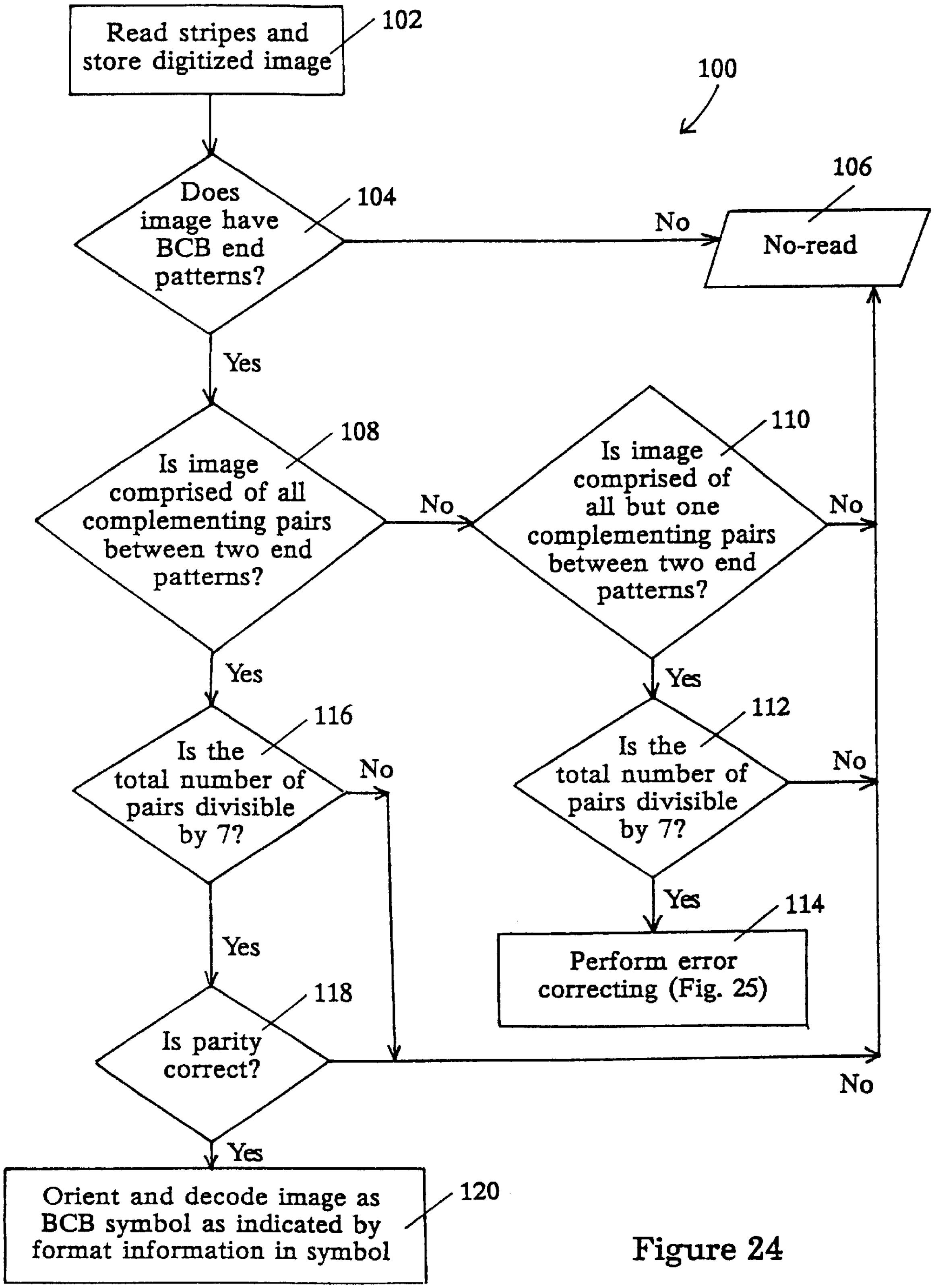
FIG. 24 is a flow chart illustrating BCB bar code detection and decoding.

FIG. 24 is a flow chart (100) of a method for detecting whether a bar code is BCB, and for detecting whether that BCB bar code has an error in it. In step 102, the bar code stripes are read and the digitized image is stored. In step 104, the end patterns of the bar code are checked to determine whether they are valid BCB end patterns. If they are not, a no-read results in step 106. If they are, the method proceeds to step 108 and determines whether the bar code symbol is comprised of all complementing pairs of black and white stripes between the two end patterns. If the image is not comprised as such complementing pairs, then in step 110 the method determines whether the image is comprised of all but one complementing pair between the two end patterns. If not, a no-read results. If so, the method determines in step 112 whether the total number of pairs is divisible by 7. If not, a no-read results. If so, error correcting is performed in step 114 in accordance with the flow chart of FIG. 25. If in step 108, it is determined that the image is comprised of all complementing pairs, then the method proceeds to step 116 to determine whether the total number of pairs is divisible by 7. If it is not, then a no-read results (step 106). If it is, then in step 118 parity is checked. If parity is not correct, a no-read results (step 106). If parity is correct, then the BCB symbol is oriented and decoded as indicated by the format information in the symbol (step 120).

Figure 25:
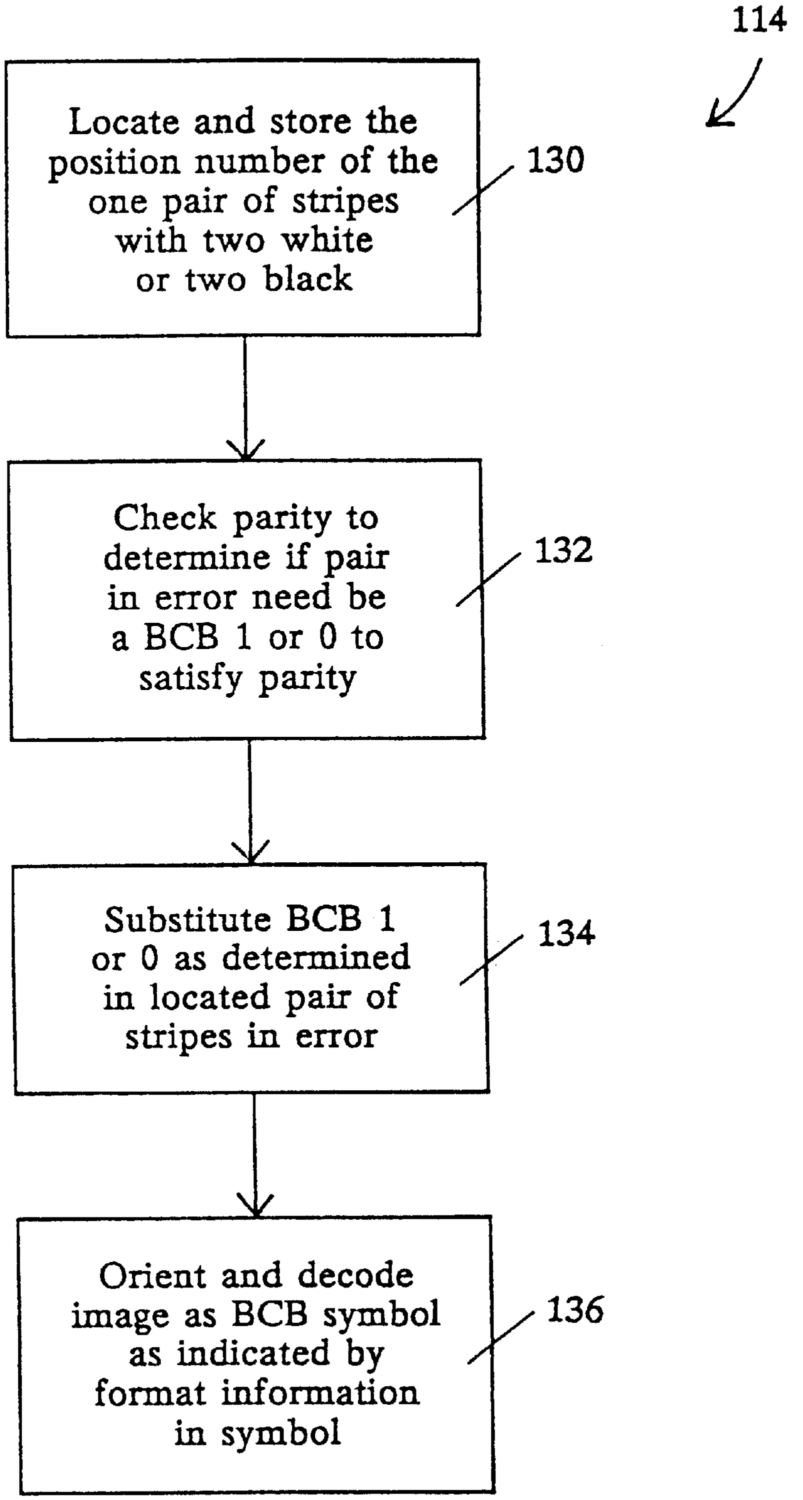
FIG. 25 is a flow chart illustrating BCB bar code error correction.

FIG. 25 is a flow chart illustrating a method for performing the error correcting of step 114 of the flow chart of FIG. 24. In step 130, the position of the error is determined, i.e., the position of the one pair of strip with two white or two black elements is located and stored. In step 132, parity is checked to determine if the BCB digit in error should be a BCB 1 or a BCB 0 digit to satisfy parity. In step 134, the erroneous BCB digit is replaced by the BCB digit determined in step 132 to satisfy parity. Then in step 136, the corrected BCB symbol is oriented and decoded as indicated by the format information in the symbol.

Any single error in a BCB bar code is corrected reliably. Since single errors occur much more frequently than multiple errors, BCB's successful first time read is much higher than other bar codes. BCB's error correcting function is responsible for this. If any one error has occurred within a given BCB symbol, BCB's parity convention determines what specific defective BCB half digit must be inverted to correct the failure, i.e., what specific bit in memory must be inverted to perform the correction.

FIG. 17*a* is similar to FIGS. 14*a*, 15*a* and 16*a* except that the bar code symbol therein contains two errors, one mark (m) and one erasure (e). Since more than one error is present in the bar code symbol illustrated in FIG. 17*a*, error correcting is not possible. The sequence of BCB digits that FIG. 17*a* represents is:

1 0 1 1 1 0 E 1 0 0 0 M 1

This sequence is shown below broken down into units of x width with a binary 0 representing each 1x white stripe and a binary 1 representing each 1x black stripe. The bar code symbol may be read starting from either end because two end reference patterns, distinct from each other, are detected to provide proper orientation. The sequence shown corresponds to that shown in FIG. 17*b*. The sequence reads (shown with a space separating each pair of stripes representing a BCB digit):

1 10 01 10 10 10 01 00 10 01 01 01 11 10 1

The two successive zeros comprising a BCB digit indicate the presence of an error. The two successive ones comprising another BCB digit indicate the presence of another error. Two errors are detected. This reading must be discarded because BCB cannot correct multiple errors. However, multiple errors that may occur will be detected because any error must interrupt the proper binarily complementing sequence and/or result in an improper number of code elements read. This error detecting method, unique to BCB, enables BCB to avoid misreads.

Figure 17:
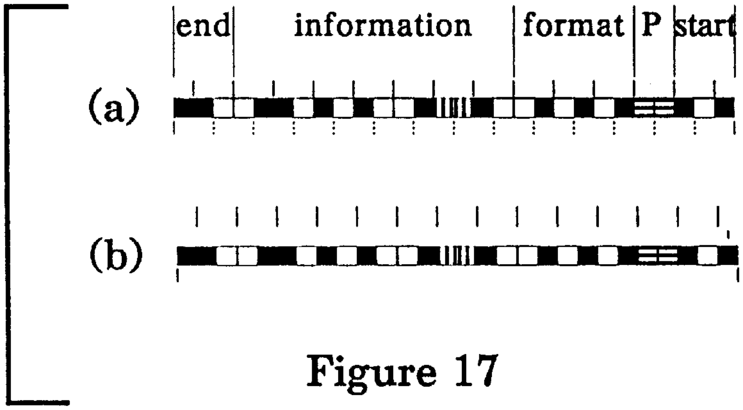
FIG. 17 shows a BCB Format B bar code symbol with two errors.

In FIG. 17, the mark error occurred in the BCB parity digit. This is inconsequential. In BCB, it makes no difference where errors occur. Detecting a single error of a mark or an erasure, or detecting multiple errors of either one or more marks and/or one or more erasures, is not reliant on BCB parity. Rather, for detection of any of these error(s), BCB's patterns of binarily complementing pairs of stripes are relied upon. However, BCB parity is relied on to correct any single stripe failure as demonstrated. As discussed below, BCB parity serves yet another purpose. In the event one or an odd number of switches occur, BCB parity will detect them.

Figure 18:
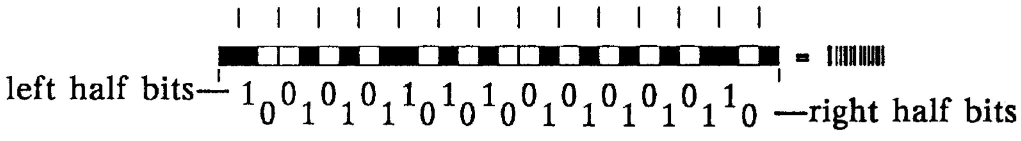
FIG. 18 shows a BCB Format B bar code symbol illustrating BCB's two distinct codes in one.

FIG. 18 repeats the bar code symbol corrected in FIG. 16 and demonstrates that BCB is two distinct codes in one. The BCB digit halves comprising the left half of each BCB digit, shown below, represent the coded message exactly.

1 0 0 0 1 1 1 0 0 0 0 0 1

The BCB digit halves on the right, shown below, separate the message bits with respective binary complement bits, thus representing the inverted form of the message:

0 1 1 1 0 0 0 1 1 1 1 1 0

Thus, BCB contains two totally separate but totally intertwined bar coded representations of information: two complete-in-every-detail representations, binarily complementing each other. Accordingly, BCB is related to coding described in applicants' U.S. Pat. No. 4,814,589, in which binary 1s and binary 0s are interchangeable.

Neatness counts in a bar code. In BCB, the black and the white stripes are as evenly distributed throughout the symbol as possible while still conveying place value information. As demonstrated above, BCB's neatness provides more than aesthetic value.

Damage to a BCB symbol involving any combination of any number of marks and/or erasures will be detected. However, there is a series of failures that could cause a misread. A misread will occur in a BCB symbol if exactly one switch (reversal of the two digit halves of one BCB digit) and one error occur, or an even number of switches, such as two switches, occur. One, or any odd number of switches alone would be detected by the BCB digit parity.

Considering conceivable damage occurring to bar coded information, damage from accidents normally would not cause a switch. Marks occur for reasons different than erasures, multiple marks or multiple erasures being comparatively common. Poor print quality is an excellent example of this.

Many common bar code misreads occur because of low cost/low print quality. BCB's EDAC supports lower cost printing and less expensive paper more than other bar codes, automatically correcting the most frequently occurring defects. Moreover, BCB's binarily complementing methodology becomes increasingly more error detecting against switches as less expensive print quality and paper are used to save costs, as described below. (A "bar code system" is purchased once, while bar code printing and paper costs are on-going, which is analogous to the razor and razor blades situation.)

With under-inked printing, resulting lighter black stripes lessen the possibility of a switch by lessening the possibility of "marks" being sensed. Likewise, with over-inked printing, heavier black stripes lessen the possibility of a switch by lessening the possibility of "erasures" being sensed.

Poor printing may be accommodated with digitizing and decoding methods described below. Consider over-inked printing (the converse would be true for under-inked printing): black stripes, both 1x and 2x wide, would, on average, be wider than comparable white stripes. This difference could automatically be sensed when decoding and allowance made therefor so that the symbol could be decoded accurately anyway, provided that there still remained a distinguishable difference between the thin and thick stripes of each respective color, as described below with an example.

One switch, if plausible, would be extremely rare, negligible compared to relatively easy ways to fool other codes even with their checkdigits. Two switches, "impossible." If exactly one switch and one error occurred simultaneously, BCB's error correcting would inevitably "correct" incorrectly. Therefore, if it were determined that a particular combination of printing technique, reading apparatus or environment allowed the possibility of a switch, additional BCB EDAC digits, such as described below or, e.g., Hamming codes or other error correcting methods, could be employed at the expense of bar code real-estate. Another solution may be used with BCB structure described herein, with provision therefor: the error correcting BCB parity digit feature may be turned off on the decoding apparatus and used instead for additional error detecting.

BCB Stripe Recognition

However, BCB stripe recognition methods may avoid the need for added BCB EDAC digits or to disable BCB error correcting. Such methods recognize individual damaged stripes and automatically "repairs" them when possible, as described below.

Decoding a BCB bar code symbol may be done by first converting a printed bar code image to binary bits, i.e., a digitized representation of a bar code image. Assume that a bar code reading wand being used by a person "scans," i.e., is moved by the person, at an average rate of one inch per 1/10 of a second. Also assume that the x measurement, i.e., one (thin) stripe, of the bar code being thus scanned is 0.01". Thus, on average, each 0.01" stripe is read in 1/1000 of a second. Further assume that the wand "samples" and stores at the rate of 10,000 "image bits" per second, i.e., each 0.0001 second a single binary stage of binary memory is loaded with the information "black" or "white" depending on whether the particular stripe being scanned is black or white.

For example, black may cause a binary 1 to be loaded and white may cause a binary 0 to be loaded. Therefore, on average, e.g., three BCB 0 digits (□■□■□■) would be loaded as ten binary 0 bits followed by ten binary 1 bits followed by ten binary 0 bits followed by ten binary 1 bits followed by ten binary 0 bits followed by ten binary 1 bits:

000000000011111111110000000000111111111100000000001111111111

If the rate of scanning by the person moving the wand varies, there will be ten, more or less, image bits per x measurement moved. However, considering inertia and other physical considerations, it can be expected that the number of image bits per x (bpx) would not "jump around." An example of a "jumping around" reading follows for the above three BCB 0 digits, white,black, white,black, white, black. The example uses "coded notation" created by applicants for representing binary, as described in their U.S. Pat. No. 4,814,589 in association with Table II (columns 14 and 15), wherein, e.g., the minus sign with a number indicates a number of consecutive binary 0s, and the plus sign with a number indicates a number of consecutive binary 1s (in the '589 Patent, this method of coding binary notation was used, e.g., to demonstrate decoding a binary number without a starting point):

−5 +15 −10 +15 −5 +10
meaning
000001111111111111111000000000011111111111111100000111111111 1

The bpx from stripe to stripe, under normal circumstances, may change more or less gradually, like so:

−9 +11 −12 +10 −9 +9
meaning
000000000111111111110000000000001111111111000000000111111111

Therefore, using a moving average of, say, two stripes' worth of bpx, a range of, say plus or minus 20%, may be accepted as an error-free range for the next stripe's bpx, i.e., if two stripes' (moving) average were 10 bpx then the next stripe should be between 8 and 12 image bits. Thus, using a moving average type of approach (preferably checked from both directions), stripes may be repaired. For example, if a black blemish in the middle of a 1x white stripe caused a reading of 000111111000 and this stripe was between two two stripe (moving) averages (to the left of it and to the right of it since it may be checked from both directions), the 000111111000 would accurately be interpreted as a white stripe, but with a blemish.

However, if two such repairs are required to both stripes comprising one BCB digit, error correction, if it otherwise were to be required, may be automatically inhibited, because two such repairs may conceivably result in a switch. By thus selectively utilizing error correction, the first time read rate is decreased only minusculely, because such potential problems are rather rare to begin with. On the other hand, misread avoidance is dramatically increased because one switch and one error represent a high statistical potential of a misread occurring (assuming switches were possible in a given application, as mentioned above).

Also, if an unusual set of circumstances did precisely create conditions that would allow a misread involving switches, other associated errors would typically be present and detected as well, and no misread would be generated.

Scan lines displaced from each other may be produced from two or more "passes" (reads) from a hand held wand, or automatically from multiple scan scanning equipment (such as Symbol Technologies' LS 2000 and LS 8000 series hand held laser scanners, which scan 36 times per second). Preferably, applicants' multiple displaced scanning method is employed, which uses two or more reflective surfaces which are angled differently, as described below.

More than one scan line may be stored in memory and then these scanned lines analyzed together to increase reliability of a reading (or one scan line only may be analyzed). For example, using applicants' "coded notation," the raw scanned bits may initially be contained in as many memory registers of the reading device as required and then each group of consecutive bits representing a different stripe counted and a minus or plus sign assigned as appropriate. The result of each count may be stored as a number with a sign in the order the stripes were read and stored in other registers so that they may be processed in accordance with BCB conventions as described above. Normal variations from one scan line to the next may be encountered. For example, three scan lines may produce the following readings (which may be compared to a two dimension digitized image) from three BCB 0 digits (□■□■□■).

0000000000011111111110000000000111111111100000000001111111111
000000000111111111110000000001111111111100000000001111111111
000000000001111111111000000000111111111110000000001111111111

These three scans lines may be converted to the following using applicants' coded notation as mentioned above:

| | | | | | |
|---|---|---|---|---|---|
| −11 | +10 | −10 | +10 | −10 | +10 |
| − 9 | +11 | − 9 | +11 | −10 | +10 |
| −11 | +10 | − 9 | +11 | − 9 | +10 |

Each line may be analyzed separately and compared to each other. If such lines and not all sufficiently similar, a problem is indicated.

These lines may be combined and the sums used, or, an average for each stripe may be taken. For example, the number of bits for each respective stripe (each column above) are added together, as follows:

−31 +31 −28 +32 −29 +30

Therefore, the average of each stripe (divide be 3), rounded off, is:

−10 +10 −9 +11 −10 +10

If the sums representing each respective stripe vary beyond a predetermined parameter, a problem is indicated.

Applicants' coded notation is used because it allows analysis of a binary representation without consideration of the actual numerical quantity represented, but rather of the respective pattern, in this example the concern being the number of consecutive binary 1s and 0s so that a comparison of the number of these consecutive digits may be made in order to reliably read the bar code stripe pattern.

Poor printing may be reliably accommodated with the digitizing and decoding methods described above. Over-inked printing (the converse would be true for under-inked printing) would, on average, cause 1x and 2x black stripes to be wider than otherwise comparable 1x and 2x white stripes. For example, with good printing quality and a consistent read, BCB digits 0100, (□■■□□■□■) would be loaded as ten binary 0 bits followed by twenty binary 1 bits followed by twenty binary 0 bits followed by ten binary 1 bits followed by ten binary 0 bits followed by ten binary 1 bits:

00000000001111111111111111111100000000000000000000111111111100000000001111111111

The terms "30% over-inked" and "50% over-inked" are used for explanation purposes only as described below, and are not understood to be generally used terms. If over-inked printing were "30% over-inked" (i.e., each individual side of a black stripe is "30%" over-inked so that when each side of a black stripe is read, three more 1 bits than intended are loaded) it would cause these BCB digits, 0100, to be loaded as 7 binary 0 bits followed by 26 binary 1 bits followed by 14 binary 0 bits followed by 16 binary 1 bits followed by 4 binary 0 bits followed by 13 binary 1 bits (more or less) as follows:

0000000111111111111111111111111111000000000000001111111111111111000011111111111110

(The reason the first and last stripe do not seem to conform is that over-inked printing "spreads" a black stripe on both sides of the stripe—only one side of the first and last stripe are considered in this example (i.e., the "inside" side). For explanation herein, the first and last stripe of the example are ignored.)

Consequently, on average, with 30% over-inked printing, 1x black stripes produce 16 bits and 2x black stripes produce 26 bits, and 1x white stripes produce 4 bits and 2x white stripes produce 14 bits. While there is only an uncomfortable 2 bit difference between a 1x black stripe at 16 bits and a 2x white stripe at 14 bits, there still remains a larger, readily distinguishable difference between the thin and thick stripes of each respective color, i.e., there still remains a 10 bit difference between thin and thick black stripes, and a 10 bit difference between thin and thick white stripes. Therefore, when decoding, a black stripe is best compared to a black stripe to each side of it (or two black stripes to each side), and a white stripe is best compared to a white stripe to each side of it (or two white stripes to each side), so that the readily discernible differences of respective colors are taken advantage of.

In accord with the above, if the over-inking were to approach 50%, thin white stripes would become totally inked-in thus preventing thin white stripes from being discerned, in which case the bar code cannot be read (but misreads would not be generated). If over-inked printing were "50% over-inked" (i.e., each individual side of a black stripe is "50%" over-inked so that when each side of a black stripe is read, five more 1 bits than intended are loaded) it would cause these BCB digits, 0100, to be loaded as 5 binary 0 bits followed by 30 binary 1 bits followed by 10 binary 0 bits followed by 20 binary 1 bits followed by no binary 0 bits followed by 15 binary 1 bits (more or less) as follows:

00000111111111111111111111111111111000000000011111111111111111111111111111111111

This resulting reading cannot be decoded but it cannot cause a misread because, as described above, proper BCB rhythm is not present and therefore BCB will not be recognized, or, if BCB were recognized, many errors would be detected. For example, black stripes and only what remains of the thick white stripes would be detected, and there would be little difference between these thick white stripes.

As described, BCB bar codes may be reliably read despite being poorly printed provided that there still remains a distinguishable difference between the thin and thick stripes of each respective color. If the printing becomes so poor that thin stripes become indiscernible, the bar code cannot be read.

By comparison, UPC, may generate misreads from marks alone, or from erasures alone, even though UPC uses a checkdigit. An example, showing how marks only can fool UPC, is as follows: if a left character 5 were soiled it could read as 3 and if a right character 3 were soiled it could read as 5, and in both cases maintain respective "character parity." If these two digits were in even (or odd) checkdigit positions, no error would be detected: the code would be misread. Similar examples could be shown for erasures, and for other bar codes. Some bar codes may require both marks and erasures to fool them if their optional checkdigits are used.

Thus, a damaged (or intentionally altered) UPC bar code symbol on a package in a supermarket can give incorrect price information. Damage, or intentional alteration, may more readily cause a misread to a UPC code than to a BCB code.

All bar codes are vulnerable to counterfeiting, i.e., an authorized bar code could be replaced with a counterfeit bar code. While BCB is vulnerable to being counterfeited like other bar codes, a practical solution to counterfeiting is described below and in applicants' U.S. Pat. No. 4,814,589. Additional features and advantages of BCB will be described in the context of such counterfeit systems, which may provide dramatic benefits, including counterfeit detection of counterfeit money, documents, records and tapes, auto parts, jewelry, designer clothing and pharmaceuticals, just to name a few objects which are commonly counterfeited today. Indeed, anything that is counterfeited, can be protected by a computer system and a bar coded serial number.

Bar Coded Lottery Ticket

Typically, ink jet printing devices are used to print security ID numbers on instant winning lottery tickets at the rate of about 8000 tickets per minute. The cost to lotteries is about 1.3 cents per ticket. However, because manual keying is too time consuming, inaccurate and expensive to validate all winning tickets, only when such winning tickets involve large payouts are these security numbers manually keyed into a computer system for validation purposes. For example, the Massachusetts Lottery sells over 100,000,000 winning tickets per year. Because it cannot validate all winning tickets, the Massachusetts Lottery loses money and reputation because cheaters are able to successfully "cut and paste" losing tickets to steal small "winnings."

A solution is to expedite the validation process with bar codes so that all winning tickets can be checked. The ink jet printing technique may be used to print a security number in bar coded form as well as normal form at an acceptable cost to lotteries so that all winning tickets may be automatically validated by scanning the bar code into the lottery computer system.

However, the quality of ink jet printed bar codes is low, yielding black stripes with fuzzy edges and white stripes speckled with black dots. These bar codes are susceptible to misreads and low successful first time read rates, which would tend to lengthen lines often associated with lottery ticket sales during peak hours. Long lines tend to reduce the number of lottery tickets sold, which results in lost profits.

An economical solution to low quality bar code printing is to incorporate a bar code methodology with a high degree of error detecting and correcting. Custom BCB formats have been designed to provide even higher levels of error detection and correction than standard BCB formats for the special requirements of the lottery industry and other applications where, e.g., bar code printing economics is important or the environment is "harsh."

Massachusetts, in an "Invitation For Bid For Optical Bar Code Readers," issued on or about Apr. 4, 1989, indicates that it would like to bar code all its Instant Lottery Tickets and thus be able to validate all such winning tickets. The BCB formats described below satisfy the specifications of the Massachusetts Lottery Commission in said Invitation For Bid and their ticket suppliers' ink jet printing apparatus. The specifications are: a 2" long bar code symbol wherein the thinnest code element is 0.0167" and its capacity is more than 14 decimal digit's worth of numerical information.

The following enhanced error detecting and correcting BCB bar code formats have been designed for such lottery industry requirements and these error correcting codes will not slow down ticket sales lines, as supermarket lines are slowed because cashiers may require several attempts to read many grocery products.

Figure 19:
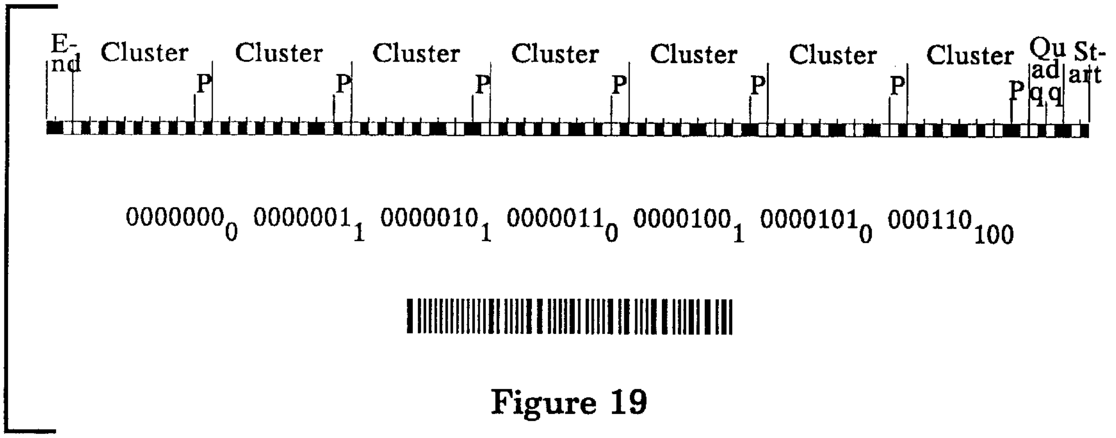
FIG. 19 shows a BCB bar code symbol illustrating enhanced error detecting and correcting abilities and the actual bar BCB code.

In these BCB formats, an information cluster is defined as any sequence of any number of BCB information digits that includes its own BCB parity digit. Referring to FIG. 19, the BCB bar code illustrated therein includes seven information clusters, the six information clusters (counting from left to right) to the right of the end code each contain 7 BCB information digits and 1 BCB parity digit, and the seventh information cluster contains 6 BCB information digits and 1 BCB parity digit. The most significant digit of the message information is at the left of the leftmost information cluster, and so on in order of descending place value toward the right to the rightmost information digit of the seventh information cluster which is the least significant digit.

The last (rightmost) BCB digit in each information cluster of FIG. 19 is the BCB parity digit for the respective cluster, shown with a "p" above it. Each of the seven information clusters follow the same parity convention (including the seventh information cluster which is based on 7 BCB digits, not 8 BCB digits like the other six information clusters). The parity convention is even in number of BCB 0 digits. Thus, considering the individual parity of each of the seven information clusters, the symbol's parity convention is also even in number of BCB 0 digits, and it will remain so as explained below.

The 2 BCB digits near the right end of the bar code, between the seventh information cluster and the start code, shown with "Quad" above them in FIG. 19, are called the BCB quadruplicity digits, and a "q" is shown above each of the quad digits. These two BCB quadruplicity digits together may be referred to as the Quad cluster, or the EDAC cluster. The Quad cluster follows the same parity convention as each information cluster—even in number of BCB 0 digits, i.e., they are always both BCB 1s or both BCB 0s. These two BCB quad digits give each symbol's total number of BCB 0 digits the quality of fourfoldness—being a multiple of four, i.e., the total number of BCB 0 digits in every possible symbol is residue 0 modulo 4. (Since the total number of all BCB digits is known because every symbol in this use always contains the same predetermined number, similar information is readily deducible about the number of BCB 1 digits.)

Some of the enhanced EDAC abilities of the BCB configuration shown in FIG. 19 are discussed below. Primarily, this configuration provides multiple error correction ability (an "error" being a mark or an erasure) since independent single error correction in each information cluster is possible because of the parity digit associated with each respective cluster (in similar manner as previously described). When decoding, an error correcting "subroutine" is first run on each cluster, and then run on the entire symbol. Secondarily, the two BCB quad digits provide added error detecting which gives added assurance of information integrity and additional but limited multiple EDAC in the event two or more switches or errors or combinations thereof occur within any one information cluster.

Each information cluster's parity will detect one or any odd number of switches within the cluster. Certain combinations of even numbers of switches within an information cluster may also be detected because of the BCB quad digits (such as two switched BCB 1 digits, or two switched BCB 0 digits), and two switches in the BCB quad digits may also be detected.

Each information cluster's parity will correct any one stripe error within the respective cluster (BCB's binary rhythm detects one or more errors). Additionally, if errors occur in two BCB 1s, or in two BCB 0s, within any one information cluster, these two errors will be corrected because of the BCB quad digits. Notice that the nature of two such errors (two whites or two blacks instead of one of each) is inconsequential.

If one BCB quad digit is switched, parity between the two BCB quad digit will be off and this will be detected. If one BCB quad digit is switched or in error, a reliable reading may be generated anyway if no more than one error has occurred in any one information cluster.

If both BCB quad digits are switched or in error, a less reliable reading could be generated anyway if no more than one error has occurred in any one information cluster (not recommended).

Message Capacity for the bar code of FIG. 19 is 7 information clusters containing 48 BCB digits of information=$2^{48}$=$2.81\times10^{14}$. This is 2.81 times the capacity required by the Massachusetts' Lottery.

If one BCB digit of information were sacrificed, leaving 1.41 times the capacity required, the sacrificed BCB digit's position could be utilized as a random BCB digit to provide positive real-time detection of attempted computer "hacking" or other fraud (as described below and in applicants' U.S. Pat. No. 4,814,589).

The overall length of the actual BCB bar code symbol shown near the bottom in FIG. 19 is 2.000", and is comprised of 120 code elements of 0.0167" (x=0.0167"). The 120 code elements comprise 48 BCB information digits (96 code elements), 9 BCB digits for parity and quadruplicity (18 code elements) and 6 code elements for the end/start codes.

In other applications more EDAC could be provided as appropriate. For example, two additional BCB quad digits (for a total of four) could be provided in predefined positions of the symbol in order to make the total number of BCB 0 digits in any possible symbol divisible by 6. Providing four additional BCB quad digits (a total of six) make the total number of BCB 0 digits divisible by 8, etc. A specified convention regarding such additional digits could also impart certain predictability regarding their usage. For example, if two additional digits were provided (a total of four including the two quad digits) and circumstances called for two of the four to be BCB 0s, and thus the other two to be BCB 1s, the convention could be that the two BCB 0s always occupy two specific positions of the four predefined positions, such as the BCB 0s always precede the BCB 1s.

Figure 20:
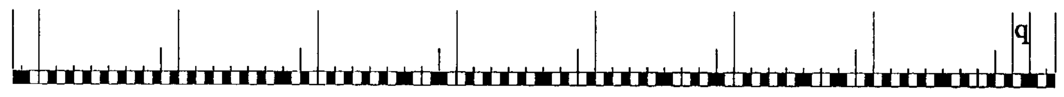
FIG. 20 shows another BCB bar code symbol illustrating enhanced error detecting and correcting abilities.

One BCB quad digit (instead of two BCB quad digits) could be provided to indicate, e.g., whether or not the total number of BCB 0 digits is divisible by four (residue 0 or 2 modulo 4). Referring to FIG. 20, one BCB "EDAC" digit is illustrated. The convention is if the one "q" BCB digit is a BCB 0, the rest of the symbol's number of BCB 0 digits is divisible by 4. However, this one EDAC digit would not be "protected" by parity, i.e., it could indicate whether or not the the total number of BCB 0 digits, exclusive of itself, is divisible by four. If this one EDAC digit were switched, it may "correct" incorrectly, e.g., if it were needed to correct two errors within one information cluster. If odd numbers of "EDAC" digits were used similarly, this would be a limitation. The message capacity of the BCB bar code illustrated in FIG. 20 is increased by one binary digit to $2^{49}$.

One or more additional BCB EDAC digits could be added to each information cluster, one (or 3/2 or more, or ½) EDAC digit could be associated with each BCB digit, etc., in order to increase EDAC ability.

Other examples follow. If $2^{49}$ message capacity were required, the one quad digit used in FIG. 20 could be dispensed with and that one BCB digit position thus freed up could be incorporated into a different BCB configuration providing the message capacity of $2^{49}$. For example, a total of 8 information clusters could be used, each with its own BCB parity digit: seven clusters containing 7 BCB digits of which 6 are BCB information digits and one cluster containing 8 BCB digits of which 7 are BCB information digits (this configuration is not illustrated).

Figure 21:
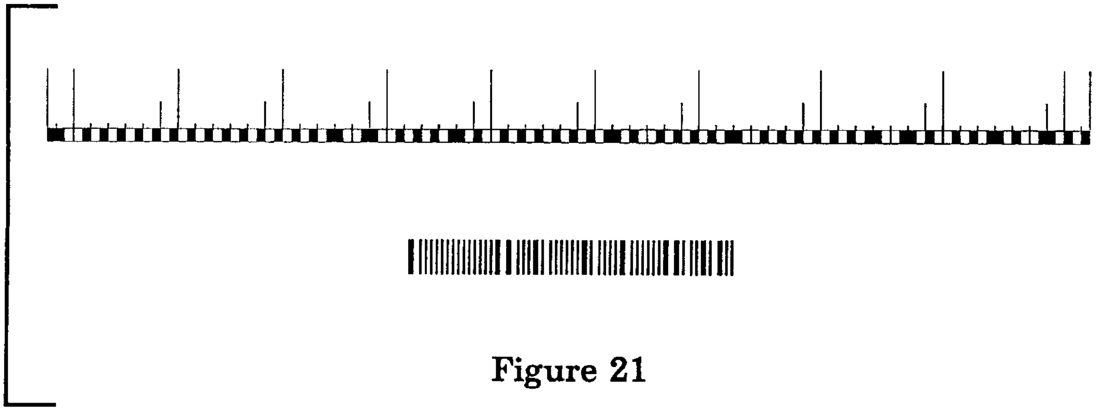
FIG. 21 shows another BCB bar code symbol illustrating enhanced error detecting and correcting abilities and the actual BCB bar code.

The Quad EDAC cluster illustrated in FIG. 19 could be dispensed with and those two BCB digit positions thus freed up could be incorporated into a different BCB configuration providing the same message capacity of $2^{48}$ as shown in FIG. 19. For example, a total of 9 information clusters could be used, each with its own BCB parity digit, six clusters containing 6 BCB digits of which 5 are BCB information digits and three clusters containing 7 BCB digits of which 6 are BCB information digits. This configuration is shown in FIG. 21, along with the actual bar code symbol, representing the same arbitrary message as FIG. 19: 17,451,483,462. If a switch were possible in a given BCB application, any binary EDAC method could be employed to detect switches, such as those methods Gulley's memory system employed. However, if switches are not expected to occur in a given application, more, smaller clusters allow more "frequent" one stripe error correction.

Bar Code Utilities

In a given BCB application, the total number of binary digits being coded, N, may be predetermined. When it is desirable to use coding where N may vary from one code to the next, N may be encoded in the code itself, in predetermined positions of the code relative to, e.g., the left end reference code element.

Also, the overall length of the symbol, L, is determinable, either as a discrete measure of time/distance or as a relative function of how many binary memory bits are required to store the scanned image of a given symbol. The latter is a sound approach to decoding because it lends itself to individually determining the width of each code element in a symbol continually, on the fly so to speak, by utilizing the measured width of adjacent code elements or the "moving average" of, e.g., two adjacently read stripes (considered from each direction independently), as mentioned above. These, and other methods, may be used to cope with code elements that may "appear" to be different in width or damaged, depending on, e.g., variations in the "manual" scanning rate of hand held devices, poor printing, etc.

Thus, with a known N, and L being determinable, the width of a single code element, W, is determinable accurately. The possible interaction of N, L and W provides advantages, useful for multiple checking when decoding, as mentioned in applicants' U.S. Pat. No. 4,814,589.

Error Correcting Methods

Other distinct advantages may be realized with BCB so that any given application's particular potential problems may be avoided. For example, an appropriate number of BCB digits (with or without their own parity digit) that define the exact number of BCB is (or 0s) in each particular code may be provided in a fixed location. Given N (see above), the number of BCB 0's would thus be known as well. Such digits could also express a modulo residue, etc. This provides another fail-safe security for insuring code integrity, another way of identifying a BCB code as such, and additional error-correcting ability.

In BCB applications where one stripe error correction is required and a switch is possible but a misread must be avoided, methods directed specifically to two-switch detection should be employed. The reason two switches should be detected is that if exactly one switch and one error occurs, BCB's parity error correcting method would create a second switch. However, since BCB is based on binary arithmetic, the wealth of knowledge pertaining to computer and telecommunication EDAC techniques (e.g., Hamming codes) or methods disclosed herein may also be readily applied to BCB. Not so with today's bar codes, which only have limited error detecting which cannot be readily augmented other than as originally provided for in the code design.

Floating Point BCB

Many new facilities may be provided with BCB bar coding. For example, when representing numerical information, an appropriate number of BCB digits, in a predetermined location of the code, could, by adopted convention, define the location of the binary point (comparable to the decimal point in decimal notation) of the coded information, and/or in another predetermined location of the code, one BCB digit could indicate the sign of the information, e.g., BCB 1 could mean positive and BCB 0 could mean negative (similar to floating point arithmetic in computers, as described, e.g., in *Computers and Data Processing Made Simple*, by Calvin A. Hofeditz, pages 27–29, © 79 Doubleday & Company, Inc.).

In some applications the following conventions may be adopted (or these conventions could comprise another BCB standard format) to represent positive or negative fractions (with no concern if the denominator is larger or smaller than the numerator). To code a fraction, such as 22/7 ($3\frac{1}{7}$, an approximation for pi), first write it as (29−7)/7; in other words, write the numerator/denominator as:

$$\frac{(\text{numerator} + \text{denominator}) - \text{denominator}}{\text{denominator}}$$

(If the fraction is negative, e.g., −22/7, it is written as (7−29)/7). Now the fraction is economically represented by two numbers, 29 and 7, the sign being determined by the order of the two numbers, according to adopted convention. Now, these two numbers may be represented in a bar code, for example, by interleaving 29 with 7 (7 with 29 if negative) as follows:

| | | |
|---|---|---|
| | 29 = | 1 1 1 0 1 |
| | 7 = | 0 0 1 1 1 |
| Interleaved | = | 0101111011 |

If the two numbers have a different number of binary digits, leading zeros are placed before the smaller number in accord with the convention as shown for the decimal 7 (111 to 00111).

Numbers with exponents may be represented in similar fashion. For example, the mantissa may be interleaved with the characteristic. One predetermined BCB digit position may define the sign of the characteristic and another the sign of the mantissa.

More than two numbers may be "interleaved," e.g., a numerator, a denominator and an exponent may be interleaved. Two or more different messages, e.g., weight and height, may be interleaved.

The process of interleaving different messages, or distinct portions of a given message, in accord with predetermined convention as described above, serves valuable purposes. For example, a "separator" or a separation point is not needed (a separation point may be defined by the following convention: the middle point in a bar code representation separates the numerator from the denominator when representing a fraction).

Such facilities will open new horizons for bar coded information in research, scientific, military, chemistry, astronomy etc. communities. Efficiency would dictate the adoption of particular conventions for given applications. These and other features have been incorporated in BCB and may provide dramatic benefits which today's codes cannot provide.

Continuously Repeated Bar Coding

Figure 22:
FIG. 22 shows an Instant Lottery Ticket with repeated actual BCB bar code symbology illustrating a decorative bar code presentation and enhanced error detecting and correcting abilities.

U.S. Pat. No. 4,814,589, describes use of bar coding in a repeated fashion. FIG. 22 herein is a sample of a lottery ticket with repeated BCB coding along its upper and lower edges. Such coding may be descriptively called continuously repeated "Wallpaper" coding because the bar code "pattern" is repeatedly applied in similar fashion to applying and matching a pattern on rolls of wallpaper. Some may prefer wallpaper coding for aesthetic reasons: it looks less like bar coding and more like edge design.

Wallpaper coding may incorporate other features, such as applicants' lack of a specific starting reference and direction reference (for two-way reading), as described in the '589 Patent and such as "inversion coding," also in the '589 Patent, where the binary connotation of physical properties defining binary digits is interchangeable (two-way complement readable). With repeated BCB bar coding, if a starting pattern is not used and the BCB bar coded information, comprised of a given number of BCB digits, n, were read from the reverse direction, white/black becomes black/white. Thus, BCB 1 digits become BCB 0 digits and vice versa.

Another feature that may be incorporated is parity, for example, for error detection purposes. If parity were used for error correction, as described above, such correction would be performed on the given number of BCB digits, n, prior to decoding the valid number as defined in the '589 Patent to, e.g., the lowest possible number. If both parity and interchangeable connotation were to be used, the given number of BCB digits, n, would be an even number, so that the parity convention could be applied to n BCB digits sampled in either direction, with either respective binary connotation. If the number of BCB digits, n, were an odd number, and the parity convention were that there were an even number of BCB 0 digits, it would follow that there were an odd number of BCB 1 digits. If the connotation were interchanged, the odd number of BCB 1 digits would become an odd number of BCB 0 digits, which does not conform to the parity convention. (The need for an even number of binary digits, in this example when using inversion coding, is also discussed below in another context.)

However, parity would not be the only error correcting means available, because if all or more than one repetition of code elements were read, each repetition would increase the first time read rate and reliability, and allow objects with illegible code elements in several locations, i.e., severely damaged objects, to be read: repeated information may be logically "spliced" together. If stripes are not readable because of, e.g., damage in one part of the bar coded information, they may be read from an undamaged part. Because the information is repeated, Wallpaper coding is a significant advance in reliability over other forms of bar coding.

Regarding bar coded instant lottery tickets, a system could be constructed utilizing randomly selected security ID numbers, as described in the '589 Patent, to detect fraud being attempted in the lottery system's computer network, in real-time. BCB formats have been designed specifically for lottery tickets, as described above and as shown in FIG. 22.

If such a computer system used validation numbers that were of a detectable series, such as normal serial numbers, or numbers that conformed to a "secret" algorithm, a thief (possibly a lottery employee or an employee at a location that sold lottery tickets and had an authorized lottery ticket validation terminal) could "poll" the system with a series of numbers that conformed to the authorized detectable series or the "secret" algorithm in order to come upon winning numbers. Such sequentially generated lottery ticket numbers would appear to be authentic lottery ticket numbers to the lottery's computer and the prize money associated with such winning numbers paid to thieves. The thief may have to fill out a form identifying a fictitious winner but that may not present a serious obstacle.

However, if such a computer system used validation numbers that were randomly selected, it could be set up to detect the polling of non-selected, unauthorized numbers. The polling of unauthorized numbers could be recorded (identification of the poller, location of poll, time, date, etc.) and would be indicative of fraud-being-attempted. Police or security personnel could be dispatched while such polling was happening.

In other words, lottery systems using predictable validation numbers may be able to prevent a winning ticket from being paid twice; however, such systems may not prevent a thief from collecting from a forged winning ticket prior to the genuine winning ticket being sold, validated and collected honestly.

If a validation number for a lottery ticket used continuously repeated BCB Wallpaper coding without a specific starting reference (did not use ending patterns) and was two-way complement readable with interchangeable connotation of the BCB digits (no direction reference was used) and incorporated a parity convention, and such a validation number was randomly selected for security, such validation numbers could be generated in accord with the principles described in the '589 Patent.

For example, binary code numbers, comprised of an even number of binary digits, could be generated in a counting fashion wherein each sequential code number generated could be decoded without a starting point reference and each was two-way complement readable. Considering parity and randomness, all such generated code numbers would not be used. Given a desired parity convention, only those generated code numbers that conformed to this convention would be possible code numbers. Of each two such referenceless generated consecutive code numbers that satisfy parity, one could be selected randomly for use as a validation number on a lottery ticket. As described below, such random selection (one out of two possible codes) may suffice for security.

Thus, n or more BCB digits of Wallpaper bar coded validation numbers could be read without a starting point reference and without concern for the reading direction which may provide inverted information, n digits satisfying the adopted parity convention and having been randomly selected so that they simply cannot be predicted if fraud were to be contemplated.

Bar Coding a Whopper

Kurt Gödel is known for his translation of an ancient paradox in philosophy into mathematical terms, the so called Epimenides paradox, "I am lying;" a one-step "Strange Loop." In the 1920's, Gödel found ways to represent any information in any notation by one number. This is related to the Godel Code, usually called "Gödel-numbering," wherein numbers are made to stand for symbols and sequences of symbols. The phrase, whopper, is used by applicants herein to conveniently descriptively refer to certain similar techniques since whoppers, for any sizable amount of information they represent, is a large numbers. However, applicants' whoppers are no larger than absolutely required, in accord with the theory of numbers; that is a major benefit of the whopper coding technique.

The whopper minimizes the number of stripes (code elements) required for a given message when the number of characters in the character set required for the message is awkward, e.g., for BCB bar coding purposes, the number of characters required for messages not conveniently related to base 2. A good example of such a character set is that of Code 39. Code 39 has 43 characters in its alphanumeric character set. Table 4 below shows Code 39's character set, along with Code 39's selected numerical value assignments. The character, & (the ampersand), has been added to the character set, making the total number of characters in the set 44. The & is assigned numerical value 43. The possible use of the & is described below. However, the whopper technique is demonstrated with only the normal 43 characters of Code 39.

TABLE 4

| Character | Numerical Value |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| A | 10 |
| B | 11 |
| C | 12 |
| D | 13 |
| E | 14 |
| F | 15 |
| G | 16 |
| H | 17 |
| I | 18 |
| J | 19 |
| K | 20 |
| L | 21 |
| M | 22 |
| N | 23 |
| O | 24 |
| P | 25 |
| Q | 26 |
| R | 27 |

TABLE 4-continued

| Character | Numerical Value |
|---|---|
| S | 28 |
| T | 29 |
| U | 30 |
| V | 31 |
| W | 32 |
| X | 33 |
| Y | 34 |
| Z | 35 |
| (hyphen) - | 36 |
| (period) . | 37 |
| Word Space | 38 |
| $ | 39 |
| / | 40 |
| + | 41 |
| % | 42 |
| & | 43 |

Coding a message into a whopper using the character set of Code 39 and bar coding the whopperized message is described below. (Applicants' whopper technique may be used in applications other than bar codes, such as communications, magnetic or optical storage, etc.) An example of coding a message into a whopper is given first. For background, a four place binary number can be represented as follows, where m equals one of the two available digits:

$$(m\bullet 2^3)+(m\bullet 2^2)+(m\bullet 2^1)+(m\bullet 2^0)$$

A four place decimal number can be represented as follows, where m equals one of the ten available digits:

$$(m\bullet 10^3)+(m\bullet 10^2)+(m\bullet 10^1)+(m\bullet 10^0)$$

A four place base 43 number can be represented as follows, where m equals one of the 43 available digits:

$$(m\bullet 43^3)+(m\bullet 43^2)+(m\bullet 43^1)+(m\bullet 43^0)$$

In accord with the above notation, the word "CODE" is whopper coded using the character set of Code 39 and its numerical value assignments into a numerical message as follows: C=12, O=24, D=13 and E=14, therefore:

$$(12\cdot 43^3)+(24\cdot 43^2)+(13\cdot 43^1)+(14\cdot 43^0)=$$
$$(12\cdot 79{,}507)+(24\cdot 1{,}849)+(13\cdot 43)+(14\cdot 1)=$$
$$954{,}084+44{,}376+559+14=999{,}033$$

Using Code 39's character set, "CODE" is represented by 999,033 in decimal, which is equivalent to 11110011111001111001 (20 digits) in binary. This binary representation may be bar coded in BCB directly in BCB's binary digits, e.g., in BCB Format B as described above, in normal binary arithmetic (or it may be stored in a computer memory or telecommunicated, etc). The message "CODE" is decoded from a BCB symbol (or otherwise) representing the message 11110011111001111001 as follows (described in decimal for convenience):

Divide 999,033 by 43. The remainder of the result is the numerical value of the last character of the message: 14=E. Divide the whole integer portion of the result (23,233) by 43. The remainder of the result is the numerical value of the next to last character of the message: 13=D. Divide the whole integer portion of the result (540) by 43. The remainder of the result is the numerical value of the next character of the message: 24=O. Divide the whole integer portion of the result (12) by 43. The remainder of the result is the numerical value of the first character of the message: 12=C. The whole integer portion of the result is zero; therefore the full message "CODE" has been decoded.

The process could be reversed by encoding the letters in the message CODE as EDOC, so that the message is decoded in reverse order, i.e., each letter would be "peeled" off as follows: C O D E, i.e., C first followed by O and D and E last.

While this novel method of coding may be used in other bar codes, it is advantageously done in BCB because BCB is more reliable than other codes: if one BCB digit of the message is lost, the entire message may not be interpretable, depending on the place value of the lost digit. For example, this whopper method of bar coding messages may be used to represent Code 39's character set in I 2 of 5 bar code symbols, i.e., base 43 characters may be represented in a base 10 bar code (or any other base coding).

Whopperized messages may not be made discrete in the same manner that Code 39's characters are discrete, i.e., discrete characters cannot be represented in a whopperized message. However, discrete portions of whopperized messages may be represented as previously described. Also, if a discrete bar code font were needed, BCB requires a simple font for printing purposes, because only two binary digit characters and three code patterns (described below) are required, along with a BCB algorithm to use the BCB font.

Considering efficiency, a prime thrust of the Whopper, BCB would require only 40x in width for the message "CODE" while Code 39 would require approximately 56x in width, a real-estate savings of 16x (about 30%). In other words, using the same x measurement for a code element, BCB may provide the same amount of information as Code 39 does in a significantly smaller bar code symbol.

Further, since reliability is one function of efficiency (parts you don't have can't fail), whopperized bar code messages are therefore more reliable (for character sets not efficiently compatible with base 2), by about 30%, when BCB is used. In other words, using the same x measurement for a code element, BCB may provide the same amount of information as Code 39 with about 30% fewer stripes in a more reliable (used broadly) bar code symbol, even before one considers the additional significant advantages of BCB's optimal bar coding methodology.

To illustrate this bar code real-estate saving, FIG. 45 shows two bar coded representations of the same message: "CODE" (not including the quotes), first, in BCB A (BCB A is described in detail below and illustrated in FIG. 32), and second, in standard Code 39 symbology, as specified by Intermec Incorporated. The x width in both symbols illustrated is 0.01" and both are shown at the same vertical height.

FIG. 46 shows a comparable message comprised of ten characters from Code 39's character set bar coded in BCB A mode and in Code 39. The x width in both symbols illustrated is 0.0133" and both are shown at the same vertical height of 0.5". FIG. 47 shows the same messages with the same measurements as FIG. 46 but the symbols are concatenated into two lines. FIG. 48 shows these messages comprised of ten characters from Code 39's character set bar coded in BCB A mode and in Code 39. The x width in both symbols illustrated in FIG. 48 is 0.0167" and both are shown at the same vertical height of 0.5". FIG. 49 shows the same messages with the same measurements as FIG. 48 but the symbols are concatenated into two lines. The comparisons in FIGS. 46 to 49 show the different bar code real-estate requirements for BCB A mode and Code 39.

Encoding "precedence" codes similarly to Code 39's convention allows the whopper to represent the full ASCII character set in similar fashion to Code 39 (see Code 39 Specifications booklet, © 1986 by Intermec Inc., page 7), although BCB Format A, described above, is designed for the full ASCII character set.

However, this scheme may be improved. For example, in Code 39, it is possible to cause the reader to enter or leave full ASCII mode via a manually operated switch on the reader device or by reading the following Code 39 symbols: "+$" which means enter full ASCII mode, and "−$" which means leave full ASCII mode. Thus, subsequently read symbols will be interpreted in full ASCII or in Code 39's character set.

A more versatile and/or efficient approach is possible in both Code 39 and BCB since these two pairs of characters, i.e., +$ and −$, typically would not occur in a message. If either of these combinations of characters were required in a message, it could appear with a space (i.e., word space, which is Code 39's numerical value 38, as shown in Table 4 above) between, i.e., +$ and −$. The approach is that these combinations may be coded within the bar code symbol so that decoding in one bar code symbol may enter and leave full ASCII. This enhancement is more versatile and/or efficient because only one bar code symbol must be read to decode the combination message comprised of Code 39 and the ASCII character set characters. Perhaps more descriptive meanings of these character pair combinations follows: +$ means enter full ASCII character set and −$ means enter Code 39's character set. Also, only one character pair may be needed within a symbol: one pair could be used to toggle back and forth from ASCII and Code 39's character set, provided however, e.g., the character set the symbol started in was known.

The character, &, the ampersand, mentioned above, could be used instead of the +$ and −$ to toggle back and forth from full ASCII and Code 39's character set. The convention could be adopted that all symbols started in normal Code 39. If the & was used, making the size of the available character set 44, the multiplying and dividing described above would be done with 44 and not 43. In essence, the base of the size of the character set would become 44. One or more additional or other characters may be used in this manner, i.e., the total number of characters used, or a number corresponding thereto, would be used for multiplying and dividing as described.

Also, the need to enter and leave full ASCII mode may be avoided sometimes by not allowing Code 39's ASCII "character pairs" to appear in normal Code 39 mode (i.e., not "Full ASCII" mode), e.g., % U, $A, $B, $C, . . . %R, %S, %T (see above reference). Instead, if one or more of these pairs are required in a Code 39 bar code symbol, let a space be placed in-between, i.e., % U, $ A, $ B, $ C, . . . % R, % S, % T. Thus, via this enhancement, full ASCII could be incorporated in a normal Code 39 mode symbol, (and in an alphanumeric BCB A mode symbol described below). Thus, the need for means for entering Full ASCII and the means for entering Code 39's character set may be avoided. Full ASCII may be incorporated while in normal Code 39 mode.

While in Full ASCII mode (or Code 39 mode with the above enhancement) when using Code 39, it is possible to incorporate the lower case letters of the alphabet, a through z, in a bar code symbol. The method used is to immediately precede each (otherwise) upper case letter with a plus sign (+). Thus, +A, +B, +C, . . . +Z would be interpreted as a, b, c, . . . z. The nature of some messages may thus require many encoded plus signs. For example, a person's full name, such as Jennifer Storch, would be bar coded in Code 39 in upper case initials and lower case letters, as one might type or write the name, Jennifer Storch, as follows:

J+E+N+N+I+F+E+R S+T+O+R+C+H

A total of 12 additional characters, 12 plus signs, have been used. Another versatility and/or efficiency enhancement follows. For example, let a pair of two dollar signs, $$, change the interpretation process of upper and lower case letters, i.e., after a first appearance of $$, letters would be interpreted as lower case unless preceded by a plus sign. If it is desired to change back to the normal interpretation process of upper and lower case letters, a second appearance of $$ is provided. Thus, the name Jennifer Storch, may be encoded as:

J$$ENNIFER +STORCH$$

A total of 5 additional characters, 1 plus sign and 4 dollar signs, have been used, a saving from the 12 characters (plus signs) used above. It may be understood by convention that the "first" pair of dollar signs, $$, is to the right, i.e., STORCH$$ represents the first pair of $$. All letters appearing to the left would be understood to be lower case letters unless a letter was preceded by a plus sign. If a second $$ pair appeared (as in the example above, J$$ENNIFER), letters to the left of the second $$, would be understood to be upper case letters unless preceded by a plus sign.

Again, if use of a character pair, e.g., $$, was needed in a message, a space could be used to separate the signs, i.e., $ $.

The choice of character pairs, such as $$, may vary so as not to conflict with unique ways specific two-character pair "labels" are already used as control labels for other purposes. Typically, such control labels are not transmitted by reading apparatus. As described, other characters, such as the &, comma, :, ;, ?, #, *, (, ), etc. could be added to the character set and be used instead of character pairs. This would be more efficient if such pairs were needed relatively frequently in relatively short bar code messages.

Also in similar fashion to Code 39, a check character may be incorporated by adopted convention as the last character of the message representing the modulus 43 sum of all the character values (see Table 4 above), or other error detecting techniques as well as error correcting techniques may be incorporated, e.g., as described herein. Another BCB Format, Format G, may be designated to represent Code 39's 43 character character set in a whopperized message.

General Purpose Compatible BCB Bar Codes

Figure 31:
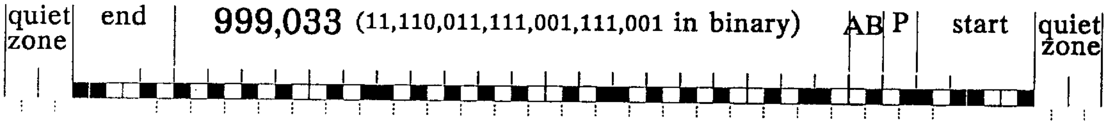
FIG. 31 shows a general purpose BCB representation of a numerical message.
Figure 32:
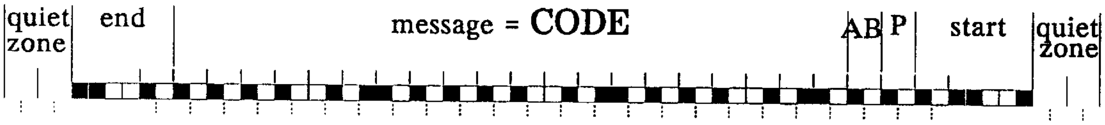
FIG. 32 shows a general purpose BCB representation of an alphanumeric message.

Two BCB bar code modes for general purpose, compatible, continuous bar codes have been designed for applications that require numerical information (called BCB B mode) and/or alphanumeric information (called BCB A mode). These two BCB bar code modes are suitable for applications where variable length symbols are required. Ending patterns, previously described, are used as shown in FIGS. 31 through 34. As shown in FIGS. 31 and 32, right to left, the start pattern is adjacent to a BCB parity digit (P) which is adjacent to an "AB" digit (AB). This AB digit indicates that the symbol represents either a numerical message (BCB B mode) or a whopperized alphanumeric message using Code 39's character set (BCB A mode). The AB digit is followed by the BCB message digits which are followed by the end pattern.

The following description concerns both the numerical message and the alphanumeric message as shown in FIGS.

Figure 34:
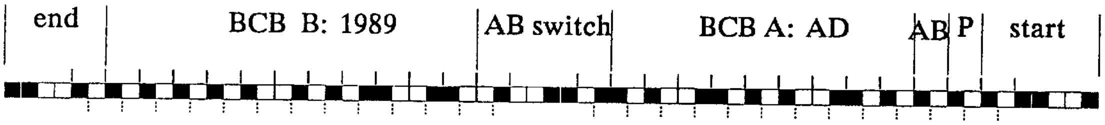
FIG. 34 shows an "AB switch" pattern in a bar code.

31 and 32 and the combination alphanumeric and numerical message in FIG. 34. The most significant BCB digit of the message is toward the left of the symbol. The BCB parity digit is always included and selected so that the total number of BCB zeros in any symbol is always even.

Also pertaining to both numerical messages and alphanumeric messages, for added assurance of message integrity, each symbol always has an even number of BCB message digits: one (otherwise meaningless) leading BCB 0 digit is added to the message if necessary to accomplish this (none were required in FIGS. 31, 32 or 34). In a combination alphanumeric and numerical message as shown in FIG. 34, if the combined total number of BCB message digits is odd, the leading zero is added to the leftmost message portion. Thus, exclusive of the start pattern, end pattern and AB switch pattern, if used (described below), bar code symbols in these two modes always contain an even number of BCB digits. When decoding these symbols, a problem is indicated if the number of decoded BCB message digits is odd and such readings are discarded.

Alternatively, in the interest of efficiency (bar code real-estate saving), instead of incorporating an AB digit to designate if a message is numerical only or alphanumeric, the incorporation of a leading BCB 0 digit, as just described, could be used to distinguish between numerical and alphanumeric messages. For example, the following convention could be adopted: symbols with an even number of message digits are numerical messages and symbols with an odd number of message digits are alphanumeric messages. One (otherwise meaningless) leading BCB 0 digit is added to the message as required to accomplish this. Obviously, if both numerical and alphanumeric symbols were used in a given application in accord with this convention, one bar code symbol to the next may contain an odd or even number of message digits.

Another alternative is that a different ending pattern or patterns could be used to distinguish between numerical only and alphanumeric messages.

It may be advantageous to break up a message into two or more messages. If two leading BCB 0 digits (double zeros) are placed between the left end pattern and the message digits (in addition to the single leading BCB 0 digit that may be required to make the number of message digits even), it may mean that the next symbol read is part of this symbol's message. Any number of numerical and/or alphanumeric messages may be intermixed in any combination.

Such intermixed, concatenated bar codes may be read in any order with additional provision. For example, by convention, the first character of an alphanumeric message may be a decimal digit, and the first decimal digit worth of information in a numerical message, may be used to indicate the order of assembly of several bar codes read (thus allowing up to 10 bar codes to be combined, 100 if by convention two digits were used, etc). A bar code without the double leading zeros may indicate the conclusion of such combining. Instead of using double zeros, a separate bar code message may be used to indicate that subsequent symbols read are to be combined and when read again (or another separate bar code is read) it may indicate the end of such combining.

When only numerical information is required it is coded in binary arithmetic with BCB digits and denoted as such in the symbol with a BCB 0 digit in the AB position. FIG. 31 shows an example of the numerical message 999,033. Decoding is straightforward, binary to decimal, if required for viewing by a person, or the message may be passed on or stored in binary.

When alphanumeric information is required, BCB utilizes Code 39's character set and is denoted as such in the symbol with a BCB 1 digit in the AB position. The full ASCII "character" set may also be encoded in this BCB alphanumeric symbology by utilizing Code 39's "precedence codes" as if using Code 39 (with enhancement as mentioned above). Encodation, etc. of Code 39's characters is described above and shown in FIG. 32.

Figure 33:
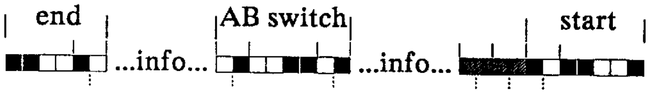
FIG. 33 shows an "AB switch" pattern for use with, e.g., FIGS. 31 and 32.

An "AB switch" pattern, which incorporates two BCB 0 digits, as shown in FIG. 33, allows A & B modes to be interchanged (an "AB switch") one or more times in one symbol in the interest of efficiency (however, if used more than once, a short-read is possible). The white white and the black black pairs of stripes in the pattern are distinguishable between the two BCB 0 digits. The AB digit indicates whether the first portion of the message to its left is in A or B mode. Each occurrence of the AB switch pattern there following switches to the other mode. FIG. 34 shows the AB switch pattern in use in a bar code representing the message "1989AD" (not including the quotation marks).

While this AB switch pattern is used to instruct apparatus to interpret the two decoded BCB binary "characters" (the BCB digits 0 and 1) in either of two modes (BCB A or BCB B, alphanumeric or numerical, respectively), these BCB "characters," are still decoded as the same characters, i.e., binary digits 0 and 1. Subsequently, the two decoded BCB characters may be interpreted according to the indicated instruction as alphanumeric or only numerical information. This is different than, e.g., Code 128, which incorporates a "CODE" (and a "SHIFT") pattern that may instruct apparatus to decode a given following character or function pattern (or patterns, respectively) as a different, distinct character or function (or characters or functions, respectively). In other words, depending on which CODE or SHIFT pattern precedes, e.g., a character value 65 pattern, Code 128's value "65" pattern is decoded as: 1) an ASCII function "SOH"; 2) a lower case letter character "a"; or, 3) two successive decimal digit characters, "6" and "5" (see e.g., AIM's brochure USD-6, published by the Material Handling Institute, Inc., which describes Code 128 in more detail).

The "AB switch" pattern method of enhancing efficiency may be applied to computer storage and communication coding, as well as bar codes. This aspect may be described in relation to an example involving telecommunication of a message using the 128 code patterns (8 bits per byte with parity) of ASCII, representing 128 characters and ASCII functions. Typically, if a message to be communicated incorporates alphabetic information and numerical information, the numerical portion is transmitted using the ASCII code patterns that represent the ten decimal digits.

Instead, by adopted convention, let a relatively unneeded ASCII code, such as ASCII code value 34, which is a quote mark, ", switch to the binary numerical mode. A quote, if needed in the message may be represented as two single quote marks. (Alternatively, another infrequently used ASCII character, such as the back-slant, \; tilde, ~; etc., which are not characters of the English language anyway, or one of the ASCII function codes, which may be not be in use, may be used instead of the quote). The quote means that the bytes following are concatenated numerical information bytes represented in binary arithmetic (leading zeros may have to be added to one byte of the message so that all bytes of binary numerical information contain 8 bits including the parity bit).

The question now arises, how do you go back to the normal ASCII mode once you have entered the binary numerical mode as a result of reading an encoded quote since any of the 128 ASCII code patterns (including the NUL, i.e., all zeros) may be required to represent the numerical information?

Any of the ASCII code patterns may be used for this purpose. Applicants suggest that the ASCII NUL code pattern be used to go back to the normal ASCII mode, its occurrence perhaps being less likely than other codes (or perhaps the "DEL", 1111111). The point being that, no matter what code is used for this purpose, it should not represent numerical information (after the occurrence of the quote). In the event the "NUL" were required in the numerical mode, the "coding" process may, if possible, switch back to normal ASCII with the NUL, or the "coding" process would not switch into the binary numerical mode in the first place. While in the ASCII mode the NUL may be used to mean what it normally means. (Regarding BCB Format A, full ASCII, and BCB Format B, previously described, the NUL may be used similarly to switch from Format B to Format A).

Such numerical information, if greater than 9999, may be bar coded, communicated, stored, etc. with fewer bytes by using this aspect of applicants' invention. Additional adopted convention could further extend the usefulness of this aspect. For example, use of two consecutive quotes could mean that the numerical information following is a numerical listing wherein each item listed is comprised of three bytes of data, three quotes could mean four bytes of data (which would, e.g., encompass 7 digit phone numbers), etc.

The principle in this aspect being that numerical information is most efficiently represented in coded numerical notation, like binary, ternary, quartal, octal, decimal, etc., as opposed to being represented in a code like Code 39's character set, which encompasses characters other than digits, or a code like ASCII, which encompasses characters and functions other than digits.

As mentioned, if the "AB switch" pattern is used more than once in a BCB symbol a short-read is possible. For example, if the AB switch pattern were used twice, it is possible that one AB switch pattern be interpreted as the start pattern and the other be interpreted as the stop pattern if the reading wand or scan were to enter and leave the symbol at these two patterns respectively. An erroneous reading could be generated if other BCB convention were also coincidentally satisfied. One way to avoid this potential problem when it is desired to switch from one mode to the other mode more than once is to let, e.g., ++ in alphanumeric mode mean to switch to only numerical information. This numerical information is represented in base 43, as described below. (Therefore the character combination ++ cannot be allowed as part of a message in an application using this feature; if the characters ++ are needed in a message they could appear with a word space between, i.e., ++.)

This would allow, e.g., from right to left, a symbol to contain an alphanumeric portion, a numerical portion, another alphanumeric portion, and another numerical portion, while using the AB switch pattern only once. An arbitrarily selected example will be used below of the message:

21MAY1989AD

Word spaces could be used, e.g., 21 MAY 1989 AD, but word spaces are not used in this example for simplicity of explanation. Also for simplicity of explanation, this example is kept short and therefore it is not more efficiently represented as described than normally using decimal digits of Code 39's character set. However, if larger numerical portions of messages were required, this method would be more efficient, i.e., less BCB digits would be required.

For example, from right to left, a symbol could include a BCB AB digit 1 indicating the alphanumeric mode to start decoding, the (first) alphanumeric portion containing a ++ followed by an included numerical sub-portion (this sub-portion being a representation of a base 43 number) followed by an AB switch pattern which would switch back to a second alphanumeric portion (because a ++ had previously been decoded indicating a numerical sub-portion), this second alphanumeric portion containing another alphanumeric portion with another ++ followed by another included numerical sub-portion (this sub-portion being another representation of a base 43 number).

21++MAY1989++AD (21++MAY 1989++AD if word spaces were used) would be encoded with BCB ending and AB switch patterns as follows, from left to right:

1) the end pattern
2) 21 (e.g., in base 43 numerical notation) and ++MAY
3) the AB switch pattern
4) 1989 (e.g., in base 43 numerical notation) and ++AD
5) the BCB AB digit 1
6) the BCB parity digit as appropriate, and
7) the start pattern.

Specifically, 21++MAY would be encoded to the left of the AB switch pattern as follows (using Code 39's numerical values as above and, e.g., digits of base 43):

21 (21st digit in base 43)=21, +=41, +=41, M=22, A=10, Y=34, therefore $$(21\cdot 43^5)+(41\cdot 43^4)+(41\cdot 43^3)+(22\cdot 43^2)+(10\cdot 43^1)+(34\cdot 43^0)=$$
$$(21\cdot 147{,}008{,}443)+(41\cdot 3{,}418{,}801)+(41\cdot 79{,}507)+$$
$$(22\cdot 1{,}849)+(10\cdot 43)+(34\cdot 1)=3{,}087{,}177{,}303+$$
$$140{,}170{,}841+3{,}259{,}787+40{,}678+430+34=3{,}230{,}649{,}073$$

Thus, 3,230,649,073 would be coded in binary arithmetic with BCB digits between the left end pattern and the AB switch pattern. Decoding the message 21MAY from a BCB symbol works as follows (described in decimal for convenience):

Divide 3,230,649,073 by 43. The remainder of the result is the numerical value of the last character of the message: 34=Y. Divide the whole integer portion of the result (75, 131,373) by 43. The remainder of the result is the numerical value of the next to last character of the message: 10=A. Divide the whole integer portion of the result (1,747,241) by 43. The remainder of the result is the numerical value of the next character of the message: 22=M. Divide the whole integer portion of the result (40,633) by 43. The remainder of the result is the numerical value of the next character of the message: 41=+. Divide the whole integer portion of the result (944) by 43. The remainder of the result is the numerical value of the next character of the message: 41=+. Because two successive plus signs have now been decoded, the whole integer portion of the last result, 21, is the value of the numerical sub-portion of the message. Therefore the portion of the bar code symbol "21MAY" has been decoded.

Specifically, 1989++AD would be encoded to the right of the AB switch pattern as follows (using Code 39's numerical values as above and digits of base 43):

1(1st digit in base 43)=1, 3 (3rd digit in base 43)=3, 11 (11th digit in base 43)=11, +=41, +=41, A=10, D=13, therefore $$(1\cdot 43^6)+(3\cdot 43^5)+(11\cdot 43^4)+(41\cdot 43^3)+(41\cdot 43^2)+(10\cdot 43^1)+(13\cdot 43^0)=(1\cdot 6{,}321{,}363{,}049)+(3\cdot 147{,}008{,}443)+(11\cdot 3{,}418{,}801)+(41\cdot 79{,}507)+(41\cdot 1{,}849)+(10\cdot 43)+(13\cdot 1)=6{,}321{,}363{,}049+441{,}025{,}329+37{,}606{,}811+3{,}259{,}787+75{,}809+430+13=6{,}803{,}331{,}228$$

Thus, 6,803,331,228 would be coded in binary arithmetic with BCB digits between the AB switch pattern and the BCB AB digit (which would be set at BCB 1). Decoding the message 1989AD from a BCB symbol works as follows (described in decimal for convenience):

Divide 6,803,331,228 by 43. The remainder of the result is the numerical value of the last character of the message: 13=D. Divide the whole integer portion of the result (158, 217,005) by 43. The remainder of the result is the numerical value of the next character of the message: 10=A. Divide the whole integer portion of the result (3,679,465) by 43. The remainder of the result is the numerical value of the next character of the message: 41=+. Divide the whole integer portion of the result (85,568) by 43. The remainder of the result is the numerical value of the next character of the message: 41=+. Because two successive plus signs have now been decoded, the whole integer portion of the last result, 1989, is the value of the numerical sub-portion of the message. Therefore the portion of the bar code symbol "1989AD" has been decoded.

In decoding apparatus, 21 and 1989 may be represented in binary, and may be passed on in binary to other computer-like apparatus, or may be converted to decimal for viewing by a person.

Thus, the full message 21MAY1989AD has been decoded.

For additional explanation, conversion of base 43 digits to decimal is shown below for three base 43 digits (shown with a space between) 11 3 1, which are the 11th, 3rd and 1st digits in base 43:

$$(1\cdot 43^2)+(3\cdot 43^1)+(11\cdot 43^0)=(1\cdot 1849)+(3\cdot 43)+(11\cdot 1)=1989$$

Other convention could be adopted, e.g., the numerical sub-portion could follow the alphanumeric portion.

By way of example, applicants disclose a convenient method of whopper encoding, as shown below coding the 1989++AD portion of the above example into 6,803,331,228 (notice that numerical portions, such as 1989 in this example, may be handled in any base convenient):

| | | |
|---|---|---|
| 1989 | = | 1989 |
| × 43 | | |
| 85,527 | | |
| + 41 | = | + |
| 85,568 | = | 1989+ |
| × 43 | | |
| 3,679,424 | | |
| + 41 | = | + |
| 3,679,465 | = | 1989++ |
| × 43 | | |
| 158,216,995 | | |
| +10 | = | A |
| 158,217,005 | = | 1989++A |
| × 43 | | |
| 6,803,331,215 | | |
| + 13 | = | D |
| 6,803,331,228 | = | 1989++AD |

Additional Error Detecting and Correcting

If a particular combination of reading and printing in a harsh environment allows the possibility of a BCB digit substitution error (a switch error, as previously described), a simple solution may be used, e.g., with BCB A & B structure as described with appropriate provision for this solution. The error correcting BCB parity digit feature may be turned off on the reading device and the BCB parity digit used instead for the error detecting function of detecting one switch error (or any odd number of switches). In the event exactly one switch and one mark or erasure error were to occur, this would prevent the BCB parity digit from correcting incorrectly and thus creating two switches that are not detected.

Another approach (which may be similar in some aspects to a Hamming code, although developed independently thereof) called "Carryless Addition," developed by the applicants (with methods and processes described in their U.S. Pat. No. 4,814,589 and discussed below) may be used, e.g., with the BCB A & B symbols just described (instead of turning the error correcting feature off) in a harsh environment that may allow the possibility of a single switch error, if error correcting is still desired despite this potential problem. For example, an EDAC cluster may be placed between the BCB AB digit and the BCB parity digit (or the EDAC digits may be "blended," as described below). A BCB parity digit may also be used to, e.g., make the total number of BCB 0 digits even (exclusive of the start pattern, stop pattern and AB switch pattern, if used), thus providing additional protection, as also described below.

The number of BCB digits required in the EDAC cluster varies in accord with the total number of BCB digits it protects. The EDAC cluster protects all BCB information, AB and EDAC digits. If the total number of protected BCB digits is 4–7, 3 are EDAC digits and 1–4 (respectively) are comprised of the BCB information and AB digits; if the total number of protected BCB digits is 8–15, 4 are EDAC digits and 4–11 (respectively) are comprised of the BCB information and AB digits; if the total number of protected BCB digits is 16–31, 5 are EDAC digits and 11–26 (respectively) are comprised of the BCB information and AB digits; if the total number of protected BCB digits is 32–63, 6 are EDAC digits and 26–57 (respectively) are comprised of the BCB information and AB digits; if the total number of protected BCB digits is 64–127, 7 are EDAC digits and 57–120 (respectively) are comprised of the BCB information and AB digits; if the total number of protected BCB digits is 128–255, 8 are EDAC digits and 120–247 (respectively) are comprised of the BCB information and AB digits; etc. The following EDAC TABLE 5 presents this information in chart form.

TABLE 5

| | EDAC | |
|---|---|---|
| Total places | Information places | EDAC places |
| 1 | 0 | 1 |
| 2 | 0 | 2 |
| 3 | 1 | 2 |
| 4 | 1 | 3 |
| 5 | 2 | 3 |
| 6 | 3 | 3 |
| 7 | 4 | 3 |
| 8 | 4 | 4 |
| 9 | 5 | 4 |
| 10 | 6 | 4 |
| 11 | 7 | 4 |
| 12 | 8 | 4 |
| 13 | 9 | 4 |
| 14 | 10 | 4 |
| 15 | 11 | 4 |
| 16 | 11 | 5 |
| 17 | 12 | 5 |
| 18 | 13 | 5 |
| 19 | 14 | 5 |
| 20 | 15 | 5 |
| 21 | 16 | 5 |
| 22 | 17 | 5 |
| . . . | . . . | 5 |
| 31 | 26 | 5 |
| 32 | 26 | 6 |
| . . . | . . . | 6 |
| 63 | 57 | 6 |
| 64 | 57 | 7 |
| . . . | . . . | 7 |
| 127 | 120 | 7 |
| 128 | 120 | 8 |
| . . . | . . . | 8 |
| 255 | 247 | 8 |
| 256 | 247 | 9 |
| . . . | . . . | 9 |
| 511 | 502 | 9 |
| etc.,etc. | | |

Thus, from the total number of BCB digits between the BCB parity digit and the left end pattern exclusive, it may readily be calculated how many of these (rightmost, between the BCB AB digit and the BCB parity digit) BCB digits comprise the EDAC cluster. Since the number of bits in one bar code to the next may vary, it is important to be able to determine how many bits are EDAC and exactly which are the EDAC bits. For example, if this total number of protected BCB digits is between 8–15 inclusive, the rightmost 4 comprise the EDAC cluster; if between 16–31 inclusive, the rightmost 5 comprise the EDAC cluster; if between 32–63 inclusive, the rightmost 6 comprise the EDAC cluster; if between 64–127 inclusive, the rightmost 7 comprise the EDAC cluster; etc.

The use of one added leading zero when required insures that the total number of BCB digits, exclusive of the start pattern, end pattern and AB switch pattern (if used), is always even. If BCB A and B modes without an EDAC cluster and with an EDAC cluster are to be mixed in one application, they may be made distinguishable with a leading zero as required as follows: bar code symbols without an EDAC cluster must always contain an even total number of BCB digits and symbols with an EDAC cluster must always contain an odd total number of BCB digits.

The principle used with this EDAC cluster is based on the following: considering the BCB information, AB and EDAC digits, to be one binary word, (i.e., not including a BCB parity digit or anything from the ending patterns and the AB switch pattern, if used) all correct binary words will be different from each other in at least three binary place positions. Procedure, methodology, properties and use of applicants' EDAC technique with a bar code, by way of example, are described below.

Regarding switch errors only, independent of the BCB parity digit (described below), the EDAC cluster described has the properties of being able to correct any one switch error or detect any two switch errors that may occur among the protected digits and the EDAC cluster itself, i.e., among the BCB information, AB and EDAC digits, in all cases. In a simple embodiment of BCB, parity may be used to correct a possible mark or erasure error and the EDAC cluster used to detect if two switch errors are subsequently present.

However, in a given situation, applicants' EDAC cluster as first described in this example cannot be used universally to correct one switch error and detect two switch errors, because two switch errors of a given valid code (a correct code) may appear to be a different failure, such as a failure of another valid code requiring a one switch correction, i.e., two switch errors may appear to be a situation where a one switch correction is required, but if the one switch correction is made the resulting valid code may be some other otherwise correct valid code, but not the intended valid code. In other words, regarding a given failure situation, without more, it may not be distinguishable as to whether it is a two switch error of the intended (correct) valid code or a one switch error of some other (unintended, but otherwise correct) valid code. However, applicants' EDAC cluster as described will reliably detect that failure has occurred in the event any one or any two switches occur in any valid (correct and intended) code.

Similarly, three (or more) switch errors may not appear to be in error at all. For example, if the total number of places used, n, is a power of 2 less 1, such as 7, 15, 31 or 63 (see EDAC TABLE 5), possible three switch errors may appear to be a different (correct) valid code, or the three errors may appear to be an (incorrect) "follower" of a different valid code. For other n, possible three switch errors may also appear to be a spare code (follower and spare are described below).

These findings have been empirically determined with applicants' method of analyzing coding questions, as described in association with FIGS. 1, 2 and 3 of the '589 Patent. Indeed, this method of analyzing coding has been the basis of these and other discoveries of applicants, such as their coding without a starting point, etc.

The BCB parity digit extends the EDAC ability, e.g., parity may be used to correct a single stripe error as described above, allowing the EDAC cluster to be used to detect if two switches are subsequently present; if a stripe error is not also corrected, any three switch errors are detectable (any odd number of switch errors are detectable because of parity, however, if three switch errors occur, an incorrect correction, if performed, may occur causing a misread); if a stripe error is not also corrected, parity may be used to distinguish between a one switch error and a two switch error, allowing the possible correction of a one switch error and detection of two switch errors; etc.

Minimally, if one stripe error occurs in the ending patterns or the AB switch pattern (if used), including their included BCB 1 digits and BCB 0 digits, respectively, it can be corrected independently of other possible errors because their patterns are completely predictable. Like a word of the English language, if misspelled, the word may still be recognizable, or the word may be understood from the context (the context here being BCB rhythm, other BCB convention, etc).

However, the AB switch pattern previously described may not be useful in a harsh environment in association with the EDAC cluster because if one switch error occurs in its middle, the AB switch pattern would be changed to four consecutive BCB 0 digits. In contrast to a short-read as described above, this may be called a long-read. However, another AB switch pattern which may better avoid this potential problem may be selected for use instead. For example, the middle four stripes of the AB switch pattern (white white black black) may be repeated (white white black black white white black black).

Thus, the BCB A & B symbols described (and other coded information for use in computer-like storage means, for communication, etc.) may reliably incorporate, minimally, one "stripe" error correcting, any number of such stripe error detecting, one and two switch error detecting.

Using the above principles, more than one mark and/or erasure errors may be corrected in a BCB bar code, or other media that may experience an error with similar consequence to a 1/1 or a 0/0 error, as described above. Such errors may be viewed as unknown bits, denoted with a question mark, "?". As mentioned, a ? error is different than a switch error because it appears to be in question (as to whether it is a binary 1 or 0) and is thus located, whereas the location of a switch error is not apparent.

This aspect may be applied to media other than bar codes. For example, suppose a message coded in binary is received from an orbiting satellite and a binary 1 bit is represented by a property such as a voltage level between greater than 0.5 and less than 1 relative unit of voltage, and a binary 0 is represented between greater than 0 and less than 0.5 relative unit. In other words, the threshold between 0 and 1 is about 0.5 unit. If a message is detected to have one error (such as parity might detect), and all but one binary bit are not near the 0.5 threshold measurement (i.e., all but one are comfortably "saturated" appropriately), it could reasonably be assumed the this 0.5 bit is the ? error and parity would be able to correct it as described above.

As mentioned, with applicants' Carryless Addition EDAC, all correct binary words (valid codes) are different from each other in at least three binary places. Therefore, a binary word with two such ? errors can be corrected (assuming a switch does not also occur) because there would be only one way to correct the two ? errors to create a correct binary word. Thus, in a bar code application, for example, where switches did not occur, more than one mark and/or erasure error (a ? error) could be reliably corrected.

The teachings of applicants' '589 Patent in FIGS. 1, 2 and 3 and related description thereof ("sub-pile analysis") were integral in creating their Carryless Addition EDAC technique. Applicants' have used their sub-pile analysis method to "reverse engineer" various coding questions, as exemplified in the '589 Patent e.g., by the coding without a starting reference. Sub-pile reverse engineering may be performed without the use of high level mathematics because all possible codes are accounted for and may readily be seen. Sub-pile reverse engineering will again be demonstrated (in relation to Carryless Addition EDAC) below.

The Carryless Addition EDAC technique may be used with any binary coding such as in computers, communication, and bar codes, such as Straight Binary, 2x Max and BCB. With this EDAC cluster and parity for example, the 2x Max bar code may be made sufficiently reliable for many general purpose bar code applications, having, on average, an advantage in compactness over I 2 of 5 and Code 39 (increasingly compact as the length of messages increases), as described above. 2x Max used thus could detect one, two and any odd number of misinterpreted bits, and single bit errors could be corrected.

A difference in applicant's use of their Carryless Addition EDAC in a bar code and, e.g., in a computer storage device, is that a bar code may vary in length from one symbol to the next, whereas in a computer system, the (binary) word length is, for the most part, fixed. Because of bar codes, applicants recognized the need for (and thus created) a general purpose method of operating their EDAC, i.e., a single, simple method that could readily be applied to binary words of various length and could operate in relatively small devices, such as hand held bar code readers and decoders.

The Carryless Addition EDAC described satisfies either of the following two requirements: it can detect any two switch errors or it can correct any one switch error. The same teachings and techniques may be used to create EDAC to satisfy other coding requirements, such as correct any two switch errors, etc. The EDAC cluster described is presented by way of example and was created for a specific anticipated requirement in BCB as applications for bar codes become more demanding. If one switch occurs and one mark or erasure error also occurs (a ? error), BCB parity will correct incorrectly and create two switches. In BCB, this EDAC cluster may be used to detect if two switches are present after parity error correction of a mark or erasure is performed, as mentioned.

Carryless Addition EDAC was derived from another technique developed by applicants which they called the One Position Sum EDAC. When subjected to sub-pile analysis, without more, One Position Sum was shown to be ineffective under some circumstances. One Position Sum initially involved numbering each binary digit position of a message consecutively starting with 1 and adding the position numbers which contain a binary 1 and modulo reduction of this sum by, e.g., the power of 2 just greater than the total number of binary information digits and representing the residue in an EDAC cluster, the capacity of which is, minimally, this power of 2. One Position Sum, as such, attempted to do the job with too little.

With normal representation of all (consecutive) numbers (normal counting) in binary, each counted number is different from every other number in at least one binary place.

With consecutive binary numbers that follow a given parity convention, each number is different from every other number in at least two binary places.

In order to detect any two switch errors, any valid code (a correct binary code) must contain at least three places (or bits) different from each other valid code: if each valid code is different in at least three places from every other valid code, any two switch errors that may occur can be detected without the possibility of confusion with another valid code.

In order to correct any one switch error, any valid code must also contain at least three places different from each other valid code: if each valid code is different in at least three places from every other valid code, any one switch error that may occur can be corrected without the possibility of creating another valid code.

Thus, any valid code must contain at least three places different from each other valid code in order to detect two switch errors or correct one switch error. This is most easily seen with sub-pile analysis.

For example, if n=15 binary places are to be used for the information and EDAC, the total number of possible codes is $2^{15}$ or 32,768. Thus, FIG. 1 of the '589 Patent would have 32,768 coded "chips."

Each valid (correct) code is the "leader" of a sub-pile which also contains every derivative representation of this valid code in which one bit is switched. Since there are 15 places in this example, there are 15 such one-off "followers." Each sub-pile therefore contains 16 coded chips: 1 valid code, the leader, and 15 one-off followers. 32,768 divided by 16 is 2048. Because 15 is one less than a power of 2, 2048 valid codes exist. Thus, FIG. 2 of the '589 Patent would have 2048 sub-piles, each comprised of 16 codes.

In a 15 place system there are 2048 valid codes (each the leader of its respective sub-pile with 15 one-off followers). Thus, FIG. 3 of the '589 Patent would have 2048 valid coded chips, each of which is different from every other in at least three binary places.

In a 15 place Carryless Addition EDAC system, 2048 valid codes is also the theoretical maximum number of valid codes possible. The theoretical maximum is determined as follows: $2^n$ divided by n plus 1 (or: $2^n/n+1$). Whenever the total number of places, n, is one less than a power of 2, the number of valid codes realized is the theoretical maximum and when n is not, something less than the theoretical maximum is realized because there are spares (described below).

Tables 6 through 10 below show a complete sub-pile analysis breakdown for n=3, 4, 5, 6 and 7 places, respectively. Above the horizontal rule in each Table, each sub-pile is shown complete, with the valid code "leader" on top and the respective one-off "followers" below. Between each leader and the followers, a small extra space vertically is shown. Each sub-pile also contains a small extra space horizontally which separates the information portion from each EDAC cluster (explained below). In Tables 7, 8 and 9, showing n=4, 5 and 6 places respectively, notice that there are "spare" codes, which are shown in a separate column below the horizontal rule. Spare codes occur when n is not equal to one less than a power of two. A spare code cannot be used as a valid code because (some of) their would-be one-off followers are used elsewhere. None of the spare codes are one-off followers of the valid codes. For convenience, Tables 6 through 9 also show each valid code in another column below the horizontal rule. Each code in these Tables is shown in binary notation with its decimal notation equivalent.

Table 11, on 8 pages, shows EDAC "cards" made by applicants to work with sub-piles in a 6 place system. The cards may be separated by cutting along the horizontal lines, thus creating 64 distinct cards. The 64 cards show, for a 6 place system, each possible leader, which is the leftmost number on each card, from 0 to 63. Each leader is followed to the right by its 6 possible respective one-off followers. Leaders and followers are shown in decimal notation and equivalent binary notation. The cards may be manually sorted into respective sub-piles, as applicants did in developing their Carryless Addition EDAC. For example, referring to Table 9, an EDAC system with 6 total places, may be created by manually sorting the cards shown in Table 11. A different set of "cards" was used in the '589 Patent to create the sub-piles (of "casino chips") in its FIG. 2.

Tables 12 and 13 show steps applicants took in developing their Carryless Addition EDAC involving "transformers," "T." The operation of transforming is the same as the operation of carryless addition, described below. Applicants use the terms "transformer," "transformand," "transform," analogously with the terms "multiplier," "multiplicand," "product." The names "transform(er, -and)" are relative, and it would suffice to speak of carryless addends (candidates for carryless addition).

Table 12 illustrates how applicants came to call certain carryless addends transformers. The EDAC patterns in this table were arrived at partly by HP41CX-assisted trial and error in association with, e.g., methods of sub-pile reverse engineering and the early realization that their method was related to a parabolic curve. Then applicants realized that when such an array is laid out in $2^m$ rows of $2^{n-m}$ elements, in numerical order of the $2^n$ information numbers to be protected by the EDAC, the "transformation" from one column to any other column is the same in every row (and incidentally, vice versa). That is, for example, to pass from any entry in the table to the one immediately to right, just the same places must be changed as in the first row; the same "carryless addend" or "transformer" is required. The transformers from column to column are shown as superscripts over the first row, and those from the end of each row to the beginning of the next down the right. The odd multiples of any given power of two share the same transformer (from the entry just to the left, or end of previous row if none), while the even multiples of that power of two are odd multiples of a higher power of two and have new transformers accordingly.

The transformers in Tables 12 and 13 are different, demonstrating the point that various transformers may be adopted, i.e., the EDAC digits for a given system need be consistent with each other but different sets of EDAC digits may be created for a given set of information digits that would perform a similar function. Indeed, different sets of information digits may also be created, and each set of information digits may use different sets of transformers.

Next applicants learned that a simple (simplest) assignment of EDAC values to the powers of two (as specific information codes) is the one reflected in Table 13; the EDAC for info $2^0$=1 is 3, for $2^1$=2 is five, for $2^2$=4 is 6 and so on—the numbers 1, 2, 3, 4, 5, 6, 7, 8, 9 etc. skipping the powers of two (the skipped powers of two are shown in a smaller font). Transformers are indicated on Table 13 but were not needed to construct it; they would be useful for expanding Table 13 into a new, more rational Table 12 (or much bigger table, if one needed to be written out). But the array itself is uniquely determined by this choice of EDACS for the powers of two.

Finally, applicants discovered the possibility of making the skipped powers of two to be the EDAC position numbers, with the elegantly tidy results described below in association with the "blended" form.

The transformers of Table 13 are used in the description below with the set of information digits starting with 0 and consecutively counting up.

Methods of operating the Carryless Addition EDAC follow these Tables.

TABLE 6

| EDAC System with 3 Total Places | |
|---|---|
| 0 00 = 0 | 1 11 = 7 |
| 0 01 = 1 | 1 10 = 6 |
| 0 10 = 2 | 1 01 = 5 |
| 1 00 = 4 | 0 11 = 3 |

| Valid Codes |
|---|
| 0 00 = 0 |
| 1 11 = 7 |

TABLE 7

| EDAC System with 4 Total Places | |
|---|---|
| 0 000 = 0 | 1 011 = 11 |
| 0 001 = 1 | 1 010 = 10 |
| 0 010 = 2 | 1 001 = 0 |
| 0 100 = 4 | 1 111 = 15 |
| 1 000 = 8 | 0 011 = 3 |

| "Spares" | Valid Codes |
|---|---|
| 0 101 = 5 | 0 000 = 0 |
| 0 110 = 6 | 1 011 = 11 |
| 0 111 = 7 | |
| 1 100 = 12 | |
| 1 101 = 13 | |
| 1 110 = 14 | |

Notice that, in the 4 place system of Table 7, two bit errors causing any spare may be corrected because such "2 bit spares" differ by 2 bits from their respective valid code, i.e., they are "2 bits off" their respective valid code, and 3 bits off (or more in larger systems) other valid codes. As may be seen, spares 0 101, 0 110 and 1 100 are two off the valid code 0 000 and three off the valid code 1 011, and spares 0 111, 1 101 and 1 110 are two off the valid code 1 011 and three off the valid code 0 000. However, in the 5 place system of Table 8 for example, a spare may be two bits off more than one valid code. For example, spare 00 110 is two bits off valid code 00 000 and two bits off valid code 11 110.

The above system has the ability to correct one bit errors and some two bit errors (namely those that create spares). If such a system were also used to detect all two bit errors and correct all one bit errors, a mistake could result. For example, if two errors in the valid code 0 000 created 1 010, it would be one-bit corrected incorrectly to 1 011. If a parity bit were also used (not shown), parity would detect that such a correction was incorrect, which would indicate that two bits were in error in this example, not one, thus preventing this mistake: the only two bit correction possible, that would satisfy parity, is to correct to 0 000, which is the correct code. However, in larger systems, this is not necessarily so, as may be seen in Table 8 for a 5 total place system. For example, if a parity bit (not shown) were also used in the 5 place system, and two errors occurred to the valid code 00 000 creating 01 010, parity would prevent the incorrect correction of one bit to 01 011, but it would not be distinguishable as to whether 01 010 were two bits off 00 000 or two bits off 11 110.

TABLE 8

| EDAC System with 5 Total Places | | | |
|---|---|---|---|
| 00 000 = 0 | 01 011 = 11 | 10 101 = 21 | 11 110 = 30 |
| 00 001 = 1 | 01 010 = 10 | 10 100 = 20 | 11 111 = 31 |
| 00 010 = 2 | 01 001 = 9 | 10 111 = 23 | 11 100 = 28 |
| 00 100 = 4 | 01 111 = 15 | 10 001 = 17 | 11 010 = 26 |
| 01 000 = 8 | 00 011 = 3 | 11 101 = 29 | 10 110 = 22 |
| 10 000 = 16 | 11 011 = 27 | 00 101 = 5 | 01 110 = 14 |

| "Spares" | Valid Codes |
|---|---|
| 00 110 = 6 | 00 000 = 0 |
| 00 111 = 7 | 01 011 = 11 |
| 01 100 = 12 | 10 101 = 21 |
| 01 101 = 13 | 11 110 = 30 |
| 10 010 = 18 | |
| 10 011 = 19 | |
| 11 000 = 24 | |
| 11 001 = 25 | |

TABLE 9

| EDAC System with 6 Total Places | | | |
|---|---|---|---|
| 000 000 = 0 | 001 011 = 11 | 010 101 = 21 | 011 110 = 30 |
| 000 001 = 1 | 001 010 = 10 | 010 100 = 20 | 011 111 = 31 |
| 000 010 = 2 | 001 001 = 9 | 010 111 = 23 | 011 100 = 28 |
| 000 100 = 4 | 001 111 = 15 | 010 001 = 17 | 011 010 = 26 |
| 001 000 = 8 | 000 011 = 3 | 011 101 = 29 | 010 110 = 22 |
| 010 000 = 16 | 011 011 = 27 | 000 101 = 5 | 001 110 = 14 |
| 100 000 = 32 | 101 011 = 43 | 110 101 = 53 | 111 110 = 62 |
| 100 110 = 32 | 101 101 = 45 | 110 011 = 51 | 111 000 = 56 |
| 100 111 = 39 | 101 100 = 44 | 110 010 = 50 | 111 001 = 57 |
| 100 100 = 36 | 101 111 = 47 | 110 001 = 49 | 111 010 = 58 |
| 100 010 = 34 | 101 001 = 41 | 110 111 = 55 | 111 100 = 60 |
| 101 110 = 46 | 100 101 = 37 | 111 011 = 59 | 110 000 = 48 |
| 110 110 = 54 | 111 101 = 61 | 100 011 = 35 | 101 000 = 40 |
| 000 110 = 6 | 001 101 = 13 | 010 011 = 19 | 011 000 = 24 |

| "Spares" | Valid Codes |
|---|---|
| 000 111 = 7 | 000 000 = 0 |
| 001 100 = 12 | 001 011 = 11 |
| 010 010 = 18 | 010 101 = 21 |
| 011 001 = 25 | 011 110 = 30 |
| 100 001 = 33 | 100 110 = 38 |
| 101 010 = 42 | 101 101 = 45 |
| 110 100 = 52 | 110 011 = 51 |
| 111 111 = 63 | 111 000 = 56 |

TABLE 10

| EDAC System with 7 Total Places | | | |
|---|---|---|---|
| 0000 000 = 0 | 0001 011 = 11 | 0010 101 = 21 | 0011 110 = 30 |
| 0000 001 = 1 | 0001 010 = 10 | 0010 100 = 20 | 0011 111 = 31 |
| 0000 010 = 2 | 0001 001 = 9 | 0010 111 = 23 | 0011 100 = 28 |
| 0000 100 = 4 | 0001 111 = 15 | 0010 001 = 17 | 0011 010 = 26 |
| 0001 000 = 8 | 0000 011 = 3 | 0011 101 = 29 | 0010 110 = 22 |
| 0010 000 = 16 | 0011 011 = 27 | 0000 101 = 5 | 0001 110 = 14 |
| 0100 000 = 32 | 0101 011 = 43 | 0110 101 = 53 | 0111 110 = 62 |
| 1000 000 = 64 | 1001 011 = 75 | 1010 101 = 85 | 1011 110 = 94 |
| 0100 110 = 38 | 0101 101 = 45 | 0110 011 = 51 | 0111 000 = 56 |
| 0100 111 = 39 | 0101 100 = 44 | 0110 010 = 50 | 0111 001 = 57 |
| 0100 100 = 36 | 0101 111 = 47 | 0110 001 = 49 | 0111 010 = 58 |
| 0100 010 = 34 | 0101 001 = 41 | 0110 111 = 55 | 0111 100 = 60 |
| 0101 110 = 46 | 0100 101 = 37 | 0111 011 = 59 | 0110 000 = 48 |
| 0110 110 = 54 | 0111 101 = 61 | 0100 011 = 35 | 0101 000 = 40 |
| 0000 110 = 6 | 0001 101 = 13 | 0010 011 = 19 | 0011 000 = 24 |
| 1100 110 = 102 | 1101 101 = 109 | 1110 011 = 115 | 1111 000 = 120 |
| 1000 111 = 71 | 1001 100 = 76 | 1010 010 = 82 | 1011 001 = 89 |

TABLE 10-continued

| EDAC System with 7 Total Places | | | |
|---|---|---|---|
| 1000 110 = 70 | 1001 101 = 77 | 1010 011 = 83 | 1011 000 = 88 |
| 1000 101 = 69 | 1001 110 = 78 | 1010 000 = 80 | 1011 011 = 91 |
| 1000 011 = 67 | 1001 000 = 72 | 1010 110 = 86 | 1011 101 = 93 |
| 1001 111 = 79 | 1000 100 = 68 | 1011 010 = 90 | 1010 001 = 81 |
| 1010 111 = 87 | 1011 100 = 92 | 1000 010 = 66 | 1001 001 = 73 |
| 1100 111 = 103 | 1101 100 = 108 | 1110 010 = 114 | 1111 001 = 121 |
| 0000 111 = 7 | 0001 100 = 12 | 0010 010 = 18 | 0011 001 = 25 |
| 1100 001 = 97 | 1101 010 = 106 | 1110 100 = 116 | 1111 111 = 127 |
| 1100 000 = 96 | 1101 011 = 107 | 1110101 = 117 | 1111 110 = 126 |
| 1100 011 = 99 | 1101 000 = 104 | 1110 110 = 118 | 1111 101 = 125 |
| 1100 101 = 101 | 1101 110 = 110 | 1110 000 = 112 | 1111 011 = 123 |
| 1101 001 = 105 | 1100 010 = 98 | 1111 100 = 124 | 1110 111 = 119 |
| 1110 001 = 113 | 1111 010 = 122 | 1100 100 = 100 | 110 1111 = 111 |
| 1000 001 = 65 | 1001 010 = 74 | 1010 100 = 84 | 1011 111 = 95 |
| 0100 001 = 33 | 0101 010 = 42 | 0110 100 = 52 | 0111 111 = 63 |

TABLE 11

| EDAC Cards | | | | | | |
|---|---|---|---|---|---|---|
| 0 | 1 | 2 | 4 | 8 | 16 | 32 |
| 000000 | 000001 | 000010 | 000100 | 001000 | 010000 | 100000 |
| 1 | 0 | 3 | 5 | 9 | 17 | 33 |
| 000001 | 000000 | 000011 | 000101 | 001001 | 010001 | 100001 |
| 2 | 3 | 0 | 6 | 10 | 18 | 34 |
| 000010 | 000011 | 000000 | 000110 | 001010 | 010010 | 100010 |
| 3 | 2 | 1 | 7 | 11 | 19 | 35 |
| 000011 | 000010 | 000001 | 000111 | 001011 | 010011 | 100011 |
| 4 | 5 | 6 | 0 | 12 | 20 | 36 |
| 000100 | 000101 | 000110 | 000000 | 001100 | 010100 | 100100 |
| 5 | 4 | 7 | 1 | 13 | 21 | 37 |
| 000101 | 000100 | 000111 | 000001 | 001101 | 010101 | 100101 |
| 6 | 7 | 4 | 2 | 14 | 22 | 38 |
| 000110 | 000111 | 000100 | 000010 | 001110 | 010110 | 100110 |
| 7 | 6 | 5 | 3 | 15 | 23 | 39 |
| 000111 | 000110 | 000101 | 000011 | 001111 | 010111 | 100111 |
| 8 | 9 | 10 | 12 | 0 | 24 | 40 |
| 001000 | 001001 | 001010 | 001100 | 000000 | 011000 | 101000 |
| 9 | 8 | 11 | 13 | 1 | 25 | 41 |
| 001001 | 001000 | 001011 | 001101 | 000001 | 011001 | 101001 |

TABLE 11-continued

| EDAC Cards | | | | | | |
|---|---|---|---|---|---|---|
| 10 | 11 | 8 | 14 | 2 | 26 | 42 |
| 001010 | 001011 | 001000 | 001110 | 000010 | 011010 | 101010 |
| 11 | 10 | 9 | 15 | 3 | 27 | 43 |
| 001011 | 001010 | 001001 | 001111 | 000011 | 011011 | 101011 |
| 12 | 13 | 14 | 8 | 4 | 28 | 44 |
| 001100 | 001101 | 001110 | 001000 | 000100 | 011100 | 101100 |
| 13 | 12 | 15 | 9 | 5 | 29 | 45 |
| 001101 | 001100 | 001111 | 001001 | 000101 | 011101 | 101101 |
| 14 | 15 | 12 | 10 | 6 | 30 | 46 |
| 001110 | 001111 | 001100 | 001010 | 000110 | 011110 | 101110 |
| 15 | 14 | 13 | 11 | 7 | 31 | 47 |
| 001111 | 001110 | 001101 | 001011 | 000111 | 011111 | 101111 |
| 16 | 17 | 18 | 20 | 24 | 0 | 48 |
| 010000 | 010001 | 010010 | 010100 | 011000 | 000000 | 110000 |
| 17 | 16 | 19 | 21 | 25 | 1 | 49 |
| 010001 | 010000 | 010011 | 010101 | 011001 | 000001 | 110001 |
| 18 | 19 | 16 | 22 | 26 | 2 | 50 |
| 010010 | 010011 | 010000 | 010110 | 011010 | 000010 | 110010 |
| 19 | 18 | 17 | 23 | 27 | 3 | 51 |
| 010011 | 010010 | 010001 | 010111 | 011011 | 000011 | 110011 |
| 20 | 21 | 22 | 16 | 28 | 4 | 52 |
| 010100 | 010101 | 010110 | 010000 | 011100 | 000100 | 110100 |
| 21 | 20 | 23 | 17 | 29 | 5 | 53 |
| 010101 | 010100 | 010111 | 010001 | 011101 | 000101 | 110101 |
| 22 | 23 | 20 | 18 | 30 | 6 | 54 |
| 010110 | 010111 | 010100 | 010010 | 011110 | 000110 | 110110 |
| 23 | 22 | 21 | 19 | 31 | 7 | 55 |
| 010111 | 010110 | 010101 | 010011 | 011111 | 000111 | 110111 |
| 24 | 25 | 26 | 28 | 16 | 8 | 56 |
| 011000 | 011001 | 011010 | 011100 | 010000 | 001000 | 111000 |
| 25 | 24 | 27 | 29 | 17 | 9 | 57 |
| 011001 | 011000 | 011011 | 011101 | 010001 | 001001 | 111001 |

TABLE 11-continued

EDAC Cards

| | | | | | | |
|---|---|---|---|---|---|---|
| 26 | 27 | 24 | 30 | 18 | 10 | 58 |
| 011010 | 011011 | 011000 | 011110 | 010010 | 001010 | 111010 |
| 27 | 26 | 25 | 31 | 19 | 11 | 59 |
| 011011 | 011010 | 011001 | 011111 | 010011 | 001011 | 111011 |
| 28 | 29 | 30 | 24 | 20 | 12 | 60 |
| 011100 | 011101 | 011110 | 011000 | 010100 | 001100 | 111100 |
| 29 | 28 | 31 | 25 | 21 | 13 | 61 |
| 011101 | 011100 | 011111 | 011001 | 010101 | 001101 | 111101 |
| 30 | 31 | 28 | 26 | 22 | 14 | 62 |
| 011110 | 011111 | 011100 | 011010 | 010110 | 001110 | 111110 |
| 31 | 30 | 29 | 27 | 23 | 15 | 63 |
| 011111 | 011110 | 011101 | 011011 | 010111 | 001111 | 111111 |
| 32 | 33 | 34 | 36 | 40 | 48 | 0 |
| 100000 | 100001 | 100010 | 100100 | 101000 | 110000 | 000000 |
| 33 | 32 | 35 | 37 | 41 | 49 | 1 |
| 100001 | 100000 | 100011 | 100101 | 101001 | 110001 | 000001 |
| 34 | 35 | 32 | 38 | 42 | 50 | 2 |
| 100010 | 100011 | 100000 | 100110 | 101010 | 110010 | 000010 |
| 35 | 34 | 33 | 39 | 43 | 51 | 3 |
| 100011 | 100010 | 100001 | 100111 | 101011 | 110011 | 000011 |
| 36 | 37 | 38 | 32 | 44 | 52 | 4 |
| 100100 | 100101 | 100110 | 100000 | 101100 | 110100 | 000100 |
| 37 | 36 | 39 | 33 | 45 | 53 | 5 |
| 100101 | 100100 | 100111 | 100001 | 101101 | 110101 | 000101 |
| 38 | 39 | 36 | 34 | 46 | 54 | 6 |
| 100110 | 100111 | 100100 | 100010 | 101110 | 110110 | 000110 |
| 39 | 38 | 37 | 35 | 47 | 55 | 7 |
| 100111 | 100110 | 100101 | 100011 | 101111 | 110111 | 000111 |
| 40 | 41 | 42 | 44 | 32 | 56 | 8 |
| 101000 | 101001 | 101010 | 101100 | 100000 | 111000 | 001000 |
| 41 | 40 | 43 | 45 | 33 | 57 | 9 |
| 101001 | 101000 | 101011 | 101101 | 100001 | 111001 | 001001 |

TABLE 11-continued

EDAC Cards

| | | | | | | |
|---|---|---|---|---|---|---|
| 42 | 43 | 40 | 46 | 34 | 58 | 10 |
| 101010 | 101011 | 101000 | 101110 | 100010 | 111010 | 001010 |
| 43 | 42 | 41 | 47 | 35 | 59 | 11 |
| 101011 | 101010 | 101001 | 101111 | 100011 | 111011 | 001011 |
| 44 | 45 | 46 | 40 | 36 | 60 | 12 |
| 101100 | 101101 | 101110 | 101000 | 100100 | 111100 | 001100 |
| 45 | 44 | 47 | 41 | 37 | 61 | 13 |
| 101101 | 101100 | 101111 | 101001 | 100101 | 111101 | 001101 |
| 46 | 47 | 44 | 42 | 38 | 62 | 14 |
| 101110 | 101111 | 101100 | 101010 | 100110 | 111110 | 001110 |
| 47 | 46 | 45 | 43 | 39 | 63 | 15 |
| 101111 | 101110 | 101101 | 101011 | 100111 | 111111 | 001111 |
| 48 | 49 | 50 | 52 | 56 | 32 | 16 |
| 110000 | 110001 | 110010 | 110100 | 111000 | 100000 | 010000 |
| 49 | 48 | 51 | 53 | 57 | 33 | 17 |
| 110001 | 110000 | 110011 | 110101 | 111001 | 100001 | 010001 |
| 50 | 51 | 48 | 54 | 58 | 34 | 18 |
| 110010 | 110011 | 110000 | 110110 | 111010 | 100010 | 010010 |
| 51 | 50 | 49 | 55 | 59 | 35 | 19 |
| 110011 | 110010 | 110001 | 110111 | 111011 | 100011 | 010011 |
| 52 | 53 | 54 | 48 | 60 | 36 | 20 |
| 110100 | 110101 | 110110 | 110000 | 111100 | 100100 | 010100 |
| 53 | 52 | 55 | 49 | 61 | 37 | 21 |
| 110101 | 110100 | 110111 | 110001 | 111101 | 100101 | 010101 |
| 54 | 55 | 52 | 50 | 62 | 38 | 22 |
| 110110 | 110111 | 110100 | 110010 | 111110 | 100110 | 010110 |
| 55 | 54 | 53 | 51 | 63 | 39 | 23 |
| 110111 | 110110 | 110101 | 110011 | 111111 | 100111 | 010111 |
| 56 | 57 | 58 | 60 | 48 | 40 | 24 |
| 111000 | 111001 | 111010 | 111100 | 110000 | 101000 | 011000 |
| 57 | 56 | 59 | 61 | 49 | 41 | 25 |
| 111001 | 111000 | 111011 | 111101 | 110001 | 101001 | 011001 |

TABLE 11-continued

| EDAC Cards | | | | | | |
|---|---|---|---|---|---|---|
| 58<br>111010 | 59<br>111011 | 56<br>111000 | 62<br>111110 | 50<br>110010 | 42<br>101010 | 26<br>011010 |
| 59<br>111011 | 58<br>111010 | 57<br>111001 | 63<br>111111 | 51<br>110011 | 43<br>101011 | 27<br>011011 |
| 60<br>111100 | 61<br>111101 | 62<br>111110 | 56<br>111000 | 52<br>110100 | 44<br>101100 | 28<br>011100 |

TABLE 11-continued

| EDAC Cards | | | | | | |
|---|---|---|---|---|---|---|
| 61<br>111101 | 60<br>111100 | 63<br>111111 | 57<br>111001 | 53<br>110101 | 45<br>101101 | 29<br>011101 |
| 62<br>111110 | 63<br>111111 | 60<br>111100 | 58<br>111010 | 54<br>110110 | 46<br>101110 | 30<br>011110 |
| 63<br>111111 | 62<br>111110 | 61<br>111101 | 59<br>111011 | 55<br>110111 | 47<br>101111 | 31<br>011111 |

TABLE 12

A POSSIBLE ARRAY OF EDAC PATTERNS FOR THE FIRST 2048 INFONUMBERS IN A SYSTEM OF ANY NUMBER OF BINARY PLACES (represented in decimal form for convenience). The superscripts across the top are the transformers from column to column (1 step to right). The subscripts down the right-hand side are the transformers from the end of each row to the beginning of the next.

| $0^{3}$ | $3^{6}$ | $5^{3}$ | $6^{0}$ | $6^{3}$ | $5^{6}$ | $3^{3}$ | $0^{7}$ | $7^{3}$ | $4^{6}$ | $2^{3}$ | $1^{0}$ | $1^{3}$ | $2^{6}$ | $4^{3}$ | $7^{8}$ | $15^{3}$ | $12^{6}$ | $10^{3}$ | $9^{0}$ | $9^{3}$ | $10^{6}$ | $12^{3}$ | $15^{7}$ | $8^{3}$ | $11^{6}$ | $13^{3}$ | $14^{0}$ | $14^{3}$ | $13^{6}$ | $11^{3}$ | $8_{6}$ |
|---|---|---|---|---|---|---|---|---|---|---|---|---|---|---|---|---|---|---|---|---|---|---|---|---|---|---|---|---|---|---|---|
| 14 | 13 | 11 | 8 | 8 | 11 | 13 | 14 | 9 | 10 | 12 | 15 | 15 | 12 | 10 | 9 | 1 | 2 | 4 | 7 | 7 | 4 | 2 | 1 | 6 | 5 | 3 | 0 | 0 | 3 | 5 | $6_{13}$ |
| 11 | 8 | 14 | 13 | 13 | 14 | 8 | 11 | 12 | 15 | 9 | 10 | 10 | 9 | 15 | 12 | 4 | 7 | 1 | 2 | 2 | 1 | 7 | 4 | 3 | 0 | 6 | 5 | 5 | 6 | 0 | $3_{6}$ |
| 5 | 6 | 0 | 3 | 3 | 0 | 6 | 5 | 2 | 1 | 7 | 4 | 4 | 7 | 1 | 2 | 10 | 9 | 15 | 12 | 12 | 15 | 9 | 10 | 13 | 14 | 8 | 11 | 11 | 8 | 14 | $13_{0}$ |
| 13 | 14 | 8 | 11 | 11 | 8 | 14 | 13 | 10 | 9 | 15 | 12 | 12 | 15 | 9 | 10 | 2 | 1 | 7 | 4 | 4 | 7 | 1 | 2 | 5 | 6 | 0 | 3 | 3 | 0 | 6 | $5_{6}$ |
| 3 | 0 | 6 | 5 | 5 | 6 | 0 | 3 | 4 | 7 | 1 | 2 | 2 | 1 | 7 | 4 | 12 | 15 | 9 | 10 | 10 | 9 | 15 | 12 | 11 | 8 | 14 | 13 | 13 | 14 | 8 | $11_{13}$ |
| 6 | 5 | 3 | 0 | 0 | 3 | 5 | 6 | 1 | 2 | 4 | 7 | 7 | 4 | 2 | 1 | 9 | 10 | 12 | 15 | 15 | 12 | 10 | 9 | 14 | 13 | 11 | 8 | 8 | 11 | 13 | $14_{6}$ |
| 8 | 11 | 13 | 14 | 14 | 13 | 11 | 8 | 15 | 12 | 10 | 9 | 9 | 10 | 12 | 15 | 7 | 4 | 2 | 1 | 1 | 2 | 4 | 7 | 0 | 3 | 5 | 6 | 6 | 5 | 3 | $0_{9}$ |
| 9 | 10 | 12 | 15 | 15 | 12 | 10 | 9 | 14 | 13 | 11 | 8 | 8 | 11 | 13 | 14 | 6 | 5 | 3 | 0 | 0 | 3 | 5 | 6 | 1 | 2 | 4 | 7 | 7 | 4 | 2 | $1_{6}$ |
| 7 | 4 | 2 | 1 | 1 | 2 | 4 | 7 | 0 | 3 | 5 | 6 | 6 | 5 | 3 | 0 | 8 | 11 | 13 | 14 | 14 | 13 | 11 | 8 | 15 | 12 | 10 | 9 | 9 | 10 | 12 | $15_{13}$ |
| 2 | 1 | 7 | 4 | 4 | 7 | 1 | 2 | 5 | 6 | 0 | 3 | 3 | 0 | 6 | 5 | 13 | 14 | 8 | 11 | 11 | 8 | 14 | 13 | 10 | 9 | 15 | 12 | 12 | 15 | 9 | $10_{6}$ |
| 12 | 15 | 9 | 10 | 10 | 9 | 15 | 12 | 11 | 8 | 14 | 13 | 13 | 14 | 8 | 11 | 3 | 0 | 6 | 5 | 5 | 6 | 0 | 3 | 4 | 7 | 1 | 2 | 2 | 1 | 7 | $4_{0}$ |
| 4 | 7 | 1 | 2 | 2 | 1 | 7 | 4 | 3 | 0 | 6 | 5 | 5 | 6 | 0 | 3 | 11 | 8 | 14 | 13 | 13 | 14 | 8 | 11 | 12 | 15 | 9 | 10 | 10 | 9 | 15 | $12_{6}$ |
| 10 | 9 | 15 | 12 | 12 | 15 | 9 | 10 | 13 | 14 | 8 | 11 | 11 | 8 | 14 | 13 | 5 | 6 | 0 | 3 | 3 | 0 | 6 | 5 | 2 | 1 | 7 | 4 | 4 | 7 | 1 | $2_{13}$ |
| 15 | 12 | 10 | 9 | 9 | 10 | 12 | 15 | 8 | 11 | 13 | 14 | 14 | 13 | 11 | 8 | 0 | 3 | 5 | 6 | 6 | 5 | 3 | 0 | 7 | 4 | 2 | 1 | 1 | 2 | 4 | $7_{6}$ |
| 1 | 2 | 4 | 7 | 7 | 4 | 2 | 1 | 6 | 5 | 3 | 0 | 0 | 3 | 5 | 6 | 14 | 13 | 11 | 8 | 8 | 11 | 13 | 14 | 9 | 10 | 12 | 15 | 15 | 12 | 10 | $9_{5}$ |
| 12 | 15 | 9 | 10 | 10 | 9 | 15 | 12 | 11 | 8 | 14 | 13 | 13 | 14 | 8 | 11 | 3 | 0 | 6 | 5 | 5 | 6 | 0 | 3 | 4 | 7 | 1 | 2 | 2 | 1 | 7 | $4_{6}$ |
| 2 | 1 | 7 | 4 | 4 | 7 | 1 | 2 | 5 | 6 | 0 | 3 | 3 | 0 | 6 | 5 | 13 | 14 | 8 | 11 | 11 | 8 | 14 | 13 | 10 | 9 | 15 | 12 | 12 | 15 | 9 | $10_{13}$ |
| 7 | 4 | 2 | 1 | 1 | 2 | 4 | 7 | 0 | 3 | 5 | 6 | 6 | 5 | 3 | 0 | 8 | 11 | 13 | 14 | 14 | 13 | 11 | 8 | 15 | 12 | 10 | 9 | 9 | 10 | 12 | $15_{6}$ |
| 9 | 10 | 12 | 15 | 15 | 12 | 10 | 9 | 14 | 13 | 11 | 8 | 8 | 11 | 13 | 14 | 6 | 5 | 3 | 0 | 0 | 3 | 5 | 6 | 1 | 2 | 4 | 7 | 7 | 4 | 2 | $1_{0}$ |
| 1 | 2 | 4 | 7 | 7 | 4 | 2 | 1 | 6 | 5 | 3 | 0 | 0 | 3 | 5 | 6 | 14 | 13 | 11 | 8 | 8 | 11 | 13 | 14 | 9 | 10 | 12 | 15 | 15 | 12 | 10 | $9_{6}$ |
| 15 | 12 | 10 | 9 | 9 | 10 | 12 | 15 | 8 | 11 | 13 | 14 | 14 | 13 | 11 | 8 | 0 | 3 | 5 | 6 | 6 | 5 | 3 | 0 | 7 | 4 | 2 | 1 | 1 | 2 | 4 | $7_{13}$ |
| 10 | 9 | 15 | 12 | 12 | 15 | 9 | 10 | 13 | 14 | 8 | 11 | 11 | 8 | 14 | 13 | 5 | 6 | 0 | 3 | 3 | 0 | 6 | 5 | 2 | 1 | 7 | 4 | 4 | 7 | 1 | $2_{6}$ |
| 4 | 7 | 1 | 2 | 2 | 1 | 7 | 4 | 3 | 0 | 6 | 5 | 5 | 6 | 0 | 3 | 11 | 8 | 14 | 13 | 13 | 14 | 8 | 11 | 12 | 15 | 9 | 10 | 10 | 9 | 15 | $12_{9}$ |
| 5 | 6 | 0 | 3 | 3 | 0 | 6 | 5 | 2 | 1 | 7 | 4 | 4 | 7 | 1 | 2 | 10 | 9 | 15 | 12 | 12 | 15 | 9 | 10 | 13 | 14 | 8 | 11 | 11 | 8 | 14 | $13_{6}$ |
| 11 | 8 | 14 | 13 | 13 | 14 | 8 | 11 | 12 | 15 | 9 | 10 | 10 | 9 | 15 | 12 | 4 | 7 | 1 | 2 | 2 | 1 | 7 | 4 | 3 | 0 | 6 | 5 | 5 | 6 | 0 | $3_{13}$ |
| 14 | 13 | 11 | 8 | 8 | 11 | 13 | 14 | 9 | 10 | 12 | 15 | 15 | 12 | 10 | 9 | 1 | 2 | 4 | 7 | 7 | 4 | 2 | 1 | 6 | 5 | 3 | 0 | 0 | 3 | 5 | $6_{6}$ |
| 0 | 3 | 5 | 6 | 6 | 5 | 3 | 0 | 7 | 4 | 2 | 1 | 1 | 2 | 4 | 7 | 15 | 12 | 10 | 9 | 9 | 10 | 12 | 15 | 8 | 11 | 13 | 14 | 14 | 13 | 11 | $8_{0}$ |
| 8 | 11 | 13 | 14 | 14 | 13 | 11 | 8 | 15 | 12 | 10 | 9 | 9 | 10 | 12 | 15 | 7 | 4 | 2 | 1 | 1 | 2 | 4 | 7 | 0 | 3 | 5 | 6 | 6 | 5 | 3 | $0_{6}$ |
| 6 | 5 | 3 | 0 | 0 | 3 | 5 | 6 | 1 | 2 | 4 | 7 | 7 | 4 | 2 | 1 | 9 | 10 | 12 | 15 | 15 | 12 | 10 | 9 | 14 | 13 | 11 | 8 | 8 | 11 | 13 | $14_{13}$ |
| 3 | 0 | 6 | 5 | 5 | 6 | 0 | 3 | 4 | 7 | 1 | 2 | 2 | 1 | 7 | 4 | 12 | 15 | 9 | 10 | 10 | 9 | 15 | 12 | 11 | 8 | 14 | 13 | 13 | 14 | 8 | $11_{6}$ |
| 13 | 14 | 8 | 11 | 11 | 8 | 14 | 13 | 10 | 9 | 15 | 12 | 12 | 15 | 9 | 10 | 2 | 1 | 7 | 4 | 4 | 7 | 1 | 2 | 5 | 6 | 0 | 3 | 3 | 0 | 6 | $5_{15}$ |
| 10 | 9 | 15 | 12 | 12 | 15 | 9 | 10 | 13 | 14 | 8 | 11 | 11 | 8 | 14 | 13 | 5 | 6 | 0 | 3 | 3 | 0 | 6 | 5 | 2 | 1 | 7 | 4 | 4 | 7 | 1 | $2_{6}$ |
| 4 | 7 | 1 | 2 | 2 | 1 | 7 | 4 | 3 | 0 | 6 | 5 | 5 | 6 | 0 | 3 | 11 | 8 | 14 | 13 | 13 | 14 | 8 | 11 | 12 | 15 | 9 | 10 | 10 | 9 | 15 | $12_{13}$ |
| 1 | 2 | 4 | 7 | 7 | 4 | 2 | 1 | 6 | 5 | 3 | 0 | 0 | 3 | 5 | 6 | 14 | 13 | 11 | 8 | 8 | 11 | 13 | 14 | 9 | 10 | 12 | 15 | 15 | 12 | 10 | $9_{6}$ |
| 15 | 12 | 10 | 9 | 9 | 10 | 12 | 15 | 8 | 11 | 13 | 14 | 14 | 13 | 11 | 8 | 0 | 3 | 5 | 6 | 6 | 5 | 3 | 0 | 7 | 4 | 2 | 1 | 1 | 2 | 4 | $7_{0}$ |
| 7 | 4 | 2 | 1 | 1 | 2 | 4 | 7 | 0 | 3 | 5 | 6 | 6 | 5 | 3 | 0 | 8 | 11 | 13 | 14 | 14 | 13 | 11 | 8 | 15 | 12 | 10 | 9 | 9 | 10 | 12 | $15_{6}$ |
| 9 | 10 | 12 | 15 | 15 | 12 | 10 | 9 | 14 | 13 | 11 | 8 | 8 | 11 | 13 | 14 | 6 | 5 | 3 | 0 | 0 | 3 | 5 | 6 | 1 | 2 | 4 | 7 | 7 | 4 | 2 | $1_{13}$ |
| 12 | 15 | 9 | 10 | 10 | 9 | 15 | 12 | 11 | 8 | 14 | 13 | 13 | 14 | 8 | 11 | 3 | 0 | 6 | 5 | 5 | 6 | 0 | 3 | 4 | 7 | 1 | 2 | 2 | 1 | 7 | $4_{6}$ |
| 2 | 1 | 7 | 4 | 4 | 7 | 1 | 2 | 5 | 6 | 0 | 3 | 3 | 0 | 6 | 5 | 13 | 14 | 8 | 11 | 11 | 8 | 14 | 13 | 10 | 9 | 15 | 12 | 12 | 15 | 9 | $10_{8}$ |
| 3 | 0 | 6 | 5 | 5 | 6 | 0 | 3 | 4 | 7 | 1 | 2 | 2 | 1 | 7 | 4 | 12 | 15 | 9 | 10 | 10 | 9 | 15 | 12 | 11 | 8 | 14 | 13 | 13 | 14 | 8 | $11_{6}$ |
| 13 | 14 | 8 | 11 | 11 | 8 | 14 | 13 | 10 | 9 | 15 | 12 | 12 | 15 | 9 | 10 | 2 | 1 | 7 | 4 | 4 | 7 | 1 | 2 | 5 | 6 | 0 | 3 | 3 | 0 | 6 | $5_{13}$ |
| 8 | 11 | 13 | 14 | 14 | 13 | 11 | 8 | 15 | 12 | 10 | 9 | 9 | 10 | 12 | 15 | 7 | 4 | 2 | 1 | 1 | 2 | 4 | 7 | 0 | 3 | 5 | 6 | 6 | 5 | 3 | $0_{6}$ |
| 6 | 5 | 3 | 0 | 0 | 3 | 5 | 6 | 1 | 2 | 4 | 7 | 7 | 4 | 2 | 1 | 9 | 10 | 12 | 15 | 15 | 12 | 10 | 9 | 14 | 13 | 11 | 8 | 8 | 11 | 13 | $14_{0}$ |
| 14 | 13 | 11 | 8 | 8 | 11 | 13 | 14 | 9 | 10 | 12 | 15 | 15 | 12 | 10 | 9 | 1 | 2 | 4 | 7 | 7 | 4 | 2 | 1 | 6 | 5 | 3 | 0 | 0 | 3 | 5 | $6_{6}$ |
| 0 | 3 | 5 | 6 | 6 | 5 | 3 | 0 | 7 | 4 | 2 | 1 | 1 | 2 | 4 | 7 | 15 | 12 | 10 | 9 | 9 | 10 | 12 | 15 | 8 | 11 | 13 | 14 | 14 | 13 | 11 | $8_{13}$ |
| 5 | 6 | 0 | 3 | 3 | 0 | 6 | 5 | 2 | 1 | 7 | 4 | 4 | 7 | 1 | 2 | 10 | 9 | 15 | 12 | 12 | 15 | 9 | 10 | 13 | 14 | 8 | 11 | 11 | 8 | 14 | $13_{6}$ |

TABLE 12-continued

A POSSIBLE ARRAY OF EDAC PATTERNS FOR THE FIRST 2048 INFONUMBERS IN A SYSTEM OF ANY NUMBER OF BINARY PLACES (represented in decimal form for convenience). The superscripts across the top are the transformers from column to column (1 step to right). The subscripts down the right-hand side are the transformers from the end of each row to the beginning of the next.

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 11 | 8 | 14 | 13 | 13 | 14 | 8 | 11 | 12 | 15 | 9 | 10 | 10 | 9 | 15 | 12 | 4 | 7 | 1 | 2 | 2 | 1 | 7 | 4 | 3 | 0 | 6 | 5 | 5 | 6 | 0 | $3_5$ |
| 6 | 5 | 3 | 0 | 0 | 3 | 5 | 6 | 1 | 2 | 4 | 7 | 7 | 4 | 2 | 1 | 9 | 10 | 12 | 15 | 15 | 12 | 10 | 9 | 14 | 13 | 11 | 8 | 8 | 11 | 13 | $14_6$ |
| 8 | 11 | 13 | 14 | 14 | 13 | 11 | 8 | 15 | 12 | 10 | 9 | 9 | 10 | 12 | 15 | 7 | 4 | 2 | 1 | 1 | 2 | 4 | 7 | 0 | 3 | 5 | 6 | 6 | 5 | 3 | $0_{13}$ |
| 13 | 14 | 8 | 11 | 11 | 8 | 14 | 13 | 11 | 8 | 14 | 13 | 13 | 14 | 8 | 11 | 2 | 1 | 7 | 4 | 4 | 7 | 1 | 2 | 5 | 6 | 0 | 3 | 3 | 0 | 6 | $5_6$ |
| 3 | 0 | 6 | 5 | 5 | 6 | 0 | 3 | 4 | 7 | 1 | 2 | 2 | 1 | 7 | 4 | 12 | 15 | 9 | 10 | 10 | 9 | 15 | 12 | 11 | 8 | 14 | 13 | 13 | 14 | 8 | $11_0$ |
| 11 | 8 | 14 | 13 | 13 | 14 | 8 | 11 | 12 | 15 | 9 | 10 | 10 | 9 | 15 | 12 | 4 | 7 | 1 | 2 | 2 | 1 | 7 | 4 | 3 | 0 | 6 | 5 | 5 | 6 | 0 | $3_6$ |
| 5 | 6 | 0 | 3 | 3 | 0 | 6 | 5 | 2 | 1 | 7 | 4 | 4 | 7 | 1 | 2 | 10 | 9 | 15 | 12 | 12 | 15 | 9 | 10 | 13 | 14 | 8 | 11 | 11 | 8 | 14 | $13_{13}$ |
| 0 | 3 | 5 | 6 | 6 | 5 | 3 | 0 | 7 | 4 | 2 | 1 | 1 | 2 | 4 | 7 | 15 | 12 | 10 | 9 | 9 | 10 | 12 | 15 | 8 | 11 | 13 | 14 | 14 | 13 | 11 | $8_6$ |
| 14 | 13 | 11 | 8 | 8 | 11 | 13 | 14 | 9 | 10 | 12 | 15 | 15 | 12 | 10 | 9 | 1 | 2 | 4 | 7 | 7 | 4 | 2 | 1 | 6 | 5 | 3 | 0 | 0 | 3 | 5 | $6_9$ |
| 15 | 12 | 10 | 9 | 9 | 10 | 12 | 15 | 8 | 11 | 13 | 14 | 14 | 13 | 11 | 8 | 0 | 3 | 5 | 6 | 6 | 5 | 3 | 0 | 7 | 4 | 2 | 1 | 1 | 2 | 4 | $7_6$ |
| 1 | 2 | 4 | 7 | 7 | 4 | 2 | 1 | 6 | 5 | 3 | 0 | 0 | 3 | 5 | 6 | 14 | 13 | 11 | 8 | 8 | 11 | 13 | 14 | 9 | 10 | 12 | 15 | 15 | 12 | 10 | $9_{13}$ |
| 4 | 7 | 1 | 2 | 2 | 1 | 7 | 4 | 3 | 0 | 6 | 5 | 5 | 6 | 0 | 3 | 11 | 8 | 14 | 13 | 13 | 14 | 8 | 11 | 12 | 15 | 9 | 10 | 10 | 9 | 15 | $12_6$ |
| 10 | 9 | 15 | 12 | 12 | 15 | 9 | 10 | 13 | 14 | 8 | 11 | 11 | 8 | 14 | 13 | 5 | 6 | 0 | 3 | 3 | 0 | 6 | 5 | 2 | 1 | 7 | 4 | 4 | 7 | 1 | $2_0$ |
| 2 | 1 | 7 | 4 | 4 | 7 | 1 | 2 | 5 | 6 | 0 | 3 | 3 | 0 | 6 | 5 | 13 | 14 | 8 | 11 | 11 | 8 | 14 | 13 | 10 | 9 | 15 | 12 | 12 | 15 | 9 | $10_6$ |
| 12 | 15 | 9 | 10 | 10 | 9 | 15 | 12 | 11 | 8 | 14 | 13 | 13 | 14 | 8 | 11 | 3 | 0 | 6 | 5 | 5 | 6 | 0 | 3 | 4 | 7 | 1 | 2 | 2 | 1 | 7 | $4_{13}$ |
| 9 | 10 | 12 | 15 | 15 | 12 | 10 | 9 | 14 | 13 | 11 | 8 | 8 | 11 | 13 | 14 | 6 | 5 | 3 | 0 | 0 | 3 | 5 | 6 | 1 | 2 | 4 | 7 | 7 | 4 | 2 | $1_6$ |
| 7 | 4 | 2 | 1 | 1 | 2 | 4 | 7 | 0 | 3 | 5 | 6 | 6 | 5 | 3 | 0 | 8 | 11 | 13 | 14 | 14 | 13 | 11 | 8 | 15 | 12 | 10 | 9 | 9 | 10 | 12 | 15 |

TABLE 13

A Convenient Array of EDAC Patterns to Protect INFO $2^n - 1$, $2^n$, $2^n + 1$, . . . for any n in a System with Any Number of Places

| Exponential | Decimal | INFORMATION Binary | EDAC | Transformers | |
|---|---|---|---|---|---|
| $2^0 - 1$ | 0 | o | o | 0 | |
| | | | | | 3 |
| $2^0 - 2^1 - 1$ | 1 | I | II | 3← | |
| | | | | | 6 |
| $2^1$ | 2 | Io | IoI | 5← | |
| | | | | | 3 |
| $2^2 - 1$ | 3 | II | IIo | 6 | |
| | | | | | 0 |
| $2^2$ | 4 | Ioo | IIo | 6← | |
| | | | | | 3 |
| $2^2 + 2^0$ | 5 | IoI | IoI | 5 | |
| | | | | | 6 |
| $2^2 + 2^1$ | 6 | IIo | oII | 3 | |
| | | | | | 3 |
| $2^3 - 1$ | 7 | III | ooo | 0 | |
| | | | | | 7 |
| $2^3$ | 8 | Iooo | III | 7← | |
| | | | | | 6 |
| | | | | | $6^{0}$ |
| $2^4 - 1$ | 15 | IIII | III | 7 | |
| | | | | | 14 |
| $2^4$ | 16 | Ioooo | IooI | 9← | |
| | | | | | 0 |
| | | | | | $0^{7}$ |
| $2^5 - 1$ | 31 | IIIII | IIIo | 14 | |
| | | | | | 4 |
| $2^5$ | 32 | Iooooo | IoIo | 10← | |
| | | | | | 7 |
| | | | | | $7^{14}$ |
| $2^6 - 1$ | 63 | IIIIII | oIoo | 4 | |
| | | | | | 15 |
| $2^6$ | 64 | Ioooooo | IoII | 11← | |
| | | | | | 14 |
| | | | | | $14^{4}$ |
| $2^7 - 1$ | 127 | IIIIIII | IIII | 15 | |
| | | | | | 3 |
| $2^7$ | 128 | Iooooooo | IIoo | 12← | |
| | | | | | 4 |
| | | | | | $4^{15}$ |
| $2^8 - 1$ | 255 | IIIIIIII | ooII | 3 | |
| | | | | | 14 |
| $2^8$ | 256 | Ioooooooo | IIoI | 13← | |
| | | | | | 15 |
| | | | | | $15^{3}$ |
| $2^9 - 1$ | 511 | IIIIIIIII | IIIo | 14 | |
| | | | | | 0 |
| $2^9$ | 512 | Iooooooooo | IIIo | 14← | |
| | | | | | 3 |
| | | | | | $3^{14}$ |
| $2^{10} - 1$ | 1023 | IIIIIIIIII | oooo | 0 | |
| | | | | | 15 |
| $2^{10}$ | 1024 | Ioooooooooo | IIII | 15← | |
| | | | | | 14 |
| | | | | | $14^{0}$ |
| $2^{11} - 1$ | 2047 | IIIIIIIIIII | IIII | 15 | |
| | | | | | 30 |
| $2^{11}$ | 2048 | Iooooooooooo | IoooI | 17← | |
| | | | | | 0 |
| | | | | | $0^{15}$ |
| $2^{12} - 1$ | 4095 | IIIIIIIIIIII | IIIIo | 30 | |
| | | | | | 12 |
| $2^{12}$ | 4096 | Ioooooooooooo | IooIo | 18← | |
| | | | | | 15 |
| | | | | | $15^{30}$ |
| $2^{13} - 1$ | 8191 | IIIIIIIIIIIII | oIIoo | 12 | |
| | | | | | 31 |
| $2^{13}$ | 8192 | Iooooooooooooo | IooII | 19← | |
| | | | | | 30 |
| | | | | | $30^{12}$ |
| $2^{14} - 1$ | 16383 | IIIIIIIIIIIIII | IIIII | 31 | |
| | | | | | 11 |
| $2^{14}$ | 16384 | Ioooooooooooooo | IoIoo | 20← | |
| | | | | | 12 |
| | | | | | $12^{31}$ |

TABLE 13-continued

A Convenient Array of EDAC Patterns to Protect INFO $2^n -1$, $2^n$, $2^n + 1$, . . . for any n in a System with Any Number of Places

| Exponential | Decimal | INFORMATION Binary | EDAC | Transformers | |
|---|---|---|---|---|---|
| $2^{15} - 1$ | 32767 | IIIIIIIIIIIIIII | oIoII | 11 | |
| | | | | | 30 |
| $2^{15}$ | 32768 | Iooooooooooooooo | IoIoI | 21← | |
| | | | | | 31 |
| | | | | | $31^{11}$ |
| $2^{16} - 1$ | 65535 | IIIIIIIIIIIIIIII | IIIIo | 30 | |
| | | | | | 8 |
| $2^{16}$ | 65536 | Ioooooooooooooooo | IoIIo | 22← | |
| | | | | | 11 |
| | | | | | $11^{30}$ |
| $2^{17} - 1$ | 131071 | IIIIIIIIIIIIIIIII | oIooo | 8 | |
| | | | | | 31 |
| $2^{17}$ | 131072 | Iooooooooooooooooo | IoIII | 23← | |
| | | | | | 30 |
| | | | | | $30^{8}$ |
| $2^{18} - 1$ | 262143 | IIIIIIIIIIIIIIIIII | IIIII | 31 | |
| | | | | | 7 |
| $2^{18}$ | 262144 | Ioooooooooooooooooo | IIooo | 24← | |
| | | | | | 8 |
| | | | | | $8^{31}$ |
| $2^{19} - 1$ | 524287 | IIIIIIIIIIIIIIIIIII | ooIII | 7 | |
| | | | | | 30 |
| $2^{19}$ | 524288 | Iooooooooooooooooooo | IIooI | 25← | |
| | | | | | 31 |
| | | | | | $31^{7}$ |
| $2^{20} - 1$ | 1048575 | IIIIIIIIIIIIIIIIIIII | IIIIo | 30 | |
| | | | | | 4 |
| $2^{20}$ | 1048576 | Ioooooooooooooooooooo | IIoIo | 26← | |
| | | | | | 7 |
| | | | | | $7^{30}$ |
| $2^{21} - 1$ | 2097751 | IIIIIIIIIIIIIIIIIIIII | ooIoo | 4 | |
| | | | | | 31 |
| $2^{21}$ | 2097752 | Iooooooooooooooooooooo | IIoII | 27← | |
| | | | | | 30 |
| | | | | | $30^{4}$ |
| $2^{22} - 1$ | 4194303 | IIIIIIIIIIIIIIIIIIIIII | IIIII | 31 | |
| | | | | | 3 |
| $2^{22}$ | 4194304 | Ioooooooooooooooooooooo | IIIoo | 28← | |
| | | | | | 4 |
| | | | | | $4^{31}$ |
| $2^{23} - 1$ | 8388607 | IIIIIIIIIIIIIIIIIIIIIII | oooII | 3 | |
| | | | | | 30 |
| $2^{23}$ | 8388608 | Iooooooooooooooooooooooo | IIIoI | 29← | |
| | | | | | 31 |
| | | | | | $31^{3}$ |
| $2^{24} - 1$ | 16777215 | IIIIIIIIIIIIIIIIIIIIIIII | IIIIo | 30 | |
| | | | | | 0 |
| $2^{24}$ | 16777216 | Ioooooooooooooooooooooooo | IIIIo | 30← | |
| | | | | | 3 |
| | | | | | $3^{30}$ |
| $2^{25} - 1$ | 33554431 | IIIIIIIIIIIIIIIIIIIIIIIII | ooooo | 0 | |
| | | | | | 31 |
| $2^{25}$ | 33554432 | Iooooooooooooooooooooooooo | IIIII | 31← | |
| | | | | | 30 |
| | | | | | $30^{0}$ |
| $2^{26} - 1$ | 67108863 | IIIIIIIIIIIIIIIIIIIIIIIIII | IIIII | 31 | |
| | | | | | 62 |
| $2^{26}$ | 67108864 | Ioooooooooooooooooooooooooo | IooooI | 33← | |
| | | | | | 0 |
| | | | | | $0^{31}$ |
| $2^{27} - 1$ | 134217727 | IIIIIIIIIIIIIIIIIIIIIIIIIII | IIIIIo | 62 | |
| | | | | | 28 |
| $2^{27}$ | 134217728 | Iooooooooooooooooooooooooooo | IoooIo | 34← | |
| | | | | | 31 |
| | | | | | $31^{62}$ |
| $2^{28} - 1$ | 268435455 | IIIIIIIIIIIIIIIIIIIIIIIIIIII | oIIIoo | 28 | |
| | | | | | 63 |
| $2^{28}$ | 268435456 | Ioooooooooooooooooooooooooooo | IoooII | 35← | |
| | | | | | 62 |
| | | | | | $62^{28}$ |
| $2^{29} - 1$ | 536870911 | IIIIIIIIIIIIIIIIIIIIIIIIIIIII | IIIIII | 63 | |
| | | | | | 27 |
| $2^{29}$ | 536870912 | Iooooooooooooooooooooooooooooo | IooIoo | 36← | |
| | | | | | 28 |

TABLE 13-continued

A Convenient Array of EDAC Patterns to Protect INFO 2" −1, 2", 2" + 1, . . . for any n in a System with Any Number of Places

| Exponential | Decimal | INFORMATION Binary | EDAC Transformers | | |
|---|---|---|---|---|---|
| $2^{30} - 1$ | 1073741823 | IIIIIIIIIIIIIIIIIIIIIIIIIIIIII | oIIoII 27 | | $28^{63}$ |
| $2^{30}$ | 1073741824 | Ioooooooooooooooooooooooooooooo | IooIoI 37← | | 62 |
| | | | | | 63 |
| | | | | | $63^{27}$ |
| $2^{31} - 1$ | 2147483647 | IIIIIIIIIIIIIIIIIIIIIIIIIIIIIII | IIIIIo 62 | | |
| | | | | | 24 |
| $2^{31}$ | 2147483648 | Iooooooooooooooooooooooooooooooo | IooIIo 38← | | |
| | | | | | 27 |
| | | | | | $27^{62}$ |
| $2^{32} - 1$ | 4294967295 | IIIIIIIIIIIIIIIIIIIIIIIIIIIIIIII | oIIooo 24 | | |

Methods of operating the Carryless Addition EDAC technique follow. For example, each binary position number of a binary word is numbered, starting with 1 on the right and counting to the left. A 15 place binary word is shown below with 15 binary zeros. Below the binary word each binary place position is numbered, 1–15. Certain binary place positions are underlined, as described below.

| 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 |

Each information place is protected by the EDAC digits with a lower position number than the position number of the information place. The number of EDAC digits required is the total number of position numbers (places) that are a power of 2. The positions required for the EDAC cluster are those position numbers that are numbered with a power of 2, in this example, the underlined position numbers 8, 4, 2 and 1. The EDAC positions may be separated ("unblended") into an EDAC cluster and represented to the right to the remaining places which are used to represent the information to be carried by the code. The 11 remaining binary information places, with their non-power of 2 position numbers, are shown below, with the 4 EDAC places, with their power of 2 position numbers, to their right.

| Information + EDAC | | | | | | | | | | | | | | |
|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 |
| 15 | 14 | 13 | 12 | 11 | 10 | 9 | 7 | 6 | 5 | 3 | 8 | 4 | 2 | 1 |

The position numbers which are a power of 2 are skipped and not used for information. Each remaining information position number is the EDAC value for that position and may be used, when a binary 1 is present, as described below. Note that no two powers of 2 (information) can have the same EDAC number, otherwise the message would differ in only two places; and no power of 2 (information) can have a power of 2 for an EDAC number, otherwise the message would differ from the zero message in only two places. The sequence meets these terms. Take for example the message 1989, which is 11111000101 in binary:

| Information + EDAC | | | | | | | | | | | | | | |
|---|---|---|---|---|---|---|---|---|---|---|---|---|---|---|
| 1 | 1 | 1 | 1 | 1 | 0 | 0 | 0 | 1 | 0 | 1 | 0 | 0 | 0 | 0 |
| 15 | 14 | 13 | 12 | 11 | 10 | 9 | 7 | 6 | 5 | 3 | 8 | 4 | 2 | 1 |

To determine what value should be in the EDAC cluster, the position numbers of the information places that have a binary 1 are subjected to the operation called transforming. This may be written as follows:

15 T 14 T 13 T 12 T 11 T 6 T 3

This is permissible because, like + (or −), T is commutative (a T b=b T a) and associative, a T (b T c)=(a T b) T c. Besides, T has the properties that a T a=0 and a T 0=a, always. Furthermore, for every a such that a=b T c, it is always true that b=c T a and c=a T b.

To evaluate the EDAC cluster of 1989 by taking the transforms, write the position values in binary form of the places that have a binary 1 in a column (in operation these operations could be performed by apparatus). Then the transform is a binary numeral with ones where the transformands differ and zeros where they are the same, as shown for 1989 (15T14T13T12T11T6T3):

```
        15 = 1111
        14 = 1110
    T  _____
             0001 = 1
        13 = 1101
    T  _____
             1100 = 12
        12 = 1100
    T  _____
             0000 = 0
        11 = 1011
    T  _____
             1011 = 11
         6 =  110
    T  _____
             1101 = 13
         3 =   11
    T  _____
             1110 = 14
```

The EDAC number for the message 1989 is 14, 1110 in binary. Each transforming operation shown above is, in effect, an example of a carryless addition operation. Note that each transforming operation also has the same result as a "borrowless subtraction" operation would have.

The complete binary word therefore is:

| Information + EDAC | | | | | | | | | | | | | | |
|---|---|---|---|---|---|---|---|---|---|---|---|---|---|---|
| 1 | 1 | 1 | 1 | 1 | 0 | 0 | 0 | 1 | 0 | 1 | 1 | 1 | 1 | 0 |
| 15 | 14 | 13 | 12 | 11 | 10 | 9 | 7 | 6 | 5 | 3 | 8 | 4 | 2 | 1 |

11111000101 1110=1989•$2^4$+14=31,838 in a 15 place system. In a 16 to 31 place system, the value would be 1989•$2^5$+14=63,662, etc.

In principle, one way to correct a single error, the read 1989 message is transformed to determine if the read EDAC value is correct. If it is correct, there is no single error. If it is not, and a change in a single EDAC digit will make it correct, then that is the error. Otherwise the single error must be in the 1989 message. If a change in one information digit will do, then that was the error. Other ways to determine which digit is incorrect are described below. If there were multiple errors, a mistake may occur if error correcting is performed (described below).

In principle, one way to detect any one or two errors, the read 1989 message is transformed to determine if the read EDAC value is correct. If it is correct, there is no single or double error. If it is not, one or two errors have occurred. If more errors occurred, a correct binary word of the wrong message may result, or the errors may be detected (as a follower or a spare) so that a mistake does not result.

The transforming process may be simplified. The residue modulo 2 is determined for each column. This is simpler than addition (or subtraction). In other words, each column is added in binary but the carry, if any, is discarded: carryless addition, as shown below:

```
15 = 1111
14 = 1110
13 = 1101
12 = 1100
11 = 1011
 6 =  110
 3 =   11
---------
1110 = 14
```

This may also be performed, e.g., by determining for each column what binary digit is needed to satisfy the parity convention of even binary 1 digits for that column. (Similarly, the positions with a 0 in them may be used, with appropriate adjustment in accord therewith.)

The EDAC digits may be left "blended" with the information digits, i.e., not separated into their own cluster. Each position is filled in accord with above, as shown for the same message, 1989, with the required EDAC digits underlined, in blended form:

| | | | | | | | | | | | | | | |
|---|---|---|---|---|---|---|---|---|---|---|---|---|---|---|
| 1 | 1 | 1 | 1 | 1 | 0 | 0 | 1 | 0 | 1 | 0 | 1 | 1 | 1 | 0 |
| 15 | 14 | 13 | 12 | 11 | 10 | 9 | $\underline{8}$ | 7 | 6 | 5 | $\underline{4}$ | 3 | $\underline{2}$ | $\underline{1}$ |

Binary words may be evaluated in blended form (and variations combining examples described herein) for correctness by performing carryless addition on each column of the binary representations of each position value that has a binary 1 in that place, as shown below for the example; if the final result is 0, no single or double errors are present.

```
15 = 1111
14 = 1110
13 = 1101
12 = 1100
11 = 1011
 8 = 1000
 6 =  110
 4 =  100
 3 =   11
 2 =   10
---------
0 = 0000 (no single or double error)
```

If one error occurred, the result would not be zero: the result would be the value of the position number in error, as shown below.

For example, if position 5, which is "off" (0) in the above example, turned "on" (1) in error, the following would result:

```
15 = 1111
14 = 1110
13 = 1101
12 = 1100
11 = 1011
 8 = 1000
 6 =  110
 5 =  101
 4 =  100
 3 =   11
 2 =   10
---------
5 = 0101 (the 5 position is in error)
```

This result, 5 (0101), indicates that the 5 position, since it is a 1, must be turned off to perform the correction, i.e., the binary 1 in the 5 position must be inverted to a 0.

In another example, if position 6, which is on (1), turned off (0) in error, the following would result:

```
15 = 1111
14 = 1110
13 = 1101
12 = 1100
11 = 1011
 8 = 1000
 4 =  100
 3 =   11
 2 =   10
---------
6 = 0110 (the 6 position is in error)
```

This result, 6 (0110), indicates that the 6 position, since it is a 0, must be turned on to perform the correction, i.e., the binary 0 in the 6 position must be inverted to a 1.

If position 6, which is on (1) in this example, turned off (0) in error, and position 5, which was off (0) in the above example, is turned on (1) in error, two errors occurred and the following would result:

```
15 = 1111
14 = 1110
13 = 1101
12 = 1100
11 = 1011
 8 = 1000
 5 =  101
 4 =  100
 3 =   11
 2 =   10
-----------
3 = 0011 (the 3 position appears in error)
```

This result, 3 (0011) indicates that the 3 position, since it is a 1, must be turned off to perform the correction, i.e., the binary 1 in the 3 position must be inverted to a 0. Obviously, this is an incorrect correction for our example. Thus, two errors may incorrectly appear to be a one bit error. If the EDAC system described is used to correct a one bit error and also expected to detect two bit errors, mistakes may result, as described and demonstrated.

(Note that, even with the position numbers of the information digits and the EDAC digits sorted out as described above, if a One Position Sum operation, i.e., normal addition of the column followed by a modulo reduction, were performed, without more, the result is not satisfactory, as may be revealed in the above examples if the One Position Sum operation is performed and the results evaluated.)

However, as mentioned, a system could be used to correct a one bit error and detect two bit errors satisfactorily if a normal binary parity convention were adopted and one additional bit were used with each binary word to maintain the adopted parity convention. For example, if one parity bit and a given convention are added to Tables 6–10 above and the examples of the protected message 1989, one bit errors may be corrected and two bit errors detected satisfactorily as described below. The parity convention shown below is an even number of 1 digits, (although, since the number of digits with a parity digit is 16, the number of 0 digits will also be even). Parity on the 1 digits is preferred, one reason being that parity on the 1s avoids possible concern with leading 0s.

With the EDAC digits "blended" with the information digits, i.e., not separated into their own cluster, the parity digit may be neatly assigned the position number zero, as shown immediately below. Each position is filled in accord with the above (blended) example of the message 1989, with the required EDAC as described and a 0 parity bit in position 0, shown in blended form (the EDAC positions including parity are underlined):

| | | | | | | | | | | | | | | | |
|---|---|---|---|---|---|---|---|---|---|---|---|---|---|---|---|
| | | | | | | | | | | | | | | | P |
| 1 | 1 | 1 | 1 | 1 | 0 | 0 | 1 | 0 | 1 | 0 | 1 | 1 | 1 | 0 | 0 |
| 15 | 14 | 13 | 12 | 11 | 10 | 9 | <u>8</u> | 7 | 6 | 5 | <u>4</u> | 3 | <u>2</u> | <u>1</u> | <u>0</u> |

With an adopted parity convention, any valid code must contain at least four places different from each other valid code. When performing Carryless Addition, nothing differs if the parity digit is assigned position 0. (If parity is assigned a different position number than 0, a modulo reduction may be required to be performed on the result of the carryless addition.) When carryless addition is performed on blended numbers with the parity bit assigned to the zero position number as described, a 0 result indicates that the binary word is correct, just as above, etc.

Because four places are different with the added parity bit, a one bit error of any valid code will be at least three bits different from each other valid code, and thus a one-off error cannot be confused with another valid code's two-off error. All two-off errors will be detected when EDAC operation is performed and the code rejected (although when a two-off error occurs, it may not be determinable as to which valid code the two-off error belongs). Thus, one-off errors can be corrected and two-off errors detected. Also, any possible one, two or three bit errors may be reliably detected if one bit errors are not also corrected.

A means of operating EDAC with conventional parity follows. By using parity in a normal sense, all one-off errors will be detected as such because parity will be off if any one-off error occurs. Assuming the parity convention is an even number of 1 digits, if any one 0 bit changes in error to a 1, the number of 1 bits would then be odd, and if any one 1 bit changes in error to a 0, the number of 1 bits would then be odd. (No matter the parity convention, any one bit error will cause a parity error.) Thus, the normal parity convention on the binary word is able to reveal any possible one bit error. EDAC operation need not be performed to detect a one bit error because a parity check is sufficient to detect any one bit error. In the event a one bit error is detected via a parity check, carryless addition EDAC operation may then be used to correct the bit in error as described above. However, if the EDAC operation is performed when parity is off and no one bit error is found, the parity bit itself is in error and it may thus be correctly corrected.

If any possible two bits are in error, parity will be correct. If any two 1 bits change in error, or if any two 0 bits change in error, or if one 1 bit and one 0 bit change in error, the correct parity convention still remains in the binary word. EDAC operation is required to detect any possible two-bit errors. If parity is correct and EDAC operation is performed and detects (only) one bit in error, the one bit detected in error is in error and the parity bit itself is in error. Both may be correctly corrected. Thus, with parity, if the parity bit is in error and any other one bit is also in error, both errors may be corrected.

If three bits are in error a mistake may occur because the three bits in error in a given valid code may be confused with a one bit error of another valid code. If such a confused one bit error is corrected, a mistake may thus occur. However, if one of the three bits in error is the parity digit itself, a mistake will not occur because the other two bits in error will be detected as being a two-off error and no correction attempt will be made; for what value may be had, the parity bit (only) may be correctly corrected if the parity bit is in error and any two other bits are in error. EDAC operation may be limited to detecting one, two or three bits in error reliably if no error correcting is performed.

If four bits are in error they may go undetected as another valid code, a mistake being the result. However, a mistake will be avoided if the four bits in error create a two-off follower or a spare code.

Five bits in error may appear to be a one bit error from another valid code and a correction, if performed, will result in a mistake. Six bits may appear to be a two-off error, etc, etc. Of course, if the same bit fails twice, that bit winds up correct, as if error did not occur to it.

In a sub-pile analysis including two-off errors of an EDAC system as described with an added parity bit, it is seen that there are two-off followers for each valid code leader, and that these two-off followers are "shared" by more than one valid code, as described below in association with Table 14. (Without parity, a two-off code may appear to be a one-off code of another valid code, as described above.)

Table 14 demonstrates half of a 7 place EDAC system with 1 parity bit, making a total of 8 places, blended as described: at the top of Table 14, the gross position numbers (which are used for carryless addition), 8 through 1, are shown with the 4 information places denoted below and the 4 EDAC places denoted below that (the EDAC places include parity, which is shown in the 4th EDAC place, which is the first place as shown, in this example). The parity bit is assigned the position value 8 in this example.

Only 8 valid codes, half of the 16 possible valid codes, are shown in Table 14. The other half of Table 14 would conform to the description below and is not shown for the sake of brevity. All 16 valid codes, in the same form as the first 8 valid codes shown in Table 14 (except that a small space separates information digits and EDAC digits) are:

| |
|---|
| 0 000 0 0 00 |
| 1 000 0 1 11 |
| 1 001 1 0 01 |
| 0 001 1 1 10 |
| 1 010 1 0 10 |
| 0 010 1 1 01 |
| 0 011 0 0 11 |
| 1 011 0 1 00 |
| 0 100 1 0 11 |
| 1 100 1 1 00 |
| 1 101 0 0 10 |
| 0 101 0 1 01 |
| 1 110 0 0 01 |

-continued

| |
|---|
| 0 110 0 1 10 |
| 0 111 1 0 00 |
| 1 111 1 1 11 |

Note that the second 8 valid codes are the complements of the first 8 in reverse order.

Each of the 8 valid codes shown in Table 14 are numbered in accord with the information digits of their code, followed by a decimal point which is followed by a sub-pile designation. A valid code, x, is designated x.0 and its one-off follower sub-pile is designated x.1 and its two-off follower sub-pile is designated x.2. Each of the 8 valid codes are shown with their respective one-off sub-pile (each of which contains 8 one-off followers) below the valid code. These 8 one-off codes are used exclusively by the respective valid number like the above sub-pile Tables and as shown.

Below the one-off sub-pile is the two-off follower sub-pile, each of which contains 28 two-off followers. Each two-off follower appears three additional times, once in each of three other two-off follower sub-piles. Thus, each two-off follower is shared in four sub-piles.

Every number possible in an 8 place system is thus accounted for, in accord with sub-pile analysis.

Table 15 shows the "anatomy" of a complete sub-pile from Table 14, namely the one-off and two-off sub-pile of the 00000000 valid code of Table 14. Two-off followers (which may be called secondary followers), may be thought of as one-off followers of the one-off followers of the valid code (and thus such thought of two-off followers would include the valid code itself).

TABLE 14

| position numbers, | gross / info / edac | 8 7 6 5 4 3 2 1 / 4 3 2 1 / 4 3 2 1 | | | | | | | | | | subpile | | | | | | | | | | | |
|---|---|---|---|---|---|---|---|---|---|---|---|---|---|---|---|---|---|---|---|---|---|---|---|
| 0.0 | oooooooo | 0 | 1.0 | IooooIII | 135 | 2.0 | IooIIooI | 153 | 3.0 | oooIIIIo | 30 | 4.0 | IoIoIoIo | 170 | 5.0 | ooIoIIoI | 45 | 6.0 | ooIIooII | 51 | 7.0 | IoIIoIoo | 180 |
| 0.1 | oooooooI | 1 | 1.1 | IooooIIo | 134 | 2.1 | IooIIooo | 152 | 3.1 | oooIIIII | 31 | 4.1 | IoIoIoII | 171 | 5.1 | ooIoIIoo | 44 | 6.1 | ooIIooIo | 50 | 7.1 | IoIIoIoI | 181 |
| | ooooooIo | 2 | | IooooIoI | 133 | | IooIIoII | 155 | | oooIIIoo | 28 | | IoIoIooo | 168 | | ooIoIIII | 47 | | ooIIoooI | 49 | | IoIIoIIo | 182 |
| | oooooIoo | 4 | | IoooooII | 131 | | IooIIIoI | 157 | | oooIIoIo | 26 | | IoIoIIIo | 174 | | ooIoIooI | 41 | | ooIIoIII | 55 | | IoIIoooo | 176 |
| | ooooIooo | 8 | | IoooIIII | 143 | | IooIoooI | 145 | | oooIoIIo | 22 | | IoIoooIo | 162 | | ooIooIoI | 37 | | ooIIIoII | 59 | | IoIIIIoo | 188 |
| | oooIoooo | 16 | | IooIoIII | 151 | | IoooIooI | 137 | | ooooIIIo | 14 | | IoIIIoIo | 186 | | ooIIIIoI | 61 | | ooIoooII | 35 | | IoIooIoo | 164 |
| | ooIooooo | 32 | | IoIooIII | 177 | | IoIIIooI | 185 | | ooIIIIIo | 62 | | IoooIoIo | 138 | | ooooIIoI | 13 | | oooIooII | 19 | | IooIoIoo | 148 |
| | oIoooooo | 64 | | IIoooIII | 199 | | IIoIIooI | 217 | | oIoIIIIo | 94 | | IIIoIoIo | 234 | | oIIoIIoI | 109 | | oIIIooII | 115 | | IIIIoIoo | 244 |
| | Iooooooo | 128 | | oooooIII | 7 | | oooIIooI | 25 | | IooIIIIo | 158 | | ooIoIoIo | 42 | | IoIoIIoI | 173 | | IoIIooII | 179 | | ooIIoIoo | 52 |
| 0.2 | ooooooII | 3 | 1.2 | IooooIoo | 132 | 2.2 | IooIIoIo | 154 | 3.2 | oooIIIoI | 29 | 4.2 | IoIoIooI | 169 | 5.2 | ooIoIIIo | 46 | 6.2 | ooIIoooo | 48 | 7.2 | IoIIoIII | 183 |
| | oooooIoI | 5 | | IoooooIo | 130 | | IooIIIoo | 156 | | oooIIoII | 27 | | IoIoIIII | 175 | | ooIoIooo | 40 | | ooIIoIIo | 54 | | IoIIoooI | 177 |
| | oooooIIo | 6 | | IooooooI | 129 | | IooIIIII | 159 | | oooIIooo | 24 | | IoIoIIoo | 172 | | ooIoIoII | 43 | | ooIIoIoI | 53 | | IoIIooIo | 178 |
| | ooooIooI | 9 | | IoooIIIo | 134 | | IooIoooo | 144 | | oooIoIII | 23 | | IoIoooII | 163 | | ooIooIoo | 36 | | ooIIIoIo | 58 | | IoIIIIoI | 189 |
| | ooooIoIo | 10 | | IoooIIoI | 133 | | IooIooIo | 146 | | oooIoIoo | 20 | | IoIooooo | 160 | | ooIooIII | 39 | | ooIIIooI | 57 | | IoIIIIIo | 190 |
| | ooooIIoo | 12 | | IoooIoII | 139 | | IooIoIoI | 149 | | oooIooIo | 18 | | IoIooIIo | 166 | | ooIooooI | 33 | | ooIIIIII | 63 | | IoIIIooo | 184 |
| | oooIoooI | 17 | | IooIoIIo | 150 | | IoooIooo | 136 | | ooooIIII | 15 | | IoIIIoII | 187 | | ooIIIIoo | 60 | | ooIoooIo | 34 | | IoIooIoI | 165 |
| | oooIooIo | 18 | | IooIoIoI | 149 | | IoooIoII | 139 | | ooooIIoo | 12 | | IoIIIooo | 184 | | ooIIIIII | 63 | | ooIoIooI | 41 | | IoIooIIo | 166 |
| | oooIoIoo | 20 | | IooIooII | 147 | | IoooIIoI | 141 | | ooooIoIo | 10 | | IoIIIIIo | 190 | | ooIIIooI | 57 | | ooIooIII | 39 | | IoIooooo | 160 |
| | oooIIooo | 24 | | IooIIIII | 159 | | IooooooI | 129 | | oooooIIo | 6 | | IoIIooIo | 178 | | ooIIoIoI | 53 | | ooIoIoII | 43 | | IoIoIIoo | 172 |
| | ooIooooI | 33 | | IoIooIIo | 166 | | IoIIIooo | 184 | | ooIIIIII | 63 | | IoooIoII | 139 | | ooooIIoo | 12 | | oooIooIo | 18 | | IooIoIoI | 149 |
| | ooIoooIo | 34 | | IoIooIoI | 165 | | IoIIIoII | 187 | | ooIIIIoo | 60 | | IoooIooo | 136 | | ooooIIII | 15 | | oooIoooI | 17 | | IooIoIIo | 150 |
| | ooIooIoo | 36 | | IoIoooII | 163 | | IoIIIIoI | 189 | | ooIIIoIo | 58 | | IoooIIIo | 142 | | ooooIooI | 9 | | oooIoIII | 23 | | IooIoooo | 144 |
| | ooIoIooo | 40 | | IoIoIIII | 175 | | IoIIoooI | 177 | | ooIIoIIo | 54 | | IoooooIo | 130 | | oooooIoI | 5 | | oooIIoII | 27 | | IooIIIoo | 156 |
| | ooIIoooo | 48 | | IoIIoIII | 183 | | IoIoIooI | 169 | | ooIoIIIo | 50 | | IooIIoIo | 154 | | oooIIIoI | 29 | | ooooooII | 3 | | IooooIoo | 132 |
| | oIoooooI | 65 | | IIoooIIo | 198 | | IIoIIooo | 216 | | oIoIIIII | 95 | | IIIoIoII | 235 | | oIIoIIoo | 108 | | oIIIooIo | 114 | | IIIIoIoI | 245 |
| | oIooooIo | 66 | | IIoooIoI | 197 | | IIoIIoII | 219 | | oIoIIIoo | 92 | | IIIoIooo | 232 | | oIIoIIII | 111 | | oIIIoooI | 113 | | IIIIoIoI | 246 |
| | oIoooIoo | 68 | | IIooooII | 195 | | IIoIIIoI | 221 | | oIoIIoIo | 90 | | IIIoIIIo | 238 | | oIIoIooI | 105 | | oIIoIII | 119 | | IIIIoooo | 240 |
| | oIooIooo | 72 | | IIooIIII | 207 | | IIoIoooI | 209 | | oIoIoIIo | 86 | | IIIoooIo | 212 | | oIIooIoI | 101 | | oIIIIoII | 123 | | IIIIIIoo | 252 |
| | oIoIoooo | 80 | | IIoIoIII | 215 | | IIooIooI | 193 | | oIooIIIo | 78 | | IIIIIoIo | 250 | | oIIIIIoI | 125 | | oIIoooII | 99 | | IIIooIoo | 228 |
| | oIIooooo | 96 | | IIIooIII | 231 | | IIIIIooI | 249 | | oIIIIIIo | 126 | | IIooIoIo | 202 | | oIooIIoI | 77 | | oIoIooII | 83 | | IIoIoIoo | 212 |
| | IooooooI | 129 | | oooooIIo | 6 | | oooIIooo | 24 | | IooIIIII | 159 | | ooIoIoII | 43 | | IoIoIIoo | 172 | | IoIIooIo | 178 | | ooIIoIoI | 53 |
| | IoooooIo | 130 | | oooooIoI | 5 | | oooIIoII | 27 | | IooIIIoo | 156 | | ooIoIooo | 40 | | IoIoIIII | 175 | | IoIIoooI | 177 | | ooIIoIIo | 54 |
| | IooooIoo | 132 | | ooooooII | 3 | | oooIIIoI | 29 | | IooIIoIo | 154 | | ooIoIIIo | 46 | | IoIoIooI | 169 | | IoIIoIII | 182 | | ooIIoooo | 48 |
| | IoooIooo | 136 | | ooooIIII | 15 | | oooIoooI | 17 | | IooIoIIo | 150 | | ooIoooIo | 34 | | IoIooIoI | 165 | | IoIIIoII | 187 | | ooIIIIoo | 60 |
| | IooIoooo | 144 | | oooIoIII | 23 | | ooooIooI | 9 | | IoooIIIo | 142 | | ooIIIoIo | 58 | | IoIIIIoI | 189 | | IoIoooII | 163 | | ooIooIoo | 36 |
| | IoIooooo | 160 | | ooIooIII | 39 | | ooIIIooI | 57 | | IoIIIIIo | 190 | | ooooIoIo | 10 | | IooIIoI | 141 | | IooIooII | 147 | | oooIoIoo | 20 |
| | IIoooooo | 192 | | oIoooIII | 71 | | oIoIIooI | 89 | | IIoIIIIo | 222 | | oIIoIoIo | 106 | | IIIoIIoI | 237 | | IIIIooII | 243 | | oIIIoIoo | 116 |

TABLE 15

Anatomy of a sub-pile from Table 14: 1 leader (zero), 8 primary followers (one off), 8 · 7/2 = 28 secondary followers (two off) in 8 secondary sub-piles of 7 for each primary follower, counting each secondary follower twice. Mirror image symmetry with respect to the primary followers. To generate the sub-pile anatomy for any other leader (1–15) in Table 14, take its binary numeral and carryless-add it to each entry in this table.

| | | | Mirror image duplicates of secondary followers | | | | | |
|---|---|---|---|---|---|---|---|---|
| Leader: | oooooooo | | | | | | | |
| Primary | | | ooooooII | 3 | oooooIoI | 5 | ooooIooI | 9 |
| followers: | oooooooI | 1 | | | | | | |
| Secondary | | | | | oooooIIo | 6 | ooooIoIo | 10 |
| followers: | | | ooooooIo | 2 | | | | |
| | ooooooII | 3 | | | | | ooooIIoo | 12 |
| | | | | | oooooIoo | 4 | | |
| | oooooIoI | 5 | oooooIIo | 6 | | | | |
| | | | | | | | ooooIooo | 8 |
| | ooooIooI | 9 | ooooIoIo | 10 | ooooIIoo | 12 | | |
| | oooIoooI | 17 | oooIooIo | 18 | oooIoIoo | 20 | oooIIooo | 24 |
| | ooIooooI | 33 | ooIoooIo | 34 | ooIooIoo | 36 | ooIoIooo | 40 |
| | oIoooooI | 65 | oIooooIo | 66 | oIoooIoo | 68 | oIooIooo | 72 |
| | IoooooooI | 129 | IooooooIo | 130 | IooooIoo | 132 | IoooIooo | 136 |

| | | | Mirror image duplicates of secondary followers | | | | | |
|---|---|---|---|---|---|---|---|---|
| Primary | oooIoooI | 17 | ooIooooI | 33 | oIoooooI | 65 | IoooooooI | 129 |
| followers: | oooIooIo | 18 | ooIoooIo | 34 | oIooooIo | 66 | IooooooIo | 130 |
| Secondary | oooIoIoo | 20 | ooIooIoo | 36 | oIoooIoo | 68 | IooooIoo | 132 |
| followers: | oooIIooo | 24 | ooIoIooo | 40 | oIooIooo | 72 | IoooIooo | 136 |
| | | | ooIIoooo | 48 | oIoIoooo | 80 | IooIoooo | 144 |
| | oooIoooo | 16 | | | | | | |
| | | | | | oIIooooo | 96 | IoIooooo | 160 |
| | | | ooIooooo | 32 | | | | |
| | ooIIoooo | 48 | | | | | IIoooooo | 192 |
| | | | | | oIoooooo | 64 | | |
| | oIoIoooo | 80 | oIIooooo | 96 | | | | |
| | | | | | | | Ioooooooo | 128 |
| | IooIoooo | 144 | IoIooooo | 160 | IIoooooo | 192 | | |

What has been described is an exhaustive class of workable assignments of EDAC digits to the totality of information codes in any system. In one aspect, Hamming codes appear to represent one of these possible assignments in a given size system (since they work). Out of the totality, what has been selected is a technique that applies wholesale to systems of all sizes. What the two approaches have in common within the totality is the parity bit.

Applicants' other EDAC digits (other than the parity digit) are not parity on any particular group of digits. For simplicity, a zero position may be assigned to the parity bit. Then our Carryless Sum technique will hold without qualification, exception or modulus. This is an improvement over other error coping methods.

Depending on the media, etc. which stores or carries applicants' error correcting and/or detecting binary coding, it may be desirable to augment their EDAC technique to provide further reliability. This may be done without adding more bits. For example, in the 8 place system including parity described above, one valid code is 00000000 (8 zeros) and another is 11111111 (8 ones) and the remaining valid codes are each comprised of 4 zeros and 4 ones. Thus, the disparity in this regard may be as many as eight. If only those valid codes that contained 4 zeros and 4 ones were used, various errors beyond the scope of the EDAC described may be thus detected, namely any error which results in something other than 4 zeros and 4 ones. Also, the number of consecutive 0s and/or 1s may be limited, so as to detect error if more consecutive 0s or 1s than this limit occur. Selection of the parity convention may also be made in accord with these considerations. In other words, the EDAC digits and the information digits may be located where suitable, as long as they are assigned position numbers in accord with the above.

Tables 16, 17 and 18 below show three ways the 8 place system including parity may be arranged with various possible assignments of EDAC for the information, to change the disparity in the number of 0 and 1 digits and/or the number of consecutive 0s and 1s possible in the 16 valid codes possible (as described above).

Table 16 assigns an EDAC of 1111 to information 0000 and alternates EDAC bits (shown below the base line) with the information bits, starting with the parity bit. The transformers used, a baselined form and the gross value are also shown. Table 17 assigns an EDAC of 1111 to information 0000 and locates the EDAC bits in accord with their position numbers starting with 1 on the right and assigning the 8th position number to the parity bit. EDAC bits are shown below both the baseline and baselined. In Tables 16 and 17, six is the maximum number of either digit as well as the maximum number of consecutive similar digits.

The first column of Table 18 shows what might be contained in a "lookup" table associated with this 8 place system. The first 4 binary digits shown are the information and the second 4 binary digits are the EDAC cluster with the parity digit first. The next column shows the value of the EDAC digits (ignoring the parity digit). The column on the right contains the transformers used.

To generate a variant of the simpler systems first described (for example to rule out all-zero and/or all-one messages), an EDAC value other than all-zeroes is assigned to zero information. This arbitrary assignment should not include the parity bit in zero position; it should be used simply to establish and maintain whichever parity is desired, throughout all system sizes. This would seem to be another improvement over other techniques: the positions and position numbers for all EDAC digits are reserved beforehand, and need not be specially placed, searched for or calculated in any particular case.

The following may be used to determine the EDAC value for a given information position number without, e.g., a lookup table referencing the consecutive position numbers to position numbers which have skipped the powers of 2.

Let x=info position number=1+exponent of 2; info=$2^{x-1}$;

Let y=EDAC value for $2^{x-1}$;

Let L=INT $\log_2$ x=INT (ln x/ln 2), the exponent of the biggest $2^n$ less than or equal to x;

L+1=the exponent of the smallest $2^n$ greater than x;

Then:

$$y = x + L + 1 \begin{cases} +0 & \text{if } x + L + 1 \text{ is less than } 2^{L+1} \\ +1 & \text{if } x + L + 1 \text{ is greater than or equal to } 2^{L+1} \end{cases}$$

TABLE 16

| info value | | edac value | trans-former | | gross value |
|---|---|---|---|---|---|
| 0 | $I^oI^oI^oI^o$ | 7 | 3 | IoIoIoIo | 170 |
| 1 | $o^oI^oo^oo^I$ | 4 | 6 | ooIooooI | 33 |
| 2 | $o^oo^oI^Io^o$ | 2 | 3 | ooooIIoo | 12 |
| 3 | $I^oo^oo^II^I$ | 1 | 0 | IooooIII | 135 |
| 4 | $o^oo^Io^oI^o$ | 1 | 3 | oooIooIo | 18 |
| 5 | $I^oo^II^oo^I$ | 2 | 6 | IooIIooI | 153 |
| 6 | $I^oI^Io^Io^o$ | 4 | 3 | IoIIoIoo | 180 |
| 7 | $o^oI^II^II^I$ | 7 | 7 | ooIIIIII | 63 |
| 8 | $I^Io^oo^oo^o$ | 0 | 3 | IIoooooo | 192 |
| 9 | $o^Io^oI^oI^I$ | 3 | 6 | oIooIoII | 75 |
| 10 | $o^II^oo^II^o$ | 5 | 3 | oIIooIIo | 102 |
| 11 | $I^II^oI^Io^I$ | 6 | 0 | IIIoIIoI | 237 |
| 12 | $o^II^II^oo^o$ | 6 | 3 | oIIIIooo | 120 |
| 13 | $I^II^Io^oI^I$ | 5 | 6 | IIIIooII | 243 |
| 14 | $I^Io^II^II^o$ | 3 | 3 | IIoIIIIo | 222 |
| 15 | $o^Io^Io^Io^I$ | 0 | | oIoIoIoI | 85 |

TABLE 17

| | | |
|---|---|---|
| 0 | $I^{ooo}I^oII$ | IoooIoII |
| 1 | $o^{ooo}I^Ioo$ | ooooIIoo |
| 2 | $o^{ooI}o^oIo$ | oooIooIo |
| 3 | $I^{ooI}o^IoI$ | IooIoIoI |
| 4 | $o^{oIo}o^ooI$ | ooIooooI |
| 5 | $I^{oIo}o^IIo$ | IoIooIIo |
| 6 | $I^{oII}I^ooo$ | IoIIIooo |
| 7 | $o^{oII}I^III$ | ooIIIIII |

TABLE 17-continued

| | | |
|---|---|---|
| 8 | $I^{Ioo}o^ooo$ | IIoooooo |
| 9 | $o^{Ioo}o^III$ | oIoooIII |
| 10 | $o^{IoI}I^ooI$ | oIoIIooI |
| 11 | $I^{IoI}I^IIo$ | IIoIIIIo |
| 12 | $o^{IIo}I^oIo$ | oIIoIoIo |
| 13 | $I^{IIo}I^IoI$ | IIIoIIoI |
| 14 | $I^{III}o^oII$ | IIIIooII |
| 15 | $o^{III}o^Ioo$ | oIIIoIoo |

TABLE 18

| | | | | |
|---|---|---|---|---|
| 0 | oIoI | oIoI | 5 | 3 |
| 1 | oIoo | IIIo | 6 | 6 |
| 2 | oIII | Iooo | 0 | 3 |
| 3 | oIIo | ooII | 3 | 0 |
| 4 | oooI | IoII | 3 | 3 |
| 5 | oooo | oooo | 0 | 6 |
| 6 | ooII | oIIo | 6 | 3 |
| 7 | ooIo | IIoI | 5 | 7 |
| 8 | IIoI | ooIo | 2 | 3 |
| 9 | IIoo | IooI | 1 | 6 |
| 10 | IIII | IIII | 7 | 3 |
| 11 | IIIo | oIoo | 4 | 0 |
| 12 | IooI | IIoo | 4 | 3 |
| 13 | Iooo | oIII | 7 | 6 |
| 14 | IoII | oooI | 1 | 3 |
| 15 | IoIo | IoIo | 2 | |

Increased error detecting and correcting may be provided if all correct binary words were different from each other in at least five binary place positions (e.g., any two errors may be corrected, etc). In one embodiment, a fixed number of additional EDAC digits are used to accomplish this. Using techniques demonstrated and described above, applicants discovered that the additional required EDAC positions are places 3, 5 and 6. These additional EDAC digits (double underlined) and the previously required EDAC digits (single underlined) are shown below in blended form for a binary word comprised of 23 places, signified by 23 binary zeros on the top line:

| | | | | | | | | | | | | | | | | | | | | | | | |
|---|---|---|---|---|---|---|---|---|---|---|---|---|---|---|---|---|---|---|---|---|---|---|---|
| . . . | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| . . . | 23 | 22 | 21 | 20 | 19 | 18 | 17 | $\underline{16}$ | 15 | 14 | 13 | 12 | 11 | 10 | 9 | $\underline{8}$ | 7 | $\underline{\underline{6}}$ | $\underline{\underline{5}}$ | $\underline{4}$ | $\underline{\underline{3}}$ | $\underline{2}$ | $\underline{1}$ |

Thus, position numbers 1, 2, 3, 4, 5, 6, 8, 16 . . . are assigned to the required EDAC places for the increased EDAC ability which is based on the principle that all valid codes are different from each other valid code in at least five binary place positions.

Sub-piles, clusters, methods of operation, one additional parity bit, etc. are similar to the demonstrations and description above.

EDAC Multi-Scan Lines

Some bar code reading devices employ a scanning beam such as a laser light beam, the beam emanating from an emitter such as a laser diode. Often, the beam is made to scan by mechanical means which may include rotating multi-sided mirrored (i.e., reflective) surfaces, similar to the rotating multi-sided mirrored surfaces used to cause a laser beam to scan in common 300 dpi desk top plain paper laser printers. The multi-sided mirrored surfaces may be, e.g., the eight distinct flat or somewhat curved exterior surfaces of a part shaped like the cam (a regular octagonal prism) which operates the points in a distributor for an eight cylinder auto engine. While in a distributor these eight surfaces may be parallel to the axis about which the cam rotates, in laser devices each of the eight surfaces may (or may not) be inclined toward the axis at a similar angle, making the shape of the cam a truncated octagonal pyramid, e.g., each of the eight flat surfaces at a 15 degree vertex angle of an inscribed cone. This "optical cam," which may be mounted to a shaft-like part which may be rotated by an electric motor, is mounted so as to reflect the laser beam and cause it to scan along one line. The width of the one line is approximately the diameter of the beam. Because each mirrored surface is made at the same angle, each surface causes the beam to scan along the same one line. (See, e.g., PC Magazine's, Volume 7 No. 12, Jun. 28, 1988 article on 27 bar code readers, page 213.)

In essence, the beam is projected along this one scan line to "read" the bar code symbol. If the bar code contains an unwanted spot, e.g., from a flaw in the paper, this one scan line may, under some circumstances, only illuminate along a line through the bar code where this one spot is located which may prevent a reading or necessitate scanning along another line (requiring relative movement between the scanning device and the bar code symbol) to get a reading which takes more time and/or may cause a misread and is undesirable.

In accordance with the invention, the reflective, e.g., mirrored, surfaces are made so that they are not all at the same angle which causes the scan lines to project on the bar code along different lines, thus possibly avoiding the troublesome spot. Two or more angles may be used to correspondingly project two or more scan line. For example, for a hexagonal prism having 8 mirrored surfaces, as many as 8 distinct displaced scan lines may be projected. The angle of the 8 mirrored surfaces may be all different or four surfaces could be made at one angle and the other four (interspersed) surfaces at another angle, making two distinct displaced scan lines, etc. (which would make the cam more easily balanced for high speed rotation).

The difference required in the angle from one mirrored surface to another mirrored surface would be relatively small, e.g., about one degree. The amount of the displacement of the scan lines, at a desired distance or a range of distances, may be controlled by the difference(s) of these angles.

Displaced scan lines may be parallel to each other or, by changing other angles of one or more of these reflective surfaces, the scan lines may not be parallel to each other.

An optical cam as described may have more or less than eight reflective surfaces. Some scanning devices may rotate as few as one mirrored surface (such as Symbol Technologies' model LS 8000 hand held scanner) to cause a beam to scan, in which case, according to the invention, two or more beams would be employed (or one beam and a beam splitter would be used, etc.), which beams are displaced from each other by, e.g., mounting two beam emitters in different locations, and/or at different angles, so as to cause the two emitters to produce two separated beams to be reflected by the one reflective surface along two scan lines which are displaced from each other, thus also possibly avoiding a troublesome spot or other flaw.

Two correspondingly mounted beam detectors (or a number corresponding to the number of beams) may be used to sense each beam simultaneously so that two readings may be generated for decoding, or two beam emitters may be alternately turned on and off. Provision could be made, e.g., with another mirrored surface mounted in a fixed position, so that only one detector may be required to detect the two displaced beams returning from the bar code "target" as the two emitters are alternately turned on and off.

Similarly, a beam or beams may be made to scan along displaced lines for any imaging device, as well as (bar code) sensing devices.

This system improves the first time read rate and/or reduces the time required to get a bar code reading and may also be used to reduce the risk of a misread. If more than one (different) reading, such as two readings from two successive displaced scans, are compared and are not the same, one reading must be a misread, and therefore one or more additional readings may be taken for further comparison. This system of security used with, for example, a bar code, may be called EDAC movement and may be used with and augment other EDAC. In a way, the improved performance may be compared to the Wallpaper coding described above, in that more than one distinct reading of the same bar coded information make be taken to decrease the risk of a misread.

Figure 37:
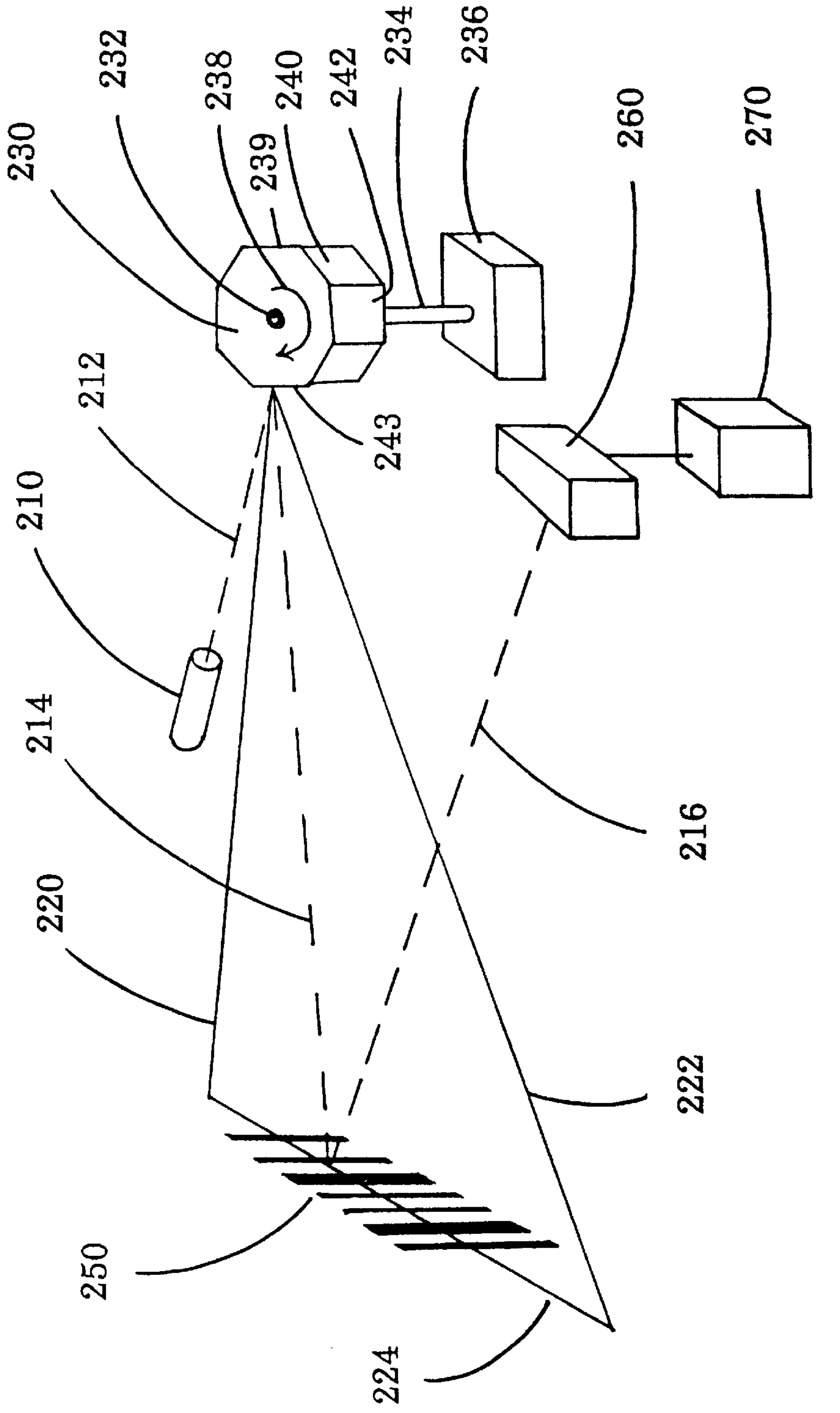
FIG. 37 shows a bar code reading device with differently angled reflective surfaces on an optical cam.

FIG. 37 depicts components of a bar code reading device, the laser beam it emits and a reflected beam from a bar code target. 230 represents a hexagonal optical cam which is rotated in the direction indicated by arrow 238 about a center axis indicated by center point 232. The cam 230 is coupled by shaft 234 to motor 236 which rotates shaft 234 and cam 230.

According to the invention, reflective surface 240 and reflective surface 242 are angled slightly differently toward the axis about which they rotate, thus creating two different scan lines (not shown) which are slightly displaced vertically from each other. (Surface 240 and 242 are depicted by way of example; other reflective surfaces of cam 230 may be angled slightly differently toward the axis as well, as described above.) The scan line depicted in FIG. 37 is reflected from reflective surface 243, which is opposite surface 239. This one scan line is represented by line 224. Lines 220 and 222 show the complete triangular scan path forming scan line 224 from reflective surface 243. The laser emitter is depicted by 210 emitting a beam 212 (shown as a dashed line) which is reflected from reflective surface 243 on cam 230 along beam path 214 to the bar code 250. The beam is then reflected from the bar code along path 216 to the beam detector 260 which senses the beam and sends corresponding signals to decoder 270 for decoding the bar code.

Figure 38:
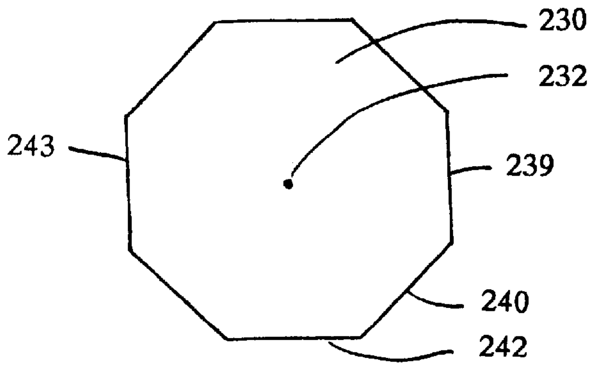
FIG. 38 is a top view of one embodiment of an optical cam.
Figure 39:
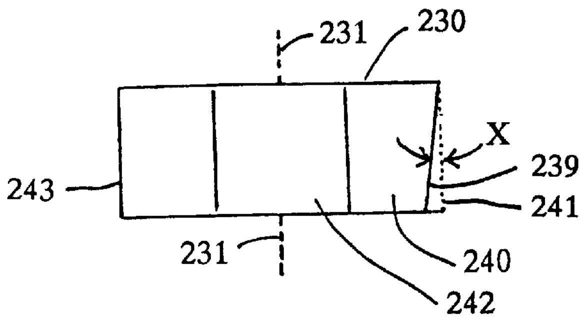
FIG. 39 is a side view the optical cam shown in FIG. 38.

FIG. 38 is a top view of cam 230 from FIG. 37. (FIGS. 37, 38 and 39 use like numbers in referring to like parts, surfaces, etc.) FIG. 38 shows center axis point 232 and reflective surfaces 239, 240, 242 and 243. FIG. 39 is a side view of cam 230. The axis about which 230 rotates is represented by dashed line 231. Surface 243 is depicted to be parallel to axis 231. However, according to the invention, surface 239, which is opposite surface 243, is not similarly parallel and is at an "x" angle with respect to axis 231 and surface 243 (represented by dashed line 241). Angle x, shown exaggerated in FIG. 39, is in the order of 1 degree. As mentioned, all reflective surfaces of cam 230 may be angled slightly differently (but all in the order of 1 degree) with respect to axis 231 of FIG. 39, or all reflective surfaces may conform to one of two such angles, etc.

Figure 40:
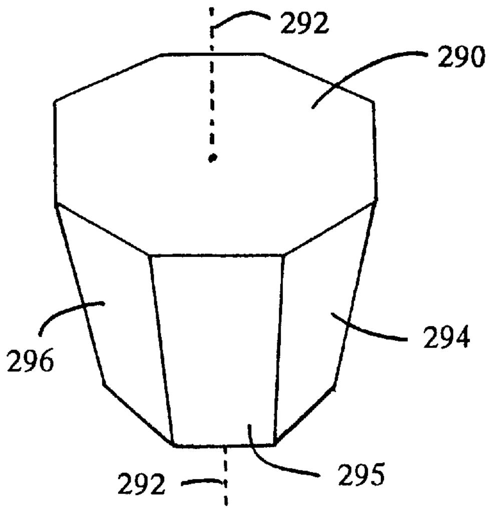
FIG. 40 is a view of another possible embodiment of an optical cam.

FIG. 40 depicts a view of a truncated octagonal pyramid shaped optical cam 290 (with 8 reflective surfaces) which may also be used to create displaced scan lines. Dashed line 292 depicts the axis about which cam 290 rotates. In accord with the invention, surfaces 294, 295 and 296 may be made to respectively conform to more than one angle relative to axis 292. For example, if surface 294 was angled differently than surface 295, respective scan lines reflected from these two surfaces 294 and 295 would be displaced from each other in accord with the invention as described above.

While reflective optical elements have been shown and described, other optical elements such as refractive optical elements may be used to achieve the functions described.

Multiple Line Bar Codes

A bar code according to the invention may have more than a single line of bar code elements, i.e., a line of bar code elements arranged in a row or in a column, and may have a plurality of lines of bar code elements arranged in a plurality or rows and/or a plurality of columns. Such multi-line bar codes have, for example, increased information capacity. Applicants' U.S. Pat. No. 4,814,589 discloses a multi-line bar code, which applicants refer to therein as a "checker board" code.

BCB and 2X Max in accordance with the invention may be assembled into a multi-line bar code. In the case of BCB, since the binary digit/code element ratio is fixed (2 code elements per digit), the lengths of lines of code for the same number, n, of digits are the same. Multi-line BCB bar codes, as depicted for example in FIGS. 41 and 42, have the appearance of what one may visualize as computer language printed on paper.

According to the invention, BCB in a multi-line code allows use of parity for each row and each column of code elements. For example, in the multi-line embodiments of FIGS. 41 and 42, one row and one column, e.g., the last (bottom) row of the bar code symbol and the last (rightmost) column of the bar code symbol may contain parity digits for the code elements of the respective column and row, as described below.

Figure 41:
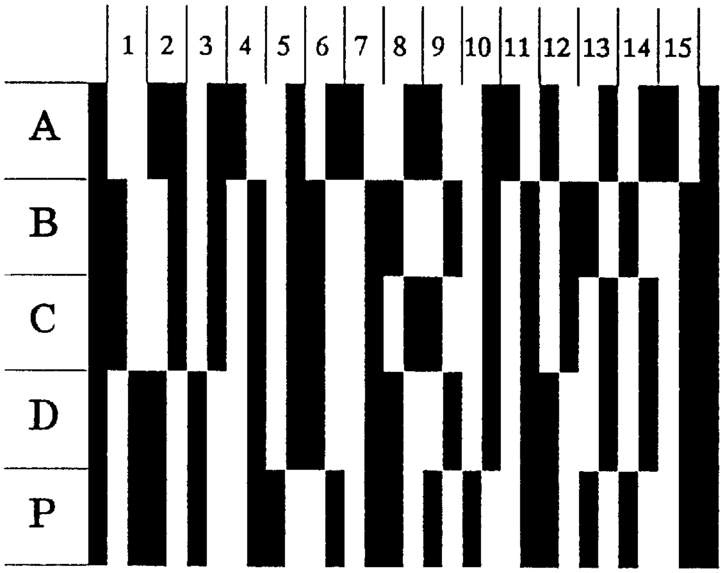
FIG. 41 shows a multiple line BCB bar code representing BCB 2D.
Figure 42:
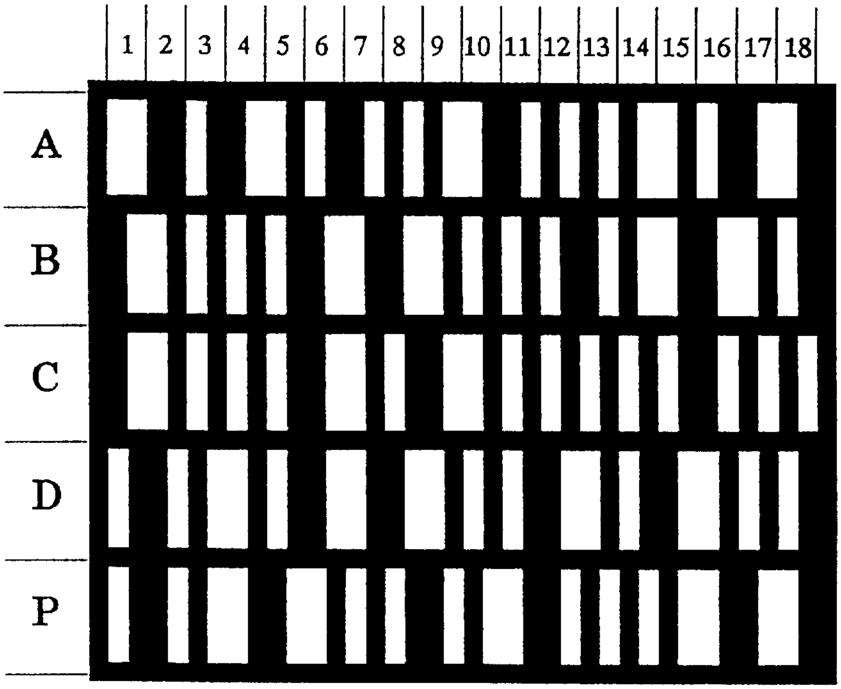
FIG. 42 shows a multiple line BCB bar code representing BCB 2D with bearer bars and horizontal bars between lines of the bar code.

Multi-line BCB bar codes are referred to by applicants as BCB 2D symbols, "2D" indicating two dimensions. In the embodiments of the BCB 2D symbols shown in FIGS. 41 and 42, x is the width of one module and is 0.1", the width of each BCB digit is 2x, and the nominal height, h, of each row is 5x. In FIGS. 41 and 42, the letters A, B, C, D and P along the left side of the respective bar code symbol each designate a row of bar code elements, and the numbers 1–15 (FIG. 41) and 1–18 (FIG. 42) each designate a respective column of bar code elements. The leftmost column is comprised of 1x width black modules. The rightmost column is comprised of 1x width black modules. These two 1x columns provide a reference for each end of the BCB 2D symbol and are ignored for calculations. Means to orient the symbol is described below. (As described above, because of these leftmost and rightmost 1x black columns, the first and last wide stripes on each row must be black, and must alternate with any possible wide white stripes.) The quiet zone on each side of these 1x columns and above and below the symbol is preferred by applicants to be 3x in width (or a 1x width bearer bar may be used above and below the symbol with no top or bottom quiet zone. FIG. 42 is shown with 1x width black bearer bars and with 1x width black horizontal bars between each row).

In FIG. 41, the number of x width modules between the left and right columns is 30, comprising a maximum of 15 BCB digits. This is the minimum preferred number in BCB 2D embodiments and additional BCB digits may be included in each row (in multiples of seven in these embodiments). The top row always contains two pairs of modules which are not BCB digits, as described below.

In FIG. 41, the first 6 modules of the top row are the ending pattern of the symbol and provide required orientation (leftmost; using the column numbers on top and the row letters along the left side, the first 6 modules occupy position locations A1, A2 and A3): from left to right; white,white (A1), black,black (A2) and one BCB 0 (white,black) (A3), followed by position A4 which is a parity digit explained below, followed by 4 format indicating BCB digits, A5, A6, A7 and A8, followed by 3 BCB digits, A9, A10 and A11, which indicate the number of rows in the BCB 2D symbol (unless specified different for a particular format), followed by positions A12, A13 and A14 which are parity digits explained below, followed by leading zeros, if required (in the top row if more BCB digits are included in each row or on the next row), followed by the most significant digit of the message. In FIGS. 41 and 42 the most significant digit of the message is B1. As explained below, the rightmost column and the bottom row are comprised of parity digits.

BCB 2D symbols contain at least two rows. The 3 BCB digits which indicate the number of rows in the BCB 2D symbol do so in binary arithmetic except that 0000 indicates 8 rows. If more than 8 rows are present these 3 BCB digits indicate the residue of the number of rows reduced modulo 8.

BCB 2D Formats include: 0000 for numerical information only represented in binary; 0001 for whopper coded alphanumeric message using Code 49's character set (as specified by Intermec Inc.); 0010 for ASCII (7 BCB digits per ASCII character, as described above, e.g., see Table 1); 0011 for ASCII but three additional BCB digits are included on each row between the BCB message digits and the rightmost column of parity digits (these three digits indicate the row number, described below); etc.

A switch pattern comprised of a BCB 0 digit, white,white, black,black, and a BCB 0 digit (as described, e.g., in association with FIGS. 33 and 34) may be used as described above. A switch pattern may be located on two lines, i.e., the first BCB digit 0 and/or the pairs of modules may be located rightmost on a row before the respective BCB parity digit (FIG. 41) or BCB line number digits (FIG. 42) of that row, or the pairs of modules or the last BCB digit 0 of the switch pattern may be located leftmost on the row below. However, if use of a switch pattern on two lines would cause three modules of the same color to be adjacent, leading zeros, e.g., would be used to avoid such three modules: leading zeros may be used to make all eight modules of the switch pattern appear leftmost on the row below. Many other aspects of the invention described above and below may also be used with BCB 2D.

Parity conventions are even BCB 0 digits for the examples described below. Referring to FIG. 41, positions A1, A2 and A3 (and any white,white or black,black pairs, if used) are not included in parity determination. Positions A1, A2 and A3 are ignored for parity considerations because they are completely predictable (they are not mentioned again below). The various parity digits are determined and included as described below, (referring, by way of example, to FIG. 41):

1) Parity is independently determined for each row (except the bottom row, i.e., the last row) and the required parity digit for respective rows is inserted in column 15. Parity consideration for the top row (the first row) does not include the following BCB digits: A4, A12, A13 and A14. The last (bottom) BCB parity digit in column 15 (position P15) is determined and included to provide parity on all BCB parity digits that have been inserted above P15 in column 15.

2) Parity is independently determined for each remaining column (columns 1 through 14 in FIG. 41, the last column 15 already being completed). The required parity digit for respective columns is inserted in row P. BCB digits in positions A12, A13 and A14 are not considered for the column parity determinations. Parity for the completed row P is then determined (including P15) and the required parity digit is provided elsewhere, in position A4 (on the top row).

3) Parity is then determined for the total number of BCB digits in the symbol, except positions A13 and A14, and the required parity digit is provided in position A12.

4) Parity is determined for the first half of the total number of BCB digits (counting left to right, top to bottom, starting with position A4) excluding position A14, and the required parity digit is provided in position A13. If this total number of BCB digits is odd, the extra digit is included in this first half.

5) Parity is determined for the remaining half of the total number of BCB digits (which excludes position A13) and the required parity digit is provided in position A14.

(In another embodiment, applicants determine parity on half the digits (comparable to steps 4 and 5 above) by considering every other BCB digit (alternate digits) first, and then considering the in-between remaining digits. Other variations are possible.)

Parity for FIGS. 41 and 42 was determined in this manner by applicants. The BCB digits represented in FIG. 41 are as follows (shown with spaces for convenience):

| | | |
|---|---|---|
| ——0 1 0 0 1 | 0 1 0 1 1 0 0 | 1 |
| 1 0 0 0 0 1 0 | 1 0 0 0 0 1 1 | 0 |
| 1 0 0 0 0 1 0 | 0 1 0 0 0 0 0 | 0 |
| 0 1 1 0 0 1 0 | 1 0 0 0 1 0 0 | 0 |
| 0 1 1 0 1 0 0 | 1 1 1 0 1 1 1 | 0 |

The BCB digits represented in FIG. 42 are as follows (shown with spaces for convenience):

| | | | |
|---|---|---|---|
| ——0 1 0 0 1 | 1 1 0 1 1 1 1 | 0 0 1 | 0 |
| 1 0 0 0 0 1 0 | 1 0 0 0 0 1 1 | 0 1 0 | 0 |
| 1 0 0 0 0 1 0 | 0 1 0 0 0 0 0 | 0 1 1 | 1 |
| 0 1 1 0 0 1 0 | 1 0 0 0 1 0 0 | 1 0 0 | 0 |
| 0 1 1 0 1 0 0 | 0 1 1 0 1 1 1 | 1 0 1 | 0 |

FIG. 41 depicts format 0010, ASCII (denoted in position numbers A5, A6, A7 and A8). The message illustrated is, “BCB 2D” (not including the quotes). The digits 101 are located in positions A9, A10 and A11, respectively, indicating that there are five rows in the symbol. The first 7 BCB digits in row B represent the upper case B, the next 7 represent C, the first seven of row C represent B, the next 7 represent a space, the first seven of row D represent 2, the and next 7 represent D. Row P and column 15 contain BCB parity digits. The parity row and column and positions are filled as described above.

FIG. 42, similar to FIG. 41, depicts format 0011, ASCII with line numbers. The message illustrated is the same as FIG. 41. Columns 15, 16 and 17 contain respective line (row) numbers, i.e., row A is 001, row B is 010, row C is 011, row D is 100, and row P is 101. (If 8 rows were present, the 8th row would be numbered 000.)

FIG. 43 is a reduction to 25% size produced on an office copying machine of the BCB 2D bar code symbols illustrated in FIGS. 41 and 42. Thus, the x width shown in FIG. 43 is approximately 0.025".

The use of multiple parity as described above imparts multiple error detecting and correcting. The EDAC operates in accord with the various descriptions above. A switch error, for example, may be located in the row it occurs by the parity convention for that row and further located in that row by the parity convention for that column.

Other Applications

Version A UPC symbols may be read by orthogonal slot scanners in two halves, a left half and a right half, as described, e.g., in Bar Code Symbology, by Dr. David Allais, page 7, © Intermec, 1985. A BCB bar code of suitable length (message capacity) may be separated into two halves so as to be read in similar fashion as Version A UPC symbols. At the separation point, a single black stripe may be added to the left half and a single black stripe may be added to the right half to delineate the two halves. More than one stripe may also be used for this purpose. These stripes, and/or the stripes on the ends of the symbol, may be lengthened to allow larger tilt reading angles. In this embodiment, the overall height of the bar code may be appropriately determined (increased) to further facilitate reading.

Other base codes, such as base 4 (quartal), base 8 (octal), base 16 (hexadecimal), etc., may be used with the principles described for BCB. For example, a quartal system could use stripes as follows to represent the digits 0, 1, 2 and 3:

base 4 digit 0 =
base 4 digit 1 =
base 4 digit 2 =
base 4 digit 3 =

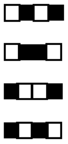

As mentioned above, regarding binary coding for other purposes, such as other bar codes, communications, storage, etc., the inventions described, such as binarily complemented bits, short-read protection, error correction via parity, clusters, floating point, interleaved messages, repeated coding, whoppers, compatible numerical and alphanumeric messages, efficiency, EDAC clusters and other EDAC techniques and so forth, may be applied by those skilled in the art.

Figure 23:
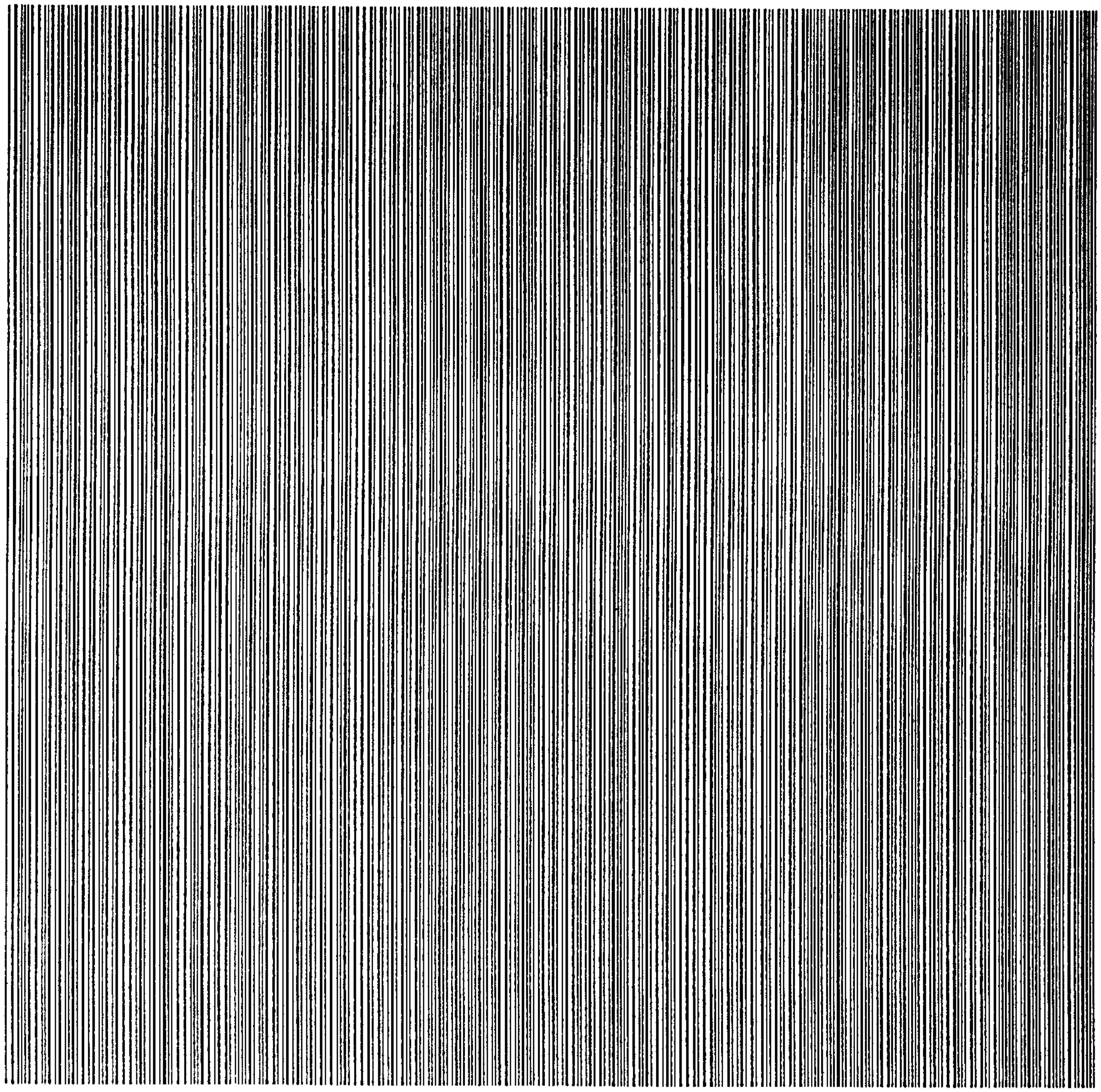
FIG. 23 shows a large square BCB bar code in Format A for ASCII.

By way of visual summary, and to demonstrate an unusually shaped BCB bar code symbol, FIG. 23 shows a large, square BCB bar code in Format A, the full ASCII set, representing the following forty-five (45) upper and lower case alphanumeric characters (x=0.01"):

! " #$ % & ' ( ) 0 1 2 3 4 5 6 7 8 9 a b c d e f g h i j k l m n o p q r s t u v w x y z

Operating With A Defective Storage

In addition to error detection and error correction as described above for coding, bar codes, signals, etc., the invention is applicable to hardware failure in which a storage or other element is capable of assuming only one of the two binary logic levels. Such a defective storage element is referred to in U.S. Pat. No. 3,768,071 (Knauft et al.) as a "stuck bit." The Knauft '071 Patent describes a method and system for operating with such a defective storage element as follows. An additional storage element in addition to the data bits is provided for a word to be stored. A stored word is read, and if an error is detected, the error-free elements of the word are inverted, and the word is marked as an inverted word in the additional storage element, and then stored in this form. The word may be read again and if an error is detected in the inverted word the operation of the apparatus may be interrupted.

U.S. Pat. No. 3,421,148 (Howells et al.) discloses a similar technique for operating with such a defective storage including detecting an error using a Hamming check.

In both the Knauft et al '071 Patent and the Howells et al. '148 Patent, appropriate arrangements (to retrieve the original correct information) must be made to process the word once it has been inverted, e.g., the word must be re-inverted again as disclosed in the Knauft et al. '071 Patent.

Applicants' U.S. Pat. No. 4,814,589 and copending application Ser. No. 109,075 disclose coding which equates the informational content of a set of binary code elements representing binary logic levels with an inverted set of binary code elements. Applicants teach that a one code element error in a set of code elements may be tolerated if all error-free code elements are inverted, and the information represented by the inverted set of code elements is equated to the information represented by the original set of code elements. By equating the information carried by the original and inverted set of code elements, the applicants obviate the need to keep track of whether a particular set of code elements, or a word, is inverted or not. According to applicants' invention, a word thus inverted need not be re-inverted to retrieve the original information, since the original word's information is equated with its respective inverted words' information.

According to the invention herein, two or more defective bits may be accommodated similarly, provided however, that the information required to be stored and the two or more stuck bits happen to coincide. For example, if two bits of a register were both stuck in respective positions, whatever those positions happened to be, information could be stored in the register with this scheme if the information bits of either the original form or the inverted form coincided with the positions the two stuck bits were struck in. Thus, half of all possible information that may be contained in a particular register with two stuck bits can be accommodated therein. Minimally, such a scheme would be more useful if it incorporated two bit error detection coding, such as described above.

If a binary parity convention is to be used with a binary word whose inverted form is equated in meaning to the word's original form (and no means are provided to distinguish between the original and inverted form), the word must contain an even number of bits (including the parity bit), because if the word contained an odd number of bits, parity would change from original form to inverted form. For example, if a word contained an odd number of total bits, and if the given parity convention is that the word contains an even number of binary 0 bits in the original form, when inverted, the word would contain an odd number of binary 0 bits, because a word containing an odd total number of bits and an even number of 0 bits must contain an odd number of 1 bits. When this word (with an odd number of 1 bits) is inverted, the number of 0 bits will be odd, and this would not conform with the given parity convention.

Means For Indicating Inverted Words

In accordance with another aspect of the invention, a method is provided for detecting when binary information is in its original form or inverted form, without the use of a "marking or tag" bit. This method offers another choice for indicating the orientation of binary information, and may enjoy use in various binary applications. Such information may have error detection and/or error correction means associated therewith, e.g., a Hamming code.

The method is comprised of representing information with an odd number of binary logic levels and associating an original form of the information with an odd number of a first of the two binary logic levels contained in the information and an inverted form of the information with an even number of the first binary logic levels contained in the information.

For example, if a word contained an odd number of bits such as 7 bits, convention can be established wherein any odd number of binary 1 bits (1, 3, 5 or 7 binary 1s) in a given 7 bit word indicates that the information is in original form. According to this convention, if a given 7 bit word with an odd number of bits is inverted, the inverted form must then contain an even number of binary 1s because the word contains a total of 7 bits (in a similar vein, if an odd number is subtracted from an odd number, the result is even). In other words, if a given word with an odd number of 1 bits is detected, in accord with this convention, it may be readily detected that the information is in original form because if the given word were in inverted form it would have an even number of binary 1s. Since, according to this convention for a 7 bit word, original information can only have an odd number of binary 1s, the maximum number of original words of information possible is $2^6$, or 64 (not $2^7$, or 128).

It may be noted that the number of bits required for a given amount of information is the same if a marking or tag bit is used instead to keep track of inversions, and that applicants' invention in this aspect is useful for words, or portions thereof, with an odd number of bits as described.

Applicants' method for indicating the orientation of information, however, is not applicable to word lengths with an odd number of bits, e.g., 7 bits, since binary parity as such cannot be applied within, e.g., 7 bit words. However, in the above example, an 8th bit may be associated with each 7 bit word to maintain binary parity, e.g., in order to detect one or any odd number of errors which may occur. When a word with the associated 8th bit is inverted, the 8th bit would also be inverted. However, when determining the orientation of the word by detecting whether or not the number of 1 bits is odd or even, the 8th bit would be ignored. (Error coping means other than parity may also be incorporated.)

Bar Coded Serial Numbers & Information Systems

A purpose of serial numbers is to uniquely identify things. Serial numbers may also help protect unauthorized duplication of things. Serial numbers may also help in recovering stolen things and in apprehending thieves who stole or pass them. While serial numbers have been around for a long time, these potential benefits of serial numbers have been neglected. Moreover, serial numbers may serve dramatic new purposes in the Information Age in which we live.

Fingerprints/Bar Coded Serial Numbers

Serious use of fingerprints was first achieved by Americans just after the turn of the century (although fingerprint identification owes its inception to the British). Despite the relative difficulty of acquiring and categorizing fingerprints, 200,000,000 or so are on file with the FBI (growing by about 30,000 daily). About 80 foreign nations participate in an international exchange of fingerprints with the FBI. Today, fingerprints are an indispensable aid to law enforcement.

Bar coded serial numbers on objects may be compared with fingerprints on people. Fingerprints and serial numbers may provide many similar benefits and bar coded serial numbers provide additional dramatic benefits that fingerprints cannot provide.

Fingerprints are unique for each person, and each serial number authorized in a given application is unique. Thus, serial numbers may serve to reveal an object's true identity, as fingerprints reveal an individual's.

Because of the billions of dollars lost annually to counterfeits, e.g., in the record industry, in the designer garment industry, from the treasury, etc., there is a need to uniquely identify authorized objects to detect counterfeits. Where good counterfeits are involved, for practical purposes, it may otherwise be impossible to tell a real cassette, or pair of jeans, or a $100 bill from a counterfeit copy.

Fingerprints are acquired manually and are and analyzed (partially by computer) with significant difficulty and only on isolated occasions. Bar codes are applied automatically, and are read and analyzed automatically by computer, and are used, collected and stored frequently.

By comparison, an information system for bar coded serial numbers is almost totally automated compared to an information system for fingerprints. A serial number data base may grow larger and quicker, because it is easier to get and use information from bar codes.

A fingerprint cannot be copied or changed easily, while a bar coded serial number can be copied or changed easily. While this is a clear distinction between fingerprints and bar codes, it is of little matter to an information system. What disadvantage exists because bar codes may be easily copied or changed, an information system data base may make up for. If a bar coded serial number is changed, or if it is copied, it can only be changed or copied to one of following two cases.

First case: a bar coded serial number can be changed or copied to an unauthorized serial number, which is any number that has not been issued or authorized. In this first case, any unauthorized serial number may be detected when it is compared in the system's data base because the data base records all serial numbers that have been issued. However, in order for a fingerprint to be useful it also must be compared to another fingerprint, typically with the help of a data base. One fingerprint alone, like one serial number alone, means little. Just as fingerprints must be compared to other fingerprints, serial numbers must be compared to other serial numbers.

Second case: a serial number can be changed or copied to an authorized serial number. This may be detected because one purpose of an accountability information system is to track the location, actual or estimated, of objects having authorized serial numbers. If an object with a duplicate serial number is found, it means that one of the objects has a changed or copied serial number, or if an object is found in a location different than where the authorized object should be located, it means that that object has a changed or copied serial number.

If a bar coded serial number is changed or copied, it may be detected with the use of a computer data base. Data bases may make each set of fingerprints and each serial number accountable. Just as one cannot dupe a fingerprint, if a data base is utilized, one cannot dupe a serial number.

While a fingerprint information system is indispensable for positively identifying criminals, bar coded serial number systems applied to objects, such as currency, may be indispensable for detecting and tracking (or backtracking) criminals. The combination of a fingerprint information system and a bar coded serial number information system may provide more value than the mere sum of their values.

Economic Principle vs. Crime

This application describes in more detail how the reading of bar coded serial numbers on objects of value, including currency, may become an indispensable aid for detecting and tracking criminals and criminal activity (beyond counterfeiting). The essential principle here is one born in a fundamental economic principle: commerce requires a medium of exchange. Criminal commerce (involving profit) is no different; it also requires a medium of exchange. However, there is one relevent distinction between criminal commerce and honest commerce: criminal commerce requires an anonymous medium of exchange—cash. The use of bar coded serial numbers on currency destroys currency's heretofore anonymity. Also, profit motivated criminal activity involving objects of value, if such objects were serialized with bar codes so that these objects could readily be traced, would be hampered.

In addition, bar coded serial number systems may eliminate counterfeit objects (including currency) that are authenticated in an information system which tracks the bar coded serial numbers. (If counterfeit objects could be detected prior to the counterfeiter making a profit and/or detected in sufficient time to allow enforcement agencies to apprehend the counterfeiter, applicants feel that such counterfeit would be eliminated.) Applicants have invented systems, disclosed herein and in their U.S. Pat. No. 4,814,589, which cope with counterfeits via accountability, versus the traditional anti-counterfeit measure, deterrence (making genuine objects with sufficient skill so that bogus copies may readily be discerned by eye).

Because of steadily growing technological advance and growing skill and dedication among counterfeiters for faithful reproduction, deterrence has become less viable, while conversely, applicants believe that their accountability solution is and will be become viable. Both approaches however, must rely on enforcement. Only accountability however, provides enforcement agencies with valuable "leads," which may lead to apprehension. A bar coded serial number information system for currency is described in detail below. For present purposes, the benefits discussed would be realized if bar coded serial numbers on currency were read only by banks and this information centrally processed.

Automatically gathered business information, as well as leads for law enforcement agencies to catch criminals, are benefits of applicants' invention. Civic concerns and profits are both important. There is value in effective crime control and in effective counterfeit control, as well as business information acquired from such systems, as described below.

Casino Chips with Bar Coded Serial Numbers

For example, applicants' U.S. Pat. No. 4,814,589 describes a custom circular coding system for casino chips and casino information systems using uniquely bar coded casino chips. Bar codes used on casino chips may take different formats, such as BCB or 2x Max.

While thievery by players and employees alike involving casino chips is traditionally a serious problem to the casino industry, and while real-time accounting may provide invaluable money management information, a major value of bar coded casino chips is to provide in-depth individual player information. Such information is valuable for a casino to identify a profitable customer base: loyal "medium-rollers" who gamble away hundreds of dollars periodically.

As described in applicants' '589 Patent, casino information systems using uniquely bar coded casino chips may have many benefits, e.g.: speed up the games to provide more action and faster turnover; automatically learn about individual and group players of both slot machines and table games for rating, tracking, "comping," etc.; dramatically increase labor control and reduce labor costs; provide complete security for all casino currency; prevent theft; eliminate counterfeit casino chip and token losses as well as losses from a variety of other schemes used to cheat casinos; provide slot machine acceptors for individually serialized tokens and/or table game chips and allow "credit plays" etc.; eliminate the need to stop games for accounting or control purposes; allow automation and integration of all management functions, and so forth.

To emphasize one point, a major benefit based on explicit information is that casino management will be able to give more "comps" and better treatment to the right players and less (or none) to the wrong players. One way to do this is as follows: players need to be identified by casino personnel when purchasing chips and tokens when asked or recognized or otherwise. Casino employees selling the chips and tokens would only suffer the minor inconvenience of entering the player's identity into the computer system when selling chips and tokens (the amount of the sale would be automatically recorded). The chips/tokens given to the player would come from vending devices such as cashier or dealer chip racks or portable devices carried by slot token sellers that, e.g., read the chips and tokens sold. Portable devices may readily connect to the computer system (e.g., through individual slot machines) so that the computer system can be kept abreast of all transactions in real time.

The computer system may automatically associate the serial numbers of the chips and tokens vended in each transaction with the player's identity. Thereafter, the computer system may observe every detail of his play including each amount bet, whether a win or loss, what time, how frequently, which table or machine, etc. The serial numbers of chips and tokens won may automatically be associated with the serial numbers of the chips and tokens wagered to make the win, thereby informing the computer system of the serial numbers of additional chips and tokens each player acquires by winning.

The computer system is thus able to follow a player's every action with each and every chip and token the player buys, loses, wins and cashes in. Additionally, the computer system is in frequent contact with every individual chip and token belonging to the casino. Thus, the computer system sees everything, precisely, all totally automatically and instantaneously, requiring nothing of the player and a minimum of effort from casino employees.

Players could also be identified while playing or cashing in, as well as purchasing, or various combinations thereof, or other ways, such as the use of bar coded individual player identity cards.

Holographic Counterfeit Deterrents

Holograms are printed 3D images, such as are used on credit cards. Holograms are a strong deterrent because of the difficulty involved in printing them. Holograms may offer a solution to some counterfeiting problems, but their solution is potentially temporary. The theory behind holograms (and deterrents in general) is that counterfeiters cannot print holograms properly and therefore untrained people need only visually inspect for a proper hologram printed on (or attached to) an object of value to determine if the object is authentic. However, counterfeiters can learn to reproduce holograms (as they successfully learned to reproduce $100 bills, etc). This is a fatal flaw deterrents suffer. Thus, deterrents alone cannot be relied on.

The deterrent/hologram solution and applicants' bar coded accountability solution both require sophisticated printing technology. Holograms are printed on (or otherwise associated with) the respective objects they protect, as bar coded serial numbers will be with the objects they protect. However, once the printing of a given hologram is mastered by counterfeiters, this same hologram is reproduced over and over for each counterfeit object. While obviously not the primary thrust of applicants' accountability solution, each counterfeit serial number a counterfeiter prints must be different to be effective, as explained below. In the case of currency, for example, bar code "numbering blocks," or print wheels would be required which would not be made available except to the Bureau of Engraving and Printing.

The accountability solution is not similarly flawed; even if bar coded serial numbers could be readily reproduced, since the serial numbers are accounted for by a computer, counterfeits may be detected. The use of bar coded serial numbers allows cost-effective accountability.

A person is required to see and authenticate holograms on an object, while a bar code must be machine read and authenticated by a computer. Given this difference, people vs. machine, these two techniques are not mutually exclusive: each serves a different purpose. While machines offer dramatic new possibilities for counterfeit control, sometimes it is more convenient for people to authenticate objects. Indeed, both techniques may be utilized together, in a complementary fashion: an object of value with a hologram and with a bar coded serial number would enjoy the benefits of both solutions. The advantages bar coded serial numbers offer are that a machine can authenticate objects faster, en masse, automatically, without possible human error and without regard to printing technology which counterfeiters may master.

Serial numbers are traditionally used on currency, ostensibly to cope with counterfeits. (When discussing counterfeits, the basic principles are similar and relate to casino chips, currency, consumer articles, documents or any counterfeit object; counterfeit is counterfeit.) According to the applicants, the theory behind the primary benefit of serial numbers is that no two bills should have the same number, and secondarily, only specific ranges of serial numbers are authorized. However, it is impossibly tedious for people to record and compare serial numbers in order to check for duplicates. Thus, serial numbers cannot fulfill these functions because people alone cannot adequately process serial numbers.

However, computers can process numbers with ease. Bar coded serial numbers and data bases are a solution (possibly the only solution): bar coded serial numbers may easily be read by computers and that information automatically processed to detect duplicates. Anything that is counterfeited today can be protected by a computer and a bar coded serial number, as described herein, and described previously in applicants' U.S. Pat. No. 4,814,589. What can be printed or made, can be copied. Thus, the accountability approach is superior to deterrent counterfeit measures.

Serial numbers will not be re-used when a bill wears out for, say, ten generations (35 years per generation, total 350 years). Further, the government may want the coding system to allow for more bills in circulation and, for example, to have the potential to encompass other nation's currencies at some time in the future. This may be important because U.S. currency is used throughout the world and it would be desirable for all governments concerned to have U.S. currency read by banks overseas. U.S. currency readers may be resisted in other nations if such readers could not read respective nation's currencies as well.

The BCB bar code shown below exceeds these requirements. Moreover, the thinnest code element of this BCB code is a nominal 0.01" and thus compatible with common reading devices with only an added simple BCB reading software routine. The sample is shown actual size, 1" by 0.1", representing a bill's serial number:

As has been demonstrated, the BCB code cannot be fooled, i.e., it can detect virtually all plausible damage to its code without generating an incorrect reading, and it can also correct most ordinary damage that may affect a code. However, for reusable objects such as currency, the primary requirement is that a damaged code not generate a misreading, because if a code does not read properly, for any reason, it is best to replace it. Detecting errors automatically is necessary and it is quite convenient to correct errors as damaged bills are detected for replacement. But bills with damaged codes should be replaced even when bar code readings are correctable.

Currency System Security

Three currency information systems may run simultaneously and independently at separate locations for security, as is done with other important government computer systems. (An information computer system for official records such as birth certificates, etc., for New York City for example, operates independently in three computer systems at three separated locations for security purposes.) Double redundancy copes with most fears: earthquake, explosions, computer hackers' attempts, sabotage, etc. Access to the systems must be limited and the systems protected. Any attempted unauthorized access is cause for suspicion and investigation. Parameters for unauthorized access may readily be established and all such attempted access automatically recorded: if a problem occurs, there is a record for tracking down the cause.

Security for the currency information system must not rely on secrecy associated with the coding or other secrets such as secret algorithms. Applicants believe that secrets are meant to be broken. Random is random; nothing can "break" random (except actual "theft" of the random ID numbers after their generation, which is a security consideration). Even if would-be counterfeiters were resigned to one-for-one copying, they would have little chance of success given accountability and the data base.

Counterfeit Detection/Deterrence Using Random ID Numbers

Routine use of serial numbers on currency (or other objects of value) forces more sophisticated counterfeiters to sequentially number their counterfeits. For example, large numbers of counterfeits with the same serial numbers are more difficult to illegally sell or pass because of the increased risk of detection. Moreover, sequential numbering presents no problem to counterfeiters using ordinary serial numbers. A counterfeiter merely needs to read one authorized serial number from a real bill (or object) and count from there for his illicit printing purposes. Thus, common use of serial numbers is no obstacle to counterfeiters.

However, applicants' U.S. Pat. No. 4,814,589 offers another distinct measure to cope with counterfeiting: randomly selected serial numbers. The '589 Patent describes the use of random as a deterrent as follows using round coding on casino chips as an example (column 15, lines 43 to 58):

> "It should be pointed out that the security of the coding/decoding system described herein does not reside in secrecy of the manner of coding and decoding, but rather security resides partially in the use of substantially less than all possible valid numbers available and in the random secret selection thereof. Thus, if a casino utilizes a code capable of encoding about 18 million chips and selects randomly only one million valid numbers to be encoded on one million chips, (designating the unauthorized 17 million as potential counterfeits) one would not be able to deduce from a sampling of the chips in use what valid numbers are being used. Security, moreover, resides in the fact that two or more chips with the same coded information means that one or more of them is counterfeit."

Randomly selected serial numbers should not properly be called "serial" numbers because they are not sequential or part of a detectable series. Indeed, randomly selected numbers do not conform to any rule or algorithm whereby they may be predicted. "Random ID numbers," or "RID" numbers, is more appropriate.

In practice, random selection of ID numbers creates difficulties for counterfeiters, because they cannot sequentially number their counterfeits as before: they must copy authorized ID numbers from genuine objects, one for one. This deterrent aspect of Random ID numbers would also necessitate the modification of numbering apparatus in an unusual fashion since numbering devices typically number sequentially. Authorized originators only would have limited, controlled access to such required specialized apparatus. Such legitimate apparatus may be computer controlled (in response to, e.g., a random number generator based on "noise").

RID numbers merely need to be compared to the randomly selected authorized numbers that are recorded in a data base. If an object's ID number is not recorded, it is a counterfeit. RID numbers may, but need not be checked against information read from other objects to detect duplicates. However, in combination with an accountability system, random selection of ID numbers is a powerful new deterrent measure to help thwart counterfeiting. Accountability is provided with a data base and once a data base is utilized, the additional required operational cost of also utilizing randomly selected ID numbers is low.

Counterfeit control for some applications, less critical than for currency, may not require accountability, and may simply require RID numbers on authorized objects, a data base to store authorized RID numbers, and a comparison of numbers read from objects to the authorized RID numbers stored in the data base to determine if the RID numbers are present, and thus authorized.

A random system wherein numbers read are only compared to stored authorized RID numbers to determine their authenticity, and accountability is not provided for, is relatively easy to start, and is an innovative advance over existing counterfeit detection methods. Indeed, a random system for an enormous quantity of objects of value could operate in a large desk top computer, as described below.

However, a random security system for currency for example, and nothing more, is flawed similarly to holographic deterrents. In theory, if a system relied solely on random selection of ID numbers, a counterfeiter would only need to learn one authorized ID number and repeatedly print it on his bogus goods to be successful because one such number would consistently pass the simple comparison test described above. A random system's effectiveness would be dramatically increased if, for example, it also kept track of how often each ID number is read (increasing the systems memory requirements proportionately; keeping track of how often each ID number is read is one function of an accountability system).

For less demanding applications, the mere printing of bar coded numbers and/or, e.g., holograms, may suffice for limited counterfeit control because both are inconvenient to print. In this regard, where bar coded numbers are printed but not read, holograms have the deterrent advantage because holograms are more inconvenient to print than bar codes (however, they are also more expensive to print). On the other hand, bar codes may serve as a more effective psychological deterrent, because bar codes appear to have function beyond their mere presence. However, applicants believe that mere inconvenience or psychological deterrence should not be solely relied on to stop counterfeiters.

BCB Bar Coded Currency Serial Numbers

Below, a specific format of BCB coding for Random ID numbers is described using currency as an example. The particular BCB format used is not critical and, indeed, other bar codes could be used and other objects may be similarly bar coded. However, BCB is the most compact and reliable bar code, whether Random ID numbers, serialization, letters and words, etc. are coded, as described above. Differing BCB coding formats may be more suitable for differing applications. For example, reading bar codes from audio cassettes or small packages of pharmaceutical products at the point-of-sale, for example, has different requirements than reading codes while sorting bills from stacks of bills in hi-speed sorting machines equipped with BCB bar code readers at a bank. However, it would be quite valuable for all bar codes to be compatible among themselves and with computers. Additional currency bar coding features are described below.

Bar codes on currency may be read by various devices, from hand-held "wands," to sophisticated laser scanners, etc. Hand-held bar code reading wands may be manufactured in quantity inexpensively, like hand-held calculators. Bar code readers may be combined or associated with, e.g., telephones so that, e.g., the authenticity of currency may be verified by dialing government verification facilities (at cost or free) and then reading the bar code on a piece of currency with the wand associated with the telephone so that the bill's serial number is transmitted over the telephone lines, as described below.

Regarding the cost of operating a currency information system, which applicants expect will be substantial, and will include, e.g., a significant cost for the telephone lines and/or other means to transmit information relating to currency to and from central processing location(s), etc. Costs may be offset in whole or in part by charging for inquiries, which may include inquiries from abroad since U.S. currency is often used internationally.

Bar code reading devices associated with telephones may provide signals related to bar codes read into the telephone lines and may be used for a variety of purposes.

Store and restaurant personnel, cashiers at banks, wagering establishments (casinos, race tracks, betting parlors, etc.), individuals, representatives of manufacturers, distributors, etc. may verify currency, may determine or verify the identity or authenticity of pharmaceutical products, obtain or verify drug indications and precautions, register purchased products for warranty, authentication and other purposes, e.g., software licenses and goods likely to be pirated or counterfeited such as pre-recorded video and audio media, designer clothing, auto parts, etc.

In essence, such services would promote sales by providing worthwhile after-the-sale service (at cost or free) to customers, while simultaneously providing valuable information to vendors, which information may be utilized to control counterfeiting, as well as provide marketing, accounting, and other valuable business information. All such use of bar coded serial numbers adds information to the data banks, which is processed with other information. One reason computers have become indispensable to society is the cumulative value of increasing amounts of stored and processed information.

Limited access may be provided for individuals and small businesses to utilize the government's currency information system data bank for verification purposes. If a bar code reading device is not present on a telephone, the authenticity of currency, etc., could still be verified, using a normal telephone's keys or dial, by keying or dialing the normally printed serial number, which is printed along with the bar coded representation, into the telephone. Bar codes would not be required for serial numbers keyed or dialed in, but this usage provides another application for data banks started for bar code ID information systems.

Verification and other information transfer may be accomplished between remote locations including some of the following: a fax machine, a telephone, other dialing apparatus such as a keypad, a modem, a bar code reader (BCR), a display, etc., and a central location including some of the following: a telephone, a modem, a computer, a data bank, storage, etc.

Use of bar code readers and telephones is described in the following U.S. patents: U.S. Pat. No. 4,042,792, Pakenham et al.; U.S. Pat. No. 4,329,684, Monteath et al.; U.S. Pat. No. 4,535,204, Hughes et al.; and, U.S. Pat. No. 4,654,482, DeAngelis.

Figure 29:
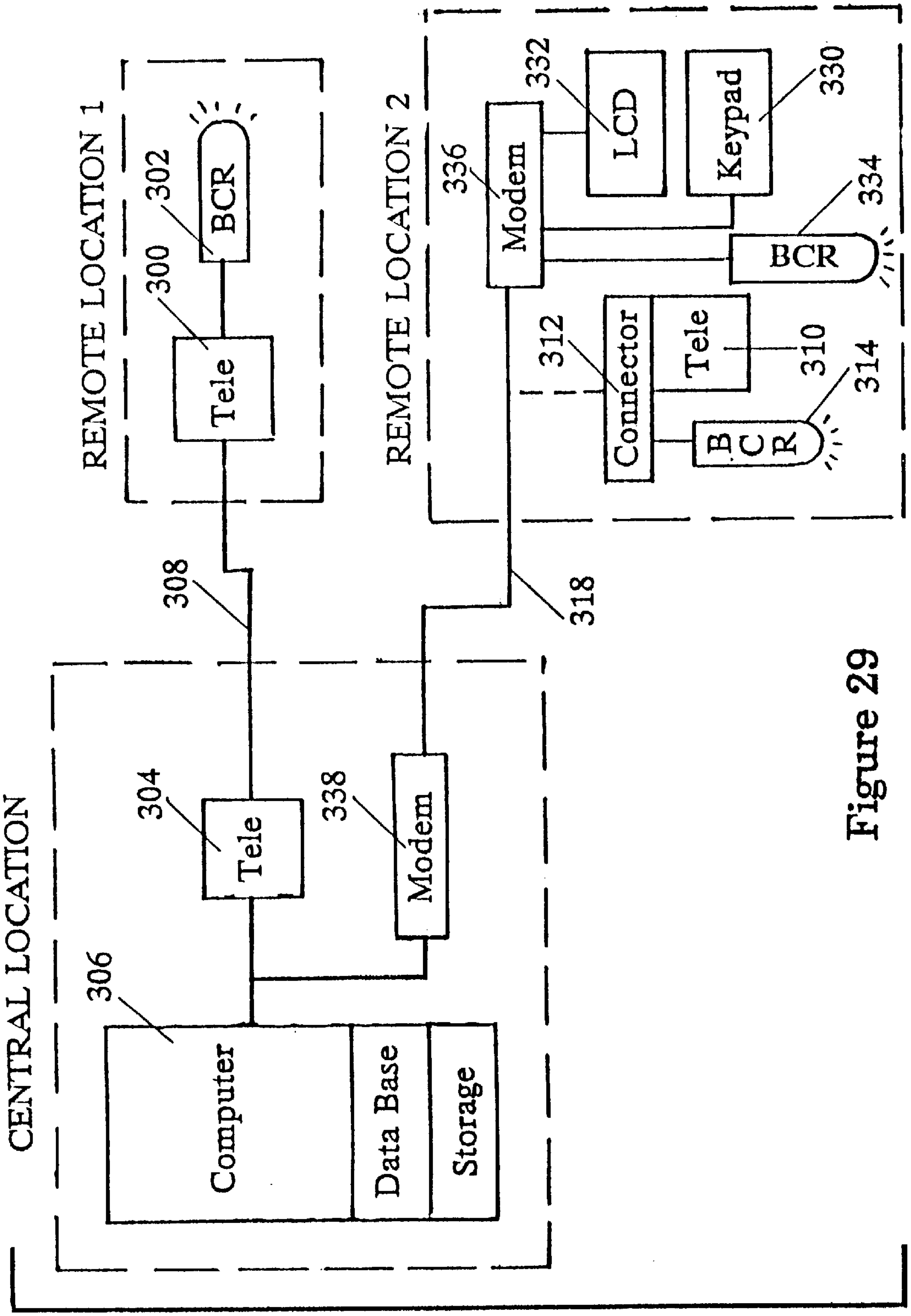
FIG. 29 shows a system with a telephone incorporating a bar code reader.

In one embodiment, as depicted in FIG. 29 herein, a telephone 300 with an associated bar code reader (BCR) 302 such as a hand-held wand (or hand-held scanner, such as Symbol Technologies' LS 2000 series scanners, or it could be a BCR device meant to be mounted or fixed, such as Symbol's LS 6100, LS 6300 or LS 5500 series) is provided at Remote Location 1, which accesses the computer 306 through normal telephone lines 308 and a telephone 304 associated with the computer 306. A telephone 310 may connect to a connector 312 connected to the wiring of the BCR 314 and this connector then connect directly or through additional wiring to the telephone lines 318, or the BCR may be integrated with the telephone more directly, i.e., the BCR 302 may be provided as an associated feature or component of the telephone 300 when purchased, as depicted in Remote Location 1 in FIG. 29. The BCR may be powered by drawing power from the telephone lines thus avoiding the need for a battery, AC line power and associated AC power supply or other power. Cooperation may be required and expected from the telephone company since such bar code reading would represent a major new business opportunity for the phone company.

The computer in FIG. 29 may establish an interactive system and provide audio prompts via the telephone to enter a serial number on currency and other objects, etc. The system may also provide audio confirmation and/or other information. Such a system may also include a key pad device 330 and/or a video display device (e.g., a liquid crystal device, LCD) 332 for information entry and display, and/or a BCR 334, and/or a telephone with or without a BCR and a modem 336 type of device, as depicted in FIG. 29 Remote Location 2. In Remote Location 2 of FIG. 29, a BCR 314 is connected to a connector 312 associated with the wiring of the telephone and the connector 312 also connects to the telephone 310. If a key pad device 330 is used, it may be preferred that modems 336 and 338 be used as shown, e.g., in Remote Location 2 FIG. 29.

Figure 30:
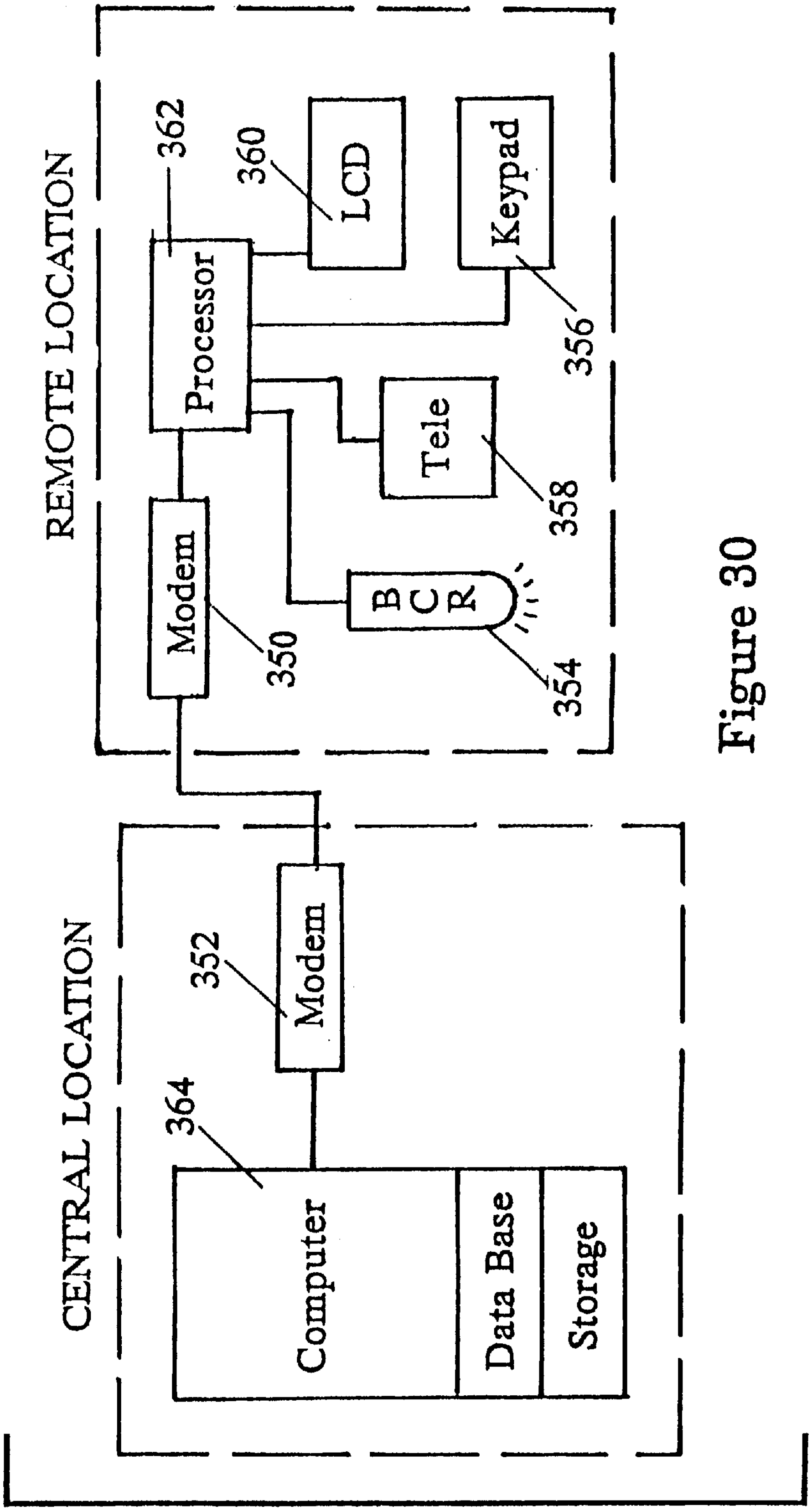
FIG. 30 shows another system with a telephone incorporating a bar code reader.

In another embodiment, depicted in FIG. 30, a modem 350 is provided at the remote location and another modem 352 is provided at the central location, and information entry means such as a bar code reader BCR 354 or keypad 356 or the keypad on the telephone 358 are provided for information entry, and a video display 360 may also be provided, as in the embodiment of FIG. 29, wherein these devices may be connected to a processor 362. The computer 364 establishes an interactive system which prompts for and controls data entry and transfer.

In a similar manner as described above for associating a bar code reading device with a telephone, a bar code reading device could be associated with a FAX machine, so that, for example, a FAX operator can input an intended receiving number instead of keying or dialing it.

Access to the currency information system by individuals and businesses for verification purposes would provide additional information to the system, as well as provide confidence and comfort to those verifying currency. However, for the system to function as described for both counterfeit control and crime control, banks need only read currency when they receive cash deposits and when they provide cash withdrawals. Verification by others, in additional to banks, would improve and increase the overall abilities of a counterfeiting and crime control information system.

Applicants believe that, at any given time, almost half of all currency is directly accounted for, by virtue of the fact that it is in the custody of banks or the Federal Reserve. Most cash comes from banks in the form of payroll. Individuals cash their paychecks or businesses cash larger payroll checks for their employees. In the latter case, the bank usually provides individual cash payroll envelopes containing each employee's pay and payroll information, such as the employee's tax deductions and social security number.

Typically, payroll cash is subsequently spent at local businesses for goods or services. Businesses, in turn, deposit cash daily at their bank. Unspent wages are usually deposited by the individual in a checking or savings account at a bank. Thus, most cash "circulates" in and out of banks, in accord with payroll cycles,.

Each time money "circulates," a set-of-information is generated. If only about half of the number of "circulation sets-of-information" is acquired by banks, the rest of the information may be "pieced-in," analogous in a way to analyzing a "paper trail." Thus, sufficiently complete information about almost all cash that circulates "honestly" may be had. In other words, for the currency information systems to work as described herein, only a fraction (one-half or less) of the money in circulation need be read by banks for the system to provide benefits described. Analyzing the circulation of currency may be compared to traffic or weather analysis. The information that may be gleaned from the currency information system described may also be useful to track various economic activity, buying and saving habits and trends, to predict various favorable or unfavorable economic conditions, provide economic indicators, etc.

Exceptions to these cycles may indicate "mattress" savings, criminal usage, etc. Criminals typically do not maintain bank accounts for ill-gotten gains. Serial numbers of currency that leave the normal circulation cycle will be detected. Most "drug" money, for example, does not circulate to and from banks regularly. However, patterns of such money leaving the normal circulation cycle may be detected and would provide valuable information to the authorities.

As a result of reading bills at banks and automatically associating this information with the account number or social security number of the person or entity making the withdrawal or deposit, and processing the information centrally to check for counterfeits (duplicates), etc., information about the circulation or flow of currency may be acquired.

With a currency information system, information about any specific currency may be stored and this could be valuable. For example, if a mugger or burglar steals cash from a victim, that victim's money may be identified by checking with the victim's bank or the bank where the victim got his pay from. Criminals may be prosecuted based on their possession of uniquely bar coded "evidence" because such property may be proven to belong to someone else.

With a currency information system, a thief has no way of knowing if information about the stolen currency is stored so as to be traceable. If he were to spend or pass-on this money, there would be a chance that he would provide a "lead" for enforcement agencies to follow. Similarly, e.g., money confiscated in a drug bust or from known organized criminals or contractors doing business with the government, etc., may be traced, possibly with the result of exposing people previously thought to be trustworthy, e.g., police, politicians, lawyers, clergy, community leaders, executives of Fortune 500 companies, etc. Corrupt people and entities that previously were effectively safe from exposure would run a greater risk of exposure with a currency information system in operation. What the currency data bank may reveal is leads: leads for police to follow, leads they never would have had, because money was heretofore anonymous. Leads are important for effective law enforcement. Currency with bar coded serial numbers may be tracked in order to provide leads, much as leads are provided by fingerprints left at the scene of a crime.

Applicants think that a currency information system would create significant implications for society that should be noted. For example, applicants feel that personal ethics are, to a large extent, voluntary, i.e., they feel that individuals may chose to adopt lower levels of ethics simply because it may be more profitable and it is relatively risk free to do so. A currency information system will cause individuals to voluntarily adopt higher levels of ethics by increasing the risk of exposure associated with unethical acts involving money, crime, tax avoidance (tax collecting agencies may benefit from a currency information system), etc. Honest people will enjoy the benefit of knowing that their bar coded currency is more likely authentic and safer (if stolen, it is traceable and thus more recoverable), especially if they took the time to verify it, which adds more information to the system. Honest people will also benefit by knowing that less honest people will be running increasingly higher risk of exposure. Less honest people will view bar codes as a threat, and thus the incentive to improve their ethics will be always be present, e.g., whenever they spend or think about spending tainted cash.

The drug problem today in the U.S. is dramatic as are the efforts to cope with the problem. Such efforts may go so far as to use military forces to fight in the "war" against drugs. Applicants believe such efforts are counterproductive, much as prohibition was. Prohibition, applicants believe, caused dramatic growth in the industry of crime. Applicants feel that bar coded currency may be the basis of more effect means to cope with this problem, both in terms of human lives and cost. It may be the only solution (besides legalization).

The casino information system previously described provided detailed player, security and accounting information. A currency information system may provide similar information but for it to be effective it need only provide leads because leads typically are sufficient for enforcement agencies to be successful.

Currency Coding Requirements

Bar coded currency ID numbers have been selected to demonstrate BCB further because it is a rather demanding application. One such demand: a large information capacity code in a small, unobtrusive size. While the government could use a large code printed with invisible-to-the-eye ink, it may not be desirable to use a hidden or secret code. If the government used one of today's popular codes printed in normally visible ink, the code would have to be larger than a BCB code (and even so, less reliable), changing the appearance of money more drastically. A suitable BCB bar code is shown (and described below) which is readily visible but hardly noticeable when placed on a real bill in association with each of the normally printed serial numbers:

Applicants understand that at any given time there are about 20,000,000,000 (twenty billion) U.S. bills in circulation worldwide and that, given wear and tear, the average life of a one dollar bill is about one and a half years, longer for higher denominations. Assume that the average life of all bills is two years. That means over 27,000,000 bills are printed for replacement purposes every day of the year.

Bar coded serial numbers will be unobtrusively printed in normal visible ink in association with the normal serial numbers that are now printed on all bills. Preferably, the two codes printed on each bill must be as readily "printable" as the normal serial numbers. This is another advantage of BCB. Requiring only binary digits and using the logic of binary arithmetic, mechanical printing apparatus for BCB is easier to manufacture than other bar code printing apparatus. Printing apparatus for I 2 of 5, UPC or Code 39, etc. would be more difficult to fabricate than BCB apparatus because of the use of distinguishable patterns that make less sense, mechanical or otherwise, as described above.

Because the serial or Rid number is printed twice on currency in bar code form and twice in normal numerical form, a code damaged beyond recognition does not mean that the serial number is lost forever. Even if all four printed serial numbers (two normal and two in bar code form) were not properly "legible," portions of each may be logically "pieced" together to retrieve an otherwise-lost serial number (similar to retrieving information from damaged continuously repeated bar codes). This is a distinct subject and is quite useful. Serial numbers from such damaged bills may thus be retrieved and removed from circulation and "retired" (designating their possible future use as counterfeits) or reissued if desired.

Wallpaper bar coding, as described above, may be most suitable for currency. For example, if invisible bar codes were desired, fluorescing inks (which are quite durable) may be used as follows: on the entire face of a bill (or with a small margin around two or more of the bill's edges) three or more repetitions of the bar code may be printed in a continuous fashion.

Selecting and Storing Random ID Numbers Efficiently

When selecting ID numbers randomly, there is no reason to do it chaotically. Random ID numbers may be chosen in an orderly fashion while still preserving their random nature. As described, this is not similar to pseudo random, i.e., applicants' random ID numbers are not just seemingly-random.

One BCB digit may conveniently suffice for random purposes. One BCB digit in one fixed location of the bar code may be selected randomly (using, e.g., a random generator based on "noise") and stored in the database along with the rest of the ID number. The rest of the ID number may be orderly, sequential, serial, part of a detectable series, conform to an algorithm which may or may not be kept secret, etc. Thus, it cannot be deduced from a sampling of authorized ID numbers what other ID numbers have been authorized or will be authorized. Nor can the method of selecting authorized ID numbers ever be discovered or fall into the wrong hands, because previously randomly selected numbers and future randomly selected numbers cannot be predicted because no rule or algorithm is used in association with their generation; they are random. A BCB bar code may be made random by the orderly, but random, selection of a single BCB digit, as described below.

Regarding efficient storage of randomly selected ID numbers: in order to reduce memory requirements, only the single random digit for each ID number of a series of ID numbers need be stored.

For example, each successive "serial" number, less the single random digit, may be a respective computer memory "address," or may be referenced to a respective computer memory address (an address, or locator, is a location at which information may be stored in a storage device), and only the single random digit of each successive serial number actually stored. This reduces the actual memory requirement to one (binary) digit per ID number. Thus, applicants have reduced the storage requirement for each random ID number to one single bit in a computer.

This assumes that each binary digit in a computer memory register is individually addressable. If however, a particular computer is used in which only a complete computer memory register, comprised of, e.g., 32 (binary) digits, is individually addressable, then each separate digit may be made individually addressable as follows: the complete register address is followed by the number, from 1 through 32, of the successive location of a respective digit of the 32 digits. Thus, a random ID number printed on a bill may be comprised of a particular computer memory address, M, (or information referenced thereto, to correspond to a particular 32 digit memory register of a computer), a location from 1 through 32, L, (for a particular digit of the 32 digits of said memory address) and one random digit, e.g., (binary) 0, for a complete random ID number printed on the bill of, "ML0". What would be correspondingly stored for this random ID number in the computer, at address, M, located at L digit of address M, is, simply, (binary) 0, which requires only one bit of actual memory for what may be a relatively large random ID number.

For example, one word in Gulley's memory system, described above as having 32 digits of information and 7 digits of EDAC, may be used to contain 32 random binary digits for 32 respective successive serial numbers. In other words, since each word in Gulley's memory system contains 32 information digits, each such information digit may comprise the randomly selected digit associated with a respective serial ID number because each such information digit may be distinguished and determined in association with a specific computer memory address, digit location/serial ID number, as described above.

Further, Gulley's 7 EDAC digits associated with each word may be utilized in normal fashion as described by Gulley—to provide error detection and correction of one switched digit, thus insuring the integrity of the 32 information digits (comprised of 32 randomly selected digits) incorporated into a 39 digit word. If Gulley's 32 information digits are "mixed" with the 7 EDAC digits, the word may have to be processed to remove the 7 EDAC digits so that the 32 information digits may be "addressed" separately. Preferably, applicants' EDAC technique, as described above, would be used.

As mentioned above, a random ID number system that did not provide accountability beyond keeping track of how often each random ID number is read would be a powerful counterfeit control measure in some applications. A system that utilized normally serialized numbers, that did not provide accountability beyond keeping track of how often each non-random ID number is read, would also be a powerful counterfeit control measure in some applications. An example of how each may operate is described below.

For example, a system that uses normally serialized numbers, and does not provide accountability beyond keeping track of how often each ID number is read, may allow one empty-to-start memory register address for each authorized ID number that is printed normally and/or in bar code form on a respective bill. This register may contain, e.g., 32 digits, as described above. The register itself may be set to zero when the normal serial number is first authorized and issued on a respective bill. This register may be used to keep track of $2^{32}$ (over 4,000,000,000) subsequent readings of each bill so authorized and issued.

A system that utilizes randomly selected ID numbers, and does not provide accountability beyond keeping track of how often each random ID number is read, may allow one empty-to-start memory register address, except for one digit in a predefined location of the register, such as the first (most significant) digit of the register, for each authorized random ID number that is printed normally and/or in bar code form on a respective bill. This register may contain, e.g., 32 digits, as described above. The register itself may be set to zero, except for the location of the random digit which is set to binary 1 or 0 in accord with the random selection therefore, when the random ID number is first authorized and issued on a respective bill. This register may be used to keep track of $2^{31}$ (over 2,000,000,000) subsequent readings of each bill so authorized and issued.

For these approaches, a register smaller that 32 digits may suffice. For example, a 16 digit register would allow up to a maximum of $2^{16}$ and $2^{15}$ readings to be recorded, respectively (over 65,000 and 32,000, respectively). Also, while bar coded ID numbers may make it practical and/or convenient to keep track of how often each bill (or other object) with a serial ID number or a random ID "circulates," i.e., is read, the systems described above may use means other than bar code readings to enter each "circulation" or reading, such as using an optical character recognition (OCR) device to read the normally printed ID number, or typing it on a keypad, to enter the information into the system.

Thus, this method of efficiently storing information in association with a related memory address may be used for various types of information such as: one or more random bits (also, a random decimal digit could be stored with 4 binary bits), how often an object is circulated, etc.

Bills that may thus be detected as "circulating" more than statistically probable would suggest that a counterfeiter used that particular serial number on one or more counterfeits. Such a suggestion may constitute a valuable lead to authorities concerned with such counterfeits. A single counterfeited bill (or other object) introduced into "circulation" would, on average, double the number of times its ID number was thereafter read. Thus, even one counterfeited object may be cause for authorities to start an inquiry based on the fact that a particular ID number exceeded a predefined parameter set in accord with reasonably expected statistical probabilities.

Be that as it may, one random bit may provide sufficient unpredictability in some applications for effective counterfeit control. This in effect gives an unsophisticated counterfeiter an even break: he has a 50% chance of guessing an authorized randomly selected ID number for any one object he counterfeits. That is, he has a 1-in-2 chance of success on one object, a 1-in-4 chance if he counterfeits two objects, a 1-in-8 chance if he counterfeits three objects, a 1-in-16 chance if he counterfeits four objects, . . . . Like flipping a coin, only the first time a tail turns up counterfeit may be detected. i.e., for more than one object counterfeited, the chances of successfully guessing correctly for each object counterfeited is reduced in accordance with conventional statistical mathematics. One random digit may be enough to deter counterfeiters because they must pass many undetected counterfeits for counterfeiting to be profitable.

One random digit used as described maintains order in the printing of money or the authorized production of objects when binary arithmetic is used. For example, if bills were printed from serial numbers 1 to 1,000 it would be automatically ascertained that 500 bills were printed because every other serial number, in a random fashion, may be selected. For example, one random "serial" number is selected from consecutive numbers 0 and 1, another randomly selected number from the numbers 2 and 3, another randomly selected from 4 and 5, and so on. The use of random with binary may thus made quite manageable and orderly.

If more randomness is desired in certain applications, two or more binary digits may be randomly selected, 3 numbers may be randomly selected from 8 consecutive numbers, etc. If less randomness is desired in other applications, 3 numbers may be randomly selected from 4 consecutive numbers, 5, 6 or 7 numbers may be randomly selected from 8 consecutive numbers, etc. Be that as it may, there is no way for a counterfeiter (or anyone else) to figure out with certainty which ID numbers have been used, are being used, or will be used, other than copying legitimate, authorized random ID numbers one-for-one. The relevant principles may be applied to ternary codes, decimal codes, etc.

In addition to the special random BCB digit, other special digits may be used when bar coding currency, such as denomination digits, which may be provided for high-speed accounting convenience. While the denomination of a bill may be determined by checking the serial number against the database, this may slow down high-speed sorting and counting apparatus, such as that used where large amounts of currency are handled. Therefore, certain BCB digits in a serial number may be assigned to define the denomination of a bill, without database searching. This feature alone is quite valuable because it would eliminate the human error of mixing say, a $10 bill in a stack of singles. This is no trivial matter to banks, race tracks, casinos, amusement parks, or any business that uses automated equipment to handle its cash. Human error is a serious problem in handling large amounts of cash.

Thus, while one may otherwise question the need to bar code small denominations of bills, such as $1s or $5s, the question becomes moot: all bills need to be compatibly bar coded, minimally, so that their respective denominations may be determined from the bar coded ID number for sorting, counting, banding, etc. purposes. However, less or no information regarding small denomination bills may be stored and/or such information may be processed differently than larger denomination bills.

Denomination digits, and/or other special BCB digits, may be placed in predetermined positions of the code (other special digits may identify the national origin of currency, printing date, etc). In a similar approach, rather than using denomination digits as such, a particular "range of coded numbers" may be "assigned" for given denominations, a given range being defined by a low and a high magnitude. Decimal notation is used to illustrate this point for simplicity below (whereas in practice the limiting magnitudes of a given range may be defined in binary arithmetic if a BCB bar code is utilized).

$1 bills could be serialized between the magnitudes of 0 and 19,999,999,999; $5 bills between 20,000,000,000 and 29,999,999,999; $10 bills between 30,000,000,000 and 39,999,999,999; etc. Using the random digit as described would mean that 10,000,000,000 $1 bills would be printed, 5,000,000,000 $5 bills would be printed, 5,000,000,000 $10 bills, respectively.

Use of more than three BCB digits may be better for defining the denomination because increased flexibility may be realized without loss of efficiency. Three are described below for simplicity of explanation. Three denomination BCB digits could be assigned as shown in Table 19 below.

TABLE 19

| Denomination Identification | |
|---|---|
| 000 = open | 100 = $ 20 |
| 001 = $ 1 | 101 = $ 50 |
| 010 = $ 5 | 110 = $100 |
| 011 = $ 10 | 111 = $ 2 & $500 and up |

Figure 26:
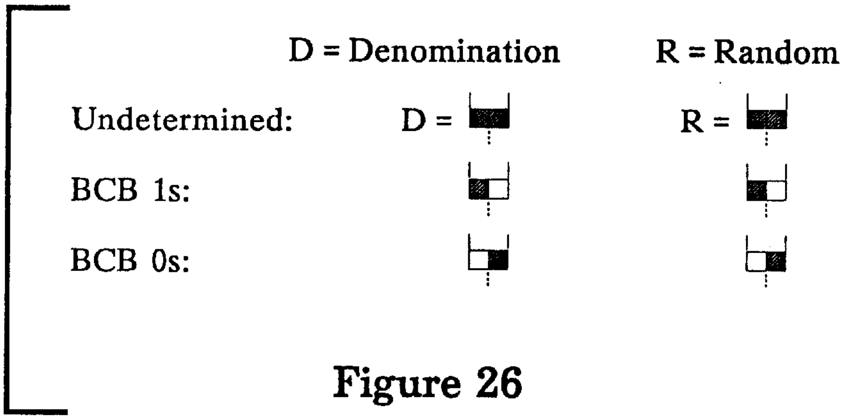
FIG. 26 shows examples of BCB denomination and random digits.
Figure 27:
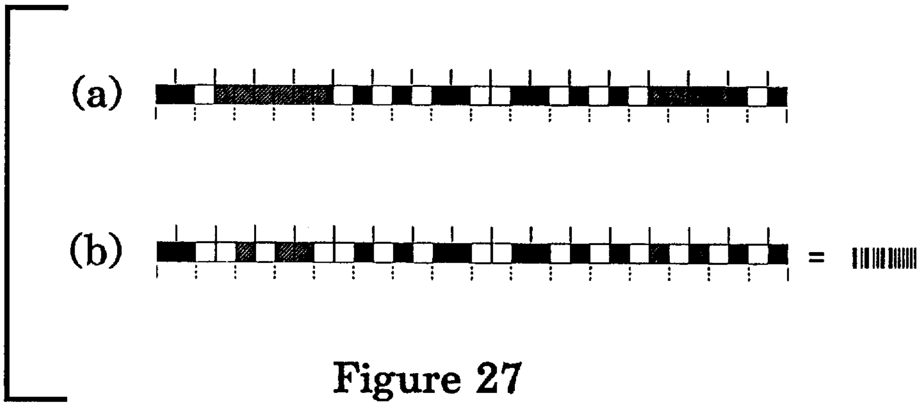
FIG. 27 shows examples of BCB denomination and random digits in a bar code.

FIG. 26 illustrates denomination and random BCB digits. FIG. 27 is an illustration of a BCB bar code symbol with denomination digits and a random BCB digit incorporated therein. FIG. 27*a* illustrates, from left to right, not including the end and start patterns, a BCB bar code representing three unspecified BCB denomination digits, the serial number 00010111, an unspecified BCB random digit and a (thus) unknown BCB parity digit, respectively. FIG. 27*b* illustrates the three denomination digits of 001 (defining a $1 dollar bill), this serial number, 00010111, with a randomly selected BCB 1 digit for the random digit, and (thus) the appropriate, even-BCB-0s, BCB parity digit 0 (each as described above). The actual BCB bar code symbol for this serial number is shown on the right in FIG. 27*b* and this actual BCB bar code measures 0.32" long.

In high capacity mechanical currency sorting/banding machines, which are used where large amounts of currency are handled, BCB code readings may be taken from the upper right quadrant of the bill only and reading is done from the center of the bill to its outside edge, left to right, just like reading a book. With BCB bar codes as described, such apparatus may sort, count and band bills in neat stacks with all bills identically arranged, i.e., none are upside down or back-to-front.

Figure 28:
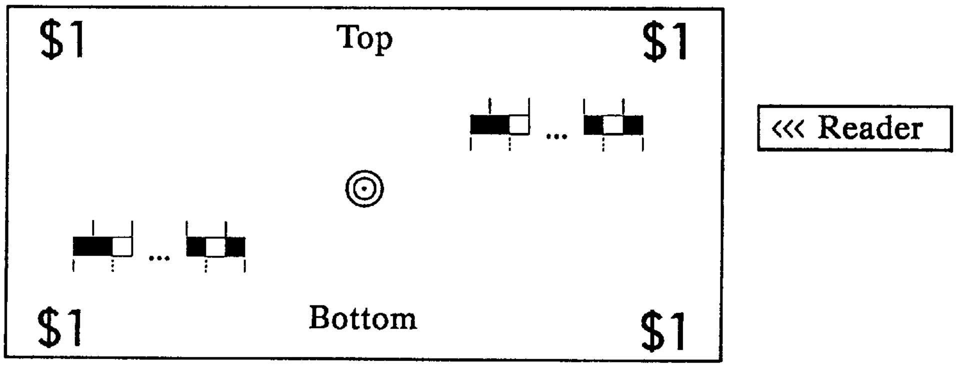
FIG. 28 shows BCB bar codes on currency.

The code is printed in the upper right and lower left quadrants as illustrated in FIG. 28. The bill may be in a right sideup or upside down orientation (rotated about an imaginary pivot point shown in the FIG. 28) in its stack of bills when going through the sorting machine. (Or the bill may be back-to-front, discussed below.) If it is upside down, the code in the lower left quadrant will be in the upper right quadrant and it will be read in reverse order. This presents no problem for interpreting the code since the code is bi-directional as previously described, which also allows for reading by, e.g., manual wands and scanners and fixed scanners such as those in supermarkets (supermarket scanners, by the way, may be made to scan currency as well as products).

As may be seen in FIG. 28, if the bill is read upside down (not back-to-front, discussed below) the left hand reference "stop" code will be read first by the reading device at the right of the bill. This is how the sorting machine may detect the bill's orientation, and thus orient the bill's portrait (which is present on U.S. currency) right sideup. Reading left to right, if the reader sees black, black, white, the bill is right sideup. If it reads black, white, black, the bill is upside down. This is easily understood when looking at FIG. 28 and imagining the bill rotated 180 degrees (turned half way around) in relation to the reading device which does not move.

When upside down bills are detected, the sorting device mechanically re-orients them to right sideup. For example, if a bill were placed in a stack back-to-front, no code would be read from the back of the bill and the sorting machine would right such a bill front-to-back and then read the code. Thus, the bar coded serial number may be utilized for mechanical orientation purposes. (However, in a start up phase, if old non-bar coded currency were being read as well as new bar-coded currency, allowance would have to be made since old currency would not have bar codes on either side. Old bills may be separated in this manner for replacement with new bar coded bills at some point in time.)

Of historical note, Chief Justice Chase was responsible for the first U.S. paper currency issued as legal tender in 1861–64 (during the Civil War), which gave rise to rampant counterfeiting, which gave rise to the creation of the Secret Service in 1865 to suppress counterfeiting. Applicants' research suggests that the "secret" in Secret Service refers to the fact that successful counterfeiting should be kept a secret from citizens because common knowledge of counterfeits undermines faith in currency: sound, trusted currency is required for government to govern. Applicants also point out that currency, like religion, requires faith to be viable.

Currency with bar coded ID numbers would instill more faith and trust in such currency, and would thus be perceived as "safer" currency by users worldwide. Applicants' research also suggests that U.S. $100s and $50s are no longer tender in much of Europe today because of widespread counterfeiting of these denominations of U.S. currency, and that the United States of America itself is currently in the worst counterfeit crisis since the Civil War.

Table 20 on the following page contains exemplary specifications and sample BCB currency codes consistent with the currency bar coding requirements discussed above.

Table 20: Sample BCB Currency Codes

*In a given application, the vertical dimension of the code may vary. The vertical* shown below, base to base, is .25".

The actual proposed currency bar code varies from the description herein and is presented elsewhere.

Measurements:

Code element = .01" (Width) x .10" (Ht.)
BCB digit = .02" x .10"
BCB 0 = .01 white/.01 black
BCB 1 = .01 black/.01 white
Overall Length of code = 1 inch

Description:

Total code elements = 100
Total BCB digits = 50, comprised of
49 BCB digits and 2 blk end elements
(2 blk ends = one BCB digit)

*1 BCB digit for "two blk ends"*
*1 Random BCB digit*
1 Parity BCB digit for BCB digits
2 Orientation BCB digits
45 Information BCB digits Therefore, $2^{45} = 35.18 \times 10^{12}$ is how many bills could be serialized with the one inch BCB code described. This is enough to code every U.S. banknote for the next 350 years, as well as five other countries' with the *same* number of banknotes and requirements as the U.S. Of course, during the 350 years, no serial numbers would have to be repeated to replace worn out money in any of the six countries and these figures allow for all banknotes in circulation at any one time (currently: $.02 \times 10^{12}$ in the U.S.) to almost double. Switzerland is a good country to first incorporate *safer* BCB coded money.

49 "0"s
49 "1"s
0101...10
1010...01
110110...1101
001001...0010
0011...110
1100...001
000111...1110
111000...0001
00001111...11110
11110000...00001
0000011111...000001111
1111100000...111110000
25 "0"s, 24 "1"s
25 "1"s, 24 "0"s
49 arbitrary sample
49 arbitrary sample
49 arbitrary sample
0s + Fig. 13 (old): 10110010001011101
0s + Fig. 13 (old) comp: 01001101110100010
0s + Fig. 13 (old) rev: 10111010001001101
0s + Fig. 13 (old) rev comp: 01000101110110010

Computer System

Figure 50:
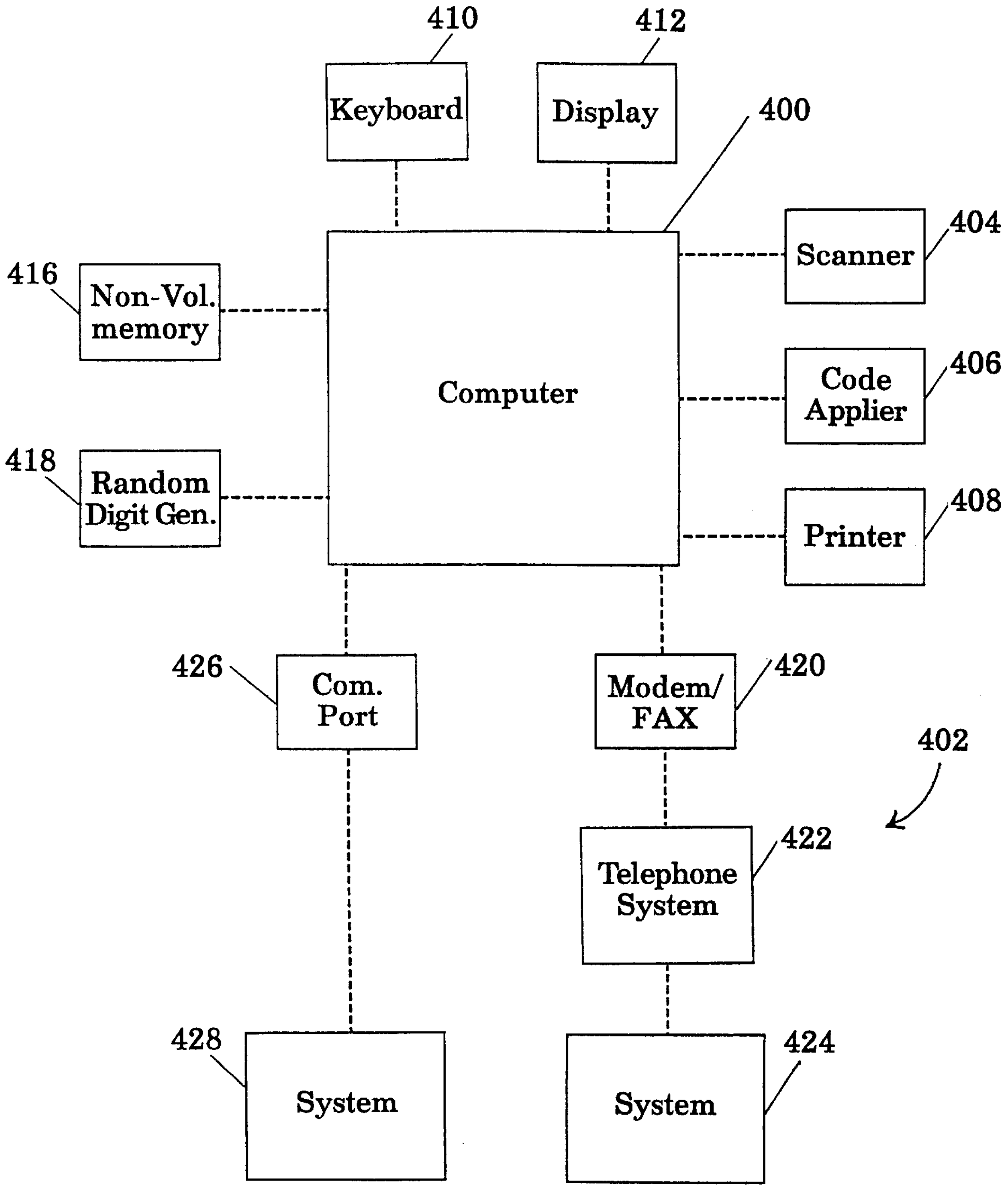
FIG. 50 is a block diagram of a system including a computer for carrying out the functions described in the application.

FIG. 50 depicts a computer 400 which may be used in a computer system 402 to carry out the processing, storing, bar code and machine reading, signal encoding, bar code printing, communicating with remote systems and terminals described above. Computer 400 comprises conventional components known to those of skill in the art, and may be a microcomputer, personal computer, etc. As such, computer 400 includes a central processing unit (CPU), read only memory (ROM), random access memory (RAM), input/output interfacing and control, registers, etc.

The following may be connected to computer 400 in various combinations to form a variety of computer systems 402, the connections being represented by broken lines which are meant to indicate that different components may be connected as necessary to achieve a given function: a scanner device 404 for machine reading bar codes or other machine-readable information, e.g., a hand-held bar code reader of the type described in "PC Magazine," Vol 7, No. 12, Jun. 29, 1988, starting at page 213; a code applied device 406 for applying code elements to paper, objects, etc., e.g., a laser or other printer for printing bar codes on paper or on other objects or, e.g., a computer controlled machinist's cutting tool to make recesses or slants on objects such as parts, tokens or casino chips, molds or dies etc; an impact, ink jet or laser printer, or a plotter 408 for printing text and graphics; a keyboard 410; a display 412; non-volatile read/write, or write once read memory (WORM) storage device 416, of the magnetic, optical, etc. Type, e.g., magnetic floppy or hard disc drive (in which, e.g., sub-piles may be stored); a random digit generator 418 which may, e.g., generate digits based on random cosmic noise); a modem or FAX 420 for communicating via telephone system 422 with other systems or terminals, etc., 424; a communications port 426, e.g., an RS232 port, for outputting coded signals to and receiving coded signals from other systems, terminals, etc. 428. Systems 424 and 428 may include a computer and components as described above for system 402.

Software and programs for operating computer 400 and computer system 402 to carry out the functions described herein are available or known or can be constructed by those of skill in the art from the disclosure herein.

Modifications And Other Embodiments

In some situations it may be desirable to print the coded or decoded information, or information corresponding thereto, in a normal decimal fashion or otherwise, on the face(s) of currency and other objects to allow people to readily read information therefrom. And further, it may be useful to print a reference on surfaces of objects to reference the code elements (codable positions) of the code. And still further, apparatus may be provided to more fully examine, objects and/or the codable positions thereof so as to extract additional useful information or to read damaged objects etc., and the apparatus could be used away from primary bar code reading stations to minimize any interference with normal operations.

Certain changes and modifications of the embodiments of the invention disclosed herein will be readily apparent to those skilled in the arts. For example, the coding/decoding system may be used for any alphanumeric coding. Moreover, to those in the various arts, the invention itself herein, will suggest solutions, etc., to other tasks, etc. Additionally, information coded and/or decoded with the coding/decoding system disclosed herein will find operating environments in various machinery such as mechanical, pneumatic, hydraulic, electronic. It is also possible to utilize three-dimensional coded formats in accordance with the invention. Although optical coding has been described in connection with a number of embodiments, it is to be understood that other forms of coding may be used, and that in such other forms of coding, "black" and "white" refer to the logic levels of which the coding form is comprised. Also, the code elements may have shapes other than those described herein. It is the applicants' intention to cover by the claims all such uses of the invention and all those changes and modifications which could be made to the embodiments of the invention herein chosen for the purpose of disclosure without departing from the spirit and scope of the invention. In the claims, terms such as obtain(ing), storing, processing, etc., information from coded objects, signals, coded information, etc., apply not only to information itself but to information related thereto or derived therefrom.

What is claimed is:

1. A method of coding information represented by first and second machine-detectable code elements defined by contrasting properties, comprising:

defining a start of the pattern of code elements with one or more code elements and defining an end of the pattern of code elements with one or more code elements, the start and the end being distinguishable from each other;

between the start and the end defining a first of two binary digits with a single code element of either property and defining a second of the two binary digits with two adjacent code elements of the same property, the property representing the code element or code elements of adjacent binary digits alternating;

arranging the code elements between the start and the end into a pattern representing the given information object to represent said information with binary digits.

2. The method according to claim 1 wherein the number of unique binary coded information messages possible (the yield) for increasing numbers of code elements representing the binary digits increases in accordance with a Fibonacci series.

3. The method according to claim 1 wherein the code elements include code elements coded for error detecting.

4. The method according to claim 1 wherein the code elements include code elements coded for error correcting.

5. The method according to claim 1 wherein the binary digits include a parity digit.

6. A method of coding given information comprised of characters of a given size character set into a single coded numerical message wherein individual characters are not distinguishable subsequent to coding and prior to decoding, comprising;

(a) performing a mathematical operation on each of the characters defining the given information in which the operands include the position sequence of each character of the given information, a number derived from the number of characters in the character set and each character's numerical value as derived from the character set;

(b) using the numerical total of each result of step (a) to represent the given information as the single coded numerical message.

7. The method of coding according to claim 6 wherein the coded numerical message is represented in a bar code.

8. The method of coding according to claim 6 wherein the coded numerical message is represented in a storage medium associated with a computer like apparatus.

9. The method of coding according to claim 6 wherein the coded numerical message is communicated over a communication medium.

10. The method of coding according to claim 6 wherein the coded numerical message is decoded by performing a mathematical operation on the coded numerical message with a number derived from the number of characters in the character set.

11. The method of claim 10 wherein the mathematical operation by which the coded numerical message is decoded is division.

12. The method of claim 6 wherein the mathematical operation is multiplication.

13. A bar code comprising a single bar coded representation of given integer and fractional numerical information, a predefined number of code elements in a predefined location of the bar code which define the location of a point which separates code elements representing the integer numerical information from code elements representing the fractional numerical information, wherein the code elements representing the given integer and fractional numerical information are located in other predefined locations of the single bar coded representation.

14. A bar code according to claim 13 wherein at least one additional code element in another predefined location represents the sign of the given integer and fractional numerical information.

15. A method of coding information in an alphanumeric mode and coding information in a numerical only mode into a composite coded message comprising:

coding the information in binary arithmetic with representations of the binary digits 0 and 1;

forming from the binary digits alphanumeric information from a first character set including letters and digits in an identifiable location or locations in the composite coded message;

forming from the binary digits only numerical information from a second character set including only numerical digits in an identifiable location or locations in the composite coded message; and forming a unique pattern for identifying the locations in the composite coded message of the characters formed with binary digits from the first and from the second character sets.

16. The method of coding according to claim 15 comprising the step of incorporating the composite coded message is a bar code.

17. The method of coding according to claim 15 comprising the step of storing the composite coded message in a memory apparatus.

18. The method of coding according to claim 15 including the step of communicating the composite coded message over a communication medium.

19. The method of claim 15 wherein the unique pattern identifies the locations of the characters formed with the binary digits from the first and the second character sets by separating them in the composite code.

* * * * *